United States Patent [19]

Andersen et al.

[11] Patent Number: 5,683,772
[45] Date of Patent: *Nov. 4, 1997

[54] ARTICLES HAVING A STARCH-BOUND CELLULAR MATRIX REINFORCED WITH UNIFORMLY DISPERSED FIBERS

[75] Inventors: Per Just Andersen; Simon K. Hodson, both of Santa Barbara, Calif.

[73] Assignee: E. Khashoggi Industries, Santa Barbara, Calif.

[*] Notice: The term of this patent shall not extend beyond the expiration date of Pat. No. 5,506,046.

[21] Appl. No.: 353,543

[22] Filed: Dec. 9, 1994

Related U.S. Application Data

[63] Continuation-in-part of Ser. No. 327,524, Oct. 21, 1994, Ser. No. 288,667, Aug. 9, 1994, Ser. No. 218,971, Mar. 25, 1994, Pat. No. 5,545,450, Ser. No. 109,100, Aug. 18, 1993, abandoned, Ser. No. 95,662, Jul. 21, 1993, Pat. No. 5,385,764, Ser. No. 982,383, Nov. 25, 1992, abandoned, and Ser. No. 929,898, Aug. 11, 1992, abandoned, said Ser. No. 327,524, Ser. No. 288,667, Ser. No. 218,971, Ser. No. 109,100, Ser. No. 095,662, and Ser. No. 982,383, each is a continuation-in-part of Ser. No.929,898, Aug. 11, 1992, abandoned.

[51] Int. Cl.$^6$ .................. B32B 5/14; B32B 5/16; B65D 85/40

[52] U.S. Cl. .................. 160/36.4; 206/524.3; 206/524.6; 206/524.7; 428/36.5; 428/53; 428/220; 428/310.5; 428/314.4; 428/317.9; 428/318.8; 428/319.3; 428/339

[58] Field of Search .................. 428/34.5, 35.6, 428/35.7, 36.4, 36.5, 53, 220, 312.2, 312.4, 312.6, 313.9, 314.4, 317.9, 319.3, 339, 532, 310.5; 524/4, 425, 446, 447, 451, 498, 650; 206/524.3, 524.6, 524.7

[56] References Cited

U.S. PATENT DOCUMENTS 2,432,971 12/1947 Ruthman et al. .

(List continued on next page.)

FOREIGN PATENT DOCUMENTS

0118240 B1 9/1984 European Pat. Off. .

(List continued on next page.)

OTHER PUBLICATIONS

Andersen, *Control and Monitoring of Concrete Production—A Study of Particle Packing and Rheology*, The Danish Academy of Technical Sciences (1990).

(List continued on next page.)

*Primary Examiner*—Marion E. McCamish
*Assistant Examiner*—Blame R. Copenheaver
*Attorney, Agent, or Firm*—Workman, Nydegger & Seeley

[57] ABSTRACT

Compositions, methods, and systems for manufacturing articles, particularly containers and packaging materials, having a starch-bound cellular matrix reinforced with substantially uniformly dispersed fibers. High strength articles that have adequate flexibility and toughness immediately or very shortly after being demolded without the need for subsequent conditioning are molded from compositions having a starch-based binder and fibers that are uniformly dispersed by means of a high yield stress fluid fraction within the starch-based composition. In a two-step mixing process, a preblended mixture is formed by gelating a portion of the starch-based binder or other thickening agent in water to form a liquid phase having high yield stress into which the fibers are substantially uniformly dispersed. The fibers preferably have an average length of at least about 2 mm and an aspect ratio of at least about 25:1. The remaining starch-based binder, water, and other desired admixtures, such as mold-release agents, inorganic fillers, rheology-modifying agents, plasticizers, integral coating or sealing materials, and dispersants, are added to the preblended mixture to form a moldable starch-based composition, which is molded between heated molds to produce form-stable articles having a desired shape and a selectively controlled foamed structural matrix. Such articles can replace articles presently made from conventional materials like paper, paperboard, polystyrene, plastic, or other organic-based materials and have especial utility in the mass-production of containers, particularly food and beverage containers.

200 Claims, 34 Drawing Sheets

U.S. PATENT DOCUMENTS

| | | |
|---|---|---|
| 2,968,561 | 1/1961 | Bimkrant . |
| 3,042,578 | 7/1962 | Denning . |
| 3,052,595 | 9/1962 | Pye . |
| 3,117,014 | 1/1964 | Klug . |
| 3,493,382 | 2/1970 | Ryan et al. . |
| 3,759,729 | 9/1973 | Fahn . |
| 3,914,359 | 10/1975 | Bevan . |
| 3,962,155 | 6/1976 | Usamoto et al. . |
| 3,968,004 | 7/1976 | Coffey et al. . |
| 4,017,324 | 4/1977 | Eggers . |
| 4,043,862 | 8/1977 | Roberts . |
| 4,044,166 | 8/1977 | Koizumi . |
| 4,070,196 | 1/1978 | Kraak et al. . |
| 4,080,213 | 3/1978 | Mori et al. . |
| 4,089,691 | 5/1978 | Cummisford et al. . |
| 4,094,077 | 6/1978 | Schrader et al. . |
| 4,124,550 | 11/1978 | Kobayashi et al. . |
| 4,149,550 | 4/1979 | Green et al. . |
| 4,172,154 | 10/1979 | von Rymon Lipinski . |
| 4,204,337 | 5/1980 | Roos et al. . |
| 4,210,490 | 7/1980 | Taylor . |
| 4,225,247 | 9/1980 | Hodson . |
| 4,225,383 | 9/1980 | McReynolds . |
| 4,230,502 | 10/1980 | Lustig et al. . |
| 4,249,991 | 2/1981 | Baes et al. . |
| 4,303,690 | 12/1981 | Haas, Sr. et al. . |
| 4,306,059 | 12/1981 | Yokobayashi et al. . |
| 4,328,136 | 5/1982 | Blount . |
| 4,329,177 | 5/1982 | George . |
| 4,377,440 | 3/1983 | Gasland . |
| 4,378,271 | 3/1983 | Hargreaves et al. . |
| 4,394,930 | 7/1983 | Korpman . |
| 4,410,571 | 10/1983 | Korpman . |
| 4,438,685 | 3/1984 | Haas, Sr. et al. . |
| 4,445,970 | 5/1984 | Post et al. . |
| 4,454,268 | 6/1984 | Otey et al. . |
| 4,462,835 | 7/1984 | Car . |
| 4,508,595 | 4/1985 | Gasland . |
| 4,524,682 | 6/1985 | Haas, Sr. et al. . |
| 4,529,653 | 7/1985 | Hargreaves et al. . |
| 4,529,662 | 7/1985 | Lancaster et al. . |
| 4,529,663 | 7/1985 | Lancaster et al. . |
| 4,545,854 | 10/1985 | Gomez et al. . |
| 4,550,655 | 11/1985 | Haas, Sr. et al. . |
| 4,552,463 | 11/1985 | Hodson . |
| 4,562,218 | 12/1985 | Fornadel et al. . |
| 4,567,049 | 1/1986 | Haas, Sr. et al. . |
| 4,588,443 | 5/1986 | Bache . |
| 4,595,623 | 6/1986 | DuPont et al. . |
| 4,602,590 | 7/1986 | Haas, Sr. et al. . |
| 4,613,627 | 9/1986 | Sherman et al. . |
| 4,623,150 | 11/1986 | Moehlman et al. . |
| 4,624,855 | 11/1986 | Haas, Sr. et al. . |
| 4,625,856 | 12/1986 | Haas, Sr. et al. . |
| 4,648,314 | 3/1987 | Plight et al. . |
| 4,669,603 | 6/1987 | Haas, sen. et al. . |
| 4,673,438 | 6/1987 | Wittwer et al. . |
| 4,694,741 | 9/1987 | Haas, Sr. et al. . |
| 4,710,117 | 12/1987 | Haas, Sr. et al. . |
| 4,710,422 | 12/1987 | Fredenucci . |
| 4,711,669 | 12/1987 | Paul et al. . |
| 4,749,583 | 6/1988 | Branch . |
| 4,753,710 | 6/1988 | Langley et al. . |
| 4,755,494 | 7/1988 | Ruben . |
| 4,775,580 | 10/1988 | Dighton . |
| 4,789,244 | 12/1988 | Dunton et al. . |
| 4,814,012 | 3/1989 | Paul et al. . |
| 4,828,650 | 5/1989 | Wagle et al. . |
| 4,833,191 | 5/1989 | Bushway et al. . |
| 4,846,932 | 7/1989 | Karita et al. . |
| 4,863,655 | 9/1989 | Lacourse et al. . |
| 4,872,913 | 10/1989 | Dunton et al. . |
| 4,889,428 | 12/1989 | Hodson . |
| 4,892,590 | 1/1990 | Gill et al. . |
| 4,912,069 | 3/1990 | Ruben . |
| 4,919,758 | 4/1990 | Wagle et al. . |
| 4,921,250 | 5/1990 | Ayres . |
| 4,923,665 | 5/1990 | Andersen et al. . |
| 4,925,530 | 5/1990 | Sinclair et al. . |
| 4,927,655 | 5/1990 | Ito . |
| 4,927,656 | 5/1990 | Ito . |
| 4,941,922 | 7/1990 | Snyder . |
| 4,943,349 | 7/1990 | Gomez . |
| 4,944,595 | 7/1990 | Hodson . |
| 4,952,278 | 8/1990 | Gregory et al. . |
| 4,953,453 | 9/1990 | Haas, Sr. et al. . |
| 4,957,558 | 9/1990 | Ueda et al. . |
| 4,957,754 | 9/1990 | Munk et al. . |
| 4,963,603 | 10/1990 | Felegi, Jr. et al. . |
| 4,979,992 | 12/1990 | Bache . |
| 5,032,413 | 7/1991 | Haas et al. . |
| 5,032,414 | 7/1991 | Haas et al. . |
| 5,035,930 | 7/1991 | Lacourse et al. . |
| 5,039,003 | 8/1991 | Gordon et al. . |
| 5,039,378 | 8/1991 | Pommier et al. . |
| 5,043,196 | 8/1991 | Lacourse et al. . |
| 5,048,403 | 9/1991 | Haas, Sr. et al. . |
| 5,061,346 | 10/1991 | Taggart et al. . |
| 5,071,512 | 12/1991 | Bixler et al. . |
| 5,076,985 | 12/1991 | Koch et al. . |
| 5,082,500 | 1/1992 | Nachtman et al. . |
| 5,095,054 | 3/1992 | Lay et al. . |
| 5,103,717 | 4/1992 | Haas, Sr. et al. . |
| 5,104,487 | 4/1992 | Taggart et al. . |
| 5,104,669 | 4/1992 | Wolke et al. . |
| 5,106,880 | 4/1992 | Miller et al. . |
| 5,108,677 | 4/1992 | Ayres . |
| 5,110,413 | 5/1992 | Steer . |
| 5,122,231 | 6/1992 | Anderson . |
| 5,126,013 | 6/1992 | Wiker et al. . |
| 5,126,014 | 6/1992 | Chung . |
| 5,132,155 | 7/1992 | Singh et al. . |
| 5,134,179 | 7/1992 | Felegi, Jr. et al. . |
| 5,141,797 | 8/1992 | Wheeler . |
| 5,153,037 | 10/1992 | Altieri . |
| 5,156,718 | 10/1992 | Neubert . |
| 5,160,368 | 11/1992 | Begovich . |
| 5,160,676 | 11/1992 | Singh et al. . |
| 5,162,126 | 11/1992 | Thorner et al. . |
| 5,178,677 | 1/1993 | Haas et al. . |
| 5,178,730 | 1/1993 | Bixler et al. . |
| 5,185,382 | 2/1993 | Neumann et al. . |
| 5,186,990 | 2/1993 | Starcevich . |
| 5,194,206 | 3/1993 | Koch et al. . |
| 5,201,403 | 4/1993 | Haas, Sr. et al. . |
| 5,206,087 | 4/1993 | Tokiwa et al. . |
| 5,208,267 | 5/1993 | Neumann et al. . |
| 5,221,435 | 6/1993 | Smith, Jr. . |
| 5,224,595 | 7/1993 | Sugimoto et al. . |
| 5,240,561 | 8/1993 | Kaliski . |
| 5,248,702 | 9/1993 | Neumann et al. . |
| 5,252,271 | 10/1993 | Jeffs . |
| 5,253,743 | 10/1993 | Haas, Sr. et al. . |
| 5,256,711 | 10/1993 | Tokiwa et al. . |
| 5,258,430 | 11/1993 | Bastioli et al. . |
| 5,262,458 | 11/1993 | Bastioli et al. . |
| 5,264,030 | 11/1993 | Tanabe et al. . |
| 5,264,080 | 11/1993 | Shaw et al. . |
| 5,266,368 | 11/1993 | Miller . |
| 5,268,187 | 12/1993 | Quinlan . |
| 5,269,845 | 12/1993 | Grunau et al. . |

| | | |
|---|---|---|
| 5,272,181 | 12/1993 | Boehmer et al. |
| 5,273,167 | 12/1993 | Haas et al. |
| 5,273,821 | 12/1993 | Olson et al. |
| 5,275,774 | 1/1994 | Bahr et al. |
| 5,277,764 | 1/1994 | Johansson et al. |
| 5,278,194 | 1/1994 | Tickner et al. |
| 5,279,658 | 1/1994 | Aung. |
| 5,284,672 | 2/1994 | Ito. |
| 5,288,318 | 2/1994 | Mayer et al. |
| 5,288,765 | 2/1994 | Bastioli et al. |
| 5,290,350 | 3/1994 | Besnard. |
| 5,298,273 | 3/1994 | Ito. |
| 5,300,333 | 4/1994 | Wilkerson et al. |
| 5,308,879 | 5/1994 | Akamatu et al. |
| 5,314,754 | 5/1994 | Knight. |
| 5,317,037 | 5/1994 | Golden et al. |
| 5,317,119 | 5/1994 | Ayres. |
| 5,320,669 | 6/1994 | Lim et al. |
| 5,346,541 | 9/1994 | Goldman. |
| 5,360,586 | 11/1994 | Wyatt et al. |
| 5,362,776 | 11/1994 | Barenberg et al. |
| 5,362,777 | 11/1994 | Tomka. |
| 5,372,877 | 12/1994 | Kannankeril. |
| 5,411,639 | 5/1995 | Kurrie. |
| 5,500,089 | 3/1996 | Huang et al. |
| 5,506,046 | 4/1996 | Andersen et al. ............ 428/35.6 |
| 5,506,277 | 4/1996 | Griesbach, III. |
| 5,508,072 | 4/1996 | Andersen et al. ............ 428/34.5 |
| 5,512,090 | 4/1996 | Franke et al. |
| 5,512,378 | 4/1996 | Bastioli et al. |
| 5,545,450 | 8/1996 | Andersen et al. ............ 428/36.4 |

FOREIGN PATENT DOCUMENTS

| | | |
|---|---|---|
| 0265745 A2 | 5/1988 | European Pat. Off. |
| 0271853 B2 | 6/1988 | European Pat. Off. |
| 0304401 B1 | 2/1989 | European Pat. Off. |
| 0340707 A2 | 11/1989 | European Pat. Off. |
| 0370913 B1 | 5/1990 | European Pat. Off. |
| 0405146 B1 | 1/1991 | European Pat. Off. |
| 0447797 A2 | 9/1991 | European Pat. Off. |
| 0453980 A2 | 10/1991 | European Pat. Off. |
| 0546956 A2 | 6/1993 | European Pat. Off. |
| 0551954 A2 | 7/1993 | European Pat. Off. |
| 0 608 031 A1 | 7/1994 | European Pat. Off. |
| 1278195 | 10/1961 | France. |
| 0 006 390 | 6/1979 | France. |
| 2642731 | 8/1990 | France. |
| 3346970 A1 | 7/1985 | Germany. |
| 3420195 A1 | 12/1985 | Germany. |
| 4008862 | 4/1991 | Germany. |
| 63-22636 | 1/1988 | Japan. |
| 5-105815 | 4/1993 | Japan. |
| 5-171049 | 7/1993 | Japan. |
| 5-246417 | 9/1993 | Japan. |
| 5-320401 | 12/1993 | Japan. |
| 32386 | 2/1994 | Japan. |
| 6-32386 | 2/1994 | Japan. |
| 6-135487 | 6/1994 | Japan. |
| 9100590 | 11/1992 | Netherlands. |
| 2050459 | 1/1981 | United Kingdom. |
| 1584387 | 2/1981 | United Kingdom. |
| 2214516 | 6/1989 | United Kingdom. |
| 2208651 | 12/1989 | United Kingdom. |
| WO 87/00828 | 2/1987 | WIPO. |
| WO 89/02225 | 3/1989 | WIPO. |
| WO 91/12186 | 8/1991 | WIPO. |
| WO 92/04408 | 3/1992 | WIPO. |
| WO 93/01242 | 1/1993 | WIPO. |
| 0 556 774 A2 | 2/1993 | WIPO. |
| WO 94/18384 | 8/1994 | WIPO. |
| WO 94/18388 | 8/1994 | WIPO. |

OTHER PUBLICATIONS

Davidson et al, *Water–Soluble Resins*, New York: Reinhold Publishing Corp., Chapman & Hall, Ltd., London. (no date).

Fedors and Landel, *An Empirical Method of Estimating the Void Fraction in Mixtures of Uniform Particles of Different Size*, Powder Technology, 23, 225–231 (1979).

Furnas, *Grading Aggregates. I–Mathematical Relations for Beds of Broken Solids of Maximum Density*, Industrial and Engineering Chemistry (Sep. 1931).

Greminger, Jr. and Krumel, *Alkyl and Hydroxyalkylalkylcellullose*, Dow Chemical U.S.A., Midland, Oregon. (no date).

Johansen et al., *Particle Packing and Concrete Properties*, Materials Science of Concrete II, 111–147. (no date).

McGeary, *Mechanical Packing of Sperical Particles*, Journal of the American Ceramic Society, vol. 44, No. 10 (Oct. 1961).

Osbaeck and Johansen, *Particle Size Distribution and Rate of Strength Development*, Paper for the 89th Annual Meeting of the American Ceramic Society, Inc., Pittsburgh, PA (Apr. 26–30, 1987).

Patankar and Mandal, *The Packing of Some Non–Spherical Solid Particles*, Trans. J. Brit. Ceram. Soc., 79, 59–66 (1980).

Ridgway and Tarbuck, *Particulate Mixture Bulk Densities*, Chemical and Process Engineering (Feb. 1968).

Robinson, *Extrusion Defects*. (no date).

Stovall et al., *Linear Packing Density Model of Grain Mixtures*, Powder Technology, 48 1–12 (1986).

Swientek, *Formidable Films*, Prepared Foods (Sep. 1993).

Vrana, *Khashoggi Kin Reported Planning Private Placement of Shares in New Container Firm* (Mar. 28, 1993).

Weinrich, R., *German Comes Up With Recycled Product to Replace Foam Chips*. (no date).

Westman and Hugill, *The Packing of Particles* (1930).

Biomat 32—Production Unit for Natural Packaging, *Starch Foam Dishes at Burger King's*. (no date).

*Biotec Product Literature*. (no date).

*Plastic–Forming Processes*. (no date).

Sequa Chemicals, Inc., Technical Data, *Sunrez® 700 Series Insolubilizers Coating Additive*. (no date).

Staley Starch and Specialty Products Group, technical data, *Sta–Lok® 400 Cationic Potato Starch*. (no date).

*Thermoforming Process Guide*, Dow Plastics. (no date).

Zeneca, *Biopol. Nature's Plastic—Born from Nature. Back to Nature*. (no date).

*Zien In The Food Industry*, Freemen Industries, Inc. (no date).

Andersen, *Effect of Organic Superplasticizing Admixtures and Their components on Zeta Potential and Related Properties of Cement Materials*, Pennsylvania State University (1987).

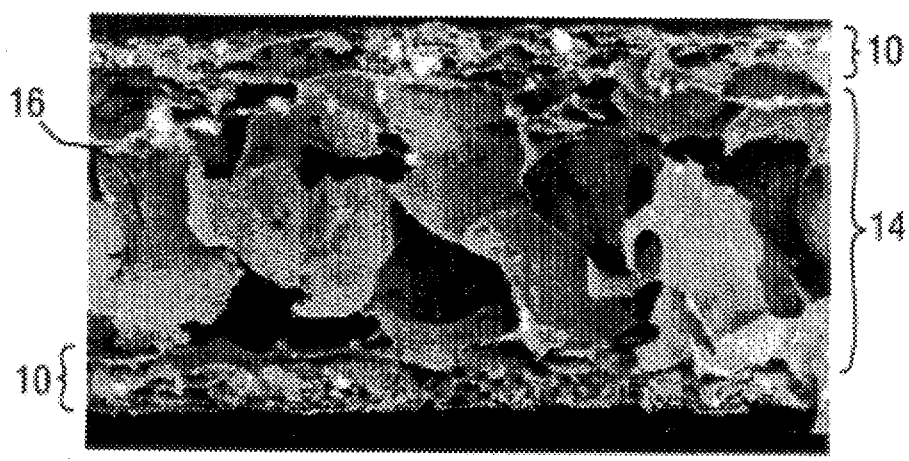
FIG. 2A
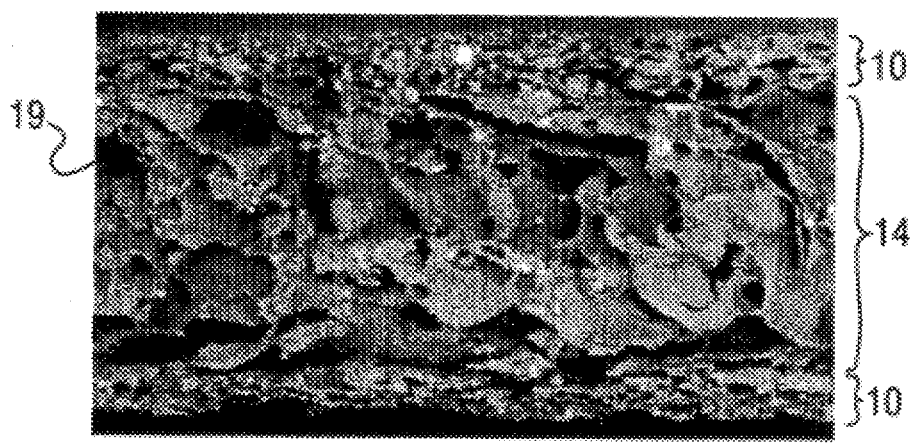
FIG. 2B
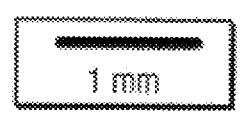
1 mm
FIG. 2C

ARTICLES HAVING A STARCH-BOUND CELLULAR MATRIX REINFORCED WITH UNIFORMLY DISPERSED FIBERS

This application is a continuation-in-part of U.S. Ser. No. 08/327,524, filed Oct. 21, 1994 (pending), which is a continuation-in-part of Ser. No. 07/929,898, filed Aug. 11, 1992, now abandoned. This application is also a continuation-in-part of U.S. Ser. 08/288,667, filed Aug. 9, 1994, now allowed, which is a continuation-in-part of Ser. No. 07/929,898, filed Aug. 11, 1992, now abandoned. This application is also a continuation-in-part of U.S. Ser. No. 08/218,971, filed Mar. 25, 1994, now U.S. Pat. No. 5,545,450, which is a continuation-in-part of Ser. No. 07/929,898, filed Aug. 11, 1992, now abandoned. This application is also a continuation-in-part of U.S. Ser. No. 08/109,100, filed Aug. 18, 1993, now abandoned, which is a continuation-in-part of Ser. No. 07/929,898, filed Aug. 11, 1992, now abandoned. This application is also a continuation-in-part of U.S. Ser. No. 08/095,662, filed Jul. 21, 1993, now U.S. Pat. No. 5,385,764, which is a continuation-in-part of Ser. No. 07/929,898, filed Aug. 11, 1992, now abandoned. This application is also a continuation-in-part of U.S. Ser. No. 07/982,383, filed Nov. 25, 1992, now abandoned, which is a continuation-in-part of Ser. No. 07/929,898, filed Aug. 11, 1992, now abandoned. This application is also a continuation-in-part of U.S. Ser. No. 07/929,898, filed Aug. 11, 1992, now abandoned.

BACKGROUND OF THE INVENTION

1. The Field of the Invention

The present invention relates to improved compositions and methods for obtaining starch-based compositions having uniformly dispersed fibers, which may be manufactured into starch-bound articles having a fiber-reinforced, foamed cellular matrix. More particularly, the present invention relates to the use of a fluid system having high yield stress and viscosity in order to obtain homogenous dispersion of fibers, especially longer-length fibers (i.e., those having an average length greater than about 2 mm), within the inventive starch-based compositions. The uniformly dispersed fibers reinforce the newly formed starch-bound matrix so that the molded articles are form stable and resistant to damage immediately upon being demolded even though enough free water is maintained within the foamed matrix to keep it sufficiently flexible and tough for its intended use without the need for conventional conditioning procedures. In addition, the well-dispersed fibers greatly improve the final strength, toughness, and flexibility of the starch-bound articles, which allows for the manufacture of articles of reduced cross-section and higher strength. The starch-based compositions may optionally include an inorganic (or natural mineral) aggregate and other admixtures to improve the moldability and lower the cost of the molded articles. The resulting articles can be mass-produced in a manner that is less expensive but environmentally superior to articles manufactured from conventional materials such as paper, glass, metal, plastic, polystyrene foam, or other organically-bound materials.

2. The Relevant Technology

A. Conventional Materials.

Materials such as paper, paperboard, plastic, polystyrene, glass, and even metals are presently used in enormous quantity in the manufacture of articles such as containers, separators, dividers, lids, tops, cans, and other packaging materials used to protect, store, package, dispense, or ship an enormous variety of liquid and solid goods. Containers and other packaging materials protect goods from environmental influences and distribution damage, particularly from gases, moisture, light, microorganisms, vermin, physical shock, crushing forces, vibration, leaking, or spilling. Packaging materials may also be imprinted with useful or promotional product information to the consumer, such as the origin of manufacture, contents, advertising, instructions, brand identification, and pricing.

Most conventionally manufactured containers or other packaging materials (including disposable containers) are made from paper, paperboard, plastic, polystyrene, glass, or metal materials. Each year, over 100 billion aluminum cans, billions of glass bottles, and thousands of tons of paper and plastic are used in storing and dispensing, e.g., soft drinks, juices, processed foods, cereals, grains, and beer. In addition, huge quantities of retail goods are sold or distributed using some sort of packaging material. In the United States alone, approximately 5.5 million tons of paper made primarily from tree-derived wood pulp are consumed each year solely in the production of packaging materials. This vast consumption represents only about 15% of the total annual domestic paper production.

Recently, consciousness-raising organizations have led a debate as to which of the conventional materials used to make such containers and other articles (e.g., paper, paperboard, plastic, polystyrene, glass, or metal) is most damaging to the environment, or which is more environmentally "correct." The debate often misses the point that each of these materials has its own unique environmental weaknesses. One faction will frequently tout a particular material as being superior to another when viewed in light of a particular environmental problem, while unknowingly (or even knowingly) ignoring different, often larger, problems associated with the supposedly "environmentally friendly" material. In reality, the debate should not be directed to which of these materials is more or less harmful to the environment, but rather toward asking: Can we discover or develop an alternative material which will solve most, if not all, of the various environmental problems associated with each of these presently used materials?

B. Alternative Materials.

Due to the more recent awareness of the tremendous environmental impact of using paper, paperboard, plastic, polystyrene, glass, and metals for a variety of single-use, mainly disposable, articles such as containers and other packaging materials (not to mention the ever mounting political pressures), there has been an acute need (long since recognized by those skilled in the art) to find environmentally superior or improved substitute materials. One creative alternative has been to manufacture disposable food or beverage containers out of baked edible sheets, such as waffles or pancakes. Although edible sheets can be made into trays, cones, and cups that are easily decomposed, they pose a number of limitations. Edible sheets are primarily made from a mixture of water, flour, and a rising agent, which is shaped and baked between heated molds. Fats or oils are often added to the mixture to assist in the removal of the sheet from the baking mold. However, oxidation of these fats can cause the edible sheets to go rancid. From a mechanical standpoint, edible sheets are generally too brittle and fragile to replace any but a few of the articles made from conventional materials. This inherent weakness generally requires the cross-section of the edible sheet to be substantially increased relative to a similar article made from conventional materials, thus negating much, if not all, of the environmental or economic benefits. Furthermore, if exposed to excessive moisture, the articles can easily grow mold or decompose prior to or during their intended use, thereby making such materials unsuitable for many of the applications for which their substitution would be desirable.

Attempts have been made to make articles from organic materials such as starch, which is a natural, plentiful, and renewable resource. For example, articles have been made from a mixture of starch, water, and a mold-releasing agent. The starch-containing mixture is usually baked between heated molds for a period of 2–3 minutes or more until the starch gelates, foams, and hardens by nearly complete drying of the molded starch-based mixture in the desired shape of the article. Such articles have a relatively low density and are generally biodegradable.

However, the manufacture of starch-based articles, as well as the articles themselves, are plagued with a number of drawbacks. The manufacture of such articles has heretofore required a high baking time, a relatively high concentration of starch, expensive equipment, either a time-consuming "conditioning step" or the addition of a synthetic polymer to impart to the molded article the proper moisture balance, and a mandatory coating step to maintain the proper moisture balance. As a result, the manufacture of starch-based articles has heretofore been far more expensive than simply making articles from conventional materials.

Moreover, such starch-based articles are very fragile and brittle (i.e. they have inadequately low fracture energy and flexural strength, both of which are essential qualities for most packaging materials), particularly when initially demolded, giving them limited use. The extreme brittleness of the newly demolded articles occurs because of the need to drive off substantially all of the free water within the starch-based cellular matrix in order to avoid degradation or fracture due to expansion of the newly demolded article. This is because the starch-based cellular matrix of such articles is simply too soft to withstand the internal pressures generated by and persisting within the cells due to the vaporized free water left within an undercooked article. On the other hand, overdrying the articles by leaving them within the heated molds too long can lead to carmelization, fracture due to shrinkage, and destruction of the binding capability of the starch material. These opposing concerns have created a very narrow window of time in which such starch-based articles can be molded without yielding a highly defective article, which naturally increases the processing costs. Moreover, this has made the manufacture of articles having varying cross-sectional thickness virtually impossible due to the inability to simultaneously remove adequate water from the thicker portion to avoid destruction of the article while avoiding the overheating of the thinner portion.

In order to improve the flexibility and reduce the brittleness of the newly demolded starch-bound articles it has heretofore been necessary to "condition" the newly demolded starch-based articles by exposing them to elevated humidity and temperature for prolonged periods of time in order to reduce the brittleness and increase the toughness of the articles. This "conditioning step" often takes several minutes, or even hours, depending on the processing conditions, which further retards the already slow manufacturing process. Furthermore, the additional processing step of applying a coating to the article has been necessary in order to maintain the critical level of moisture within the starch-based cellular matrix of the conditioned articles or to make the articles water-resistant.

Like their edible sheet counterparts, such starch-based articles have suffered from the inability to obtain the requisite materials properties of conventional materials (even with "conditioning") without greatly increasing the thickness and mass of the articles manufactured therefrom (with thicknesses of at least 2 mm, and usually upwards of 5 mm, being required). This high thickness, of course, greatly increases the amount of overall material needed to form an acceptable article. Also, such articles are prone to spoilage if exposed to excessive moisture, thereby creating a criticality with respect to moisture: too little moisture and the articles would be too brittle and fragile to be suitable for their intended use; too much and they would rot or spoil. Hence, they have a poor shelf life. Moreover, such starch-based articles usually have a poor surface quality due to poor venting, inadequate viscosity and yield stress, and non-optimized flow dynamics. The poor surface quality has often been disguised by forming the articles with a waffled or textured surface, the waffle molds also serving the dual purpose of improving the flow of mixtures that already tended to segregation.

Attempts have been made to fill such starch-based materials with fibers, usually shorter-length fibers and/or fibers of low aspect ratio (i.e., less than about 25:1). Nevertheless, such fibers have not appreciably increased the strength and toughness of the resulting starch-based articles. Moreover, although one of ordinary skill in the art might have expected the inclusion of longer-length fibers (i.e., those having an average length greater than about 2 mm) or fibers having a high aspect ratio (i.e., greater than about 25:1) to improve the mechanical properties of the starch-based articles, the opposite has been true. It has been discovered that the addition of fibers usually resulted in no improved properties or even a weaker article because of poor dispersion, clumping, and/or segregation of the fibers from the starch-based liquid component of the starting composition.

The inability to adequately disperse the fibers resulted from a lack of understanding with regard to the relationship between the rheology (particularly yield stress) of the liquid component and the ability of the liquid component to disperse the fibers and prevent clumping, formation of nodules, and segregation of the fibrous component from the liquid phase. In fact, the conventional wisdom has been to increase the water content in order to obtain better fiber dispersion. A common example is the manufacture of conventional tree paper, in which fibrous slurries containing up to 99.5% water are used. However, even the addition of large quantities of water in the aforementioned starch-based materials (up to 80% in some cases) did not result in adequate dispersion of fibers of any length. Moreover, the inclusion of large amounts of water thought to be necessary to disperse the fibers, even shorter-length fibers, increased the production cost of the articles because of the increased time and energy required to remove the additional water from the formed product.

Finally, attempts have been made to incorporate small mounts of inert inorganic fillers within the starch-based compositions in order to cut material costs; however, only minimal amounts (less than about 10% by volume of the composition) have been successfully added due to the sharp decline in mechanical properties and strength of the molded article as the amount of such fillers is increased. Those who have attempted to add significant amounts of inorganic filler to the starch-based compositions have heretofore failed to obtain structurally sound articles having even minimally required mechanical properties. Even if inorganic fillers in an amount up to 10% were successfully included the effect on materials cost and manufacturing efficiency would be marginal.

In general, industry has repeatedly sought to develop more highly inorganically filled materials capable of being mass-produced into a variety of disposable articles. Inorganic materials such as clay, natural minerals, and stone are easily accessed, non-depletable, inexpensive, and environmentally inert. In spite of economic and environmental pressures, extensive research, and the associated long-felt need, the technology simply has not existed for the economic and feasible production of highly inorganically filled materials which could be substituted for paper, paperboard, plastic, polystyrene, metal, or other organic-based articles.

In light of the foregoing, what are needed are compositions and methods for manufacturing novel starch-bound materials that can replace paper, paperboard, metal, plastic, polystyrene, or other organic materials as the material of choice for producing containers and other articles.

It would be a tremendous improvement in the art to provide compositions and methods to improve the dispersion of fibers within the above starch-based materials without the use of large quantities of water. It would yet be a significant improvement if such compositions and methods allowed for the more thorough dispersion of fibers, particularly relatively long-length fibers (i.e., those having an average length greater than about 2 mm) and/or fibers of high aspect ratio (i.e., at least about 25:1), within the starch-based materials used to make said containers or other articles.

It would also be an improvement in the art if the above starch-bound compositions could be filled with relatively large concentrations of inorganic aggregates, particularly aggregate fillers which are compatible with and commonly found in the earth, and yet maintain the structural integrity and desired mechanical properties of articles made therefrom.

It would be a significant improvement in the art if such compositions and methods yielded highly inorganically filled, starch-bound articles that had properties similar, or even superior, to paper, paperboard, metal, polystyrene, plastic, or other organic materials.

It would yet be an improvement in the art if such compositions and methods provided for the manufacture of containers and other articles without the need for prolonged, high-humidity conditioning in order to obtain the required flexibility or toughness.

It would be an additional improvement in the art to provide compositions and methods that yielded starch-bound articles that did not require the application of a coating to keep the cellular matrix from drying out or absorbing humidity from the air.

It would be a further improvement in the art to provide compositions and methods for manufacturing starch-bound containers and other articles having a smoother, more uniform surface compared to existing starch-based articles.

It would yet be an improvement to provide compositions and methods that yielded starch-bound articles having varying cross-sectional thicknesses throughout the same article.

It would also be an improvement in the art if such articles could be formed using existing manufacturing equipment and techniques presently used to form such articles from paper, paperboard, metals, polystyrene, plastic, or other organic materials. It would further be an improvement if such compositions and methods did not result in the concomitant generation of wastes involved with the manufacture of articles from conventional materials.

It would be yet an advancement in the art if such compositions and methods required the use of less water that had to be removed during the manufacturing process (as compared to the manufacture of paper or other organically-based materials), in order to shorten the processing time and reduce the initial equipment capital investment.

From a practical point of view, it would be a significant improvement if such compositions and methods made possible the manufacture of containers and other articles at a cost that was comparable to, or even less than, existing methods of manufacturing containers or other articles from paper, paperboard, metal, plastic, polystyrene, or other organic materials. Specifically, it would be an advancement in the art if such materials resulted in a reduction in the consumption of energy, valuable natural resources, and initial start-up capital presently expended in making articles from conventional materials, such as paper, metals, polystyrene, plastic, or other organic materials.

It would further be a significant improvement in the art if such compositions and methods yielded containers and other articles having a similar cross-section and comparable critical mechanical properties for a specific use, such as, e.g., insulation, strength, toughness, etc., compared to paper, paperboard, polystyrene, plastic, or other organic materials.

From a manufacturing perspective, it would be a significant advancement in the art to provide compositions and methods that allowed for the mass-production of highly inorganically filled, starch-bound articles that could be rapidly formed and ready to use within a matter of minutes from the beginning of the manufacturing process.

It would also be a tremendous advancement in the art to provide compositions and methods that allowed for the production of highly inorganically filled, starch-bound materials having greater flexibility, flexural strength, toughness, moldability, mass-producibility, product stability, and lower environmental impact compared to conventionally manufactured starch-based materials.

Such compositions, methods, and articles are disclosed and claimed herein.

SUMMARY AND OBJECTS OF THE INVENTION

The present invention is directed to novel starch-based compositions and methods for obtaining starch-based compositions having substantially uniformly dispersed fibers, as well as articles having a foamed, fiber-reinforced, starch-bound structural matrix made from such compositions. The inventive starch-based compositions are unique in that they include significant quantities of well-dispersed fibers, preferably fibers of high aspect ratio and longer length. This results in articles having substantially the same amount, concentration, or distribution of fibers throughout the entire bonding matrix, which allows for the manufacture of a wide variety of articles which attain substantially all of their final strength, flexibility, toughness, and other critical properties immediately or shortly after being demolded without the need for a subsequent conditioning step. A fluid system having a pseudo plastic or an approximate Binghamian flow behavior (i.e., having an appropriately high yield stress) is used to impart shear from the mixer down to the fiber level in order to obtain a composition having uniformly dispersed fibers.

The inventive starch-based compositions include a thickening agent capable of increasing the yield stress of the fluid fraction in order to facilitate substantially uniform dispersion of fibers, an ungelatinized starch-based binder component, water, and, optionally, inorganic aggregate fillers, mold releasing agents, internal coating materials, humectants, plasticizers, internal sealing materials, coloring dies, and other admixtures. The thickening agent is preferably pregelatinized starch. The water is included within the moldable mixture to disperse the components, gelate the starch-based binder, and act as an evaporative foaming agent. The water remaining within the starch-bound cellular matrix of the final article also helps to plasticize the otherwise brittle structure of the article in order to provide internal flexibility and toughness.

The present invention also teaches improved methods for molding starch-based compositions into articles having a starch-bound cellular structural matrix. The molding process generally includes forming the moldable composition between heated dies in order to gelate the starch-based binder and to cause the water-based solvent to evaporate and expand, thereby creating a foamed, starch-bound cellular matrix.

It has been discovered that the well-dispersed fibers of high aspect ratio (i.e., about 25:1 or greater) and preferably longer-length (i.e., at least about 2 mm) within the starch-based composition serve at least two important functions. First, and perhaps most importantly, the fibers reinforce the newly foamed and gelated starch-bound matrix of the molded composition so that the molded article can be removed from the mold while retaining adequate free water within the structure of the article to plasticize the starch-bound matrix. This allows the newly demolded article to have adequate toughness and strength immediately or shortly after being demolded for its intended purpose without the need for conventional conditioning, or the inclusion of oils, plasticizers, or co-polymers, as were previously required in the manufacture of foamed starch-based articles. Without the conditioning step to reintroduce moisture back into the starch-based matrix, highly foamed starch-based articles, even those that included significant quantities of shorter-length fibers (i.e. those having an average length between 0–1.5 mm), were usually too brittle and fragile for their intended use, predominately because of the inability to adequately disperse the fibers. Moreover, such articles could not simply be demolded without such overdrying because of the destructive nature of the highly pressurized water vapor that otherwise would remain within the cellular structure of the newly demolded article. The conventional starch-based cellular matrix was not strong enough to withstand the internal buildup of pressure caused by the heated molding process.

Another important benefit of including well-dispersed, preferably longer-length fibers of high aspect ratio within the molded articles is the dramatic increase in the fracture energy, tensile strength, flexural strength, toughness, flexibility, and other related properties of the final molded article over previously made starch-based articles. This improvement in mechanical properties is even more dramatic where significant quantities of inorganic aggregates are included, which in the past greatly reduced the strength of the molded articles. It is the substantially uniform dispersion of fibers that gives the materials of the present invention materials properties similar or even superior to conventional materials at about the same cross sectional thickness or mass. This allows for the manufacture of thinner-walled articles having properties superior to their much thicker walled, starch-based counterparts, thereby greatly reducing the mass, cost, forming time, and environmental impact of the materials used to manufacture such articles. Moreover, the shortened molding times and the elimination of the previously required conditioning step greatly reduces the manufacturing costs in terms of labor, time, and energy.

A preferred moldable starch-based composition is formed in two steps. The first step includes mixing together the fibers (often comprising an undisassociated fibrous material or bundle) and a portion of the starch-based binder and water, gelating the starch-based binder to form a "preblended" mixture having a fluid fraction of sufficiently high yield stress and viscosity to adequately disperse the fibers, and dispersing the fibrous material by means of applying sufficient shear to the preblended mixture. The starch-based binder used in the preblended mixture may either be pre-gelatinized or gelated in situ by raising the temperature of the preblended mixture to the gelation temperature of the particular starch-based binder being used. In the second step, the remaining components are added to the preblended mixture, including the remaining ungelated starch-based binder and additional water, as well as other optional components such as the inorganic aggregate filler, the mold release agent, plasticizers, rheology-modifying agents, internal coating agents, and any other desired admixture. Once the fibers have been dispersed, however, maintaining a higher yield stress becomes less important. In fact, lowering the viscosity and yield stress of the final mixture often aids in the molding process by making the mixture more flowable.

In an alternative embodiment, the fibers are dispersed within the moldable starch-based composition using only one mixing step by ensuring that the viscosity and yield stress of the liquid fraction within the overall mixture (excluding the solids, such as, e.g., the fibers, ungelated starch granules, inorganic aggregate, etc.) is initially great enough to impart the desired shear at the fiber level. This may be accomplished by, e.g., initially adding both a pre-gelatinized starch-based binder (or other similar thickening agent) and an ungelated starch-based binder to the starch-based composition, with the pre-gelatinized starch or other thickening agent raising the viscosity and yield stress of the liquid fraction of the mixture to the appropriate minimum level.

It is important to understand that the ability to uniformly disperse the fibers throughout the starch-based composition is determined primarily by the rheology of the fluid fraction as opposed to the mixture as a whole. In fact, adding solid components, such as fibers and aggregates, to the mixture is known to increase both the yield stress and viscosity of the mixture. However, simply increasing the yield stress and viscosity of the mixture will not result in the high degree of fiber dispersion that is obtained through the use of a high yield stress fluid fraction; hence, the importance of adding gelatinized starch or other appropriate water soluble thickening agent to the fluid fraction.

Once the fibers have been uniformly dispersed, whether by a one- or two-step method, the viscosity and yield stress of the starch-based composition may be altered as needed to prepare the desired moldable composition. In general, the addition of the remaining components will tend to increase both the viscosity and yield stress of the overall moldable composition (though not of the fluid fraction), which is desired in many cases. However, it may often be desirable instead to reduce the viscosity of the fluid fraction within the moldable composition by, e.g., adding additional water and/or a dispersant in order to improve the ability of the composition to flow into the molding apparatus. This, in turn, yields molded articles having generally improved surface finish compared to articles made from higher viscosity mixtures. The yield stress of the fluid fraction must be maintained at sufficiently high levels, however, in order to maintain a composition that is cohesive and plastic.

It has been found that the fluid fraction used to initially disperse the fibers within the preblended mixture should have a yield stress of at least about 10 Pa, up to about 5000 Pa, preferably in a range from about 20 Pa to about 2000 Pa, more preferably from about 50 Pa to about 1000 Pa, and most preferably from about 100 Pa to about 500 Pa. It has been found that there is a more direct correlation between the yield stress of the fluid fraction and the ability to uniformly and homogeneously disperse the fibers within a mixture than between viscosity and fiber dispersion. In fact, even highly viscous mixtures, if they have little or no yield stress, are generally unable to adequately and uniformly disperse the fibers.

Nevertheless, although the viscosity of the fluid fraction is less important than maintaining the yield stress at an appropriate level, the fluid fraction will generally have a viscosity of at least about 3 Pa·s, up to about 3000 Pa·s, preferably in a range from about 5 Pa·s to about 1000 Pa·s, more preferably from about 10 Pa·s to about 500 Pa·s, and most preferably from about 30 Pa·s to about 200 Pa·s. The foregoing and all subsequent viscosity values, unless otherwise specified, represent "apparent viscosity" values measured on a Paar-Physica viscometer at a shear rate of 5 s$^{-1}$. However, the "plastic viscosity" of the same fluid fraction of the preblended mixture, when determined by the best fit line on a flow curve at a shear rate between 60 s$^{-1}$ to 100 s$^{-1}$, will fall generally within a broad range from at least about 0.1 Pa·s, up to about 100 Pa·s, preferably in a range from about 0.25 Pa·s to about 100 Pa·s, more preferably from about 0.4 Pa·s to about 50 Pa·s, and most preferably from about 0.5 Pa·s to about 20 Pa·s.

If either a one-step or two-step mixing procedure is used, the foregoing numbers for the preblended mixture closely approximate the preferred yield stress and viscosity of the liquid fraction within any appropriate mixture whenever it is desired to homogeneously disperse the fibrous component therein. Because the solids will tend to increase both the yield stress and viscosity, the final moldable starch-based composition (whether prepared using a one-step or two-step process) will have a yield stress of at least about 10 Pa, up to about 10,000 Pa, preferably in a range from about 250 Pa to about 4000 Pa, more preferably from about 500 Pa to about 3000 Pa, and most preferably from about 1000 Pa to about 2000 Pa. The associated apparent viscosity of the final mixture measured at 5 s$^{-1}$ will generally fall within a broad range from at least about 6 Pa·s, up to about 3000 Pa·s, preferably in a range from about 50 Pa·s to about 2000 Pa·s, more preferably from about 100 Pa·s to about 1000 Pa·s, and most preferably from about 300 Pa·s to about 600 Pa·s. The plastic viscosity of the same starch-based composition, when determined by the best fit line on a flow curve at a shear rate between 4 s$^{-1}$ to 14 s$^{-1}$, will generally fall within a broad range from at least about 1 Pa·s, up to about 2000 Pa·s, preferably in a range from about 2 Pa·s to about 500 Pa·s, more preferably from about 4 Pa·s to about 100 Pa·s, and most preferably from about 10 Pa·s to about 30 Pa·s.

Of course, the viscosity and yield stress of the final moldable mixture may be reduced by the addition of more water, or more preferably through the use of a dispersant, without affecting the dispersion level of the already well-dispersed fibers. In fact, while it is possible for the yield stress and viscosity of the overall starch-based mixture to increase compared to the fluid fraction during initial fiber dispersion because of the addition of the solid components, the yield stress and viscosity of the fluid fraction can be simultaneously reduced by adding additional water and/or a dispersant. Once the fibers have been substantially uniformly dispersed using either the one-step or two-step mixing process, the yield stress and viscosity may be reduced as desired in order to improve the moldability of the mixture.

It has been discovered that in sharp contrast to conventional practices in which large amounts of water are believed to be necessary in order to adequately disperse the fibers, thereby creating a generally low viscosity, very low yield stress liquid fraction, the present invention exploits the newly discovered ability of an initially high viscosity, high yield stress liquid fraction to transfer shear from the mixer down to the fiber level regardless of the viscosity and yield stress of the final moldable mixture. The inability of conventional practices to obtain adequate dispersion of high aspect ratio fibers within water solvated systems, particularly fibers having an average length greater than about 2 mm, is primarily due to the inability of the generally low viscosity Newtonian fluid fractions (i.e., those that have little or no yield stress) to transfer the shearing force or energy from the mixer to the fibers. Instead, the energy in such mixtures is dissipated within the churning aqueous solvent (or other Newtonian fluid fraction) because of the tendency of the nonviscous water to yield or flow in the direction of the shearing force without transferring such energy to the fibers or fibrous clumps. Thus, adding progressively greater amounts of water generally will not substantially improve the ability of such mixtures to thoroughly disperse or blend the fibers throughout the aqueous slurry. In fact, increasing the water content will lead to greater segregation between the fibers and the rest of the composition during the molding process, which leads to poorly formed articles of greatly diminished strength and structural integrity. Similarly, simply increasing the shear rate or shear energy of the mixing apparatus does not appreciably improve the ability to disperse fibers, particularly longer-length fibers. Moreover, the converse is often true: increasing the shear rate of the mixer can lead to clumping and entanglement of the fibers and the formation of fibrous nodules. Finally, any excess water must be removed at the price of increased production costs.

The present invention solves these problems by dispersing the fibrous component by means of either the one-step or two-step processes above in which the liquid fraction within either the preblended mixture or the starch-based composition has a high yield stress and viscosity (i.e., has an approximate Binghamian flow behavior), which has been discovered to be far more effective in directly imparting the shearing forces from the mixer to the fibers. This is because the high viscosity and yield stress of the fluid fraction creates a mixture having a high level of internal cohesion and adhesion and, hence, high shear at the fiber level. The result is greatly increased dispersion of fibers, particularly longer-length fibers of high aspect ratio, compared to conventional methods. In addition, the highly viscous high yield stress preblended mixture, as well as the preferred starch-based compositions discussed below, have sufficient viscosity to reliably maintain the fibers and other admixtures thoroughly and evenly dispersed throughout the mixture. The use of such compositions makes possible the previously unattainable dispersion of fibers having a high aspect ratio and/or an average length of at least about 2 mm, and allows for the dispersion of fibers having average fiber lengths of at least about 3.5 mm, 6.5 mm, and 10 mm, even up to about 25 mm or longer.

Once the fibers have been adequately dispersed throughout the preblended mixture, the moldable mixture is prepared by simply blending in the remaining components or admixtures. If the starch-based binder used in the preblended mixture was gelated by raising the temperature of the preblended mixture to at or above the gelation temperature, it will usually be preferable to first cool the mixture to below the gelation temperature before adding the remainder of the ungelated starch-based binder. Otherwise, the remaining starch-based binder will gelate prior to the molding procedure and generally produce inferior articles of decreased strength. In addition, it is generally preferable to maintain the majority of the starch-based binder in an ungelated state in order to keep the viscosity and yield stress of the moldable mixture within the preferred ranges in order to maintain adequate flowability and moldability of the moldable mixture.

The mixture may be cooled down to below the gelation temperature of the starch-based binder using any appropriate means known in the art. For example, the cool down procedure may simply be performed by adding each of the remaining components, such as the inorganic filler and the remaining water, before the remaining starch-based binder is added. In other cases, it may be preferable to add very cold water or even ice to cool the preblended mixture when forming it into the moldable mixture, particularly where a relatively large fraction of the total water was included in the preblended mixture.

The mixing procedure used to form the final moldable mixture should have adequate shear to thoroughly blend the components within the moldable mixture, but not be so severe so as to damage the fibers and aggregates, or so as to entrain unwanted air pockets within the mixture. In addition to the components identified above, any admixture may be added in order to improve the moldability of the mixture, or in order to impart the desired mechanical properties to the molded article. For example, co-solvents, such as water soluble, volatile alcohols may be added to aid in the removal of the water from the mixture during the molding process. Other co-solvents might include relatively non-volatile components, such as ethylene glycols, polyethylene glycols, propylene glycols, glycerol, etc., which act to plasticize or soften the foamed, starch-bound cellular matrix. The only limitation to the types of admixtures that may be added is that they should preferably not unduly interfere with the gelation process of the starch-based binder during the molding process. Otherwise, a molded article in which the starch-based binder has been inadequately gelated during the molding process will generally have inferior mechanical properties and will be harder to demold without damaging the article.

If the starch-based binder has been properly gelated, the molded article will be form stable and possess substantially all of its desired properties immediately or very shortly after being demolded. The inclusion of well-dispersed fibers aids in the ability to obtain a demolded article having sufficient form stability and, especially, resistance to internal pressure caused by the small amounts of water remaining within the cellular matrix of the newly demolded article. This in turn yields a newly demolded article that has sufficient toughness and strength so that it may be handled at high rates immediately or very shortly after being demolded (i.e., within a few seconds) without cracking or failing. Studies have shown that the inventive articles have fibers that are substantially uniformly dispersed throughout the structural matrix of the article. Although longer-length fibers having an average length greater than about 2 mm are preferred, shorter length fibers (i.e., those having an average length in a range from about 0.3 mm to about 2 mm), which are also more thoroughly and evenly dispersed using the high viscosity and yield stress mixtures of the present invention, have been shown to yield articles of increased strength and fracture energy by maintaining an aspect ratio above about 25:1 and by including such fibers in a concentration sufficient to maintain a high total fiber length throughout any given fraction of the starch-based composition.

Other mechanical properties that can be designed into the molded article by changing the mix design and/or molding parameters include thickness, density, modulus of elasticity, compressive strength, tensile strength, flexural strength, flexibility, range of strain, fracture energy, insulating ability, and specific heat. Because of the ability to adjust these properties as needed, a wide variety of articles can be made, including containers, cups, trays, "clam shell" containers, plates, cartons, boxes, bottles, crates, spacers, and numerous other articles used in, e.g., packaging, storing, shipping, serving, portioning, and dispensing almost any imaginable good, including food or beverages.

The materials of the present invention may include a variety of environmentally safe components, including a starch-based binder, water, fibers, inorganic aggregates, enzymes, pectins, inert organic aggregates, mold-releasing agents, rheology-modifying agents, cross-linkers, internal coating materials, dispersants, plasticizers, and coatings. In order to reduce the cost and also to improve the environmental compatibility of the articles, the moldable mixtures are designed with the primary considerations of maximizing the concentration of the inorganic component, optimizing the starch, fiber, and solvent components by only including as much of these as is necessary to obtain the desired properties from each, and selectively modifying the viscosity and yield stress of the moldable mixture to produce articles quickly, inexpensively, and having the desired properties for their intended use.

The starch-based binder acts as the binding agent and typically includes any starch such as potato starch, corn starch, waxy corn starch, rice starch, wheat starch, their grain predecessors, e.g., flour and cracked grains, or their modified counterparts. Unmodified starches are generally preferred because they will only gelate after the moldable mixture has been raised to the gelation temperature of the unmodified starch during the molding process, thereby providing a means for controlling the timing, rate, and extent of gelation. In addition, they are usually far less expensive than modified starches. Unmodified starches such as potato starch and waxy corn starch, the very starches preferred in the present invention, are treated as very inexpensive waste products and used as cattle feed or irrigation supplements. The substitution of naturally produced, but generally over-abundant and very low-valued unmodified starches, on the one hand, for the petroleum-based or synthetically produced plastics, polystyrene, and other polymers used in the manufacture of conventional materials, on the other, further illustrates the tremendously positive environmental impact of the fiber-reinforced, starch-bound, optionally inorganically-filled, materials of the present invention.

In many conventional uses of starch, such as the hot-melt technique in which the starch is heated under elevated temperature and extreme pressure in the presence of minimal water and in which starch behaves somewhat like a thermoplastic material (also sometimes referred to as "destructurized" starch), it has been necessary to use a starch having a relatively high amylose content (greater than 45% by weight) in order to make the starch more chemically compatible with the small amount of water that might be added to plasticize the starch material. This is in sharp contrast to the way in which starch-based binders are used in the present invention, in which the contribution by the starch-based binder to the mechanical properties of the final molded article is independent of the amylose content. In fact, the two most preferred starch-based binders, namely unmodified waxy corn starch and potato starch, have a relatively low amylose content (1–3% and 20–25%, respectively).

Water, either alone or in combination with a co-solvent, is used to disperse the components within the mixture, control the viscosity and yield stress of the moldable mixture, and act as an agent for gelating the starch-based binder. In addition, other admixtures, such as the starch-based binder, fibers, inorganic filler, rheology-modifying agent, plasticizer, and dispersant, help to create a mixture having the desired rheological or flow properties.

The starch-based binder is preferably added in its ungelated, granular form, although it may be pregelated, at least in part, in the preparation of either the preblended mixture or the final moldable mixture. If a one-step mixing process is employed, it may be preferable to include both a pre-gelatinized starch and an ungelated starch-based binder in order to increase the viscosity and yield stress of the overall composition to the appropriate levels in order to disperse the fibers. As the starch-based binder is heated in the presence of water, the granules rupture, thereby allowing the long, single chain, amylose polymers located within the granules to stretch out and intertwine with other starch polymers, such as the highly branched amylopectin polymers. This process is referred to as gelation. Preferred unmodified starches are those that, like potato or waxy corn starch, swell easily in a single step. Once the solvent has been substantially removed, the resulting interconnected mesh of starchy polymers produces a solid material. Although many starch-based binders (such as unmodified starches) can be very inexpensive, it is generally impracticable to manufacture articles out of a mixture containing solely or primarily starch and water because of the excess time and energy necessary to remove the solvent to make a form-stable article of sufficient strength and toughness, and the time required to condition the demolded article using high humidity.

The addition of fibers improves the fracture energy and toughness of the article and improves the form stability and flexibility of the newly demolded article. One preferred fibrous material is softwood fibers, which have an average length of about 3.5 mm. Longer-length fibers are preferred over shorter-length fibers because longer-length fibers are better able to bridge or span the length of the voids or pores within the foamed starch-bound matrix, thus being better anchored in the matrix and imparting a superior reinforcing effect. Nevertheless, fibers of shorter-length can be employed, either alone or in combination with longer fibers, as long as an aspect ratio of at least about 25:1 is maintained. By maintaining a high aspect ratio of the shorter fibers, the overall cumulative length of the individual fibers per unit volume of material is maintained or increased.

In general, shorter-length fibers such as hardwood fibers, which have an average length of about 1.5 mm, or cotton linters, having an average length in a range from about 0.3 mm to about 1 mm, will be better able to impart the beneficial strength and toughness properties if the average pore size of the article is 0.25 mm or lower. Even recycled paper, comprising a mixture of softwood and hardwood fiber can be used in conjunction with the high viscosity, high yield stress compositions taught and disclosed herein to yield articles having improved strength and toughness. In general, fibers may economically be included in amounts from about 2% to about 80% by weight of the total solids, or about 1% to about 40% by weight of the overall mixture, including water. As a general rule, however, where fibers of low average length are used it will be necessary to include a greater volume of fibers to obtain the same or similar mechanical properties compared to the use of longer-length fibers.

To further decrease the cost and also to impart desirable properties to the final article, inorganic fillers or aggregates may be optionally added in amounts up to about 80% by weight of the total solids in the moldable mixture. While this range applies to most aggregates of relatively high density (greater than about 1 g/cm$^3$), in the case of lower density, or "lightweight", aggregates (having a density less than about 1 g/cm$^3$), such as expanded perlite or hollow glass spheres, the weight proportion may be less and is dependent upon the density of the particular aggregate in question. As a result, it is more appropriate to express the concentration of lightweight aggregates in terms of volume percent, which will preferably be included in a broad range from about 5% to about 80% by volume of the starch-based composition before it is molded.

To obtain mixtures having a high concentration of inorganics, the inorganic aggregate particles are selected to have a shape and particle size distribution that preferably produces a high packing density. This process is referred to as particle packing. It is further preferred that the particles have a relatively low specific surface area; otherwise, the aggregate material might interfere with the water-induced gelation reaction of the starch-based binder. The specific surface area, or ratio of the surface area to the volume of the aggregates, can be reduced by using aggregates that have a more uniform, generally spherical shape. While increasing the diameter of the aggregates also decreases their specific surface area, the diameter is preferably less than about 0.5 times the cell wall thickness of the interior matrix, more preferably less than 0.3 times, and most preferably less than 0.2 times the cell wall thickness. Using fillers with a high packing density and low specific surface area minimizes the amount of starch-based binder and water needed in the mixture. By minimizing the starch-based binder and solvent, the material costs and processing time to produce the article are minimized. Furthermore, the selection of aggregates having specific mechanical and physical properties can be used to impart these properties to the final articles. For example, the aggregate can help control the specific heat, density, strength, and texture of the final article. One preferred inorganic aggregate is calcium carbonate.

Although increasing the viscosity and yield stress of the starch-based composition helps to prevent settling or separation of the solid components within the composition and, of course, aids in the dispersion of the fibrous component, it may be desired to lower the yield stress and, especially, the viscosity of the moldable composition after the fibers have been uniformly dispersed. One reason is that the inorganic filler component is generally more easily dispersed in a lower viscosity mixture, particularly where a dispersant is used. Dispersants are often referred to in the concrete industry as "water-reducers" because they reduce the viscosity of a mixture without the need to add additional water to the mixture. Once the fibers have been well dispersed throughout the starch-based composition, a dispersant can be added to aid in the dispersion of the inorganic aggregate filler without disturbing the level of dispersion of the already dispersed fibrous component. In addition, the dispersant makes the starch-based composition more fluid, thereby allowing it to flow more easily into the mold which, in turn, has been found to yield molded articles having a smoother, more even surface.

Rheology-modifying agents, such as cellulose-based, polysaccharide-based, protein-based, and synthetic organic materials can be optionally added to control the viscosity and yield stress of the mixture. However, in larger amounts they can compete with and tend to impede the gelation process of the starch-based binder. In fact, it has been found that the addition of rheology-modifying agents or thickeners other than gelated starch known in the art in amounts sufficient to attain the high viscosity and yield stress necessary to disperse most longer-length fibers can cause segregation of the material during formation of the article and varying porosity and, hence, can reduce the strength of the final molded article.

The drawback of adding large amounts of these thickening agents in addition to or instead of gelated starch is at least two-fold. First, such thickening agents are generally far more expensive than gelated, unmodified starches. Second, they may compete with the gelation reaction of the starch-based binder with water so that, at some point, the gelation reaction of the starch-based is severely impeded or inhibited, thereby preventing the starch-based binder from being the primary binding agent and undermining the purpose for which the starch-based binder was included in the first place. By gelating at least a portion of the starch-based binder during preparation of the preblended mixture, as well as by increasing the concentration of inorganic filler or decreasing the amount of water in the final moldable mixture, the need to add a rheology-modifying agent to obtain a mixture having the desired viscosity and yield stress can be greatly reduced or eliminated.

In any event, the prior art only teaches the use of thickening agents in order to improve the colloidal stability of the mixtures. Their use in dispersing longer-length fibers, even if possible, was not known. Therefore, to the extent that one of ordinary skill in the art were to use a thickening agent and it coincidentally were to aid in dispersing the fibers, particularly longer-length fibers, it would certainly fall within the purview of the present invention.

As a general rule, mixtures that have a high water content yield relatively light, low density articles having larger cells or pores in the structural matrix. In contrast, mixtures that have a lower water content yield higher density articles having smaller cells or pores within the structural matrix. The formation of the foamed structural matrix is also dependent on variables such as the solvent content and the pressure and temperature applied to the mixture. If a rheology-modifying agent is used, it may act as a binder to some extent and may help to increase the strength of the article somewhat.

Depending on the amount and average length of fibers that are used in the moldable mixture, it is possible for the newly demolded article to be somewhat brittle, particularly where fewer fibers or those of predominately shorter length are employed. Plasticizers, humectants, and porous aggregates impregnated with plasticizers or humectants may be added to the mixture, in addition to the aforementioned fibers, to increase the flexibility of the articles. Plasticizers include materials that can be absorbed by the starch-based binder to soften the structural matrix, which have a sufficiently high vapor point so that they are not completely vaporized and removed from the matrix during the molding process, and which preferably remain stable after the article is formed. They may also be absorbed by the fibers, making them more pliable or flexible. In addition to water, two preferred plasticizers include glycerin and polyethylene glycol. Humectants, such as $MgCl_2$ and $CaCl_2$, can absorb moisture and tightly bind it within the starch-bound structural matrix even after the molding process. This moisture tends to improve the flexibility and resilience of the finished article. Porous aggregates and fibers can retain the water or other plasticizing agents during the forming process and then disperse them into the matrix of the form-stable article to increase the flexibility of the article.

Hydraulically settable binders such as calcium sulfate hemihydrate ($CaSO_4 \cdot \frac{1}{2} H_2O$), may be used as a water absorption agent within the mixtures of the present invention because it reacts with water to form calcium sulfate dihydrate ($CaSO_4 \cdot 2 H_2O$). Water absorbing components may be used to more quickly increase the viscosity and form stability of the molded article, especially where larger amounts of water are included initially. However, they generally do not release the water once bound and are not generally added in order to soften the hardened matrix. Nevertheless, at elevated temperatures, such as those experienced during molding of the starch-based composition into the desired article, the dihydrate form of calcium sulfate can release water and revert to the hemihydrate form. Upon demolding such an article containing calcium sulfate hemihydrate, the article will actually stiffen and increase in strength as the article is exposed to moderate amounts of moisture.

Other components, such as medium- or long-chain fatty acids, their salts, and their acid derivatives may be added to improve the release of the hardened article from the mold. Molds having a polished metal surface, or other non-stick surface, are also useful in improving or facilitating the release of the article. Cross-linking agents may be added to improve the strength and stability of the molded articles. Integral coating agents may be added, which migrate to the surface of the starch-bound matrix as water is being removed therefrom to form a coating at or concentrated near the surface of the molded article.

Initially, the selected components are preferably blended into a uniform, moldable mixture using either the one- or two-step procedure outlined above, the more important variable being the use of a high viscosity, high yield stress fluid fraction within the overall composition while the fibers are being dispersed. The mixing can be carded out using a high shear mixer, paddle mixer, or an auger extruder, depending on the viscosity of the mixture. It may be advantageous in some cases to apply a partial vacuum to the starch-based composition to remove unwanted air voids that can create defects in the final molded article.

In a preferred embodiment, the moldable mixture is positioned within a heated mold cavity. The heated mold cavity may comprise many different embodiments, including molds typically used in conventional injection molding and die-press molding processes. In one preferred embodiment, for example, the moldable mixture is placed inside a heated female mold. Thereafter, a heated male mold is complementarily mated with the heated female mold, thereby positioning the mixture between the molds. As the mixture is heated, the starch-based binder gelates, increasing the viscosity and yield stress of the mixture. Simultaneously, the mixture increases in volume within the heated molds cavity as a result of the formation of vapor bubbles from the evaporating solvent, which are initially trapped within the viscous mixture.

Various types of heated molding apparatus known in the art can be used to mass-produce the containers and other articles contemplated by the present invention, including those used in wafer baking. Furthermore, conventional expanded polystyrene machines can be modified to produce the inventive articles.

As will be discussed later in greater detail, by selectively controlling the thermodynamic parameters applied to the mixture (e.g., pressure, temperature, and time), as well as the water content, the mixture can be formed into a form-stable article having a selectively designed foamed structural matrix. That is, the size, quantity, and positioning of the pores or cells in the foamed structural matrix can be selectively designed to produce articles having desired properties for their intended use. Furthermore, the surface texture and configuration of the pores within the foamed structural matrix can be controlled by selectively varying the temperature between the molds and the temperature along the length of the molds. Besides controlling the properties among different molded articles, the properties of a single article can be made to vary throughout the article, including varying thickness, varying skin thickness, varying cell structure, and varying density. This may be accomplished, for example, by creating within the molding apparatus differential relative temperatures, or differential temperature zones, throughout the molding apparatus. As a result, different temperature and processing conditions are imparted to varying locations throughout the same article.

Moreover, the unique compositions of the present invention also allow for the manufacture of articles having varying thickness, such as, e.g., a thicker bottom and thinner side walls of a cup, because of the ability to maintain significant amounts of free water within the cellular matrix of the article without destroying the structural integrity of the matrix. Thus, while a thicker portion of the molded article might contain more free water than a thinner portion, the entire article may be demolded at once because of the overall uniform strength and form stability of the various portions within the article. Moreover, any variation in the water content within a newly demolded article will tend to equilibrate over time in any event. The ability to have varying wall thicknesses is also enhanced by the greatly increased fracture energy imparted by the substantially uniformly dispersed fibers throughout the matrix.

In a preferred embodiment, the articles are formed from the previously discussed fiber-containing mixtures to impart the desired flexibility to the hardened articles without the need for conditioning in high humidity. Residual water, usually about 2% to about 6% by weight of the article, more preferably from about 3% to about 4% by weight, is retained within the starch-bound matrix even after the molded article has achieved adequate form stability and resistance to internal pressure so that it can be demolded without significant deformation of the desired structure of the article. It is believed that some of the water retained by the fibers may migrate from the fibers to the hardened starch-bound matrix over time, thereby further softening the structural matrix of the article. In addition, further flexibility of the molded articles may be obtained through conventional conditioning in a high humidity chamber, wherein the articles are exposed to elevated humidity and temperature over time. However, this procedure is generally unnecessary and cost-ineffective.

Once the article has been demolded, a coating may be applied in order to seal and provide a more finished surface to the article, as well as to provide additional strength. The coating can be applied through various conventional processes such as spraying, dipping, sputtering, and painting. In an alternative embodiment, so-called "integral coating materials" may be added to the mixture prior to the formation of the article. If an integral coating agent is used that has a similar melting point as the peak temperature of the mixture during the molding process, the individual particles of the integral coating agent will tend to migrate to the surface of the article during the heated molding process by the outward flow of the vaporizing water. Upon reaching the surface of the molded article they are exposed to elevated temperatures which cause the integral coating particles to melt and coalesce together and then congeal or solidify at or near the surface of the article upon demolding and cooling of the article. Such integral coating materials may include any material having a melting point that is generally above the boiling point of super heated water within the molded article and at or below the maximum temperature of the surface of the article while it is being molded. Integral coating agents may include, for example, selected waxes, stearates, shellac, polylactic acid, or any other plastic or polymeric material having the stated melting criteria. In addition, liquid materials, such as latexes or polyvinyl alcohol, can be used to create a general water resistance throughout the foamed cellular matrix. Gelatin can be added to help seal the pores at the surface of the article.

The resulting articles can be designed to have properties similar or even superior to articles made from conventional materials, such as paper, paperboard, polystyrene, metals, plastic, or other natural organic materials. In light of the minimal cost of inorganic fillers and the relatively low cost of unmodified starches and fibers, the inventive articles can also be made at a fraction of the cost of conventional articles. Finally, the inventive articles are more environmentally friendly than conventional articles. For example, the manufacturing process employs no harmful chemicals, emits no harmful emissions into the air or water, depletes no non-renewable resources as a starting raw material for the moldable mixtures, and requires only minimal processing energy. Furthermore, the inventive articles generally have low mass, are easily recycled, or quickly decompose back into the environment.

From the foregoing, an object of the present invention is to provide compositions and methods for manufacturing novel starch-bound materials that can replace paper, paperboard, metal, plastic, polystyrene, or other organic materials as the material of choice for producing containers and other articles.

Another object and feature of the invention is to provide compositions and methods to improve the dispersion of fibers within such starch-bound materials without the use of large quantities of water. Yet another object and feature is that such compositions and methods allow for the more thorough dispersion of fibers, particularly relatively long-length fibers (i.e., those having an average length greater than about 2 mm) and/or fibers of high aspect ratio (i.e., at least about 25:1) within the starch-based materials used to make said containers or other articles.

Yet another object of the present invention is to provide compositions and methods for manufacturing starch-bound materials that can be filled with relatively large percentages of inorganic aggregates (which are generally compatible with and commonly found in the earth) and yet maintain their structural integrity and desired mechanical properties.

A further object of the present invention is to provide compositions and methods that yield highly inorganically filled, organically-bound articles that have properties similar, or even superior, to paper, paperboard, metal, polystyrene, plastic, or other organic materials.

Another object and feature of the present invention is to provide compositions and methods that allow for the manufacture of containers and other articles without the need for prolonged, high-humidity conditioning in order to obtain the required flexibility or toughness.

A further object is to provide compositions and methods which yield starch-bound articles which do not require the application of a coating to keep the cellular matrix from drying out or absorbing humidity from the air.

An additional object of the present invention is to provide compositions and methods that yield starch-bound containers and other articles having a smoother, more uniform surface compared to existing starch-based articles.

Another object and feature is to provide compositions and methods that yield starch-bound articles having varying cross-sectional thicknesses throughout the same article.

Still a further object and feature of the present invention is to provide compositions and methods for manufacturing articles using existing manufacturing equipment and techniques presently used to form such articles from paper, paperboard, metals, polystyrene, plastic, or other organic materials. Another object is that such compositions and methods do not result in the concomitant generation of wastes involved with the manufacture of articles from conventional materials.

A further object of the present invention is to provide compositions and methods that require the use of less water that has to be removed during the manufacturing process (as compared to the manufacture of paper or other organically-based materials), in order to shorten the processing time and reduce the initial equipment capital investment.

Another object of the present invention is to provide compositions and methods that make possible the manufacture of containers and other articles at a cost that is comparable to or even less than existing methods of manufacturing containers or other articles from paper, paperboard, metal, plastic, polystyrene, or other organic materials. Specifically, an important object and feature is that such compositions and methods result in a reduction in the consumption of energy, valuable natural resources, and initial start-up capital presently expended in making articles from conventional materials, such as paper, metals, polystyrene, plastic, or other organic materials.

Yet another object is that such compositions and methods yield articles having a similar cross-section and comparable mechanical properties of, e.g., insulation, strength, toughness, etc., compared to paper, paperboard, polystyrene, plastic, or other organic materials.

An additional object and feature of the present invention is to provide compositions and methods that allow for the mass-production of highly inorganically filled, starch-bound articles that can be rapidly formed and ready to use within a matter of minutes from the beginning of the manufacturing process.

Finally, a further object and feature of the present invention is to provide compositions and methods that allow for the production of highly inorganically filled, starch-bound materials having greater flexibility, flexural strength, toughness, moldability, mass-producibility, product stability, and lower environmental impact compared to conventionally manufactured starch-based materials.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which:

FIG. 2A is a photomicrograph of the cross-section of an article having a relatively thin outer skin and an interior section containing relatively large cells or pores;

FIG. 2B is a photomicrograph of the cross-section of an article having a relatively thin outer skin and an interior section containing relatively medium cells or pores;

FIG. 2C is a photomicrograph of the cross-section of an article having a relatively thick outer skin and an interior section containing relatively large cells or pores, with longer-length fibers randomly dispersed throughout the entire cellular matrix;

DETAILED DESCRIPTION OF THE PREFERRED EMBODIMENTS

I. Introduction

Figure 1:
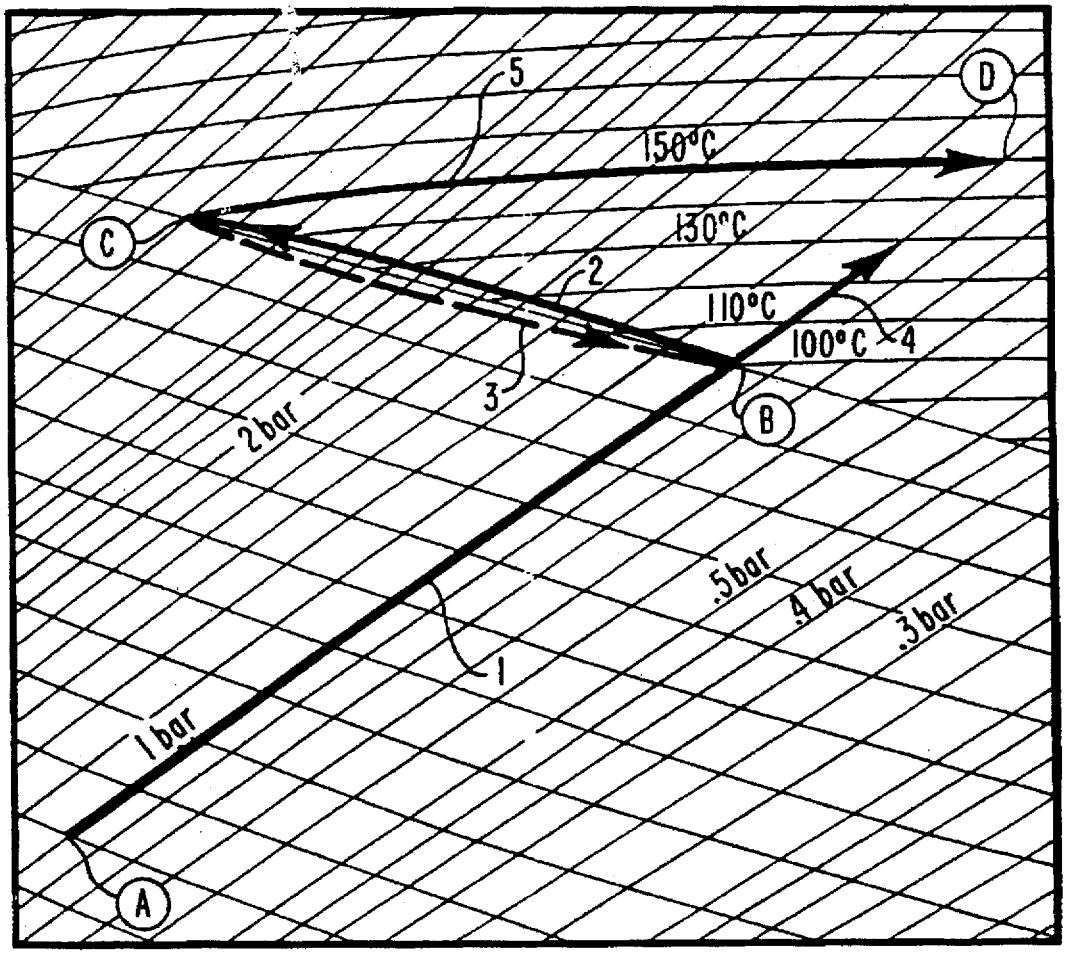
FIG. 1 is a phase diagram showing the temperature and pressure conditions that the mixture is subject to in one embodiment of the invention during formation of the articles.

The present invention is directed to novel methods for obtaining moldable starch-based compositions having substantially uniformly dispersed fibers, and articles manufactured therefrom. The fibers are uniformly dispersed by means of a high yield stress, high viscosity fluid fraction within the overall composition. The articles made from such compositions have a foamed, fiber-reinforced, organically-bound structural matrix. The inventive compositions include a variety of environmentally safe components, including a starch-based binder, water, and fibers, as well as optional admixtures such as inorganic fillers, mold-releasing agents, rheology-modifying agents, cross-linkers, plasticizers, humectants, dispersants, organic aggregates, and integral coating materials.

A materials science and microstructural engineering approach is used to select the type, proportion, and other characteristics of each component that, when blended together, will result in a moldable starch-based composition and subsequent final product having the desired properties at an optimal cost. The desired properties are dependent on the required handling and the intended use of the finished article. The optimal cost is obtained by selecting components that will maximize production output while minimizing material and production costs. By using a microstructural engineering approach, the compositions and methods of the present invention yield a variety of articles, including containers, plates, cups, "clam shell" containers, platters, cartons, and other types of containers and articles having mechanical properties substantially similar or even superior to articles manufactured using conventional materials, such as paper, polystyrene foam, plastic, metal and glass. The inventive articles can often be made at a fraction of the cost of their conventional counterparts due to their inclusion of the aforementioned components, which are generally very inexpensive, particularly the inorganic aggregate filler component, and also because of lower processing energy requirements.

Moreover, the manufacturing processes and resulting articles are less harmful to the environment compared to conventional materials and processes. First, theoretically all of the waste associated with the manufacturing process can be directly recycled back into the production line. Second, once the generally disposable articles have fulfilled their intended use, the starch-bound articles are easily recycled into other articles or similar materials with minimum processing. Third, if disposed of, the starch-based binder and other organic components of the articles are in a state which makes them quickly dissolve and/or biodegrade in the presence of moisture, while the inorganic filler is already largely compatible with the earth into which it may be disposed. Fourth, the inventive articles are of generally low mass and volume.

Preferred starch-based compositions from which the articles of the present invention are molded include a starch-based binder, such as potato, corn, waxy corn, rice, or wheat starch, or their cereal grain precursors, water, well-dispersed fibers having an aspect ratio of at least about 25:1 and an average length that is preferably at least 2 mm, and, optionally, an inorganic aggregate such as calcium carbonate. The addition of well-dispersed fibers of high aspect ratio or longer-length (and optionally, significant concentrations of inorganic aggregate filler) permits the articles to be more quickly molded and demolded, less expensive, more environmentally safe, and more resistant to heat compared to articles made with only minimal amounts of inorganic filler and no well-dispersed fibers. The materials and articles of the present invention may be referred to as "inorganically filled" or "highly inorganically filled" materials or articles if they include an inorganic filler.

The preferred method for preparing the starch-based compositions of the present invention involves a two-step process. First, a preblended mixture is prepared that includes a portion of the starch-based binder and water, and substantially all of the fibers to be dispersed. The fibers are thoroughly and evenly dispersed throughout the preblended mixture by raising the yield stress and viscosity of the fluid fraction within the preblended mixture, which allows for a much more efficient transfer of the shear forces produced by the mixing apparatus compared to typical fiber slurries employing relatively large amounts of water. The viscosity and yield stress of the fluid fraction is increased by gelating the starch-based binder, which can be accomplished by raising the temperature of the preblended mixture to the gelation temperature of the starch-based binder, usually around 65° C. for unmodified potato starch. Alternatively, the viscosity and yield stress can be increased by using a pre-gelated starch, a modified starch that will gelate when mixed with water at room temperature, or other thickening agents known in the art. If a thickening agent other than starch is used, it is preferably used to assist rather than take the place of gelatinized starch in preparing the high viscosity, high yield stress fluid fraction. In the event that heat is used to gelate the starch-based binder, it will usually be preferable to cool the preblended mixture to below the gelation temperature before adding the remainder of the starch-based binder. Finally, the moldable starch-based composition is prepared by simply mixing into the preblended mixture the remaining starch-based binder, water, and other admixtures.

In an alterative embodiment, the final moldable starch-base composition is prepared in a single step by adding enough pregelatinized starch, modified starch, or other appropriate thickener to the starch-based composition in order to raise the viscosity and yield stress of the fluid fraction to levels sufficient to adequately and homogeneously disperse the fibers.

The fibers so dispersed within the moldable starch-based composition increase the form stability and resistance to internal pressure of the cellular matrix of the molded articles, which allows them to be more easily demolded without having to remove substantially all the water from the starch-bound matrix. This is due in part to the lattice effect of the fibers, which reinforces the semi-hardened, starch-bound matrix and allows it to be demolded and handled without significant deformation or further expansion of the desired shape of the demolded article. In addition, the fibers are able to more tightly hold, and thereby retain, water within the structural matrix compared to the starch-bound binder. As a result, moisture that is retained within the fibers can migrate into and soften the otherwise brittle structural matrix of the starch-based binder after the article has been demolded.

These effects imparted by the fibers allow the demolded articles to be less brittle and have increased flexibility and resilience immediately or shortly after being demolded. This obviates, or at least greatly reduces, the need for subsequent conditioning of the starch-bound matrix using high humidity or the addition of oils, plasticizers, or other toughening agents. The fibers also increase the fracture energy and toughness of the final articles.

Other admixtures can be added to the starch-based composition to impart desired properties to the articles. For example, rheology-modifying agents and dispersants can be added to additionally regulate the viscosity and yield stress of the composition beyond that already imparted by the starch-based binder and solid components. Plasticizers and humectants can be used for imparting additional flexibility to the molded articles. Other additives include dispersants, which decrease the viscosity of the composition without additional solvent, and integral coating or internal sealing materials, which can form a coating on the surface or within the interior of the articles during the formation process. Aggregate particles upon which ettringite has been formed may be used to improve the interaction between the aggregate particles and starch-based binder. Integral coating agents that react during the molding process to coat the article or provide internal sealing can be added.

Once a desired starch-based composition has been prepared, it is positioned within a heated mold cavity. The heated mold cavity may comprise many different embodiments, including molds typically used in conventional injection molding processes and die-press molding. In a preferred embodiment, the starch-based composition is placed inside a heated female mold. A heated male mold is then complementarily mated with the heated female mold, thereby positioning the composition between the molds. By carefully controlling the temperature and pressure applied to the mixture, as well as the viscosity and solvent content, the composition can be rapidly formed into form-stable articles having a selectively designed foamed structural matrix. Furthermore, the strength and flexibility of the molded articles can be controlled by regulating the fiber length and content within the structural matrix. In general, the surface texture, strength properties, flexibility, and the formation of the pores within the structural matrix can be selectively controlled by varying the components and their relative concentrations within the composition as well as the thermodynamic processing conditions. This allows for the manufacture of a wide variety of containers and other articles having greatly varying thermal and mechanical properties corresponding to the performance criteria of the article.

In the preferred embodiment, the articles are formed having the desired flexibility and toughness for their intended use immediately or shortly after being demolded. Nevertheless, if desired, conventional conditioning procedures using high-humidity can be used to further increase the flexibility and toughness of the final articles. In the high-humidity conditioning procedure, water is absorbed by the hydrophilic starch-based binder, thereby softening and rendering the structural matrix less brittle. Of course, because the starch-based binder has a natural affinity for water, it can absorb moisture from ambient air in a relatively short period of time after the article has been demolded.

Finally, coatings can be applied to the surface of the articles of the present invention in order to protect them from moisture or otherwise render them impermeable to an attacking agent. Coatings can be applied to the demolded article using conventional coating means known in the art, or they may be formed in situ by the use of integral coating materials capable of migrating to the surface of the article during the molding process and then solidifying at or near the surface of the article. Alternatively, or in addition to "integral coating", an internal sealing material that does not migrate to the surface may be employed to render the starch-bound matrix water generally water-resistant. Subsequent processing of the articles may also include printing, stacking, and boxing.

II. Definitions

The terms "starch-based composition", "moldable starch-based composition", "moldable composition", "composition", "moldable mixture", or "mixture", as used in the specification and the appended claims, have interchangeable meanings and shall refer to a composition that can be formed into the articles which are disclosed and claimed herein. Such compositions are characterized by having a starch-based binder, well-dispersed fibers, and a gelation solvent that typically comprises water. The composition may also include other admixtures, such as an inorganic filler or aggregate (up to about 80% by weight of the total solids in the mixture), mold-releasing agents, organic aggregates, dispersants, crosslinkers, rheology-modifying agents, plasticizers, humectants, or integral coating materials. If an inorganic filler is used, the moldable mixture will often be referred to as an "inorganically filled moldable composition." In light of the wide variety of admixtures that can be added, the moldable compositions can have a wide range of viscosities, from an apparent viscosity measured at a shear rate of 5 s$^{-1}$ as low as about 3 Pa·s up to as high as about 3000 Pa·s, measured at a shear rate of 5 s$^{-1}$. In addition, because the compositions will have an approximate Binghamian plastic behavior they can have a wide range of yield stresses, from as low as about 10 Pa, up to as high as about 10,000 Pa.

The term "preblended mixture", as used in the specification and the appended claims, shall refer to any mixture having a sufficiently high yield stress and viscosity fluid fraction to result in uniform dispersion of the fibrous component. The preblended mixture will generally contain a gelatinized starch-based binder, water, and uniformly dispersed fibers.

The terms "fluid fraction", "fluid system", or "liquid fraction", as used in the specification and the appended claims, shall refer to the fluid or liquid component within either the preblended mixture or starch-based composition minus the actual solids or solid components that are not dissolved within the fluid fraction. The fluid fraction includes all components that are dissolved therein, even materials that were initially solid or which will return to a solid state later in the molding process. The fluid fraction is characterized as having approximate Binghamian flow characteristics (i.e., having a measurable yield stress) as opposed to a Newtonian flow (i.e., having essentially no yield stress regardless of whether or not it has a high viscosity). It is important to understand that the ability to uniformly disperse the fibers throughout the starch-based composition is determined primarily by the rheology of the fluid fraction as opposed to the mixture as a whole. In fact, adding solid components, such as fibers and aggregates, to the mixture is known to increase both the yield stress and viscosity of the mixture. However, simply increasing the yield stress and viscosity of the mixture will not result in the high degree of fiber dispersion that is obtained through the use of a high yield stress fluid fraction; hence, the importance of adding gelatinized starch or other appropriate water soluble thickening agent to the fluid fraction.

The terms "thickener" or "thickening agent", as used in the specification and the appended claims, refers to any generally water soluble or water dispersible material that can be used to increase the yield stress of the fluid fraction and thereby aid in the dispersion of the fibers throughout the fluid fraction. The thickener or thickening agent works by appropriately increasing the yield stress of the fluid fraction to a level in which the shear forces from the mixer can be transferred through the fluid fraction down to the fiber level. A preferred low cost, high performance thickening agent is pregelated starch, which, upon the removal of water therefrom, can also act as a binder.

The term "starch-based binder", as used in the specification and the appended claims, refers to any starch or starch derivative that can act as a binder through the gelation of the starch-based binder in water and the subsequent removal of at least part of the water from the starch-based gel. "Starch-based binder" shall refer to any such binding agent without regard to the extent of gelation or removal of water. Therefore, any starch or starch derivative shall fall within the broad definition of "starch-based binder" whether modified or unmodified, gelated or ungelated, dispersed or dissolved in water or hardened through the removal of part or all of the water from the starch-based gel. The term "starch-based gel" shall refer to an aqueous gel formed by the gelation, or gelatinization, of a starch-based binder in an aqueous solution, which is akin to dissolution of the starch-based binder. It does not refer to what has been referred to in the art as a "hot melt" or "destructurized starch", which generally require the application of elevated temperatures and extremely high pressures (>600 Bars) for an extended period and with low water content in order for the starch to pass through a "glass transition phase" and thereby act as a thermoplastic. In a hot melt, low concentrations of water are sometime added, not to dissolve or gelate the starch, but rather to plasticize or soften the hot melt. Nor does the hot melt solidify through the removal of such water, but rather upon lowering the heat and pressure.

As used in the specification and the appended claims, the term "total solids" includes the actual solids, together with all admixtures that are added to either the preblended mixture or starch-based composition that are initially in a solid or semi-solid state before being dissolved into the fluid fraction. Hence, the term "total solids" includes any portion of, e.g., the starch-based binder or any other admixture that may at some point be dissolved by water and become part of the fluid fraction until a substantial portion of the water is removed by evaporation in order to form the cellular structural matrix. For purposes of determining the relative concentrations of the components within the starch-based mixture, the term "total solids" will refer to the actual solids and all components that are initially in a solid state but which may at some point be dissolved within the fluid fraction.

The terms "fiber-reinforced cellular matrix", "cellular matrix", "foamed cellular matrix", "starch-bound cellular matrix", "starch-bound matrix", or "starch-bound material", as used in the specification and the appended claims, are interchangeable and shall refer to the substantially hardened structure of the article formed by heating the moldable mixture as described herein. The terms also refer to any starch-bound material in which there has been a net increase in the volume of the final molded article compared to the initial volume of the moldable mixture. Such increase can be as low as 2%, but can be as high as 10 times (1000%) or more. In the case where an inorganic filler is added to the matrix, it may also be referred to as, e.g., an "inorganically filled cellular matrix" or "inorganically filled matrix".

The term "hardening", as used in this specification and the appended claims, refers to the process of gelation of the starch-based binder and simultaneous removal of solvent from the moldable mixture to produce a form-stable article. The term "hardening", however, is not limited by the extent of gelation or the amount of solvent removed.

The term "form-stable", as used in the specification and the appended claims, means that the starch-bound matrix of the newly demolded article has sufficient strength and structural integrity that it can be removed from the mold, support its own weight against the force of gravity, and resist significant deformation when exposed to subsequent processing and handling. Furthermore, the term "form-stable" means that the article has sufficient solvent removed from its matrix so that the article will not bubble or crack as a result of vapor expansion once the article is removed from the molds.

The terms "article", "molded article", "starch-bound article", and "article of manufacture", as used in the specification and the appended claims, are intended to include any article that can be formed using the disclosed compositions and processes. Examples of such articles include containers, such as food and beverage containers and packaging containers. Articles within the scope of this invention also include such disparate objects as cutlery, lightweight cushioning materials, mailing tubes, and light fixtures.

The terms "container" or "containers", as used in the specification and the appended claims, are intended to include any receptacle or vessel utilized for, e.g., packaging, storing, shipping, serving, portioning, or dispensing various types of products or objects (including both solids and liquids), whether such use is intended to be for a short-term or a long-term duration of time.

Containers within the scope of this invention include, but are not limited to, the following: cartons, boxes, sandwich containers, hinged or two-part "clam shell" containers, dry cereal boxes, frozen food boxes, milk cartons, fruit juice containers, carriers for beverage containers, ice cream cartons, cups (including, but not limited to, disposable drinking cups and cone cups), french fry scoops, fast-food carry out boxes, packaging, support trays (for supporting products such as cookies and candy bars), cans, yoghurt containers, sleeves, cigar boxes, confectionery boxes, boxes for cosmetics, plates, vending plates, pie plates, trays, baking trays, bowls, breakfast plates, microwaveable dinner trays, "TV" dinner trays, egg cartons, meat packaging platters, disposable single use liners which can be utilized with containers such as cups or food containers, cushioning materials (i.e., "peanuts"), bottles, jars, cases, crates, dishes, and an endless variety of other objects.

The container is defined as being capable of holding its contents, whether stationary or in movement or handling, while maintaining its structural integrity and that of the materials contained therein or thereon, according to its designated use. This does not mean that the container is required to withstand strong or even minimal external forces. In fact, it may be desirable in some cases for a particular container to be extremely fragile or perishable. The container should, however, be capable of performing the function for which it was intended over the intended duration of time.

Containment products used in conjunction with the containers are also intended to be included within the term "containers." Such products include, for example, lids, straws, interior packaging, such as partitions, liners, anchor pads, corner braces, corner protectors, clearance pads, hinged sheets, trays, funnels, cushioning materials, and other objects used in packaging, storing, shipping, portioning, serving, or dispensing an object within a container.

The containers within the purview of the present invention may or may not be classified as being "disposable" (i.e., manufactured for a single-service or one-time use). In some cases, where a stronger, more durable construction is required, the container might be capable of repeated use. A "disposable" article of the present invention will usually be discarded (or recycled) after the duration of its intended use has expired. If produced en mass and then discarded, the articles of the present invention have a composition that is easily degraded into environmentally neutral components compatible with the earth into which they may be placed. The starch-bound matrix is quickly destroyed when exposed to moisture and the components easily recycled or composted.

The articles within the scope of the present invention can have greatly varying thicknesses depending on the particular application for which the article is intended. They can be as thin as about 1 mm for use in, e.g., a cup; however, they may be as thick as needed where strength, durability, and/or bulk are important considerations. For example, the article may be up to about 10 cm thick or more to act as a specialized packing container or cooler. Nevertheless, most articles will preferably have a thickness in a range from about 0.5 mm to about 5 mm, more preferably from about 1 mm to about 3 mm.

The phrases "mass-producible" or manufactured in a "commercial" or "economically feasible" manner, as used in the specification and the appended claims, shall refer to the capability of rapidly producing articles at a rate that makes their manufacture economically comparable or even superior to articles made from conventional materials, such as paper, paperboard, polystyrene, plastic, or metal.

The containers and other articles made from inorganically filled materials are intended to be competitive in the marketplace with such articles currently made of various materials, such as paper, plastic, polystyrene, or metals. Hence, the articles of the present invention must be economical to manufacture (i.e., the cost will usually not exceed a few cents per item). Such cost restraints thus require automated production of thousands of the articles in a very short period of time. Hence, requiring the articles of the present invention to be economically mass-produced is a significant limitation on the qualities of the materials and products.

III. Conceptual Overview of Formation Process

A. Microstructural Engineering Design.

The starch-bound materials of the present invention are developed from the perspective of microstructural engineering in order to build into the microstructure of the material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design starch-bound materials with those properties of strength, weight, flexibility, insulation, cost, and environmental neutrality that are necessary for the production of functional and useful containers and other articles.

The number of different raw materials available to engineer a specific product is enormous, with estimates ranging from between fifty thousand and eighty thousand. They can be dram from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements, historically have low flexural strength, while elastomers have high flexural strength and elongation before rupture.

Compartmentalization of material properties, however, has its dangers; it can lead to specialization (the metallurgist who knows nothing of ceramics) and to conservative thinking ("we use steel because that is what we have always used"). It is this specialization and conservative thinking that has limited the consideration of using starch-bound materials for a variety of products, such as in the manufacture of containers and other packaging materials.

Nevertheless, once it is realized that starch-bound materials have such a wide utility and can be designed and microstructurally engineered to have desired properties, then their applicability to a variety of possible products becomes appreciable. Such materials have an additional advantage over other conventional materials, in that they gain their properties under relatively gentle, nondamaging, inexpensive conditions. (Other materials often require high energy, severe heat, or harsh chemical processing that significantly affect the material components and cost of manufacturing.) Moreover, certain conventional materials, or components thereof, can be incorporated into the materials of the present invention with surprising synergistic properties or results.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are determined by the properties necessary for the article to function successfully in its intended use. With respect to a food and beverage container, for example, those primary constraints include minimal weight, strength (both compressive and tensile), flexibility, and toughness requirements, while simultaneously keeping the cost comparable to its paper, plastic, polystyrene or metal counterparts.

In its simplest form, the process of using materials science to microstructurally engineer and design an inorganically filled article requires an understanding of the interrelationships between each of the mixture components, the processes parameters (e.g. time, temperature, pressure, humidity), the mixture properties, and the properties of the final articles. By understanding the interrelationships between the variables at both the macro and micro level, one skilled in the art can select proportions of desired components that can be processed under selected conditions to produce articles that have desired properties for an intended use at a minimum cost.

The interrelationships between the variables will be discussed at selected locations hereafter where the variables are introduced and defined. Specific compositions are set forth in the examples given below in order to demonstrate how the selection of variables can optimize properties.

B. Processing Concepts and Variables.

The present section discusses the underlying concepts and processing variables used in manufacturing the articles of the present invention. A detailed description of the mechanical apparatus and systems used in the manufacturing process will be provided in a subsequent section.

The preferred starch-based compositions of the present invention are prepared by combining selected components and blending them in a two-step process until a homogeneous, moldable mixture having well-dispersed components is formed. The first step involves the preparation of a preblended mixture having high viscosity and yield stress fluid or liquid fraction in order to more thoroughly disperse the fibers, preferably longer-length fibers, within the preblended mixture. The ability to thus include fibers that were difficult, if not impossible, to adequately disperse in the past is a key inventive feature that greatly improves the final strength and other performance properties of the molded articles. The inclusion of fibers, preferably long fibers having an average length greater than about 2 mm, greatly increases the strength and flexibility of the formed articles, and aids in creating a form stable and internal pressure resistant product without removing all of the water from the article as it is being molded. This results from the reinforcing effect of the well-dispersed fibers forming a fiber matrix, lattice structure, or skeleton that strengthens the newly formed starch-bound structural matrix of the articles.

In order to take full advantage of the properties added by the fibers, it is greatly preferred that the fibers to be uniformly dispersed throughout the starch-bound composition and have an aspect ratio that is at least about 25:1, preferably greater. It has also been found that shorter fibers (i.e., those having an average length between about 0.3 mm to about 2 mm) can yield an adequate product as long as the aspect ratio and overall fiber length are kept high.

Before it was discovered that increasing the viscosity and yield stress of the fluid fraction within the composition would result in better transfer of shear to disperse the fibers, compared to simply adding more water, it was particularly difficult to get a uniform dispersion of fibers throughout a starch-based mixture, with longer-length fibers being particularly difficult to disperse. Only a reduced amount of fiber loading was possible, and only using shorter fibers having an average length between 0–1.5 mm. Because even these shorter fibers could only be partially dispersed, such mixtures yielded articles having properties that were far inferior to the articles of the present invention. If one attempted to disperse fibers, particularly long-length fibers, within a typically nonviscous aqueous slurry, the shear forces imparted by the mixer to the water did not transfer down to the fiber level because of the low viscosity, and especially because of the very low yield stress, of the liquid fraction. Simply increasing the shear rate of the mixing apparatus was ineffective and usually led to the formation of fibrous clumps or nodules.

For example, in the paper industry wood pulp fibers are typically dispersed in an aqueous slurry having a suspension of 4% by weight of fiber and 96% by weight of water. Even if dispersion is achieved, a large amount of energy is then required in order to remove the water from such slurries, which may contain even larger amounts of water up to about 99.5% by volume. Because so much water must be removed from paper slurries, it is necessary to literally suck water out of the slurry even before the drying process is begun.

Such an approach as used in the paper industry would not work in trying to disperse fibers in a starch-based mixture since there would remain the expensive procedure of removing the large excess of water. The process of removing the water would result in large fiber nodules rather than the desired dispersion of the fibers. In contrast to the way fibers are dispersed in the paper industry using a very high water content, the method of the present invention uses comparatively low water content and increased viscosity and yield stress caused by gelating a portion of the starch-based binder within the starch-based composition, preferably by first preparing a preblended mixture.

In preparing the preferred preblended mixture, a fibrous material having individual fibers with an average length preferably greater than about 2 mm and up to about 25 mm is mixed with a portion of the water to form an initial mixture. A portion of the starch-based binder is then added to the initial mixture to form a preblended mixture. The starch-based binder in the preblended mixture is gelated by heating the mixture to the gelation temperature to appropriately increase the viscosity and yield stress of the fluid fraction, which is essential in dispersing the fibers. The preblended mixture is then mixed at high shear for an effective amount of time to disperse the fibers therein. The increased viscosity and yield stress has been found to aid in transfer of the shearing energy from the mixer through the liquid fraction to the fibers. In contrast, low viscosity and low yield stress mixtures having a high water content are unable to impart the requisite shear energy at the fiber level, which energy is mostly dissipated into the water.

The preblended mixture is then cooled to below the gelation temperature of the starch, after which the remaining starch-based binder, water, and other admixtures (including, optionally, an inorganic filler) are thoroughly mixed within the preblended mixture to form the desired starch-based composition. The moldable composition can then be used to produce any article having a desired shape and a foamed structural matrix, with the article usually being form-stable within about 30 seconds to about 2 minutes after the molding process has begun (i.e., the mixture first being positioned between the dies).

A more detailed description of the above methods for preparing the preblended mixture is as follows. A fibrous material, preferably one that includes individual fibers having an average length of at least about 2 mm, is mixed with a portion of the total water to be added to form an initial mixture. The fibrous material may include fibers having an average length up to about 25 mm. Preferred fibers include softwood fibers from dry pulp sheets that have an average fiber length of about 3.5 mm, or abaca fibers having an average length of about 6.5 mm. The fibers are included in an amount in a range from about 1% to about 40% by weight of the starch-based composition, and preferably in a range from about 2% to about 20% by weight, and more preferably in a range from about 3% to about 10% by weight. The portion of water that is added to the preblended mixture is in a range from about 10% to about 90% by weight of the total water to be added to the starch-based composition, with about 25% to about 75% by weight being more preferred, and from about 40% to about 60% being most preferred. The amount of total water that will be added is selected based on the desired density of the final product and will preferably be included in a broad range from about 15% to about 80% by weight of the starch-based composition depending on the desired viscosity and yield stress of the final composition, and more preferably in a range from about 30% to about 70% by weight. Generally, the density of the final product is inversely proportional to the water content so that less water results in a higher density final product, while more water results in more foaming and a lower density final product.

An initial portion of the starch-based binder is then added to the initial mixture and then gelated, thereby forming the preblended mixture. The fraction of the starch-based binder that is added to form the preblended mixture is determined by the desired level of viscosity and yield stress, which should be large enough to adequately transfer sufficient shearing forces to disperse the particular fiber being used. Generally, the longer the average fiber length, the greater the viscosity and yield stress that is required to adequately disperse the fibers. Preferably, the fraction of the starch-based binder added to form the preblended mixture will comprise from about 5% to about 70% by weight of the total starch-based binder to be added to the final moldable mixture, with from about 10% to about 50% by weight being more preferred and from about 10% to about 30% being most preferred.

The starch-based binder in the preblended mixture is then gelated by heating the mixture to above the gelation temperature of the starch-based binder, which is usually greater than about 65° C. for unmodified starches, such as potato starch. The preblended mixture may be heated by using microwaves when forming the preblended mixture on a small scale, or by adding preheated water to the initial mixture. In an industrial setting, it may be more preferable to first mix the fibrous material with the initial portion of the starch-based binder. After this, the dry mixture is placed into a large high shear mixer and preheated water is pumped into the large mixer, thereby gelating the starch-based binder as mixing proceeds.

In alternative embodiments, the starch-based binder added to form the preblended mixture can be pregelated, or a mixture of pregelated and ungelated starch can be used. The viscosity and yield stress of the fluid fraction increases as the starch-based binder gelates and thickens the mixture. The viscosity and yield stress of the preblended mixture can be controlled by varying the respective amounts of starch-based binder and water that are used. Preferably, the yield stress of the fluid fraction used to initially disperse the fibers within the preblended mixture will be at least about 10 Pa, up to about 5000 Pa, preferably in a range from about 20 Pa to about 2000 Pa, more preferably from about 50 Pa to about 1000 Pa, and most preferably from about 100 Pa to about 500 Pa. It has been found that there is a more direct correlation between the yield stress of the fluid fraction and the ability to uniformly and homogeneously disperse the fibers within a mixture than between viscosity and fiber dispersion. In fact, even highly viscous mixtures, if they have little or no yield stress, are generally unable to adequately and uniformly disperse the fibers.

Nevertheless, although the viscosity of the fluid fraction is less important than maintaining the yield stress at an appropriate level, the fluid fraction will generally have an apparent viscosity of at least about 3 Pa·s, up to about 3000 Pa·s, preferably in a range from about 5 Pa·s to about 1000 Pa·s, more preferably from about 10 Pa·s to about 500 Pa·s, and most preferably from about 30 Pa·s to about 200 Pa·s (as measured on a Paar-Physica viscometer at a shear rate of 5 $s^{-1}$). The "plastic viscosity" of the same preblended mixture, when determined by the best fit line on a flow curve at a shear rate between 60 $s^{-1}$ to 100 $s^{-1}$, will fall generally within a broad range from at least about 0.1 Pa·s, up to about 100 Pa·s, preferably in a range from about 0.5 Pa·s to about 100 Pa·s, more preferably from about 0.5 Pa·s to about 50 Pa·s, and most preferably from about 0.5 Pa·s to about 20 Pa·s.

The preblended mixture is mixed at high shear for at least about 10 minutes and up to about 2 hours, and preferably from about 10 to 30 minutes, in order to thoroughly disperse the fibers. The length of the mixing time of the preblended mixture depends on the viscosity and yield stress of the fluid fraction and the concentration of fibers therein, with more fibers generally requiring a longer mixing time. If either a one-step or two-step mixing procedure is used, the foregoing numbers for the preblended mixture closely approximate the preferred yield stress and viscosity of the liquid fraction within any appropriate mixture whenever it is desired to homogeneously disperse the fibrous component therein.

At some point after the starch-based binder has been gelated, the preblended mixture is cooled down to below the gelation temperature of the starch-based binder, preferably below about 40° C. This may advantageously be performed in some cases by simply adding the remaining water and other components to the mixture prior to adding the remaining starch-based binder. In other cases, it may be necessary to add cooler water to further lower the temperature of the mixture to prevent gelation of the remaining starch-based binder to be added. The other components such as the inorganic fillers, mold releasing agents, humectants, plasticizers, and integral coatings or sealing compounds are added at this time to form the final starch-based composition. The composition is then mixed for a few minutes until homogeneous in order to form the desired moldable composition, which is then suitable for molding an article having a foamed structural matrix. It should be noted that the less water there is in the final mixture, the greater will be the viscosity and yield stress of the final mixture and the resulting mixing time required to disperse the remaining solid components.

Because the solids will tend to increase both the yield stress and viscosity, the final moldable starch-based composition (whether prepared using a one-step or two-step process) will have a yield stress of at least about 10 Pa, up to about 10,000 Pa, preferably in a range from about 250 Pa to about 4000 Pa, more preferably from about 500 Pa to about 3000 Pa, and most preferably from about 1000 Pa to about 2000 Pa. The associated apparent viscosity of the final mixture measured at 5 $s^{-1}$ will generally fall within a broad range from at least about 6 Pa·s, up to about 3000 Pa·s, preferably in a range from about 50 Pa·s to about 2000 Pa·s, more preferably from about 100 Pa·s to about 1000 Pa·s, and most preferably from about 300 Pa·s to about 600 Pa·s. The plastic viscosity of the same starch-based composition, when determined by the best fit line on a flow curve at a shear rate between 4 $s^{-1}$ to 14 $s^{-1}$, will generally fall within a broad range from at least about 1 Pa·s, up to about 2000 Pa·s, preferably in a range from about 2 Pa·s to about 500 Pa·s, more preferably from about 4 Pa·s to about 100 Pa·s, and most preferably from about 10 Pa·s to about 30 Pa·s.

In mixing together the components of the moldable composition it is preferable that the remaining part of the starch-based binder not be subjected to shearing forces large enough to break or rupture the starch granules, in the case where an unmodified starch is used. It is also preferable to maintain the mixture at a temperature below the gelation temperature of the starch-based binder to avoid premature gelation of the binder before the molding process has begun. Otherwise the viscosity of the moldable composition will become too high for use in further processing. The moldable composition needs to remain sufficiently fluid to be pumped to and flow into a mold to form a desired article. Pregelatinizing a substantial portion of the starch-based binder prior to molding would yield a very rigid gel that would prevent the moldable composition from flowing into a mold. By only allowing the initial portion of the starch-based binder to gelate (e.g., about 10–30% of the starch-based binder), the moldable composition maintains a suitable fluidity to flow into the mold. Once heated within the mold, however, the ungelated starch-based binder will quickly gelate in order to greatly increase the viscosity and yield stress of the moldable composition, thereby helping to create a form stable molded article that can be more easily demolded.

The key to getting the fibers to disperse in the preblended mixture is to obtain a transfer of the shearing force from the mixer to the liquid in contact with the fibrous material. The shearing force is an internal force tangential to the material on which the force acts. When fibers are mixed with low viscosity, high water mixtures, the fibers are not dispersed since the requisite shearing force from the mixer is dissipated into the water and does not transfer to the fibers. Since the water has a lower viscosity, the water has a tendency to segregate from the fibers and not provide any shear thereto. Thus, improving the transfer of shear from the mixer to the liquid in contact with the fibrous material is necessary in order to disperse the fibers.

The mechanism for obtaining this transfer of shear is by means of a fluid fraction having an approximate Binghamian flow behavior, which transfers shear properties from the mixer down to the fibrous material, which generally results in the dispersion of the fibers within about 10 to 30 minutes with removal of all fiber nodules. The higher yield stress and viscosity of the fluid fraction allows a much greater transfer of the shearing force from the mixer to the liquid in contact with the fibrous material. This results in the application of the shearing force to the connections between the fibers in the fibrous material, which causes the fiber nodules to be torn apart. The level of transfer of shear by means of the high yield stress, high viscosity fluid fraction within the preblended mixtures of the present invention result in a markedly improved dispersion of fibers compared to conventional methods. In addition to gelating a portion of the starch-based binder, various rheology-modifying or thickening agents can be used to increase the yield stress of the fluid fraction, such as the commercial thickener Tylose®. It has been found, however, that Tylose® has a very high affinity toward water, which interferes with the starch-water reaction. Hence, adding relatively large quantities of rheology-modifying agents such as Tylose® is generally not preferred.

The addition of long fibers to the moldable mixture, which are dispersed throughout the mixture by the methods of the present invention, allows a product to be molded without the need for a subsequent conditioning step. Unlike prior processes, the products of the present invention can be demolded before all of the water has been removed from the mixture. The final demolded product maintains an appropriate amount of water so that the product is not brittle and can be handled without shattering or cracking.

In addition to fibers, zeolites can be added to the compositions of the invention and act as internal conditioning components. Zeolites are aluminum silicates and have a tendency to absorb moisture from the atmosphere into the structural matrix. Magnesium chloride can also be used in the compositions of the invention in order to absorb moisture from the atmosphere and act as an internal conditioning agent.

As previously mentioned, in an alternative embodiment the starch-based composition can be formed in a single step without first dispersing the fibers within a preblended mixture. The effects of using a preblended mixture to disperse the fibers can be mimicked by ensuring that the liquid phase surrounding the solid components within the starch-based mixture (i.e., fibers, inorganic aggregates, etc.) has a viscosity and yield stress within the ranges set forth above. This may be accomplished, for example, by adding a gelatinized starch, either alone or in combination with any other appropriate thickening agent, to the starch-based composition in combination with a yet ungelated starch-based binder.

To understand the importance of having a high yield stress liquid phase within the overall starch-based composition, it must be understood that adding solid components to a Newtonian fluid will normally increase both the viscosity and yield stress of the overall mixture. However, it is the liquid phase that has been found to be the medium by which shear is transferred from the mixing apparatus down to the fiber level. If the liquid phase has essentially a zero or very low yield stress, even though the overall mixture has a positive yield stress, the fibers will easily separate or segregate from the noncohesive liquid phase. A liquid phase that has sufficient yield stress and viscosity and, hence, adhesion and cohesion, is able to pull apart and keep the fibers separated if either a one-step or two-step mixing process is used.

Once the starch-based composition has been prepared, it may be formed or molded into the shape of the desired article. In one embodiment, the forming steps include positioning and locking the composition between a heated male mold having a desired shape and a heated female mold having a complementary shape. The heat from the molds causes the composition to expand within the molds. Excess material and vapor is expelled from between the molds through small vent holes. Once a sufficient amount of the solvent has been removed, the molds are opened, and the form-stable article having a foamed structural matrix is removed for subsequent processing.

The process is more accurately defined through the use of a phase diagram. Depicted in FIG. 1 is a phase diagram for water. FIG. 1 illustrates, by way of a general example, the pressure and temperature stages that a composition using water as the solvent undergoes during formation of the article. Between points A and B along line 1, the composition is locked between the molds and is rapidly heated at first at constant ambient pressure to a temperature of about 100° C. The portion of the composition closest to the molds is heated at a faster rate and thus reaches a temperature of 100° C. before the interior section of the composition. As the composition begins to heat, the starch-based binder begins to gelate, increasing the viscosity of the composition. (The process of gelation is discussed later in the section on starch-based binders.)

Once the temperature of the water within the moldable composition in contact with the mold surface reaches 100° C., the water begins to vaporize, thereby forming air pockets or voids within the composition. As a result of these expanding pockets, the volume of the composition expands, causing the composition to "rise" and momentarily fill the mold and clog the small vent holes. The water within the portion of the moldable composition closest to the molds is quickly vaporized and driven off from the composition at or near the region closest to the mold, as represented in FIG. 1 by point B, thereby hardening that portion of the composition into a thin, dense skin. The skin is believed to be formed almost instantaneously and acts as an insulation barrier for the remaining portion of the moldable composition, thereby slowing down the rate of heating. With the vent holes plugged, and due to the restricted flow, the pressure begins to increase between the molds, as shown by line 2, preventing the transformation of the remaining solvent into vapor at the boiling point, which is usually 100° C. for water. Instead, as also shown by line 2, the solvent in the moldable composition is super heated as a result of the restricted flow. Eventually, the material blocking the vent holes ruptures, allowing excess material to escape from between the molds. However, as a result of the small size of the vent holes, the flow of the escaping composition is restricted, thereby allowing the pressure and temperature within the mold to further increase to point C on FIG. 1.

The foamed structural matrix is formed when sufficient excess material has escaped to cause the pressure to drop between the molds. Under high pressure the solvent vapor which forms is nucleated because of super heating. The drop in pressure causes the super heated solvent to transform rapidly into the gaseous state through an adiabatic expansion, thereby forming a distribution of voids or cells throughout the structural matrix of the article. The tendency of the water vapor to become nucleated at individual points throughout the super heated composition yields a fairly well-distributed cell or pore structure. The transformation of the solvent to vapor is an endothermic reaction that absorbs heat from the moldable composition, thereby substantially decreasing the temperature of the moldable composition inside the mold. The drop in temperature and pressure of the moldable composition is depicted by line 3 extending from point C to point B. The illustration that the temperature of the composition returns to 100° C. is simply by way of example. In actuality, the temperature of the composition may drop below 100° C. The drop in pressure of the solvent is depicted as line 5 extending from point C to point D.

With the vent holes open and the pressure reduced, the composition then begins to heat up again to the boiling point of the solvent, allowing the remaining solvent to freely evaporate until sufficient solvent has been removed for the article to become form-stable. This process is depicted by line 4 extending from point B. This analysis of the cellular formation is supported by the fact that producing articles under low pressure results in articles having fewer voids. For example, gradually evaporating the solvent from the composition at a low temperature or heating the mixture rapidly on top of a single mold results in a product having a lower concentration of air voids.

Figure 2:
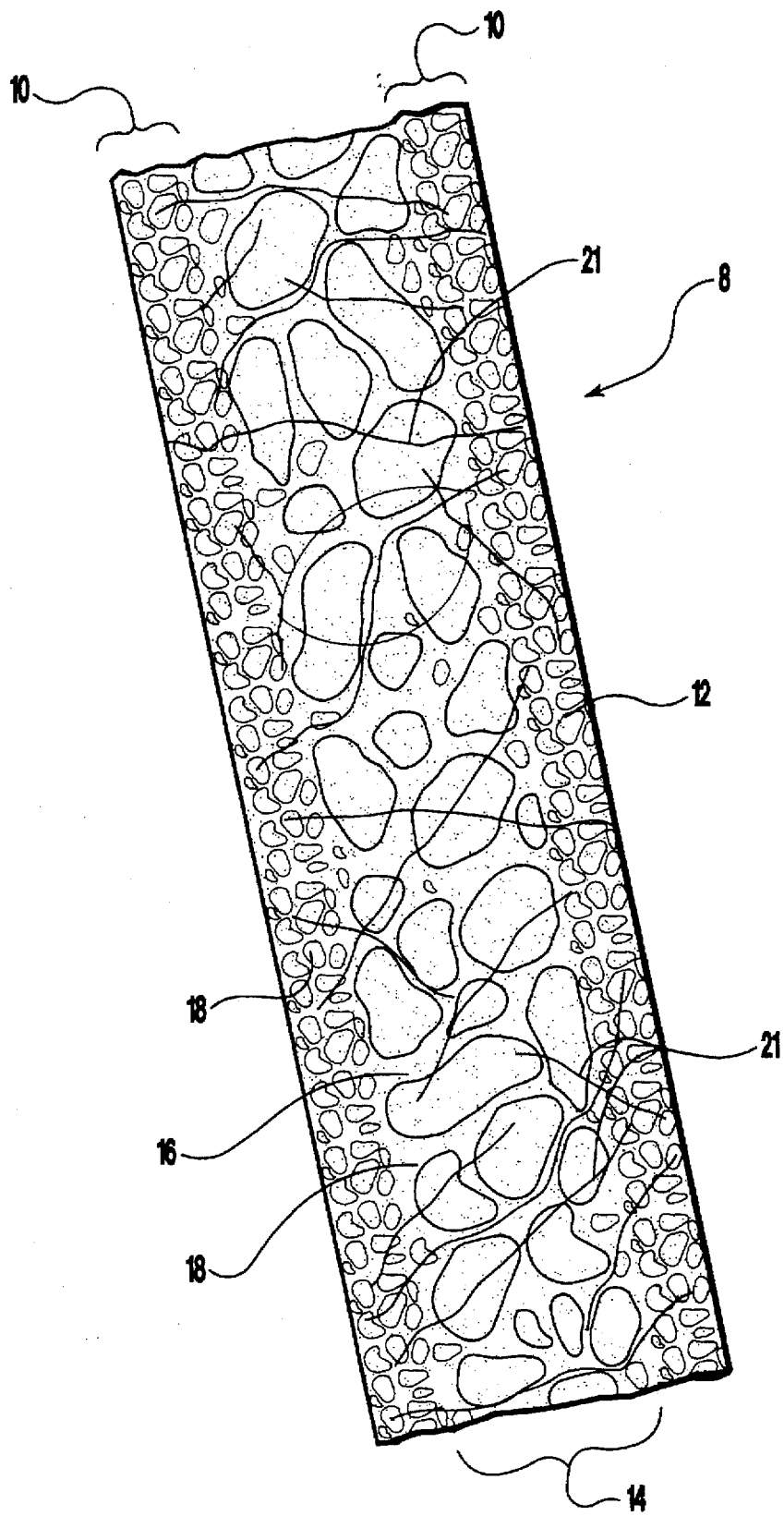
FIG. 2 is an enlarged cross-sectional view of the skin and interior section of a hardened article.

Depicted in FIG. 2 is a microscopic image of a cross-section 8 of a formed article. The figure reveals the present articles as having an outside skin 10 with small cells 12 and an interior section 14 containing large cells 16. Small cells 12 are defined as having an average diameter of less than about 250 μm. The material between adjacent cells is referred to as a cell wall 18. Fibers 21 are distributed throughout outside skin 10 and interior section 14. The distribution and size of the cells within the structural matrix are dependent on several variables including the water content of the mixture, the temperature of the molds, and the size, number, and placement of the vent holes within the molding apparatus.

Articles can be made having a desired structural matrix by controlling the related variables. For example, FIG. 2A is a microscopic picture of the cross-section of an article having a thin outside skin 10 and large cells 16 located in interior section 14. FIG. 2B is a microscopic picture of the cross-section of an article having a thin outside skin 10 and medium cells 19 located in interior section 14. Finally, FIG. 2C is a microscopic picture of the cross-section of an article having a thick outside skin 10, large cells 16 located in interior section 14, and small cells 12 located near the surface of the article. Fibers (not shown) are preferably randomly dispersed throughout the cellular matrix.

As stated above, it is important to remove enough solvent so that the article is sufficiently form stable to be removed from the mold and subsequently handled. In general, the structural matrix of the molded articles will contain about 5% or less solvent at the point where the article has adequate strength and form stability to be demolded. If excess water vapor remains within the cells of the heated article, it will cause internal pressure within the structural matrix of the molded article. This water within the cellular matrix can further expand after the demolding step, thereby causing an inadequately dried article to "blow up" or explode upon being demolded. On the other hand, overdrying, especially overheating, the article can permanently damage and weaken the starch-bound structural matrix of the molded article.

Fortunately, it has been discovered that the addition of well-dispersed fibers, particularly longer-length fibers and/or fibers of high aspect ratio, (and optionally, inorganic fillers) creates a moldable composition having a much smaller window of error or, conversely, a much larger window of processing time. That is, these admixtures facilitate and greatly reduce the time needed to remove enough of the water in order to create a form stable article, while also preventing burning or otherwise damaging the starch-bound structural matrix for a significant period of time during the molding process.

The processing variables associated with the formation of the inventive articles and the foamed structural matrix include mold temperature, time for removing the solvent, filling volume, and vent hole size. The articles of the present invention are preferably removed from the locked molds after most, but not all, of the solvent has been removed. While the composition is locked between the molds, the outside edges of the articles are supported by the opposing molds. Vapor formed by the evaporation of the solvent is thus forced to travel under pressure to the vent holes, where it is expelled. The outside walls of the article are the first to form and are brittle as a result of the loss of water. Separation of the molds prior to removing a sufficient amount of the solvent permits the vapor to expand between the article walls, resulting in bubbling, cracking, or deformation of the outside walls of the articles. Furthermore, attempts to remove the article from the molds prior to removal of a sufficient amount of moisture can result in the article sticking to the molds and damage to the structural matrix.

Since the article cannot be removed until a sufficient amount of solvent has been removed, it is preferable to have the mold temperature as high as possible. This minimizes the time for removal of the solvent and permits the quickest production of articles. Studies have found, however, that temperatures greater than about 240° C. can result in dextrification or breaking down of the starch molecules in the surface of the article. Dextrification caramelizes the starch, produces a brown color on the article, and reduces the structural integrity of the article. Temperatures above about 240° C. can also burn certain organic fibers, as well as overdrying the molded articles.

In contrast, it is difficult to form an article having a foamed structural matrix at mold temperatures below about 120° C. At such low temperatures, there is little pressure build-up and only slow evaporation of the solvent. Studies have found that increasing the processing temperature to between about 140°–240° C. decreases the production time and the density of the article. With temperatures ranging between 140°–180° C., the decrease in production time is substantial. After about 180° C., however, the decrease in processing time is less dramatic. Again, this finding is consistent with the cellular formation model.

As the temperature increases, the size of the cells also increases. The size of the cells within the structural matrix, and thus the strength and insulating capability of the articles, can thus be selected in part by adjusting the temperature of the molds. Furthermore, by varying the temperature differential between the male and female molds, the cell size can be selectively varied between the walls of the article. For example, by making the female mold hotter than the corresponding male mold, a cup can be formed having relatively large cells and higher insulating capability at its outside surface where the cup is held. In contrast, the cup will be more dense and be more water tight at its inside surface where liquid will be held.

A temperature of 200° C. is preferred for the rapid production of thin-walled articles, such as cups. Thicker articles require a longer time to remove the solvent and are preferably heated at somewhat lower temperatures to reduce the propensity of burning the starch-based binder and fiber. Leaving the articles within the locked molds too long can also result in cracking or deformation of the articles. It is theorized that removing greater than about 98% of the solvent within the mixture results in shrinking of the structural matrix, which in turn can crack the article. Accordingly, the article is optimally removed from the mold when approximately 2%–6% of the moisture remains within the article, more preferably about 3%–4%. It should be understood, however, that these figures are only approximations.

The temperature of the mold can also effect the surface texture of the molds. Once the outside skin is formed, the solvent remaining within the interior section of the mixture escapes by passing through minute openings in the outside skin and then travelling between the skin and the mold surface to the vent holes. If one mold is hotter than the other, the laws of thermodynamics would predict, and it has been empirically found, that the steam will tend to travel to the cooler mold. As a result, the surface of the article against the hotter mold will have a smoother and more uniform surface than the surface against the cooler mold.

Figure 3:
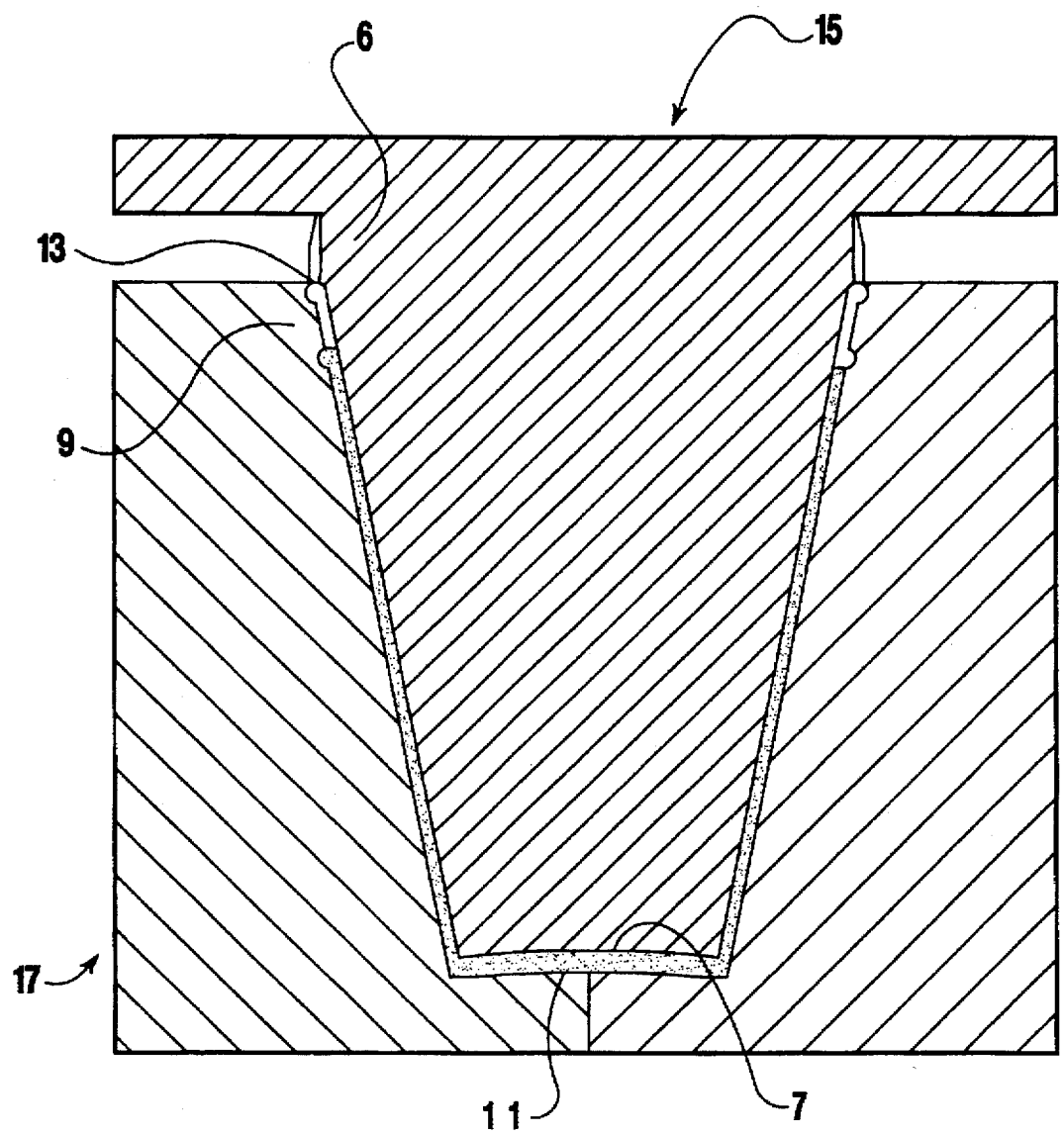
FIG. 3 is a cross-sectional view of a male mold and a female mold being mated.

The temperature of the molds can also be varied along the length of the molds. Depicted in FIG. 3 is a male mold 15 mated with a female mold 17, with a moldable composition being positioned therebetween. In general, the male mold includes a top end and a bottom end 7. Likewise, the female mold includes a top end 9 and a bottom end 11. Located near top ends 6 and 9 are vent holes 13, through which the excess material and vapor can escape. Studies have found that for deep recessed articles such as cups, a smoother surface and more uniform structural matrix can be obtained if the mixture is hardened sequentially from the point furthermost from the vent hole to the point closest to the vent holes. For example, referring to FIG. 3, it is preferable in some cases for the temperature of the molds to be the highest at bottom ends 7 and 11, with the temperature gradually decreasing toward top ends 6 and 9, where the temperature is the lowest.

Such a temperature zone differential within the molds helps to direct the vapor and air out the vent holes. As the solvent is vaporized at the bottom end of the molds, the vapor is absorbed into the adjacent composition. The vapor thus gradually travels to the vent holes. Furthermore, since the mixture closest to the vent holes is the last to harden, the excess material is more easily expelled from between the molds. In contrast, if the molds were hottest near top ends 6 and 9, the vapor near bottom ends 7 and 11 would be forced to travel over the already hardened surface of the article, thereby possibly damaging the surface texture. Likewise, the excess material would already be hardened and its removal could result in disrupting the structural integrity of the article.

The mold temperature and the time for removing the solvent are interdependent and are further dependent on the thickness of the article and the amount of solvent present. The mold temperature of the present invention is preferably in a range from about 150° C. to about 220° C., with about 170° C. to about 210° C. being more preferred, and from about 180° C. to about 200° C. being most preferred. The time in which the solvent is preferably removed from the composition ranges from about 1 second to about 15 minutes, with about 15 seconds to about 5 minutes being more preferable, and from about 30 seconds to about 2 minutes being most preferable. It should be noted that in light of the endothermic process of the vaporization of the solvent and the rather short period of time that the molds are in contact with the composition, the composition within the interior of the molded article generally does not get as hot as the molds. Typically, the temperature of the mixture will not exceed about 150° C. during the molding procedure.

The volume of material positioned between the molds for subsequent heating also affects the resulting density of an article. If insufficient material is introduced into the mold to form a completed article (no excess material is discharged) the resulting material will have a higher density and moisture content. This results from a lack of pressure build up and subsequent expansion. When sufficient material is added to produce the desired pressure (a minimum of excess material) the density of the article dramatically decreases. Further increases in the amount of material will decrease the density of the article up to a point. Past this point, the addition of more material will have little or no further effect on the resulting density. For example, in the production of 12 oz. cups, the addition of 1 gram of extra material resulted in a decrease in density of about 0.005 g/cm$^3$. However, adding more than 35 grams of material resulted in no further decrease in the density and was merely wasted. The pressure buildup within the molds is dependent both on the temperature of the molds and the size, number, and placement of the vent holes. The larger the vent holes are, the less pressure that builds within the moldable composition and the more easily the vapor and excess material can escape, resulting in less expansion and a more dense structural matrix of the molded article. Accordingly, the larger the vent holes, the smaller the cells within the structural matrix. However, if the vent holes are too large, the composition will not be able to plug the vent holes, thereby preventing proper filling of the mold and the required pressure buildup for the formation of the desired cell structure. (Such an arrangement may be preferred, however, if a more dense article is desired.) Another drawback to large vent holes is that they can create larger deformities on the surface of the articles at the point where the excess material is removed. The size of the deformities can be reduced by decreasing the size and increasing the number of the vent holes.

The smaller the vent holes are, the greater is the expansion force that the vapor can apply on the moldable composition. If the vent holes are too small, an excessive pressure will build up, resulting in deformation or even explosion of the article upon release of the pressure. The size of the cells can further be regulated by controlling the release of pressure. For example, by slowing down the rate of pressure drop, the sudden expansion force caused by vaporization of the solvent is decreased. This results in articles having smaller cells and thicker cell walls, which together produce a stronger article.

As previously discussed, by regulating the size of the vent holes, the size of the cells in the structural matrix can be regulated. The exact size and number of vent holes depends on the size of the article being produced. Larger articles require more vent holes. Examples of vent sizes and numbers to produce articles is shown later in the application in the Example Section. In the production of most articles of the present invention the vent sizes will preferably range from about 0.05 mm$^2$ to about 15 mm$^2$, more preferably from about 0.2 mm$^2$ to about 5 mm$^2$, and most preferably from about 0.5 mm$^2$ to about 2 mm$^2$. The number of vent holes will preferably be in a range from about 1 to about 10, with about 2 to about 8 being more preferred, and about 4 to about 6 being most preferred. In a preferred method for manufacturing cups, it has been found that using 4 vent holes, each having a vent hole of about 1.9 mm$^2$, is preferred.

In addition, it is generally preferable to use molds having smaller vent holes for moldable composition having a higher water content. When more water is used, a more violent reaction ensues, which must be controlled. If the vent holes are too large then material may be blown out of the vent holes during the molding process. When a low water content composition is used, the vent hole size is less important.

As discussed herein, the inclusion of fibers, particularly long-length fibers, as well as other softening or conditioning agents such as humectants or plasticizers within the moldable compositions of the present invention, yields demolded articles that immediately or shortly after demolding possess the desired flexibility and resilience. This reduces and, in most cases, even obviates the need for conventional conditioning in high humidity as is generally required in the case of molding articles without fibers and/or inorganic aggregate fillers. Nevertheless, if it is desired to further soften or condition the starch-bound matrix of the molded articles, it is possible, although not preferable in most cases, to condition the articles by placing them in a high humidity chamber at elevated temperatures for a period of time.

Using the above processes in conjunction with the components of the starch-based composition outlined below, the cellular articles of the present invention will preferably have a density in a range from about 0.05 g/cm$^3$ to about 1 g/cm$^3$, with about 0.1 g/cm$^3$ to about 0.5 g/cm$^3$ being more preferred, and about 0.15 g/cm$^3$ to about 0.25 g/cm$^3$ being most preferred.

The remaining processing steps include optional steps, such as printing and coating. These steps, along with stacking, bagging, and boxing, are performed substantially identically to that of conventional articles made from materials such as paper, plastic, polystyrene foam, and other organic materials.

IV. Compositional Effects on Formation

To facilitate implementation of the microstructural engineering approach, each of the components in the moldable composition is discussed below. The discussion includes the properties and preferred proportions of each of the components, along with how each component is interrelated with processing parameters, properties of the moldable composition, and properties of the final article.

A. Starch-based Binders.

The moldable compositions used to manufacture the inorganically filled, foamed articles of the present invention develop their strength properties through the gelation and subsequent drying out of a starch-based binder. Starch is a natural carbohydrate chain comprising polymerized sugar molecules (glucose). Plants manufacture and store the starch as food for itself and for seeds. Starch is formed in granules that comprise two types of glucose polymers: the single-chain amylose that is generally soluble in water and other solvents and the branched amylopectin that is generally insoluble in water.

In general, starch granules are insoluble in cold water; however, if the outer membrane has been broken by, e.g., grinding, the granules can swell in cold water to form a gel. When the intact granule is treated with warm water, the granules swell and a portion of the soluble starch (amylose) diffuses through the granule wall to form a paste. In hot water, the granules swell to such an extent that they burst, resulting in gelation of the mixture. The exact temperature at which a starch-based binder swells and gelates depends on the type of starch-based binder.

Gelation is a result of the amylose and amylopectin chains, which are initially compressed within the granules, stretching out and intertwining with each other. After the water is removed, the resulting mesh of inter-connected polymer chains forms a solid material that can have a tensile strength up to about 40–50 MPa. The amylose and amylopectin polymers can also be used to bind individual aggregate particles and fibers within the moldable mixture (thereby forming a highly inorganically filled matrix). Through careful microstructural engineering, starch-bound containers and other articles can be designed having desired properties including flexural strengths up to about 10 MPa or more.

Although starch is produced in many plants, the most important sources are seeds of cereal grains (e.g., corn, waxy corn, wheat, sorghum, rice, and waxy rice), which can also be used in the flour and cracked state. Other sources include tubers such as potatoes, roots such as tapioca (i.e., cassava and maniac), sweet potato, and arrowroot, and the pith of the sago palm.

As used in the specification and the appended claims, the term "starch" or "starch-based binder" includes unmodified starches (amylose and amylopectin) and modified starches. By modified, it is meant that the starch can be derivatized or modified by typical processes known in the art such as, e.g. esterification, etherification, oxidation, acid hydrolysis, cross-linking, and enzyme conversion. Typical modified starches include esters, such as the acetate and the half-esters of dicarboxylic acids/anhydrides, particularly the alkenyl-succinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches.

Pre-gelatinized starch-based binders can also be added to the starch-based composition, particularly using the one-step process, but also in preparing the preblended mixture. Pregelatinized starch-based binders are starches that have previously been gelated, dried, and ground back into a powder. Since pre-gelatinized starch-based binders gelate in cold water, such starch-based binders can be added to the starch-based composition to increase the viscosity and yield stress prior to being heated. The increased viscosity and yield stress are necessary in order to aid in the dispersion of the fibrous component, as well as in preventing settling and helping to produce thicker cell walls, as will be discussed later in greater detail.

Unmodified starch-based binders are generally preferred over modified starch-based binders because unmodified starches are significantly less expensive and produce comparable articles. These starches are very inexpensive and are often treated as a useless waste product that is discarded on a large scale. Hence, the use of unmodified starches in the present invention provides a tremendous economic advantage and a useful outlet for such previously discarded materials. Preferred starch-based binders include unmodified starches that gelate and produce a high viscosity, high yield stress composition at a relatively low temperature. For example, one preferred starch is potato starch, which quickly gelates and reaches a maximum viscosity and yield stress at about 65° C. The viscosity and yield stress of a mixture containing gelatinized potato starch and water then decreases as the temperature is raised further. Waxy corn starch acts in a similar fashion and is also preferred. Both potato starch and waxy corn starch have a high viscosity and yield stress when gelated. The high viscosity and yield stress of the gelated starch greatly enhances the ability of the preblended mixture to disperse the fibers, as previously discussed. Potato and waxy corn starch are also preferred because they swell and gelate easily in a single step; however, any starch that has similar swelling characteristics will be preferred to those that swell in two or more stages.

In many conventional uses of starch, such as the hot-melt technique in which the starch is heated under elevated temperature and extreme pressure in the presence of minimal water and in which starch behaves somewhat like a thermoplastic material (also sometimes referred to as "destructurized" starch), it has been necessary to use a starch having a relatively high amylose content (greater than 45% by weight) in order to make the starch more chemically compatible with the small amount of water that might be added to plasticize the starch material. This is in sharp contrast to the way in which starch-based binders are used in the present invention, in which the contribution by the starch-based binder to the mechanical properties of the final molded article is independent of the amylose content. In fact, the two most preferred starch-based binders, namely unmodified waxy corn starch and potato starch, have a relatively low amylose content (1–3% and 20–25%, respectively). In view of the foregoing, while any appropriate starch-based binder can be used to form an adequate product, the starch-based binder will preferably be an unmodified starch having an amylose content less than about 45%, more preferably less than about 35%, and most preferably less than about 25%.

The starch-based binder is the dominant water affinity component in the composition of the present invention and includes many hydroxyl groups. In a totally dry product, the hydroxyl groups of the individual starch molecules form hydrogen bonds, which creates a rigid and brittle structure. When water is added, a portion of the water is chemically bound to the starch matrix. Any additional water that is not bound may be classified as "free water", which associates with the hydroxyl groups of the starch and gives elasticity and toughness to the material. The initially added water thus can also act as a plasticizer. A pure starch-based composition will absorb water such that, at equilibrium, the water is present in an amount of about 10–12% by weight of the composition. When inorganic aggregates and fibers are included in the starch-based composition, the water will be present in an amount of about 2–6% by weight at equilibrium because of the less total starch in the composition, preferably about 3–4%.

It may be preferred to combine different types of starch-based binders to regulate the foamed structural matrix. In contrast to potato starch, the viscosity and yield stress of a mixture containing corn starch gradually increases as the temperature increases. Accordingly, corn starch produces a relatively low viscosity, low yield stress composition compared to potato starch at 65° C., but produces a relatively high viscosity, high yield stress composition, compared to potato starch at 95° C. By combining both corn starch and potato starch within the same mixture, the viscosity and yield stress of the mixture at the interior section of the article is increased at the point when the cells are formed. The increased viscosity decreases the cell size and increases the cell wall thickness, thereby increasing the fracture toughness of the article.

The concentration of starch-based binder within the starch-based compositions of the present invention are preferably in a range from about 10% to about 80% by weight of total solids, more preferably in a range from about 30% to about 70%, and most preferably from about 40% to about 60% by weight. The starch-based binder will have a concentration in a range from about 5% to about 50% by weight of the starch-based composition, more preferably from about 10% to about 40%, and most preferably from about 15% to about 30%. Furthermore, combinations of different starches may be employed to more carefully control the viscosity of the composition throughout a range of temperatures, as well as to affect the structural properties of the final hardened article.

B. The Fluid Fraction.

The fluid fraction is formed by adding water and soluble admixtures such as thickeners to either the preblended mixture or the final starch-based composition. The water lubricates the particles, solvates or at least disperses the starch-based binder, and acts as a gelation agent for gelating the starch-based binder. In addition to water, any liquid that can disperse and gelate the starch-based binder and be subsequently removed from the moldable composition by evaporation can be added to the fluid fraction as a co-solvent. In addition, non-evaporative liquids, such as lubricants, cross-linking agents, integral coatings, or internal sealing materials may also be added.

It is important to understand that the ability to uniformly disperse the fibers throughout the starch-based composition is determined primarily by the rheology of the fluid fraction as opposed to the mixture as a whole. In fact, simply increasing the yield stress and viscosity of the mixture by adding solid components will not result in uniform dispersion.

In the preferred method for molding the articles of the present invention, the water and other volatile solvents within the fluid fraction are substantially removed by heating the starch-based composition between heated dies to above the boiling point of water. Because water has a relatively high heat of vaporization compared to most other volatile solvents, the heat of vaporization of the aqueous phase within the starch-based composition can be reduced by adding lower boiling alcohols or other co-solvents to the water. Alcohols, such as ethanol and isopropyl alcohol, are preferable because they form lower boiling point azeotropic mixtures with water, are relatively inexpensive, and readily available.

The water also serves the function of creating a fluid fraction having the desired rheological properties, including yield stress, viscosity, and flowability. These properties are general ways of approximating the "workability" or flow properties of a mixture. The yield stress and viscosity of the mixtures of the present invention may range from being relatively low (similar to that of a thin batter) up to being very high (similar to paste or clay). Where the viscosity is so high that the material is initially dough-like in the green state, it is generally better to refer to the yield stress, rather than the viscosity, of the mixture. The yield stress is the amount of force necessary to deform the mixture.

At a minimum, a sufficient amount of water should be added to disperse and uniformly gelate the starch within the molded starch-based composition. The water content should also be sufficient to function with the particular processing equipment being employed. As will be discussed below in greater detail, compositions with high viscosity and yield stress may require an auger apparatus to mix and convey the composition to the mold. In contrast, lower viscosity compositions can use conventional mixers and pumps and transfer the mixture. High yield stress compositions having a consistency similar to that of clay or dough can be cut into small portions, which can then be mechanically placed between the molds.

Increasing the water content also increases the number and size of the cells in the structural matrix and lowers the density of the resulting article. In theory, the more water in a mixture, the more vapor that is produced, and thus, the more cells in the interior and the more pinholes in the surface that are formed. If the water content is too high, the composition may be unable to produce form-stable, crack free articles. In contrast, using less water yields a more dense product having smaller cells.

Furthermore, the more water in a mixture, the larger the size of the cells and pinholes, although the number and size of the cells and pinholes are greatly affected by the molding process. For example, where there is a variation in the temperature of the male and female molds, it has been found that the vapor tends to migrate from the hot mold to the cooler mold, thereby forming more pinholes in the article surface in contact with the cooler mold. Moreover, varying the gap distance between the molds appears to facilitate the passage of evaporating moisture between the molds and the molded article, thereby creating a much smoother article surface as a result of the lateral movement of water vapor over the article surface.

Very low viscosity mixtures can also result in settling of the components, most notably the ungelated starch-based binder, fibers, and aggregate particles. Settling may occur in the mixing stage, transfer stage, or forming stage. Settling can yield articles having varying properties from batch to batch or within the structural matrix of a single article. Experiments have also found that very low viscosity compositions can splash out of the female mold during mating with the male mold. This is especially true for shallow articles such as plates.

Based on the above discussion, the percentage of water within the starch-based composition depends in part on the processing equipment, the desired viscosity, and the desired properties. The amount of water that is added to the mixtures of the present invention will preferably be in a range from about 15% to about 80% by total weight of the mixture, the exact amount depending on the desired viscosity of the moldable composition, and more preferably from about 30% to about 70% by weight.

As stated above, the viscosity and yield stress of the compositions of the present invention are dependent on several variables such as the water content, the presence of admixtures such as rheology-modifying agents and dispersants, what fraction of the starch-based binder has been gelatinized, and the packing density of the aggregate. The viscosity and yield stress of the moldable mixture can be adjusted, at least in part, by altering the rheology of the fluid fraction in order conform to the particular molding apparatus or methods being used.

C. Fibers.

As used in the specification and the appended claims, the terms "fibers" and "fibrous materials" include both inorganic fibers and organic fibers. Fibers have successfully been incorporated into brittle materials, such as ceramics, to increase the cohesion, elongation ability, deflection ability, toughness, fracture energy, and flexural, tensile, and, on occasion, compressive strengths of the material. In general, fibrous materials reduce the likelihood that the highly inorganically filled containers or other articles will shatter when cross-sectional forces are applied.

As was previously discussed, the formed articles of the present invention have a foamed or cellular structural matrix. As a result, there is a limited amount of interfacial surface area for load transfer between the fibers and structural matrix. That is, the fibers are connected to the structural matrix of the formed articles only by the walls dividing the cells, with the remainder of the fibers suspended in the cells. When short fibers are used, these can be small enough to reside within the cell completely, depending on the ratio between the average fiber length and the pore diameter. As a result of minimal contact between shorter-length fibers and the structural matrix of the article, shorter fibers are less able to impart increases strength and toughness to the final molded articles of the present invention. Therefore, longer fibers having a length greater than about 2 mm are preferred. In general, it is preferable to include fibers that have an average length that is at least twice the wall thickness of the article. Nevertheless, in the case where the article will have smaller pores (i.e., less than about 0.25 mm), shorter-length fibers having an average length in a range from about 0.3 mm to about 2 mm can be used with moderate success, although a greater volume of such fibers are required to impart the same mechanical properties to the final article.

Fibers that may be incorporated into the inorganically filled matrix preferably include naturally occurring organic fibers, such as cellulosic fibers extracted from hemp, cotton, plant leaves, sisal, abaca, bagasse, wood (both hardwood or softwood, examples of which include southern hardwood and southern pine, respectively), or stems, husks, shells, and fruits, or inorganic fibers made from glass, graphite, silica, ceramic, or metal materials. Any equivalent fiber which imparts strength and flexibility is also within the scope of the present invention. The only limiting criteria is that the fibers impart the desired properties without adversely reacting with the other constituents of the inorganically filled material and without contaminating the materials (such as food) stored or dispensed in articles made from the material containing such fibers. Recycled paper fibers can be used, but they are somewhat less desirable because of the fiber disruption that occurs during the original paper manufacturing process. For purposes of illustration, sisal fibers are available from International Filler, abaca fibers are available from Isarog Inc. in the Philippines, while glass fibers, such as Cemfill®, are available from Pilkington Corp. in England.

Larger diameter fibers result in a smaller specific surface area compared to smaller diameter fibers of equal volume. As the exposed surface area of the fiber decreases, less water is adsorbed by the fibers, and, accordingly, the water is removed quicker with less energy. Conversely, fibers having a large specific surface area will tend to absorb more water, which can compete with the gelation reaction of the starch-based binder, but which can also aid in toughening and making less brittle the hardened cellular matrix of the final article. The fibers used in the present invention preferably have an average diameter in a range from about 1 µm to about 100 µm, with about 5 µm to about 50 µm being more preferred, and about 10 µm to about 20 µm being most preferred.

The aspect ratio (length/diameter) of the fibers is an important feature, with a higher average aspect ratio being preferred. The fibers preferably have an average aspect ratio of about 25:1 to about 2500:1, and preferably from about 100:1 to about 1000:1. The average length of the fibers is also important, with longer fiber lengths being preferred in the present invention. Longer fibers that are useful generally preferably have an average length greater than about 2 mm, and more preferably greater than about 3.5 mm, and even up to about 25 mm in length. Long fibers are generally better anchored within the structural matrix of the formed articles, although shorter length fibers having an average length from about 0.3 mm to about 2 mm, such as cotton linters, can significantly strengthen and toughen the articles of the present invention if well-dispersed.

The fibers are added to the composition of the present invention to increase the strength and flexibility of the final product. The fibers aid in forming a tough skin on the outside of the product by increasing the flexibility of the skin. The fiber content is uniform throughout the foamed structural matrix of the final product, but appears higher in the skin because the skin is higher in density than the foamed interior portion. Also, a certain amount of fibers could migrate toward the surface as the product is forming since the interior portion stays fluid longer than the skin portion. In fact, it has been discovered that the compositions and methods of the present invention yield articles having a true laminate structure between the surface and the interior portions of the article wall. In fact, the densified skin of the outer layer of the article wall provides increased resistance to moisture without the addition of a coating to the article surface or a water-resistant polymer within the structural matrix.

Particularly preferred fibers include softwood fibers from dry pulp sheets that have an average fiber length of about 3.5 mm, and abaca fibers with an average fiber length of about 6.5 mm. The number of fibers per unit volume will increase for fibers having smaller diameters when compared to fibers of the same length with larger diameters. Having an increased number of fibers per unit volume is preferred to provide increased strength to the formed articles, and longer fibers provide more toughness than the same volume percent of shorter fibers. Other fibers that can be used include hardwood fibers, which have an average length of about 1.5 mm.

While very short fibers of less than about 1 mm can also be used, these are less preferred in the present invention, particularly in articles having larger pore diameters. Because the pore size in the foamed structural matrix of more highly foamed articles can be 0.25 mm or higher, shorter fibers may only span across a few of the pores. Thus, short fibers will tend to contribute less strength and toughness to the final product, although their efficacy would be expected to increase as the average pore size of the starch-bound matrix were decreased. Nevertheless, even cotton linters, which have an average length in a range from about 0.3 mm to about 1 mm, can impart some reinforcing effect if used in greater amounts to compensate for their shorter length (usually in amounts of at least about 15–20% by weight of the moldable mixture). Articles having minimum acceptable strength have been manufactured using fine cotton linters having an average fiber length of about 0.3 mm in a concentration of about 20% by weight of the starch-based composition.

The fibers used in the composition of the invention have very specific effects on the moldable composition and foamed articles formed therefrom. There is a toughening effect that can be measured by peak load, Young's modulus, strain, and fracture energy. Numeric examples of these properties are given for compositions of the invention hereafter under the Examples section. The fibers also have a rheological effect on the compositions by increasing the yield stress and viscosity.

The fibers also allow a greater window of time in which the article may be demolded without causing damaging effects such as cracking of the material. Even if all of the water is taken out of the mixture by overheating, the fibers will prevent cracking of the formed structural matrix because they reinforce the entire matrix and prevent the article from shrinking. The moldable mixture can also be somewhat underheated without damage to the product. Underheating leaves more free water within the formed article, which would normally lead to expansion and rupture of the structural matrix but for the internal strengthening effect provided by the fibers. Thus, fibers can also aid in retaining an appropriate mount of water within the article so that the article has increased toughness and flexibility. This, in ram, allows the product to be handled straight out of the mold with little or no damage.

In the past, producing articles having a varying cross-sectional wall thickness was difficult because of the inability to remove adequate amounts of water from the thicker-walled portion of the article without overheating or over-drying the thinner-wall portions. In other words, the dilemma was caused by the inability to uniformly remove the water from the articles, which resulted in the thicker-walled portion being too weak to demold if the tier-walled portion was dried to the proper level, or the thinner-walled portion cracking or carmelizing if the thicker-walled portion was dried to the proper level. However, the inclusion of adequate amounts of fiber allows for the inclusion of varying amounts of water within the matrix without substantially affecting the strength of the matrix, which, in turn, facilitates the formation of articles having varying cross-sectional thickness.

In addition, the fibers allow for great adjustment in the amount of water that can be added initially in order to change the density of the final product, whereas pure starch materials do not have this ability. The water works as a foaming agent, so if more water is added to the moldable mixture, more foam will be created and the final product will be less dense. If less water is used, then less foam will be created and the final product will be more dense. Thus, the density of the final product can be changed just by varying the mount of water in the moldable mixture. The fibers increase the working range of the water in the moldable mixture because they greatly increase the form stability and resistance to internal pressure.

The amount of fibers added to the moldable mixture will vary depending upon the desired properties of the final product. The flexural strength, toughness, flexibility, and cost are the principle criteria for determining the amount of fiber to be added in any mix design. The concentration of fibers will preferably be in a range from about 1% to about 40% by weight of the moldable mixture, more preferably from about 2% to about 20% by weight, and most preferably from about 3% to about 10% by weight. In terms of the total weight of solids, the concentration of the fibers will be in a range from about 2% to about 80% by weight of the solids, more preferably in a range from about 4% to about 40% by weight, and most preferably in a range from about 5% to about 20% by weight.

It is known that certain fibers and inorganic fillers are able to chemically interact with and bind with certain starch-based binders, thereby adding another dimension to the materials of the present invention. For example, it is known that many fibers and inorganic fillers are anionic in nature and have a negative charge. Therefore, in order to maximize the interaction between the starch-based binder and the anionic fibers and inorganic materials, it may be advantageous to add a positively charged organic binder, such as a cationic starch.

Finally, the fibers may be coated with a variety of substances in order to improve the desired properties of the final product. For example, the fibers may be coated in order to make them more resistant to water absorption. Better water resistance can be obtained by treating the fibers with rosin and alum $(Al_2(SO_4)_3)$ or $NaAl(SO_4)_2$, the latter of which precipitates out the rosin onto the fiber surface, making it highly hydrophobic. The aluminum floc that is formed by the alum creates an anionic adsorption site on the fiber surface for a positively charged organic binder, such as a cationic starch. In addition, ettringite can be formed on the surface of the fibers in order to improve the interaction or interface between the fibers and the starch-based binder. Finally, fibers having latex precipitated onto the surface give a more flexible interface between the fibers and the starch-bound matrix.

D. Aggregates.

The terms "aggregate" and "fillers" as used in the specification and the appended claims include both inorganic and inert organic particles but do not typically include fibers. The term "inert organic particles" is further defined to include organic components that are not intended to primarily chemically or mechanically act as a binding agent within the starch-based composition. Examples of inert organic particles include seeds, grains, cork, and plastic spheres. Although most aggregates within the scope of the present invention are insoluble in water, some aggregates are slightly soluble in water, and some aggregates can be formed in situ by precipitation or polymerization. (However, many seeds contain starch, proteins, or other polymeric materials in high enough quantifies that they may be released into the moldable mixture and impart a binding force within the mixture.)

Although inorganic fillers are generally optional, articles with a high filler or aggregate content are generally cheaper to produce, have increased compressive strength, are more stable when microwaved, and have a smaller environmental impact. Studies have found that functional articles of the present invention can be made using no fillers at all or up to about 80% by weight of the final article. From a materials cost stand point, it is more economical to replace the relatively expensive starch-based binder with a less expensive aggregate. For example, holding all other variables constant, a 40% increase in the concentration of calcium carbonate results in about a 30% savings in the consumption of starch-based binder. Even though adding inorganic fillers tends to increase the density of the final article, it may be still be more economical to do so as long as it results in an appreciable reduction in the amount of starch-based binder that is used because of the extremely low cost of such fillers compared to the cost of the starch-based binder.

Increasing the filler is also beneficial from a processing standpoint. Because starch has a natural affinity for water, less energy is required to remove water from the composition where increased amounts of filler are employed. By increasing the filler content, there is less starch-based binder to absorb the water and less water is needed to gelate the starch-based binder. Accordingly, processing costs are decreased since less water, time, and energy is required to produce a form-stable article. Furthermore, the inorganic aggregate can also be used as a means for conducting heat quicker and more uniformly throughout the entire structural matrix. As a result, form-stable articles can be made in less time and with a more uniform cross-section.

By selecting an appropriate filler, the specific heat of the final article can also be decreased. For example, articles made with calcium carbonate were found to have a lower specific heat than those that contain only starch. As a result, such articles can be used for heating up food or other items without significantly heating up the article. For example, the present articles can be used for heating up or cooking food in an oven or microwave without destruction of the article. By selecting fillers with low specific heat, the articles of the present invention can be made having a specific heat in a range from about 0.3 J/g·K to about 2.0 J/g·K at a temperature of 20° C., with about 0.5 J/g·K to about 1.5 J/g·K being more preferred, and about 0.7 J/g·K to about 1.0 J/g·K being most preferred.

Increasing the filler content is also beneficial in varying the shape of the structural matrix of the article. As previously discussed, if insufficient moisture is removed from the mixture during formation of the article, the remaining water can cause the mixture to stick to the mold and also to crack or bubble. The article can also crack if too much moisture is removed from the mixture. There is, therefore, a margin of time (dependent on variables such as the heat of the molds and amount of water in the mixture) within which the articles should be removed from the heated molds to prevent cracking or sticking of the articles. All things being equal, this margin of time becomes narrower as the concentration of starch-based binder within a moldable mixture is increased. In addition, as the margin of time for removal of the article from the mold decreases, it becomes more difficult to manufacture articles having cross-sections of varying thicknesses throughout the article. In contrast, studies have found that as the percentage of inorganics increases and the percentage of starch-based binder decreases, the margin of time in which the articles can be removed form the molds without sticking or cracking increases. As a result, compositions which include an inorganic aggregate can be used to more effectively manufacture articles having varying cross-section thickness.

By selecting the type of filler used, the properties of the filler can be transferred to the finished article. The aggregate materials employed in the present invention can be added to increase the compressive strength, modulus of elasticity, and the insulation ability of the resultant inorganically filled article. In addition, plate-like aggregates having flat surfaces, such as mica, talc, and kaolin, can be used in order to create articles having a smoother surface finish. Typically, larger aggregates such as calcium carbonate give a matte surface, while smaller particles give a glassy surface. Finally, there are also environmental benefits to having a high filler content. Articles with a high filler content are more easily decomposed back into their natural components, thereby minimizing visual blight. Furthermore, minimizing the starch-based binder reduces the amount of starch that is consumed from starch-bearing plants or that must be recycled or composted upon discarding a disposable article.

Particle packing is a preferred process that can be used to maximize the amount of inorganics where a large percentage are included within the composition. Particle packing is the processes of selecting different sizes, shapes, and concentration of the aggregates to minimize the interstitial space between the particles and maximize the packing density. By minimizing the interstitial space, less water and starch-based binder is required to fill up the interstitial space and, hence, the overall composition. By decreasing the amount of starch-based binder to only the minimum amount needed to bind the aggregate particles and impart the desired physical properties, the percentage of inorganics in the final articles may be increased without substantially sacrificing the desired strength and rheological properties. As such, the cost of the articles is decreased and the above discussed properties are enhanced.

In order to optimize the packing density, differently sized aggregates with particle sizes ranging from as small as about 0.05 μm to as large as about 2 mm may be used. To maximize the strength of the cell walls, it is preferred that the particles not be greater than ¼ the thickness of the cell walls. Spherical particles having minimal fractured surfaces are preferred since they can be packed to a higher density and have the lowest specific surface area. In order to obtain an optimized level of particle packing, it is preferable for the average particle size within one size range to be roughly 10 times the particle size of the next smallest particle range. (In many cases, the ratio will differ and is dependent on the relative natural packing densities of the different aggregates to be combined.) For example, in a two-component system, it will be preferable for the average particle size of the coarse component to be at about 10 times the average particle size of the fine component. Likewise, in a three-component system, it will be preferable for the average particle size of the coarse component to be about 10 times the average particle size of the medium component, which will likewise preferably be about 10 times the size of the fine component. Nevertheless, as more differently sized particles are added, the ratio between the particle size magnitudes need not always be this great and may only be two-fold in some cases.

In a preferred embodiment, the aggregates are selected to obtain a desired packing density based on the particle packing process as disclosed in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. The preferred process of particle packing is also discussed in detail in United States Patent Application No. 08/109,100, (now abandoned), entitled "Design Optimized Compositions and Processes for Microstructurally Engineering Cementitious Mixtures", to Per Just Andersen and Simon K. Hodson, filed on Aug. 18, 1993. For purposes of disclosure, the foregoing article, doctoral dissertation, and patent application are incorporated herein by specific reference.

The volume of starch-based binder required is also dependent on the size and shape of the aggregate. Aggregates having a large specific surface area compared to aggregates of equal volume having a small specific surface area require more starch-based binder to coat the particles. In addition, the greater specific surface area utilizes more of the available water within the mixture in the coating of the particle surfaces, resulting in less water being available to react with and gelate the starch. Accordingly, in order to maximize the inorganics and minimize the volume of starch-based binder, it is preferable for the aggregates to have a smaller specific surface area. The highly inorganically filled articles of the present invention preferably employ aggregates having a specific surface area in a range from about $0.1 \text{ m}^2/\text{g}$ to about $400 \text{ m}^2/\text{g}$, with about $0.15 \text{ m}^2/\text{g}$ to about $50 \text{ m}^2/\text{g}$ being more preferred, and about $0.2 \text{ m}^2/\text{g}$ to about $2 \text{ m}^2/\text{g}$ being most preferred. Particles having a relatively small specific surface area typically are larger in diameter and have a more spherical shape. Nevertheless, it is generally preferable foe the average diameter of the aggregate particles to be less than about 0.5 times the cell wall thickness of the interior cellular matrix, more preferably less than about 0.3, and most preferably less than about 0.2 times the cell wall thickness.

There are a variety of types of aggregates that can be used in the present invention. Inorganic materials commonly used in the paper industry, as well as more finely ground aggregate materials used in the concrete industry, may be used in the moldable mixtures of the present invention. However, the size of the aggregate or inorganic filler particles will generally be many times greater than the particles of the inorganic filler materials typically used in the paper industry, thereby greatly reducing their cost.

Examples of useful aggregates include perlite, vermiculite, sand, gravel, rock, limestone, sandstone, glass beads, aerogel, xerogels, seagel, mica, clay, synthetic clay, alumina, silica, fly ash, fused silica, tabular alumina, kaolin, microspheres, hollow glass spheres, porous ceramic spheres, gypsum (calcium sulfate dihydrate), calcium carbonate, calcium aluminate, lightweight polymers, xonotlite (a crystalline calcium silicate gel), lightweight expanded clays, hydrated or unhydrated hydraulic cement particles, pumice, exfoliated rock, and other geologic materials. The containers and other articles of the present invention can be easily and effectively recycled by simply adding them to fresh moldable mixtures as an aggregate filler.

A dry-milled calcium carbonate is a preferred inorganic aggregate, since it can be obtained at one-third the cost of calcium carbonate obtained through wet-milling. A preferred calcium carbonate is R040, which has a particle size range from about 10 to 150 microns, with an average particle size of about 42 microns, and a low specific surface area. Both clay and gypsum are particularly important aggregate materials because of their ready availability, extreme low cost, workability, ease of formation, and because they can also provide a degree of binding and strength if added in high enough amounts (in the case of gypsum hemihydrate). Because gypsum hemihydrate can react with the water within the moldable mixture, it can be employed as a means for hardening, or at least increasing the form stability of, the moldable mixture.

Gypsum is also a useful aggregate material since it does not affect the starch-water reactions in the compositions of the invention. Gypsum dehydrates when heated to about 97° C. to form the hemihydrate. Upon hydrating, it can harden into a rigid structure depending on its concentration, thereby imparting delayed, but additional, binding strength to the final product. Other potential binders such as hydraulic cement or Tylose® are not preferred because they disrupt the gelation reaction between starch and water. In some cases, it may be desirable to form ettringite on the surface of the aggregate particles in order to improve the interaction and bond interface between the aggregate particles and the starch-based binder.

Because of the nature of the moldable mixtures and articles made therefrom, it is possible to include lightweight aggregates having a high amount of interstitial space in order to impart an insulation effect within the molded articles. Examples of aggregates which can add a lightweight characteristic and higher insulation to the molded articles include perlite, vermiculite, glass beads, hollow glass spheres, synthetic materials (e.g., porous ceramic spheres, tabular alumina, etc.), cork, pumice, and lightweight expanded clays, sand, gravel, rock, limestone, sandstone, and other geological materials.

Porous aggregates can also be used to remove unwanted air bubbles from the article during formation. Solvents escape from the moldable mixture by first traveling to the surface of the molds and then traveling along the mold surface to the vent holes. It is possible for air bubbles to get trapped between the male mold and the outside surface of the article, thereby pocking the surface. A porous aggregate within the moldable mixture can be used to absorb a significant portion of this entrapped gas, thereby helping to reduce the incidence of pocking. The entrapped gas bubbles can also be removed through the application of a vacuum.

Porous, lightweight aggregates, including zeolites, can be used as a means for conditioning the article during the forming process. Porous aggregates can be presoaked in a plasticizing agent or water. As the mixture containing the presoaked aggregate is heated to form the article, the water is released more slowly from within the porous aggregate than from the remainder of the mixture. As a result, a portion of the water will remain within the porous aggregate in the form-stable article. Once the article is formed and removed from the heated molds, the water within the porous aggregate can diffuse into the surrounding structural matrix, thereby conditioning and softening the structural matrix.

Another class of aggregates that may be added to the inorganically filled mixture includes gels and microgels such as silica gel, calcium silicate gel, aluminum silicate gel, and the like. These can be added in solid form as any ordinary aggregate material might, or they may be precipitated in situ. Because they tend to absorb waters, they can be added to reduce the water content (which will increase the viscosity and yield stress) of the moldable mixture.

In addition, the highly hygroscopic nature of silica-based gels and microgels allows them to be used as moisture regulation agents within the final hardened article. By absorbing moisture from the air, the gels and microgels will cause the articles to retain a predetermined amount of moisture under normal ambient conditions. (Of course, the rate of moisture absorption from the air will correlate with the relative humidity of the air). Controlling the moisture content of the articles allows for more careful control of the elongation, modulus of elasticity, bendability, foldability, flexibility, and ductility of the articles.

The thermal conductivity or "k-factor" (defined as $W/m \cdot K$) of the present articles can be selected by controlling the foamed structural matrix. Articles can be made having a low k-factor by having a higher concentration of cells within the structural matrix. In embodiments in which it is desirable to obtain a container or other article having an even higher insulation capability, it may be preferable to incorporate into the highly inorganically filled matrix a lightweight aggregate which has a low thermal conductivity. Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mixture.

Preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties to the container or other article, is within the scope of the present invention. In light of the foregoing, the amount of aggregate which can be added to the moldable mixture depends on a variety of factors, including the quantity and types of other added components, as well as the particle packing density of the aggregates themselves. By controlling the cellular structure and the addition of lightweight aggregate, articles can be made having a preferred k-factor in a range of about 0.03 $W/m \cdot K$ to about 0.2 $W/m \cdot K$. Insulating articles can have a more preferred k-factor in a range of about 0.04 $W/m \cdot K$ to about 0.06 $W/m \cdot K$. Non-insulating articles can have a more preferred k-factor in a range of about 0.1 $W/m \cdot K$ to about 0.2 $W/m \cdot K$.

The inorganic aggregates may be included in an amount in a range from about 0% to about 80% by weight of the total solids within the inorganically filled moldable mixture, with the preferred amount depending on the desired proper times of the final molded article and/or the desired rheology of the moldable mixture. If included, the inorganic aggregate is added in an amount in a range from about 20% to about 80% by weight of solids in the starch-based composition, more preferably from about 30% to about 70%, and most preferably from about 40% to about 60% by weight. If included, inert organic aggregates will preferably be included in an amount in a range from about 5% to about 60% by weight of the total solids. If included lightweight aggregates, defined as those having a density lower than about 1 g/cm³, are preferably included in an amount in a range from about 5% to about 85% by volume of the inorganically filled moldable mixture, more preferably from about 15% to about 65%, and most preferably from about 25% to about 55% by volume.

E. Mold-Releasing Agents.

To assist in demolding the newly formed articles, a mold-releasing agent can be added to the moldable composition. Medium- and long-chain fatty acids, their salts, and their acid derivatives can be used as mold-releasing agents. The preferred medium and long chain fatty acids typically occur in the production of vegetable and animal fats and have a carbon chain greater than $C_{12}$. The most preferred fatty acids have a carbon chain length from $C_{16}$ to $C_{18}$. The fats and salts used herein need not be in a pure form but merely need to be the predominant component. That is, the shorter or longer chain length fatty acids, as well as the corresponding unsaturated fatty acids, can still be present.

Preferred mold-releasing agents for use in the present invention include stearates, which have hydrophobic properties and are not soluble in water. Stearates are salts of stearic acid and have the general formula of $CH_3(CH_2)_{16}COO^-X^+$, where $X^+$ can be an ion of Al, Mg, Na, K, or Ca. Stearates have specific melting points that vary depending on what salt is used. Aluminum stearate is one preferred mold release agent that has been approved by the FDA. Aluminum stearate has a lower melting point of 110° C. and gives a smoother surface finish to a formed article. On the other hand, zinc stearate is a health hazard and should be avoided, especially when forming food or beverage containers. Generally, a lower melting point or increased amount of stearate will give a smoother surface to a formed article.

Stearates are grease repellant or resistant, allow the molding time of a product to be reduced, give a better surface content, provide heat transfer, and produce a continuous phase. When a clean mold is used to form products, a seasoning process takes place by using the stearates in the composition to be formed. The formed products improve in their surface finish appearance with each molding during the first few runs. It appears that the stearates on the surface of the product are getting transferred to the mold surface during the first few runs to provide the seasoning effect to the mold.

Silicones can also be used as mold releasing agents. Lecithin, which is a mixture of phosphatides and glycerides, can contribute to lessening of the stickiness of the moldable mixture, providing mold releasing properties, and can improve the flexibility of the formed articles.

Various waxes such as paraffin and bees wax, and Teflon-based materials can also be used as mold-releasing agents. One of the added benefits of using wax is that it can also act as an integral coating material, as discussed later. Other materials, such as CaS, calcium silicate and Lecithin, have also been found to work as mold-releasing agents. To further assist in releasing the articles from the molds, the molds can be polished, chrome plated, or coated with, e.g., nickel, Teflon, or any other material that limits the tendency of the articles to stick to the molds.

The above mold-releasing agents are preferably added to the mixture in a range from about 0.05% to about 15% by weight of the total solids, more preferably in a range from about 0.1% to about 10% by weight, and most preferably in a range from about 0.5% to about 1% by weight. It is preferred to use a smaller amount of mold-releasing agents since agents such as stearates are generally very expensive.

F. Rheology-Modifying Agents.

Rheology-modifying agents can be added to increase the yield stress and cohesive nature of the moldable mixture in the case where large amounts of water are included relative to the amount of starch-based binder used to form either the preblended mixture in a two-step mixing process, or the overall starch-based composition in either a one-step or two-step mixing process. The rheology-modifying agent may also be referred to as a "thickening agent." A rheology-modifying agent, or thickening agent, may be added to the mixture for at least two very distinct reasons: (1) to increase the ability of the fluid fraction to uniformly disperse the fibers using either the one-step or two-step mixing process; and (2) to prevent the solid components from settling, separating, or otherwise segregating from the fluid fraction after the starch-based composition has been homogeneously mixed. Of course, the thickening agent may perform both functions. Depending on the desired rheology of the fluid fraction, one of ordinary skill in the art can select the type and amount of rheology-modifying agent to be added to the mixture. Nevertheless, it is generally preferred to include an amount of rheology-modifying agent that will not substantially interfere with the gelation of the starch-bound binder. Because modified or gelatinized starches can be used as a thickening agent, it may be preferable in many cases to simply rely on the thickening effect of a gelatinized starch-based binder since it will be chemically compatible with and not significantly interfere with the gelation reaction between the water present in the mixture and the yet ungelated starch-based binder component.

A variety of natural and synthetic organic rheology-modifying agents may be used which have a wide range of properties, including yield stress, viscosity, and solubility in water. Suitable rheology-modifying agents include cellulose-based materials such as methylhydroxyethylcellulose, hydroxymethylethylcellulose, carboxymethylcellulose, methylcellulose, ethylcellulose, hydroxyethylcellulose, hydroxyethylpropylcellulose, hydroxypropylmethylcellulose, etc. The entire range of possible permutations is enormous and shall not be listed here, but other cellulose materials which have the same or similar properties would also work well.

Other natural polysaccharide-based rheology-modifying agents include, for example, alginic acid, phycocolloids, agar, gum arabic, guar gum, locust bean gum, gum karaya, xanthan gum, and gum tragacanth. Suitable protein-based rheology-modifying agents include, for example, Zein®(a prolamine derived from corn), collagen (derivatives extracted from animal connective tissue such as gelatin and glue), and casein (derived from cow's milk).

Finally, suitable synthetic organic rheology-modifying agents that are water dispersible include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylamides, ethylene oxide polymers, polylactic acid, and latex (which is a broad category that includes a variety of polymerizable substances formed in a water emulsion; an example is styrene-butadiene copolymer). Synthetic organic polymers, especially the polyvinyl compounds, are also used as film binders to produce a hydrophobic surface on the starch-based binder. The hydrophobic surface slows down the rate of water absorption by the starch-based binder in the mixing process, thereby permitting quicker formation of form-stable articles.

G. Dispersants.

The term "dispersant" shall refer in the specification and the appended claims to the class of materials which can be added to reduce the viscosity and yield stress of the starch-based composition. They are preferably added, if at all, after the fibers have been uniformly dispersed. A more detailed description of the use of dispersants may be found in the Master's Thesis of Andersen, P. J., "Effects of Organic Superplasticizing Admixtures and their Components on Zeta Potential and Related Properties of Cement Materials" (The Pennsylvania State University Materials Research Laboratory, 1987). For purposes of disclosure, the foregoing Master's Thesis is incorporated herein by specific reference.

Dispersants generally work by being adsorbed onto the surface of the aggregate particles and/or into the near colloid double layer of the particles. This creates a negative charge on or around the surfaces of the particles causing them to repel each other. This repulsion of the particles adds "lubrication" by reducing the friction or attractive forces that would otherwise cause the particles to have greater interaction. This increases the packing density of the material somewhat and allows for the addition of less water while maintaining the workability of the starch-based composition. Dispersants can be used to create low viscosity, workable mixtures that flow more easily into the mold without the addition of significant quantities of additional water. Hence, such mixtures may be suited for, e.g., the production of higher density articles. In addition, the use of dispersants has been found to yield articles having superior surface qualities.

H. Other Admixtures.

A variety of other components can be added to the moldable mixture to impart desired properties to the final article. For example, enzymes such as carbohydrase, amylase, and oxidase produce holes in the surface of starch granules permitting the starch-based binder to gelate faster in the case where ungelated starch is used. As a result, the viscosity of the mixture increases at a faster rate, thereby producing articles with a stronger and more uniform cell structure.

Articles can initially be formed having a desired flexibility (as opposed to obtaining flexibility through the use of a humidity chamber) by adding components that will tightly bind the water within the starch molecules. This can be achieved with the addition of humectants or deliquescent chemicals, such as $MgCl_2$, $CaCl_2$, NaCl, or calcium citrate. Because all of these chemicals are readily water soluble, they are able to distribute and retain water within the starch molecules to provide a more uniform distribution of moisture. In turn, the moisture improves flexibility.

Flexibility can also be obtained by adding softeners or plasticizers to the moldable mixture. Such plasticizers include Polysorbate 60, SMG, mono and diglycerides and distilled monoglycerides. Other specialized plasticizers having a boiling point above the maximum temperature reached by the mixture during the forming process can also be used. These chemicals, which include polyethylene glycol (below 600 MW), glycerin, and sorbitol, tend to take the place of water and function as plasticizers with moisture as low as 5%. They are believed to attach themselves to the hydroxyl groups of starch molecules and form a hinge-like structure. Since the plasticizers do not vaporize during the forming process, they remain within the form-stable article, thereby softening the starch-bound matrix. Integral coating materials that generally have a melting point above the boiling point of super heated water within the molded article, but below the maximum temperature achieved at or near the surface of the molded article while in the mold can be used. These include waxes, polylactic acid, shellac, or other polymers. In addition, internal sealing materials such as polyvinyl alcohol and latexes can be added to generally make the cellular matrix more water resistant.

Finally, cross-linking admixtures such as dialdehydes, methylureas, and melamine formaldehyde resins can be added to the mixture to produce a less water soluble starch-based binder. The cross-linking admixtures bind to the hydroxyl ions of the starch-based binder, which slow down the water reabsorption rate of the starch-based binder. As a result, the final articles obtain form stability at a faster rate, have higher strength, and are able to retain liquids longer before failure (e.g., a cup can hold water longer before it starts to leak).

V. Processing Apparatus, Conditions, and Results

The articles of manufacture of the present invention are produced through a multi-step process. The steps include preparing the mixture, including first the preblended mixture and the final moldable composition, and forming the composition into the desired articles. Additional optional processing steps may include, for example, printing, coating, conditioning, and packaging of the final articles. The apparatus used in the processing steps are discussed below. The inventive articles can be prepared using conventional equipment well known to those skilled in the arts of polystyrene foam, paper, plastic, cement, and starch-bound materials. The equipment, however, must be uniquely combined and arranged to form a functional system that can manufacture the present articles. Furthermore, slight modification of the equipment may be required to optimize production of the articles. The arrangement, modification, and operation of the equipment needed to manufacture the inventive articles can be performed by those skilled in the art of using the conventional equipment in light of the present disclosure.

A. Preparing the Mixture.

Figure 4:
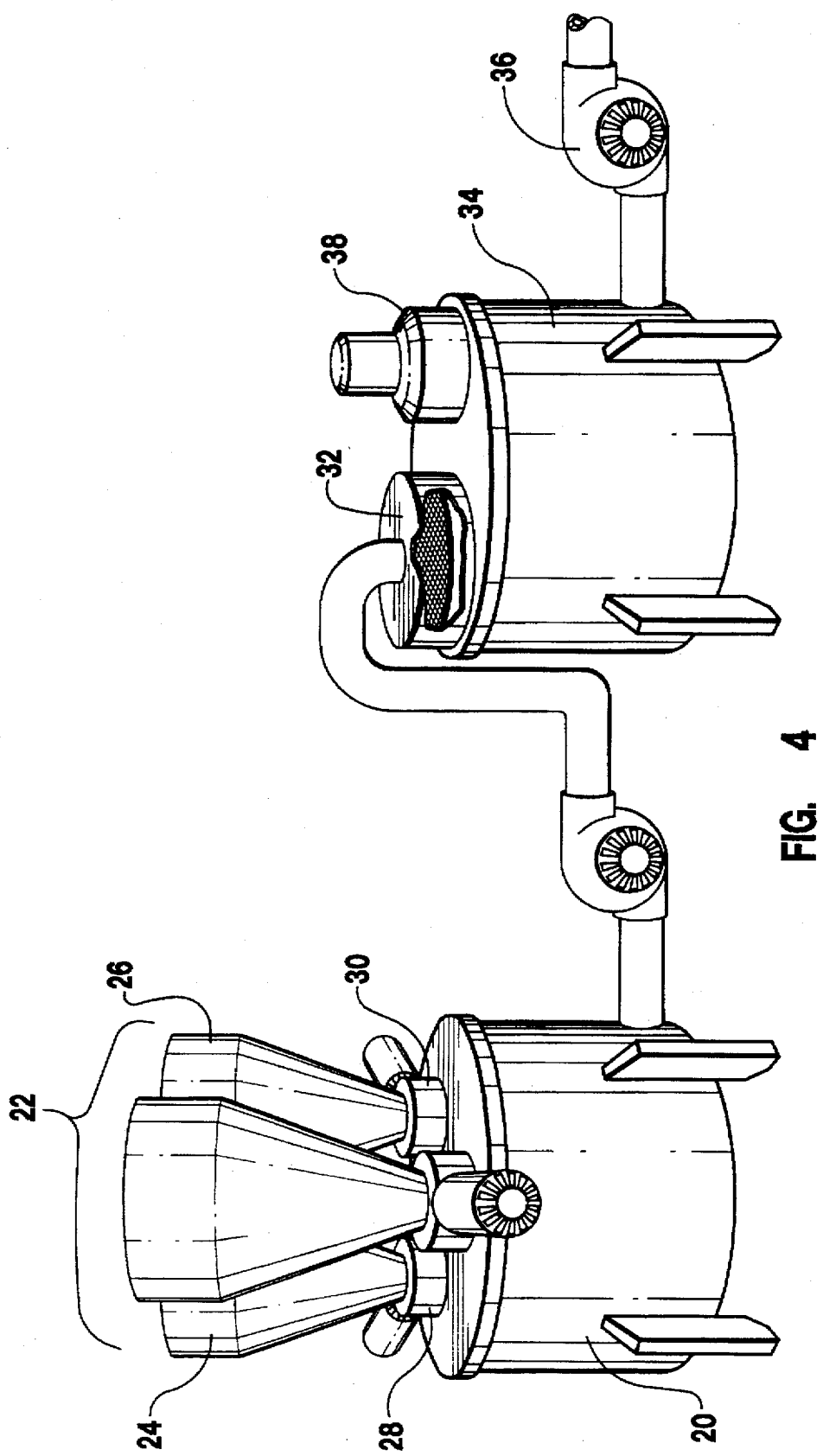
FIG. 4 is a perspective view of load cells and a mixing apparatus.

As depicted in FIG. 4, the preblended mixture and the final moldable starch-based mixture are preferably prepared in a mixing tank 20 fed by bulk storage cells 22. The number of storage cells 22 is dependent on the number of components to be incorporated into the mixture. Storage cells 22 typically comprise dry load cells 24 and liquid load cells 26. Dry load cells 24 house solid components such as the starch-based binder, fillers, and fibers. Dry material metering units 28, typically consisting of some form of auguring system, automatically and accurately measure and feed the desired amount of dry mixture into mixing tank 20.

Liquid load cells 26 house liquid components such as the solvent and different liquid rheology-modifying agents. When appropriate, automatic stirrers can be positioned within the liquid load cells 26 to help prevent separation or settling of a liquid. Metering pumps 30 automatically and accurately measure and feed the liquids into mixing tank 20.

Mixing tank 20 is preferably a high energy mixer capable of quickly and homogeneously blending the components into the aforementioned preblended and moldable mixtures. Such high energy mixers include the TMN turbo batter mixers that are available from Franz Haas Waffelmaschinen Industriegesellschaft M.B.H. of Vienna, Austria. Alternative high energy mixers are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference. Alternatively, a variable speed mixer can be used to provide low energy mixing. Variable speed mixers include the Eirich Rv-11. Where fragile fillers or aggregates, such as glass spheres, are being incorporated into a mixture, it is preferred to use low energy mixing so as not to crush the aggregate.

As further depicted in FIG. 4, once the mixture is prepared, it is pumped through an oscillating screen 32 to a storage mixer 34. Oscillating screen 32 helps to separate out and disperse unmixed clumps of the solids in the case of very nonviscous mixtures, including a yet to be gelated preblended mixture. Storage mixer 34 functions as a holding tank to permit continuous feeding of the moldable mixture to the forming apparatus. The moldable mixture is fed to the forming apparatus via a conventional pump 36. In one embodiment, storage mixer 34 is sealed closed and a vacuum pump 38 is attached thereto. Vacuum pump 38 applies a negative pressure to the moldable mixture to remove air bubbles that may be entrained in the mixture. As previously discussed, unwanted air bubbles can cause surface defects within the final products.

Storage mixer 34 continuously stirs or mixes the moldable mixture at low energy to prevent settling within the moldable mixture. Where the forming apparatus operates on batch processing, as opposed to continuous processing, storage tank 34 can be eliminated and the mixture fed directly from mixing tank 20 to the forming apparatus. A complete automated system of load cells and mixers includes the DANMIX moldable batter mixing system that can be purchased from Franz Haas Waffelmaschinen Industriegesellschaft M.B.H. of Vienna, Austria.

Figure 5:
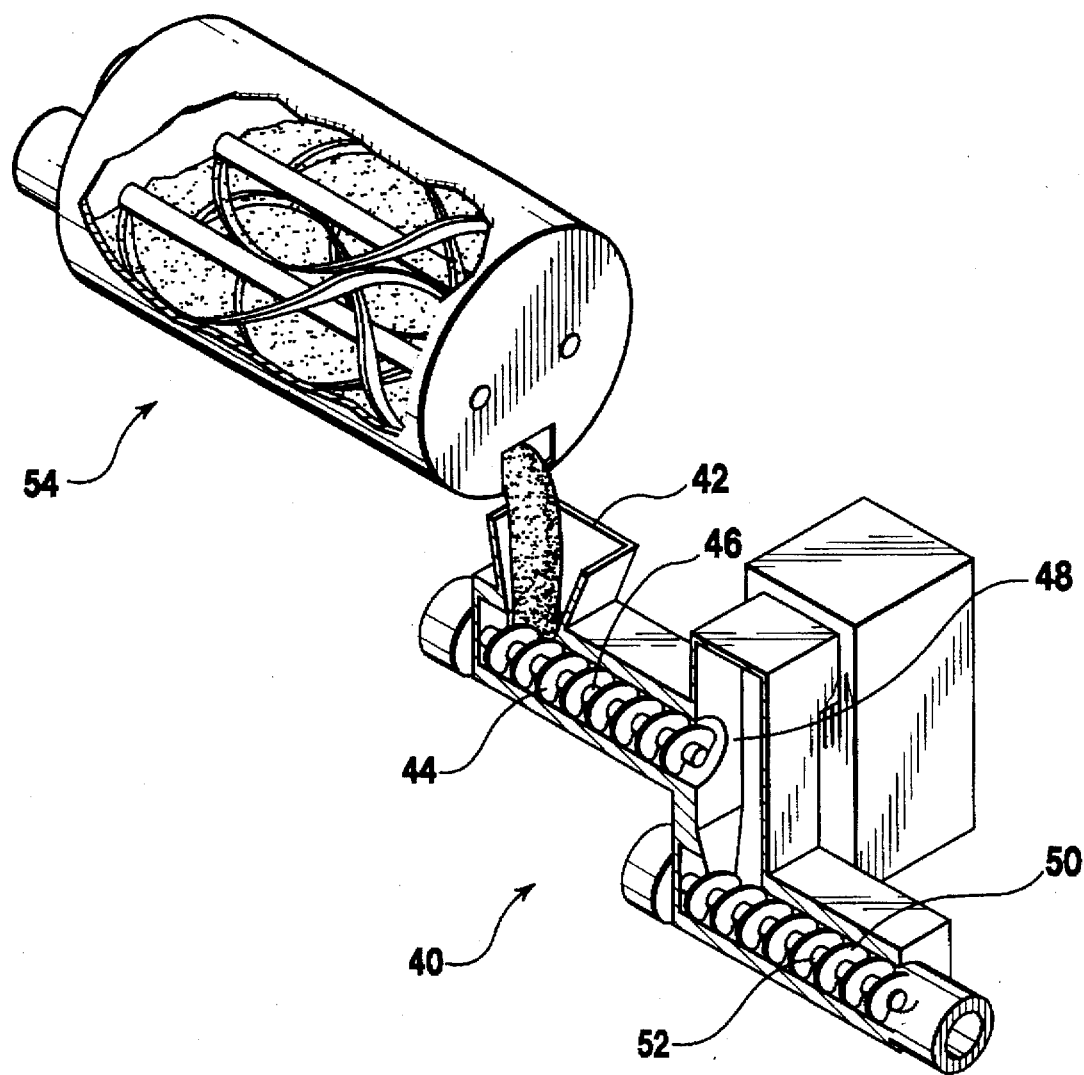
FIG. 5 is a cross-sectional view of an auger extruder apparatus.

In most cases, where a higher yield stress, more viscous moldable mixture is used, it will usually be necessary to use an auguring system to mix and transfer either the gelated preblended mixture or the moldable mixture. In one embodiment, optional admixtures such as the inorganic filler component to be incorporated into the moldable mixture are automatically and continuously metered, mixed, and deaired by a dual chamber auger extruder apparatus. FIG. 5 depicts a dual chamber auger extruder 40, which includes a feeder 42 that feeds the moldable mixture into a first interior chamber 44 of extruder 40. Within first interior chamber 44 is a first auger screw 46 which both mixes and exerts forward pressure advancing the moldable mixture through first interior chamber 44 toward an evacuation chamber 48. Typically, a negative pressure or vacuum is applied to evacuation chamber 48 in order to remove unwanted air voids within the moldable mixture.

Thereafter, the moldable mixture is fed into a second interior chamber 50. A second auger screw 52 advances the mixture toward the article forming apparatus. Auger screws 46 and 52 can have different flight pitches and orientations to assist in advancement of the mixture and performing low and high shear energy mixing. Auger extruder 40 can be used to independently mix the components of the moldable mixture, or, as shown in FIG. 5, can be fed by a mixer 54. A preferable twin auger extruder apparatus utilizes a pair of uniform rotational augers wherein the augers rotate in the same direction. Counter-rotational twin auger extruders, wherein the augers rotate in the opposite directions, accomplish the same purposes. A pugmill may also be utilized for the same purposes. Equipment meeting these specifications are available from Buhler-Miag, Inc., located in Minneapolis, Minn.

Figure 6:
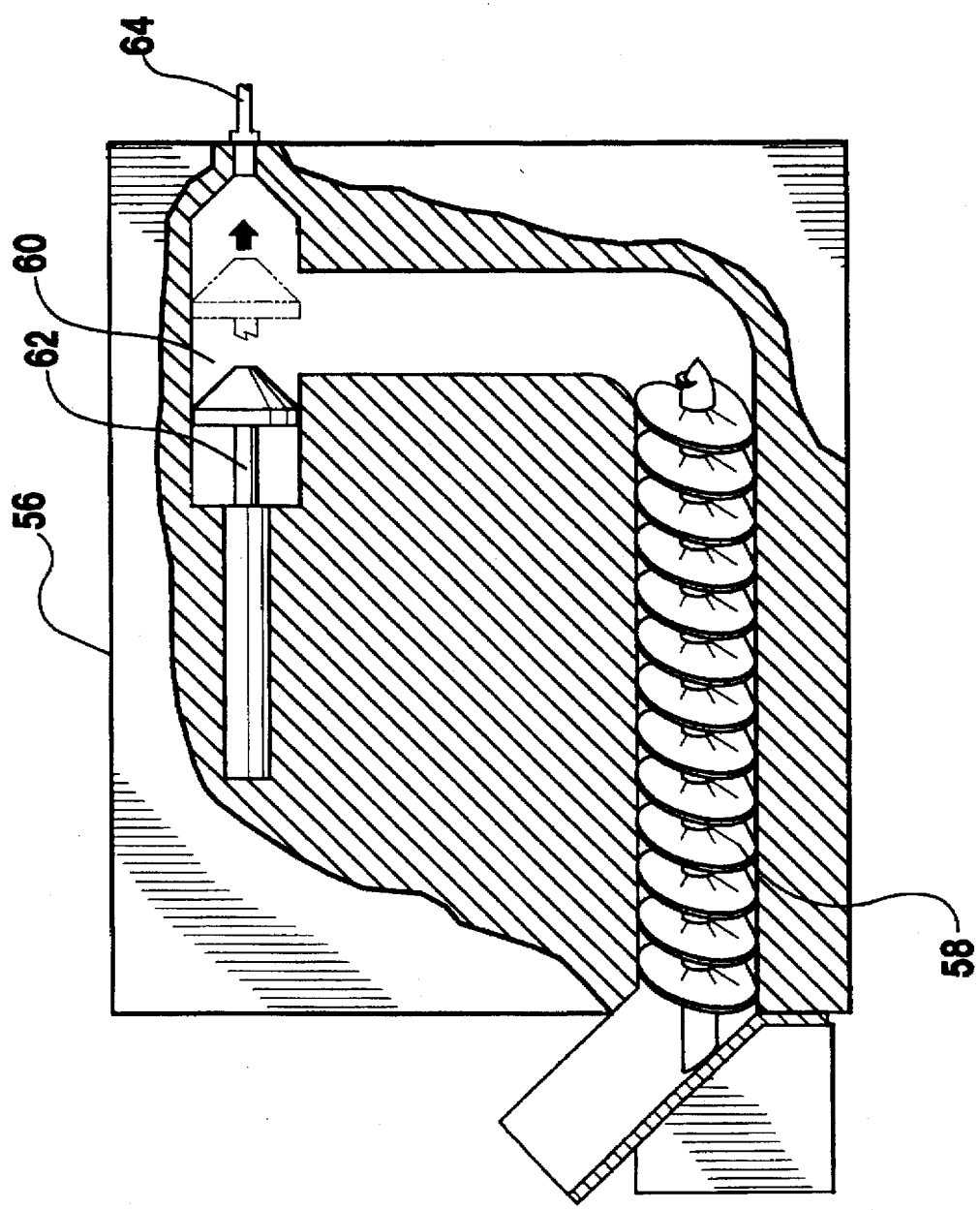
FIG. 6 is a cross-sectional view of a two-stage injector.

High yield stress, high viscosity mixtures are typically fed into the forming apparatus by either a two-stage injector or a reciprocating screw injector. As depicted in FIG. 6, a two-stage injector 56 has separate compartments for mixing or advancing and injecting. The mixture is conveyed to an extruder screw 58, which feeds the mixture to a shooting pot 60. Once shooting pot 60 is filled, an injection piston 62 pushes a defined quantity of the mixture into a flow channel 64 that feeds the forming apparatus.

Figure 7:
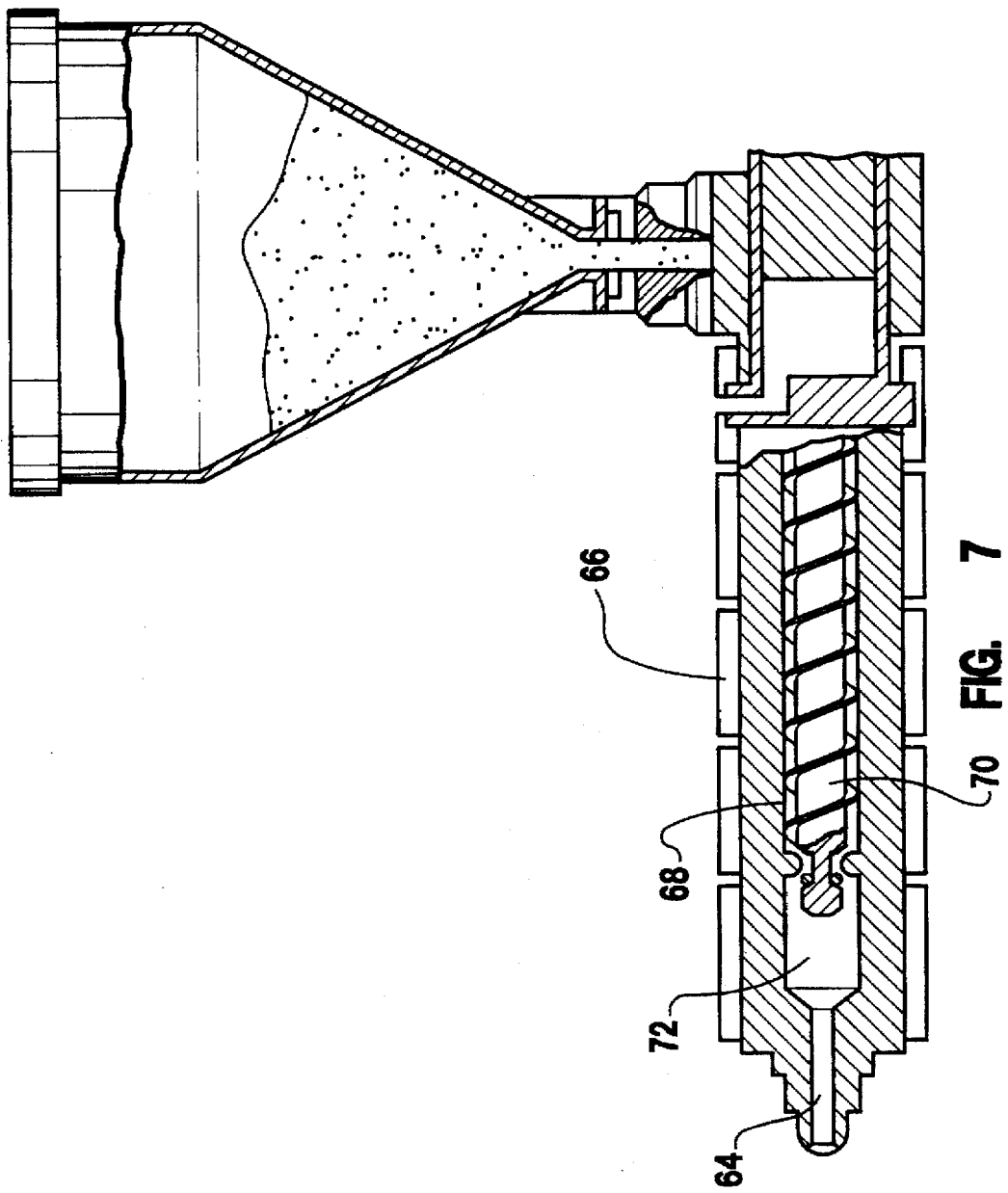
FIG. 7 is a cross-sectional view of a reciprocating screw injector.

As depicted in FIG. 7, a reciprocating screw injector 66 comprises a chamber 68 having a screw auger 70 longitudinally positioned therein. The moldable mixture is fed into chamber 68 and advanced by screw auger 70. As screw auger 70 rotates, it retracts and feeds the mixture to injection end 72 of screw auger 70. When the required volume of the mixture has accumulated at end 72, screw auger 70 stops rotating and moves forward to inject the mixture into flow channel 64 and subsequently to the forming apparatus.

B. Forming the Mixture into the Desired Article.

Figure 8:
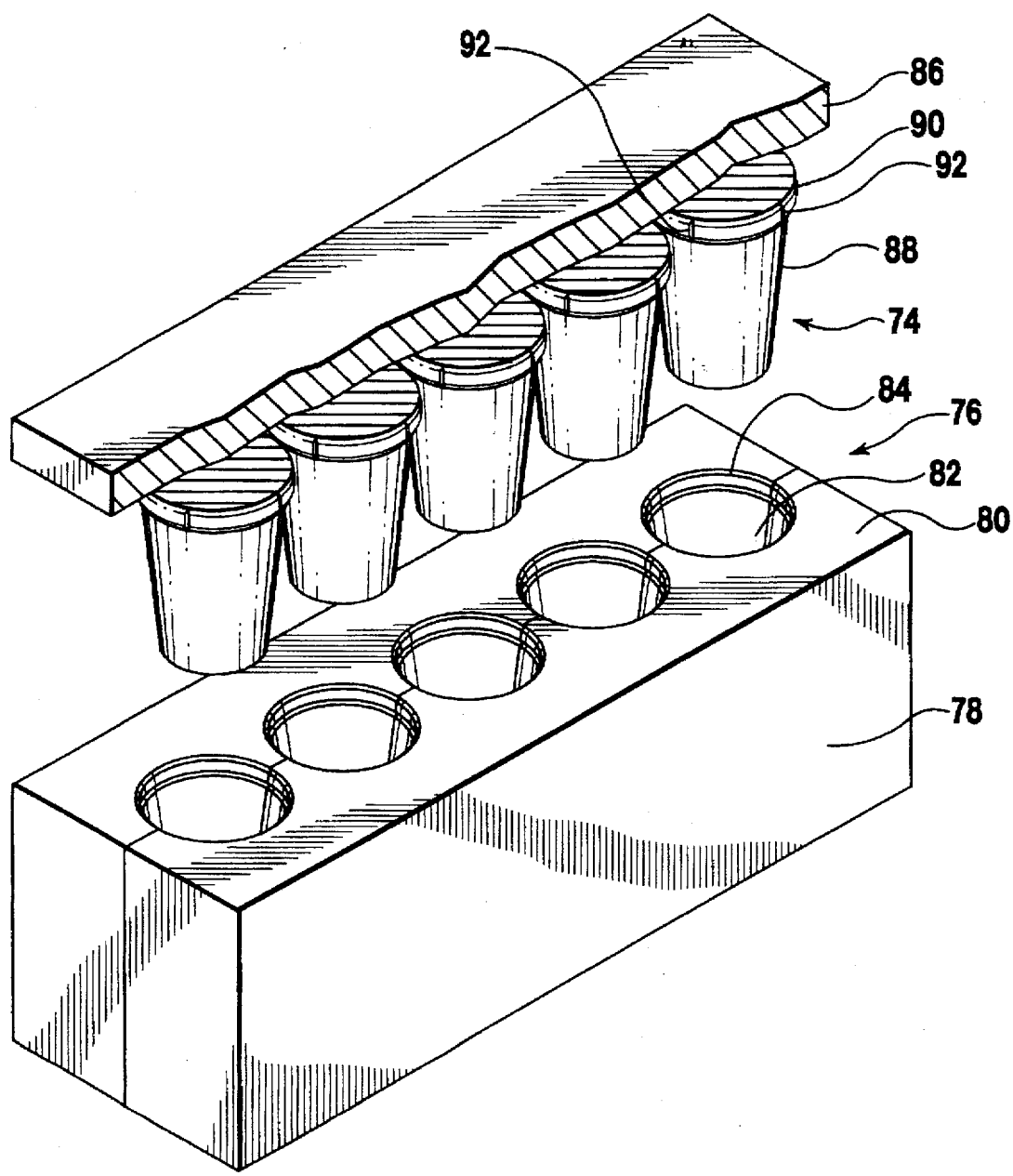
FIG. 8 is a perspective view of a male mold and a female mold.

Once the mixture is prepared, it is preferably formed into the desired shape of the article through the use of heated molds. FIG. 8 depicts a heated male mold 74 having a desired shape and a heated female mold 76 having a complementary shape. Female mold 76 comprises a mold body 78 having a flat mold face 80 with a receiving chamber 82 bored therein. Receiving chamber 82 has a mouth 84 through which it is accessed. Male mold 74 comprises an attachment plate 86, a die head 88 having a shape substantially complementary to the shape of receiving chamber 82, and a venting ring 90 extending between attachment plate 86 and die head 88. Venting ring 90 is slightly larger than mouth 84 of receiving chamber 82 and contains a plurality of venting grooves 92 that are longitudinally aligned with die head 88.

Figure 9:
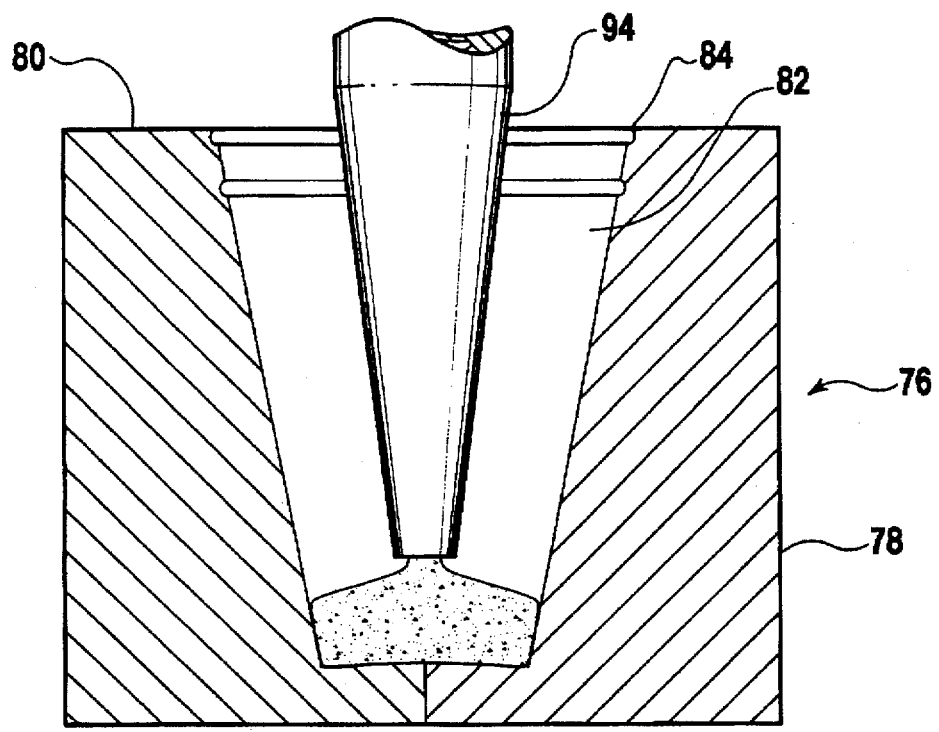
FIG. 9 is a cross-sectional view of a female mold being filled with a moldable mixture by a filling spout.
Figure 10:
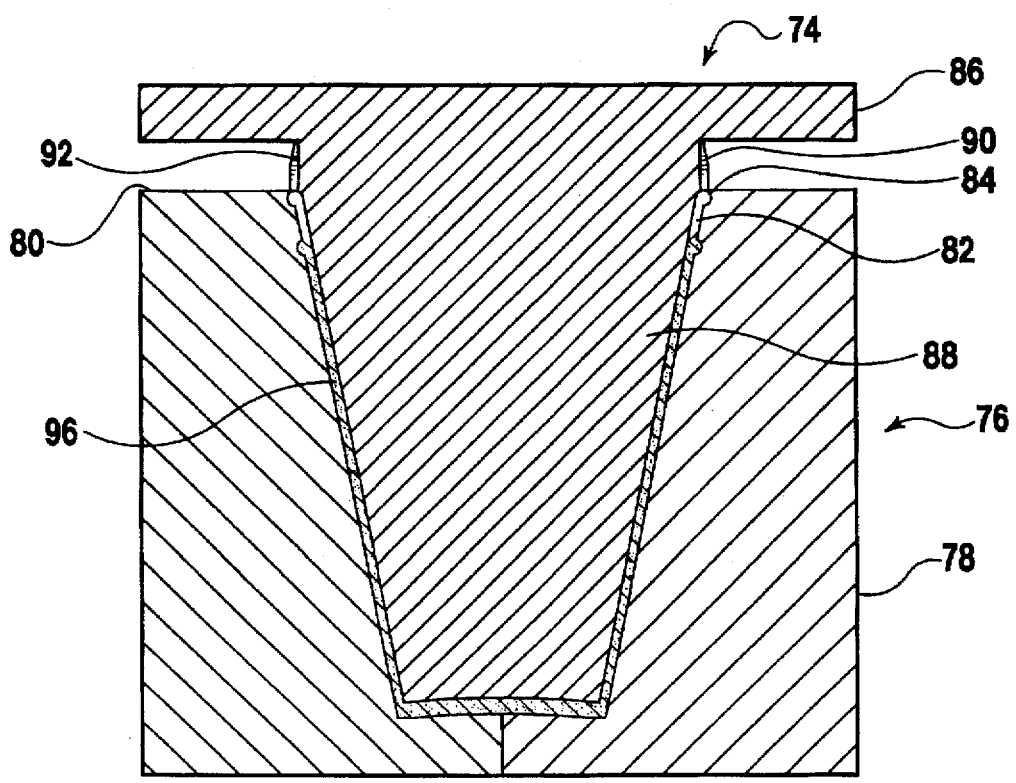
FIG. 10 is a cross-sectional view of a male mold and the female mold of FIG. 9 being mated.

In the preferred embodiment, the molds are vertically aligned with female mold 76 being positioned below male mold 74. In this orientation, as shown in FIG. 9, receiving chamber 82 acts as a container for receiving the moldable mixture from a filling spout 94. Once the mixture is positioned within female mold 76, the molds are mated, as shown in FIG. 10, by inserting die head 88 into receiving chamber 82 until vent ring 90 comes to rest on mold face 80 around mouth 84. Die head 88 is slightly smaller than receiving chamber 82 so that when the molds are mated, a mold area 96 exists between male mold 74 and female mold 76. As previously discussed, the amount of moldable mixture positioned in female mold 76 preferably only fills a portion of mold area 96.

Figure 11:
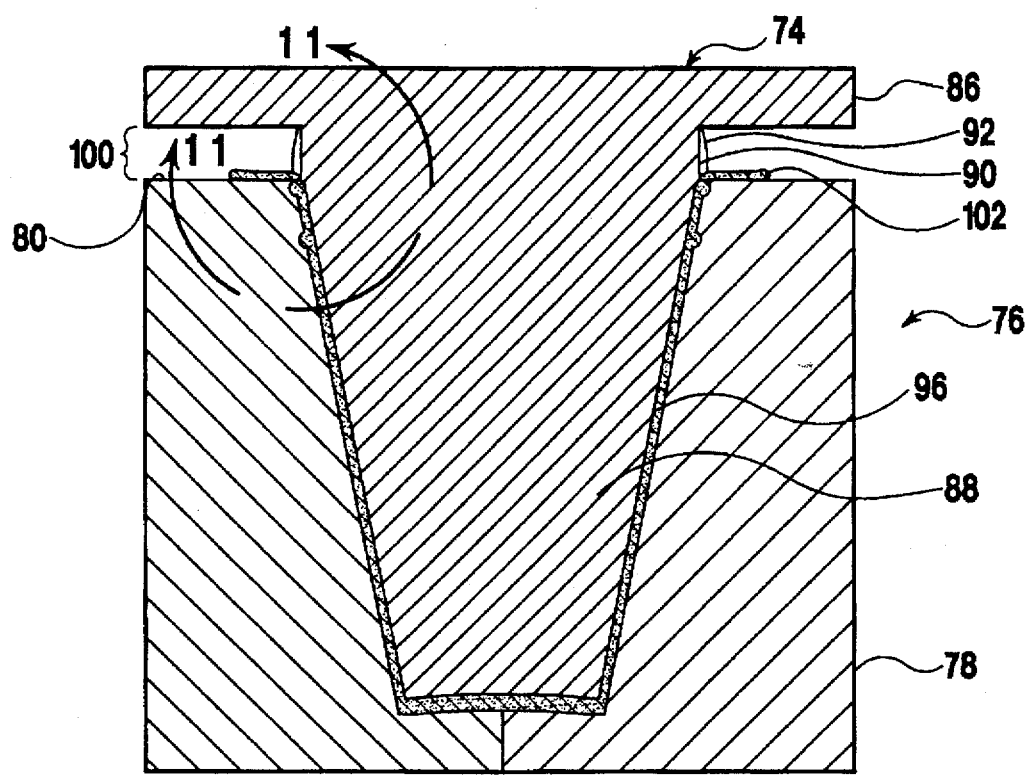
FIG. 11 is a cross-sectional view of the inventive article being molded between mated male and female molds of FIG. 10.
Figure 11A:
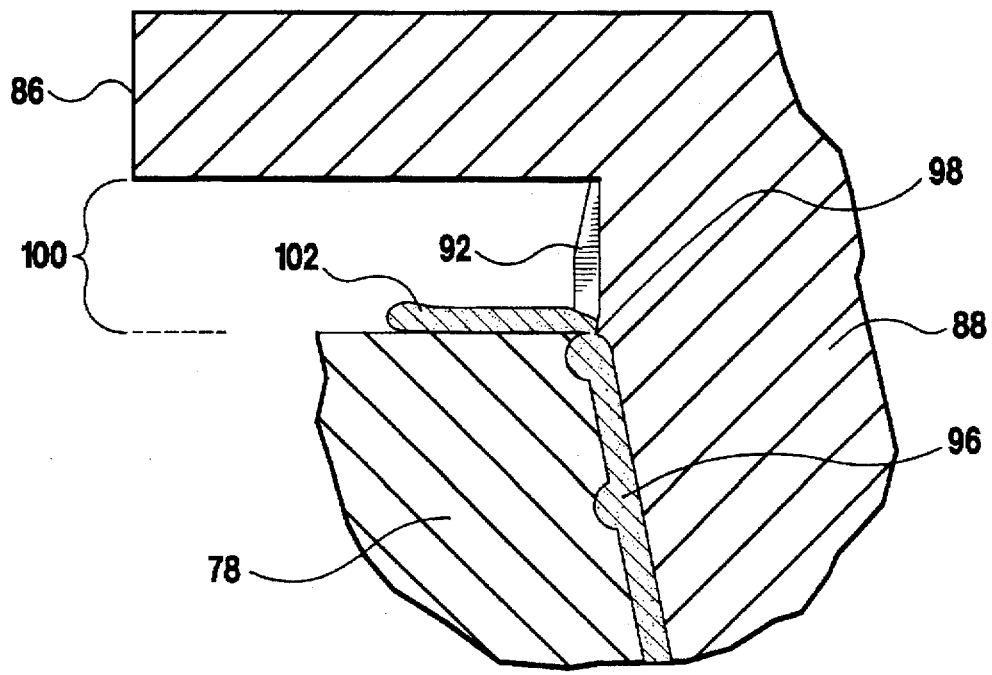
FIG. 11A is an enlarged cross-sectional view of the vent holes between the mated male mold and female molds of FIG. 11.
Figure 12:
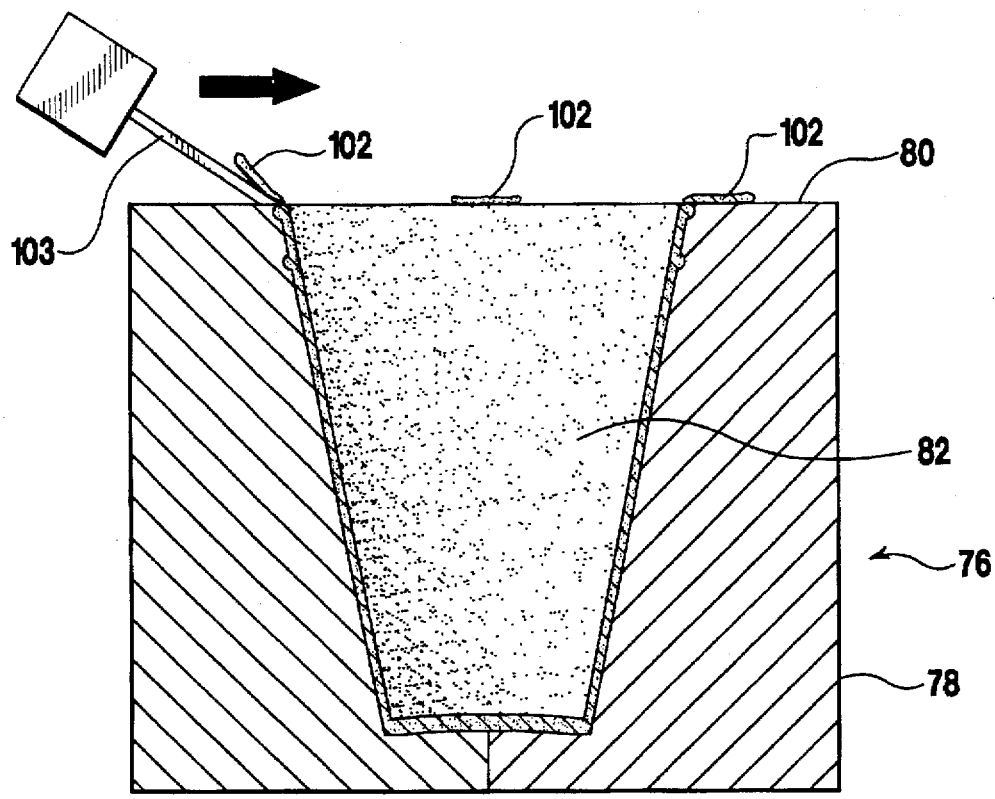
FIG. 12 is a cross-sectional view of the female mold equipped with a scraper blade to remove excess material.

In the mated position as shown in FIGS. 11 and 11A, vent grooves 92 communicate with mold area 96 to form vent holes 98. Furthermore, a venting gap 100 is formed between mold face 80 and attachment plate 86 as a result of venting ring 90 resting on mold face 80. During operation, the heated molds cause the moldable mixture to expand and dry into a solid article according to the process and parameters as previously discussed. Excess material 102 and vapor is expelled from mold area 96 through vent holes 98 and into venting gap 100. Once the mixture becomes form-stable in the desired shape of the article, male mold 74 and female mold 76 are separated. As depicted in FIG. 12, a scraper blade 103 can then be pressed along the length of mold face 80 to remove excess material 102.

Figure 13:
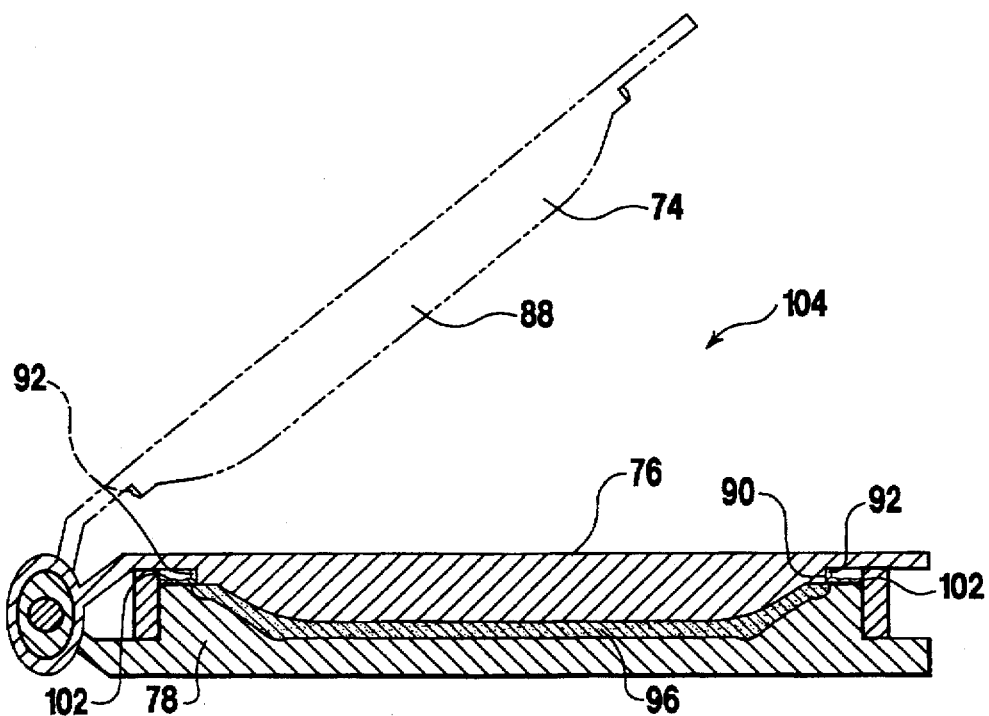
FIG. 13 is a cross-sectional view of a dual mold.
Figure 14:
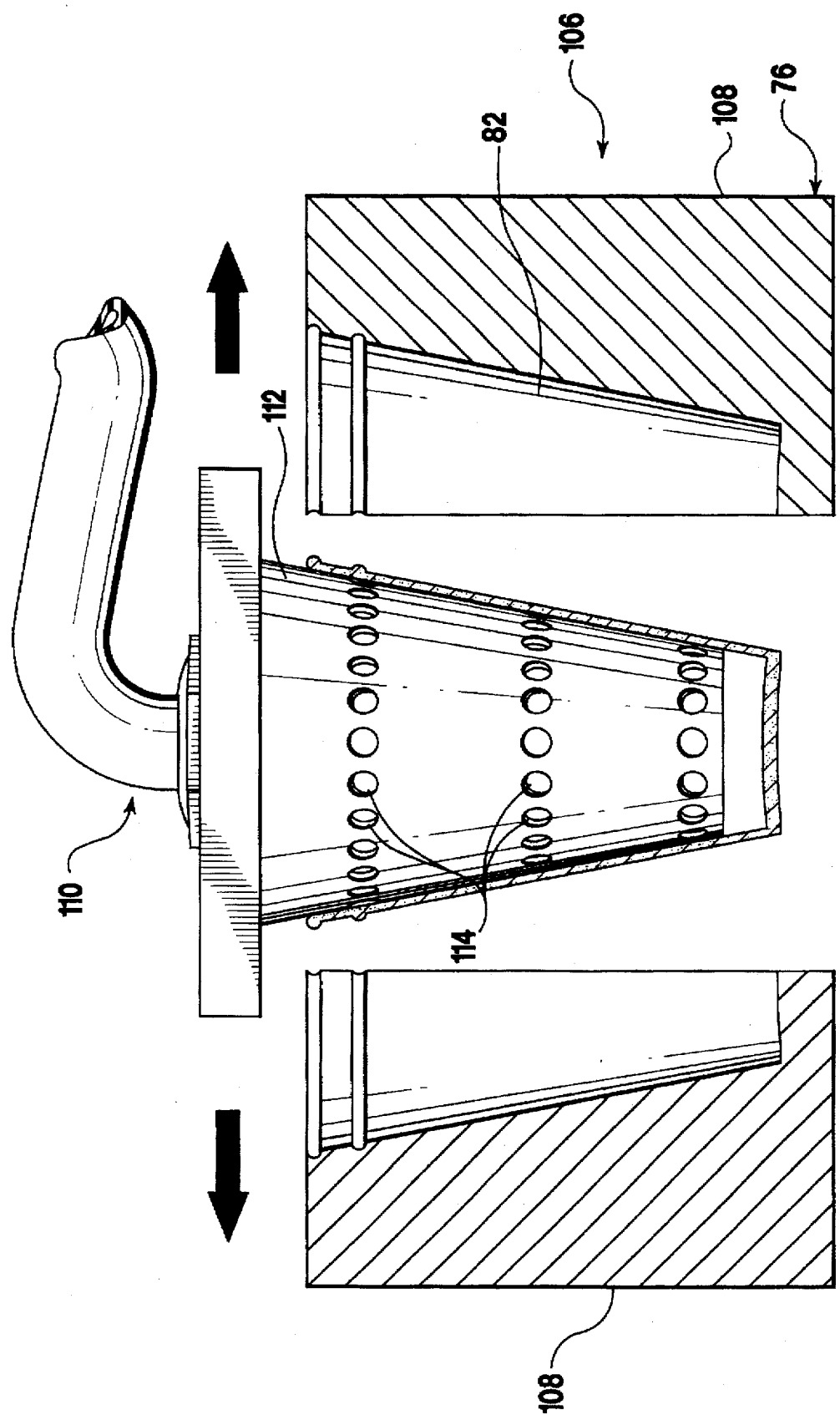
FIG. 14 is a cross-sectional view of a split mold with suction nozzle.

The molds can have a variety of shapes and sizes to form the desired article. However, there are two general types of molds: dual molds and split molds. As shown in FIG. 13, a dual mold 104 comprises a single male mold 74 and a single female mold 76. This type of mold is used for making shallow articles, such as plates and lids, that are easily removed from the molds. Split molds 106, as shown in FIG. 14, comprise a single male mold (not shown) and a female mold 76 that can be separated into mold halves 108. Mold halves 108 are separated after the article is formed to permit easy removal of the article. Split molds 106 are used for the production of deep recessed articles such as cups and bowls that can be difficult to remove from a mold.

One method for removing articles from the mold is by a suction nozzle 110. As shown in FIG. 14, suction nozzle 110 has a head 112 with vacuum ports 114 located thereon. Head 112 is designed to complementarily fit within the hardened article. Accordingly, by inserting head 112 into the article and applying a slight negative pressure through vacuum ports 114, the article can be picked up and moved to a conveyor belt for subsequent processing.

The molds are preferably made of metals such as steel, brass, and aluminum. Polished metals, including chrome and nickel, along with Teflon coatings, make it easier to remove the articles from the molds and create a smoother finish. The material of the molds must be able to withstand the temperatures and pressures, as previously discussed, encountered during the manufacturing process.

The molds can be heated in a variety of ways. For example, external heating elements, such as gas burners, infrared light, and electrical heating elements, can be attached or directed at the molds. Alternatively, heated liquids, such as oils or heated gases, such as steam, can be piped through the molds to heat them. Various types of heating can also be used to vary the temperature of the molds along the length of the molds in order to vary the properties of the hardened matrix within the molded article. It is also possible to heat the mixtures without heating the molds. For example, the molds can be made out of ceramic and microwaves can be applied to heat the mixture.

By varying the temperature and processing time it is possible to affect the density, porosity, and thickness of the surface layer, or skin. Generally, in order to yield a molded article having a thinner but more dense surface layer, the molding temperature is lower, the molds have fewer vents, and the moldable mixture has lower water. The yield stress and viscosity of the mixture can be increased by, e.g., gelating a higher fraction of the starch-based binder during preparation of the preblended mixture and/or adding a rheology-modifying agent, such as Tylose®, including less water, or using an aggregate material having a higher specific surface area.

The temperature of the molds can be varied throughout the molds in order to unevenly heat the article. This may be desired, e.g., where articles of varying wall thickness or density are manufactured. As discussed earlier, increasing the mold temperature increases the rate of evaporation of the water from the moldable mixture as it is formed into a desired article. Also, increasing the wall thickness increases the time it takes to create a form stable article. Where the desired article will have greatly varying wall thickness throughout it may be advantageous to offset the tendency of the thicker-wall portion to harden more slowly than the thinner-walled portion by increasing the temperature of the mold at the location of increased thickness, thereby increasing the rate of evaporation of water at that location. Similarly, because increasing the temperature of the mold increases the rate of evaporation of water, it would be expected that the portion of the molded article nearest a hotter portion of the mold would have a lower density than the portion of the molded article nearest a cooler portion of the mold.

Figure 15:
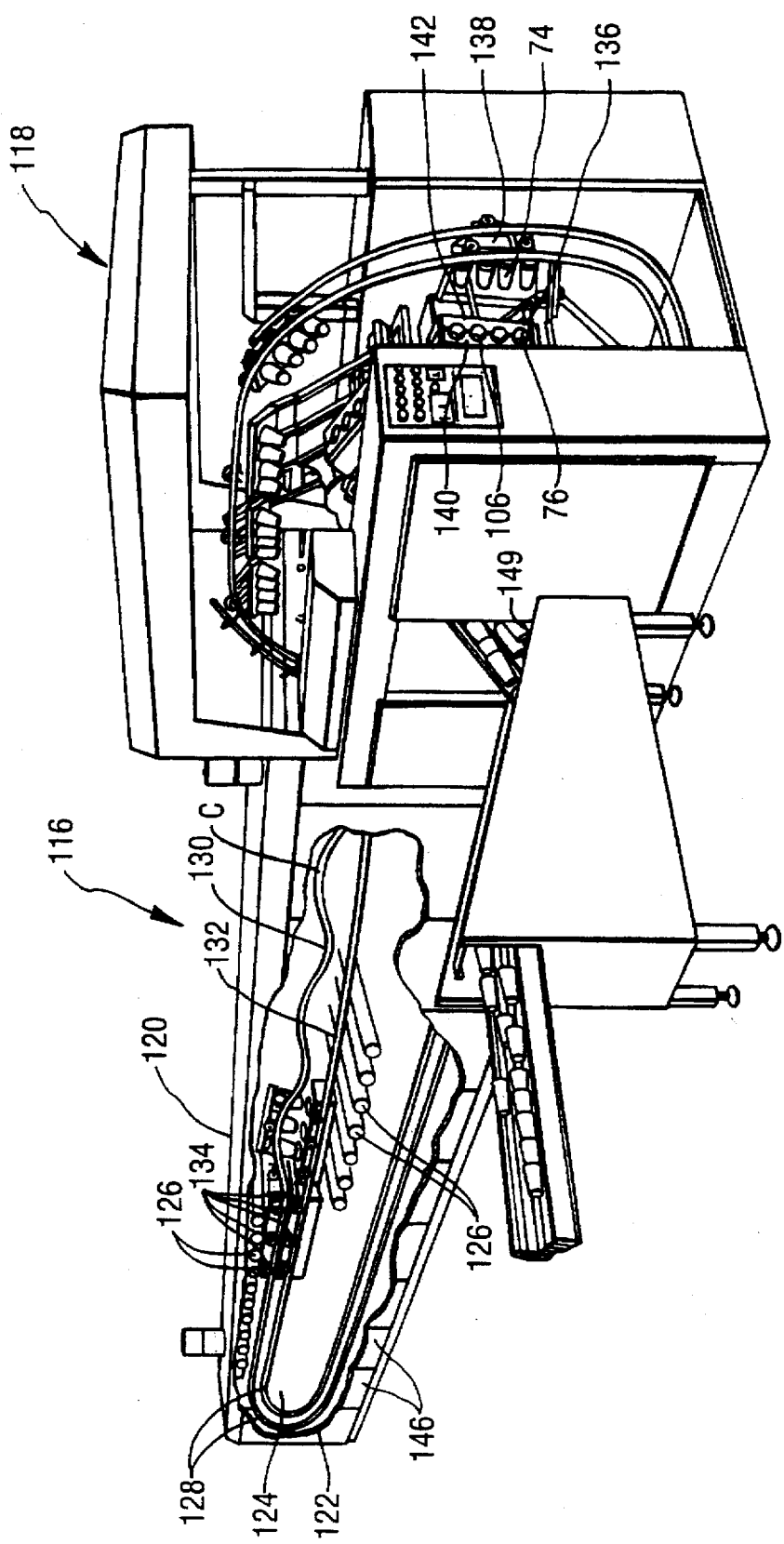
FIG. 15 is a perspective view of a heated molding apparatus.
Figure 16:
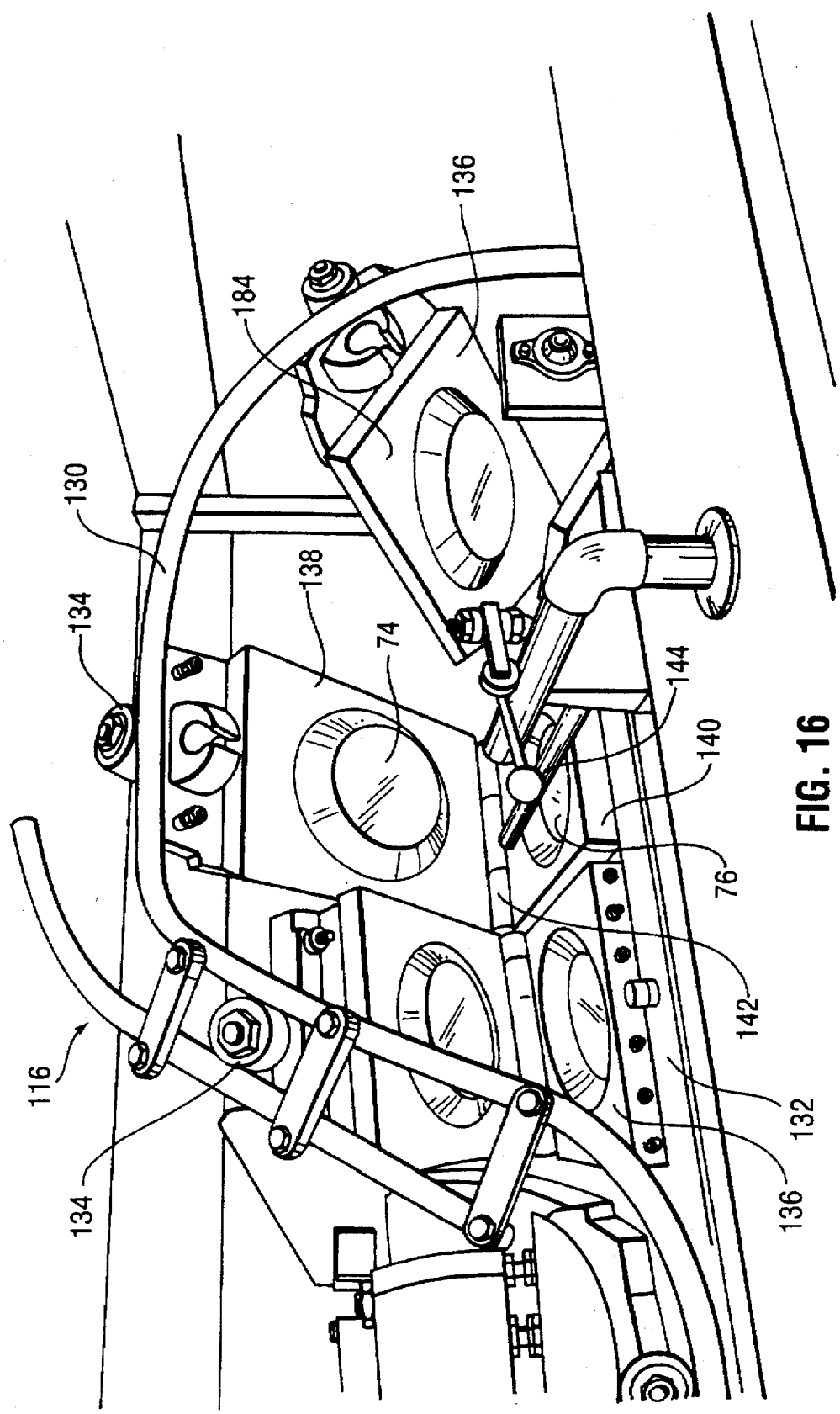
FIG. 16 is a perspective view of a mold in the filling position in the heated molding apparatus of FIG. 15.

One method for mass producing the articles of the present invention is by means of the heated molding apparatus depicted in FIG. 15. As depicted in FIG. 15, heated molding apparatus 116 has a forming station 118 attached to and communicating with a heating apparatus 120. Heating apparatus 120 includes an insulation wall 122 that defines a heating chamber 124. Heating elements 126 are positioned within heating chamber 124 for heating chamber 124. A track system 128 extends through both forming station 118 and heating chamber 124 in a continuous, circular fashion. Track system 128 includes an upper track 130 and a lower track 132. Riding on tracks via wheels 134 are a plurality of interconnected, hingedly attached heated molds 136. As best shown in FIG. 16, each mold has a top plate 138 and a bottom plate 140 with the plates being connected together at one end by a hinge 142. Top plate 138 and bottom plate 140 include a male mold 74 and a female mold 76, respectively, as previously described.

Heated molding apparatus 116 functions as a continuous process to mass produce desired articles. Production of the articles is performed in several stages that are simultaneously being performed by different heated molds 136 in the chain of molds. As shown in FIG. 16, in the first stage, heated molds 136 are open and positioned under a filling spout 144 for receiving the moldable mixture. Heated molds 136 are opened by separating the upper and lower tracks 130 and 132 on which the top and bottom plates 138 and 140 ride, respectively. Filling spout 144 is used to discharge a selected quantity of the moldable mixture into female mold 76.

Once female mold 76 is filled, heated molds 136 advance and are closed as a result of upper and lower tracks 130 and 132 closing together. To facilitate cyclic separation of the molds, as previously discussed, the tracks can be designed to cyclicly diverge and converge as shown at point C on FIG. 15, thereby repeatedly opening and closing the molds. Once cyclic separation is completed, the molds are locked and the forming process is continued.

One preferred mechanism for locking the molds is described in U.S. Pat. No. 4,953,453, issued Sep. 4, 1990, to Franz Haas, Sr. and entitled "Apparatus for Operating Locks of Baking Tongs for Producing Rotatable, Preferably Edible Wafers from Wafer Dough in a Wafer Baking Oven or an Automatic Wafer Baking Machine" (hereinafter the "Haas '453 patent"). For purposes of disclosure, the above patent is incorporated herein by specific reference. The Haas '453 patent discloses a locking mechanism that prevents the forcing of the lock or disruption of the process when the molds fail to properly align and close. More conventional locking mechanisms can be used; however, they must be able to withstand the pressures produced by the heated mixtures.

Referring to FIG. 15, heated molds 136 travel the length of heated apparatus 120, rotate to an inverted position, and then travel back to forming station 118. In accordance with the present invention, heating elements 126 are positioned within heating chamber 124 for heating heated molds 136 as they travel through heating chamber 124. By way of example and not by limitation, heating elements 126 can include electrical heating elements, gas burners, and infrared lights.

The speed at which the molds travel through heating apparatus 120 is in part limited by the required time it takes to stop and fill heated molds 136. The filling time is, of course, dependent on the size of the article being molded. The time that the molds remain in the oven is dependent on several variables, including the solvent content, heating apparatus temperature, and filing volume, as previously discussed. To permit the adjustment of the forming time without modifying the speed of the molds, heating apparatus 120 is built to include unit sections 146. Unit sections 146 can be removed from heating apparatus 120 or new sections can be added to heating apparatus 120 so as to permit selective adjustment of the length of heating apparatus 120. The forming time and temperature are selected so that when heated molds 136 return to forming station 118, the article can be removed from the molds in a form-stable condition.

Figure 17:
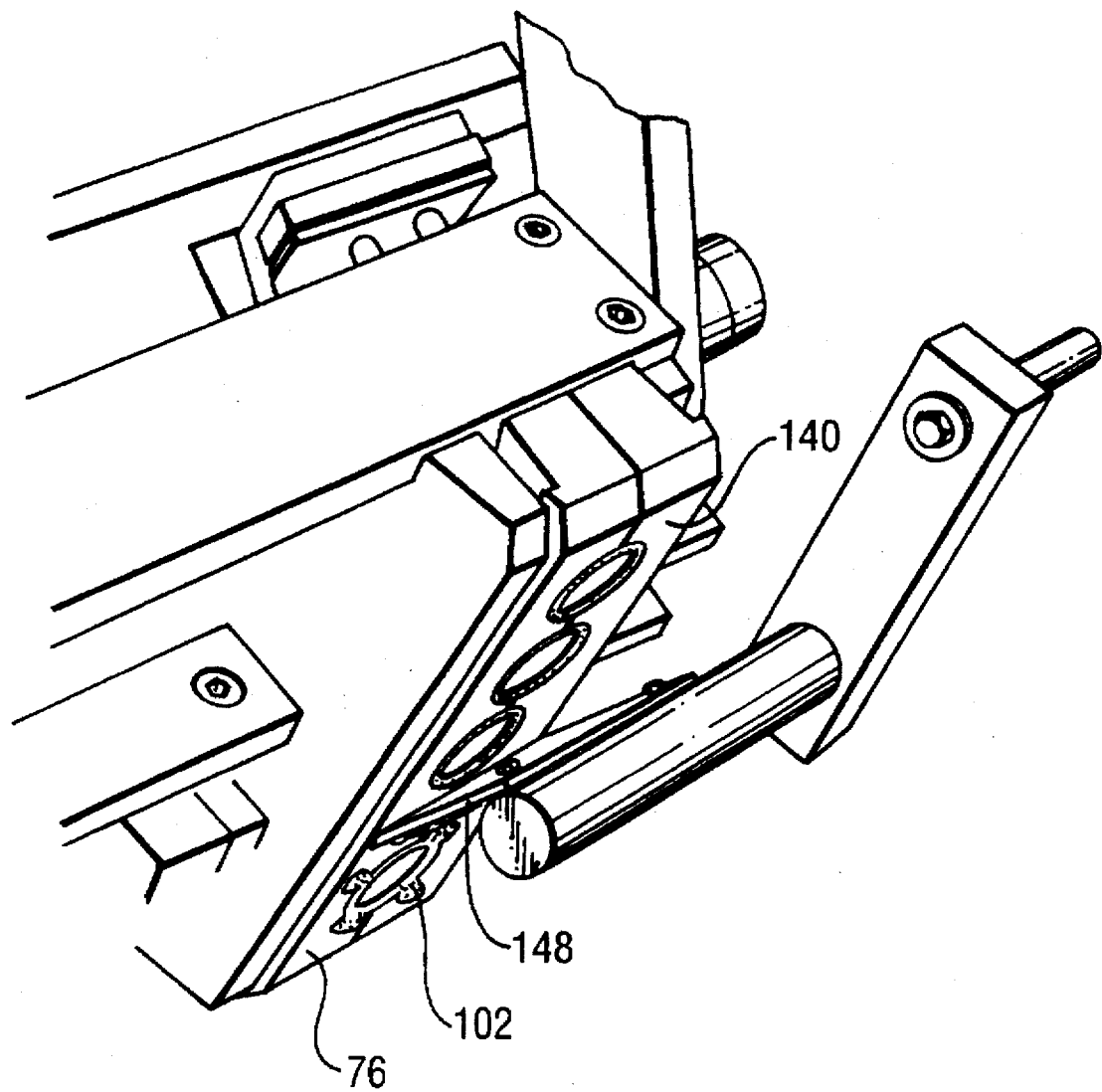
FIG. 17 is a perspective view of a scraper blade operating with the heated molding apparatus of FIG. 15.

Referring again to FIG. 15, once the molds return to forming station 118, heated molds 136 are again opened by separating upper and lower tracks 130 and 132. A scraper blade 148, depicted in FIG. 17, can then be passed over female mold 76 to remove excess material 102 that may have exited through vent holes 98 during the heating process. The article can then be removed from female mold 76.

The articles can be removed from the molds in a variety of different manners. For example, as shown in FIGS. 15 and 16, when dual molds 184 are used, as the separated molds pass through forming station 118, the molds are again rotated so as to invert back into their original orientation. As the molds are rotated, the force of gravity causes the formed articles to fall out of heated molds 136. A conveyer belt can then be used to catch and transfer the articles for subsequent processing. When split molds 106 are used, the removal process entails separating of mold halves 108 and allowing the articles to fall down a collection chute 149 under the force of gravity, as shown in FIG. 15. The articles then continue along a conveyor belt through the remaining processing steps. With the articles removed form the molds, the molds return to filling spout 144 and the process is repeated.

A typical heated molding apparatus 116 may be selected from a variety of commercially available heated molding apparatus, such as the SWAK T, SWAK I, and SWAK wafer baking machines, and the STAK, STAZ and STA ice cream cone machines. These heated molding apparatus can be purchased from Franz Haas Waffelmaschinen Industriegesellschaft M.B.H. of Vienna, Austria. Although the above-listed apparatus have been used in the past primarily for the production of edible wafers and ice cream cones, the listed apparatus can be used in the present invention by inserting the proper mold shapes, which have been selectively modified as previously discussed, depending on the desired processing parameters and the type of article to be produced.

Figure 18:
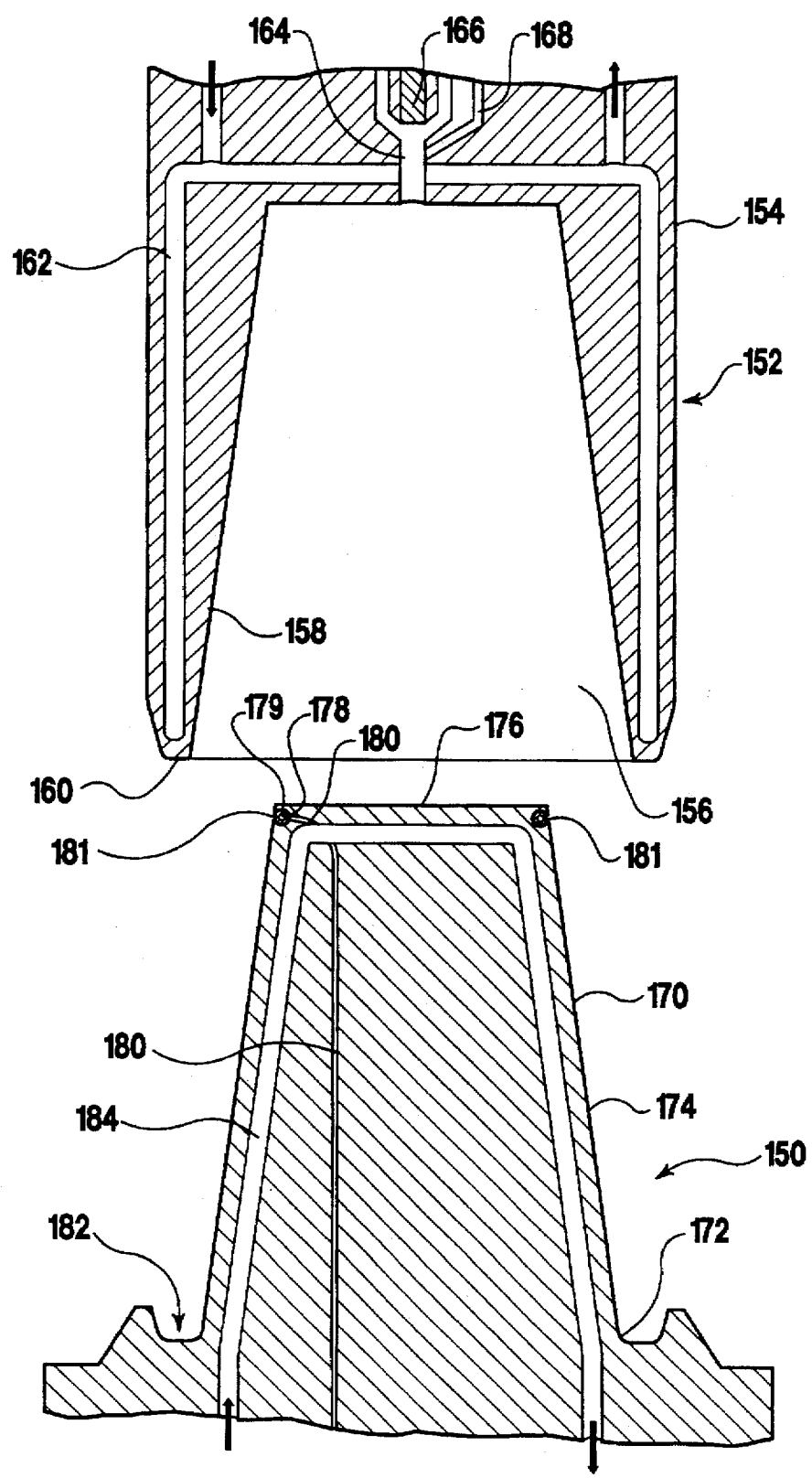
FIG. 18 is a cross-sectional view of a female mold and male mold used in a conventional expanded polystyrene machine.

As an alternative to the Haas heated molding apparatus, conventional expanded polystyrene manufacturing equipment (hereinafter "EPS machine") can be modified to produce the articles of the present invention. As depicted in FIG. 18, a conventional EPS machine comprises a male mold 150 and a female mold 152, the molds being vertically aligned with female mold 152 being on top. Female mold 152 includes a mold body 154 having a receiving chamber 156 defined by a mold wall 158. At one end of mold wall 158 is a mounting lip 160. Located within mold wall 158 is a female wall cavity 162. Communicating with receiving chamber 156 is a filling channel 164 that is selectively opened and closed by a piston 166. Finally, communicating with filling channel 164 is a filling tube 168 that is also opened and closed by piston 166.

Male mold 150 has a die head 170 having a shape substantially complementary to receiving chamber 156. Die head 170 has a base 172, a side wall 174, and a top 176. Circumferentionally located within die head 170 near top 176 is a chamber 178. Positioned within chamber 178 is an expandable vent spring 179. Chamber 178 communicates with a pressure tube 180 positioned within die head 170. Chamber 178 also communicates with the environment through a venting slot 181 that extends between chamber 178 and the exterior of male mold 150. Located at base 172 is a venting groove 182 that is complementary aligned with mounting lip 160. Finally, a male wall cavity 184 is positioned within die head 170 near side wall 174 and top 176.

Figure 19:
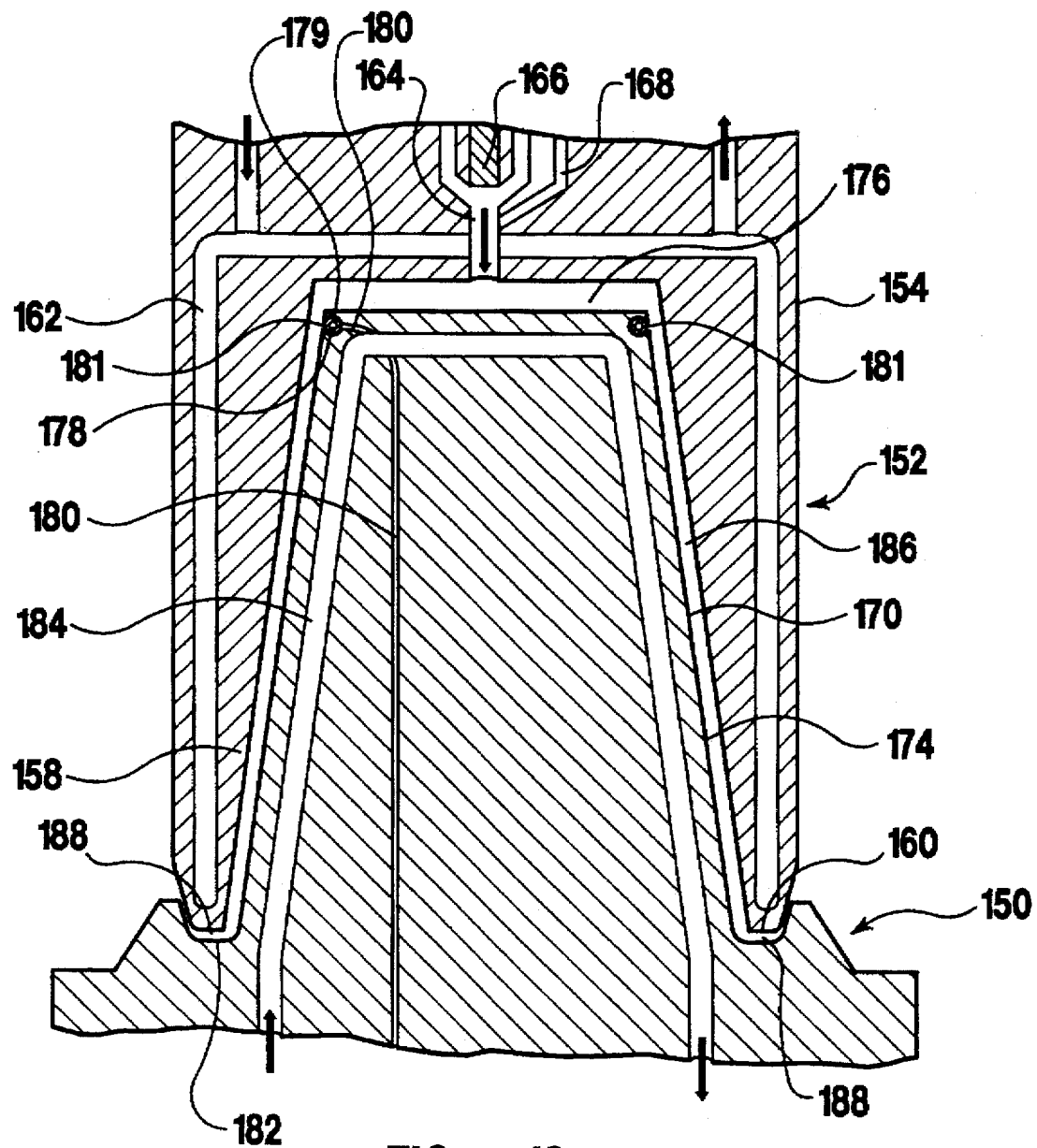
FIG. 19 is a cross-sectional view of the molds of FIG. 18 in a mated position.

During typical operation of the EPS machine, the molds are initially mated, as shown in FIG. 19, to form a mold area 186 between the molds. Air is blown through filling channel 164 into mold area 168 and exits through a vent gap 188 located between mounting lip 160 and venting groove 182. The blowing air causes a suction that pulls polystyrene beads located in filling tube 168 into mold area 186. Venting gap 188 is sufficiently small to prevent the polystyrene beads from escaping.

Once the mold area is filled with the polystyrene beads, filling channel 164 is closed by piston 166. Steam is passed into female wall cavity 162 and male wall cavity 184 heating female mold 152 and male mold 150. Steam is also blown into mold area 186 through pressure tube 180 and venting slot 181. As the steam enters chamber 178 through pressure tube 180, the pressure resulting from the steam causes vent spring 179 to expand, permitting the steam to pass through venting groove 182. Once the steam is stopped, vent spring 179 retracts, preventing material in mold area 186 from entering into chamber 178.

As a result of the heated steam, the polystyrene beads heat, expand, and melt together forming the desired article. Cold water is then passed through female wall cavity 162 and male wall cavity 184 to cool the molds and subsequently harden the polystyrene article. Once the article is formed, the molds are separated and the article removed. The article is most easily removed by blowing air through chamber 178 which pushes the article off male mold 150.

A conventional EPS machine can be used in a couple of different methods to produce the articles of the present invention. In the first method, the EPS machine is used in substantially its normal configuration. By using a mixture having a consistency similar to that of a wet powder, the mixture can be sucked into mold area 186 by passing air through filling channel 164. However, since the mixture of the present invention hardens upon being heated, as opposed to cooled, the wall cavities 162 and 186 should be continually heated by steam or other heated liquids like oil. It is also preferred to insulate and cool filling tube 168. Heating of filling tube 168 can result in the gelation and hardening of the starch-based binder, thereby clogging tube 168. Nevertheless, by providing a cool-down cycle after the heating cycle, it is possible to demold the articles while maintaining enough moisture within the structural matrix to keep it flexible without the need for a subsequent conditioning step.

By regulating the size of vent gap 188, pressure can be built up within mold area 186, thereby producing the foamed articles in the same manner as previously discussed. One advantage of using the EPS machine in its normal configuration is that the final articles remain on male mold 150 after the molds are separated. The article can then be easily removed by blowing air through pressure tube 180.

In an alternative method, the molds of the EPS machine can be inverted so that female mold 152 is vertically aligned below male mold 150 and acts as a receptacle for the moldable mixture. The mixture can then be poured into female mold 152 through an external spout while the molds are open. The molds can then be closed and the article formed in the same manner as previously discussed.

A modified expanded polystyrene (EPS) machine can be used in forming articles from the compositions of the present invention. The modified EPS machine is an injection molding system having thin walls with a lower heat capacity so the heat can be removed easier during hot and cold cycling, which occurs through the use of hot steam and cold water. In using this system, the mold is opened and the mixture is injected therein. The mold is then closed and sealed, and the mixture is heated to about 200° C. The starch in the mixture gelates, becomes plastic, and flows in the heated mold. The vent holes are then opened to expand the material and create a foamed structural matrix. The mold is then cooled before removal of the product, and the starch gel solidifies and maintains conditioning water in the structural matrix. The mold is then opened to remove the finished product which has form stability.

Figure 35:
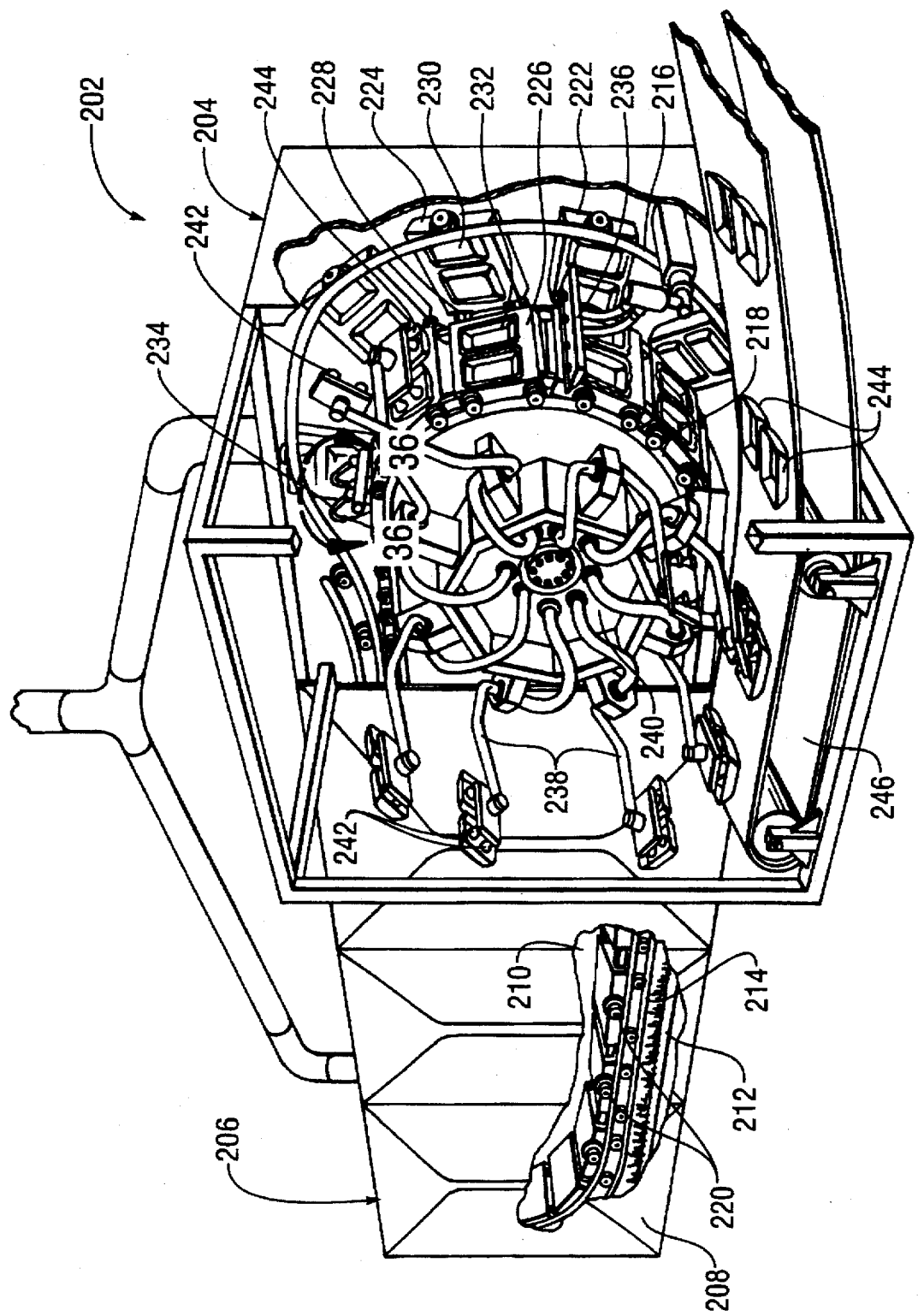
FIG. 35 is a perspective view of a molding apparatus for mass production of articles.

In an alternative embodiment, the articles of the present invention are mass produced by the molding apparatus depicted in FIG. 35, which is commercially available as the BIOMAT 32 starch foam expansion unit from Walterwerk Kiel GmbH. & Co. KG, located in Kiel, Germany. As shown in FIG. 35, molding apparatus 202 has a forming station 204 attached to and communicating with a heating apparatus 206. Heating apparatus 206 includes an insulation wall 208 that defines a heating chamber 210. Heating elements 212 are positioned within heating chamber 210 for providing heat therein. A track system 214 extends through both forming station 204 and heating chamber 210 in a continuous, circular fashion. Track system 214 includes an upper track 216 and a lower track 218. Riding on track system 214 via wheels 220 are a plurality of interconnected heated molds 222.

Figure 36:
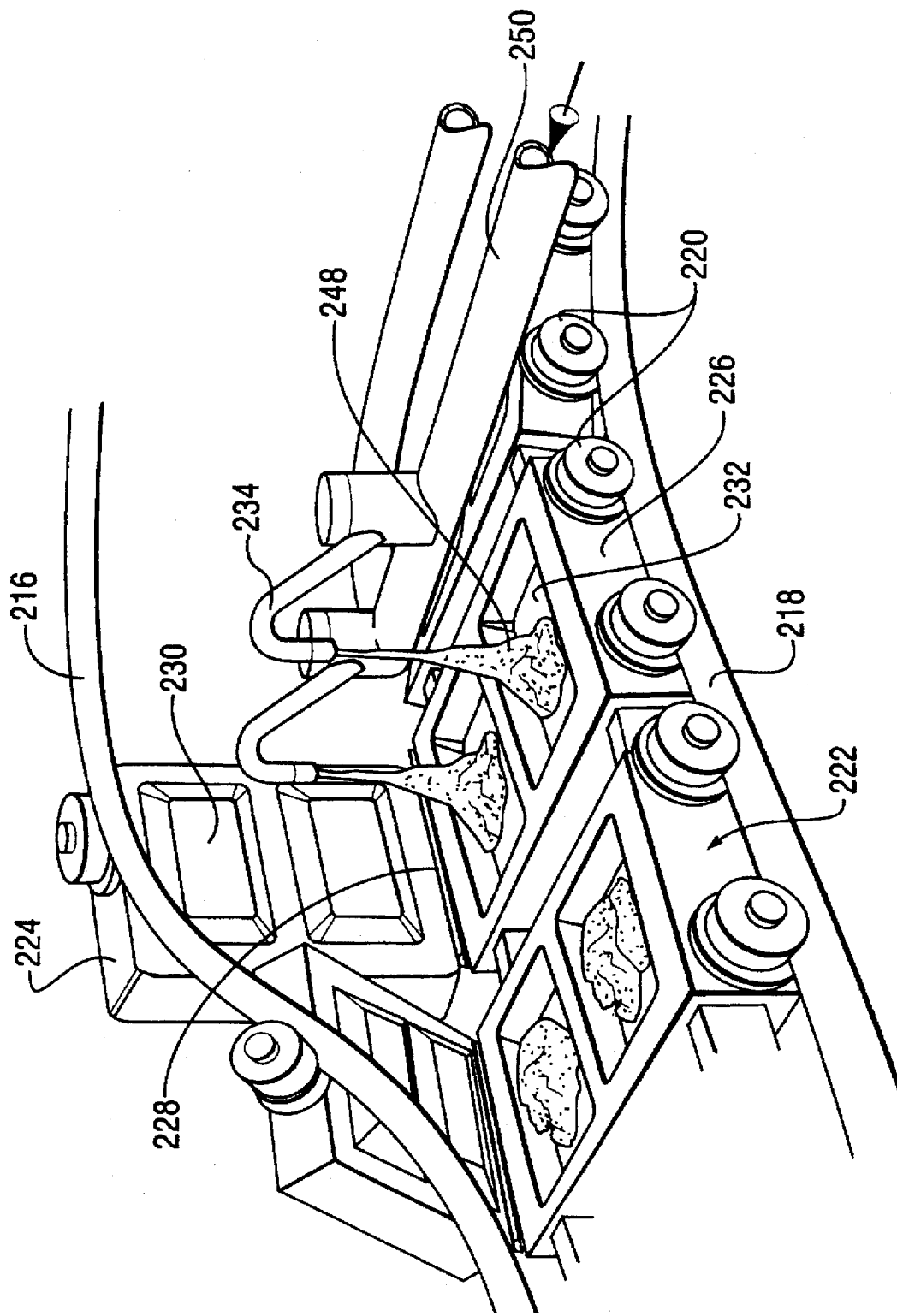
FIG. 36 is a perspective view of a mold in the filling position in the molding apparatus of FIG. 35.

As best shown in FIG. 36, each mold has a top plate 224 and a bottom plate 226, which are connected together at one end by a hinge 228. Top plate 224 and bottom plate 226 include a male mold 230 and a female mold 232, respectively. Molding apparatus 202 functions in a continuous process to mass produce desired articles. Production of the articles is performed in several stages that are simultaneously being performed by different heated molds 222 in the chain of molds.

Referring to FIG. 36, in the first stage, heated molds 222 are open and positioned under a filling spout 234 for receiving a moldable mixture 248. Heated molds 222 are opened by separating upper track 216 and lower track 218 on which top plate 224 and bottom plate 226 ride, respectively. Filling spout 234 is used to discharge a selected quantity of moldable mixture 248 into female mold 232, although this system can be modified to accommodate compositions having greatly varying rheologies. For example, highly viscous or high yield mixtures can be extruded to form a discrete volume of material, which is then separated and dropped into the mold by a cutting means. Once female mold 232 is filled, heated molds 222 advance and are closed as a result of upper track 216 and lower track 218 closing together. Conventional locking mechanisms can be used to lock the mold halves together as long as they are able to withstand the pressures produced by the heated mixtures (up to about 5 Bars)..

Referring to FIG. 35, heated molds 222 travel the length of heating apparatus 206, rotate to an inverted position, and then travel back to forming station 204. Heating elements 212 are positioned within heating chamber 210 for heating heated molds 222 as they travel therethrough. The speed at which heated molds 222 travel through heating apparatus 206 is in part limited by the required time it takes to fill heated molds 222. The filling time is, of course, dependent on the size of the article being molded. The forming time and temperature are selected so that when heated molds 222 return to forming station 204, the formed articles can be removed from the molds in a form-stable condition. Once the molds return to forming station 204, heated molds 224 are again opened by separating upper track 216 and lower track 218. A scraper blade 236 is then passed over female mold 232 to remove excess material that may have exited through vent holes during the heating process.

Formed articles 244 are removed from female mold 232 by vacuum suction cups 242 attached to a plurality of movable arms 238. Vacuum suction cups 242 are made of silicone rubber and are heat resistant up to about 250° C. Arms 238 are attached to the axle of a rotating drum 240 and follow the rotational speed of the axle of drum 240. Movement of drum 240 is controlled by track system 214, with drum 240 positioned within lower track 218. As drum 240 rotates, arms 238 bend in toward the opened heated mold to pick up formed products 244 with suction cups 242. Arms 238 then bend outward from drum 240 and a conveyer belt 246 is used to catch and transfer formed products 244 for subsequent processing such as applying a coating thereto. With formed products 244 removed form heated molds 222, the molds return to filling spout 234 and the process is repeated.

In an alternative process for forming articles of the invention using molding apparatus 202, a moldable mixture 248 is prepared using a Hobart mixer, Eirich mixer, or similar mixer having an 80 gallon capacity. Such a mixer provides enough material for the production of at least about 3000 articles per hour, up to about 14,000 per hours. The moldable mixture is then transferred to a vacuum hopper and pumped using a monopump having one auger through a dispensing pipe 250 to filling spout 234 (FIG. 36). The monopump pushes the material under pressure at a rate of about 6 kg/min. A guillotine mechanism is used to open and shut filling spout 234 for a specific time, preferably for about 0.3 seconds. This allows about 30 grams of the moldable mixture to be dispensed into female mold 232. The filled molds then go through heating apparatus 206 at a rate of 35 cm per second and are heated for about 30–35 seconds. The formed articles are then removed from the molds by vacuum suction cups 242 as described above and are placed on conveyer 246. No subsequent conditioning of the formed articles of the invention is required before being suitable for use.

C. Coatings and Coating Apparatus.

It is within the scope of the present invention to apply coatings or coating materials to the inventive articles, which is often preferable due to the porous nature of the articles. Coatings can be used to alter the surface characteristics of the articles in a number of ways, including sealing and protecting the articles, providing a more finished surface to the articles, and providing additional strength. The use of coatings can provide protection against moisture, base, acid, grease, and organic solvents. Furthermore, coatings can help prevent aggregate and fiber "fly away". Coatings may also provide reflective, electrically conductive, or insulative properties, and can fill in voids on the surfaces of the articles. Coatings provide a smoother, glossier, or scuff-resistant surface, and may even reinforce the article, particularly at a bend, fold, edge or corner. Some of the coatings can also be utilized as laminating materials or as adhesives.

The object of the coating process is usually to achieve a uniform film with minimal defects on the surface of the article. Selection of a particular coating process depends on a number of substrate (i.e., article) variables, as well as coating formulation variables. The substrate variables include the strength, wettability, porosity, density, smoothness, and uniformity of the article. The coating formulation variables include total solids content, solvent base, surface tension, and rheology.

The coating can be applied either after the article is formed or during the forming process. If the coating is applied after the article is formed, various conventional processes such as spraying, dipping, sputtering, and painting can be used. The coating may be applied to the article after formation by using any coating means known in the art of manufacturing paper, paperboard plastic, polystyrene, sheet metal, or other packaging materials, including blade, puddle, air-knife, printing, Dahlgren, gravure, and powder coating. Coatings may be applied by spraying the article with any of the coating materials listed below or by dipping the article into a vat containing an appropriate coating material. The apparatus used for coating will depend on the shape of the article. For example, cups will usually be coated differently than flat plates.

Preferred coating methods include both external and integral coating methods that can be used on the articles formed from the compositions of the present invention. In the external coating method, two different systems can be used. The first is a sprinkle system in which finely powdered wax is dispensed or sprinkled onto the surface of a newly formed product sitting in an open mold, which causes the wax to melt over the surface of the product. The mold temperature is about 200° C. and the temperature on the exposed surface of the product in the open mold is about 100° C. Since the melting point of wax is about 50° C., the wax is easily melted on the surface of the product when sprinkled thereon.

The second system for external coating that may be used is a spray system in which wax is first melted and then sprayed at a temperature higher than the wax melting point so that molten wax is dispersed on the surface of a formed article. The spray system can be used to apply wax to the inside surfaces of a product in a mold or can be used to spray one or both sides of a product that has been demolded and placed on a conveyer. The spray system can be used to apply water based or hot melt coatings such that small droplets of the coating are applied to a product surface and coalescence of the coating particles takes place.

Appropriate organic coatings, which may be used singly or in a variety of mixtures, include shellac; drying oils; reconstituted oils from triglycerides or fatty acids from drying oils to form esters with various glycols (butylene glycol, ethylene glycol), sorbitol, and trimethylol ethane or propane; synthetic drying oils including polybutadiene resin; natural fossil resins including copal (tropical tree resins, fossil and modern), damar, elemi, and sandarac (a brittle, faintly aromatic translucent resin derived from the sandarac pine of Africa); rosins and rosin derivatives including rosin (gum rosin, tall oil rosin, and wood rosin), rosin esters formed by reaction with specific glycols or alcohols; rosin salts (calcium resinate and zinc resinate); polyester resins; epoxy resins, catalysts, and adjuncts; coumarone-indene resin; petroleum hydrocarbon resin (cyclopentadiene type); terpene resins; vinyl resinous substances such as polyvinyl chloride, polyvinyl acetate, polyvinyl alcohol; cellulosic materials (such as carboxymethylcellulose, cellulose acetate, ethylhydroxyethylcellulose); polyethylene and its copolymers and waxes; acrylics and their copolymers; methyl methacrylate; ethyl methacrylate; waxes (paraffin type I, paraffin type II, microcrystalline, polyethylene, sperm oil, bees, and spermaceti); melamine; polyamides; polylactic acid; Biopol® (a polyhydroxybutyrate-hydroxyvalerate copolymer); soybean protein; other synthetic polymers including biodegradable polymers; and elastomers and mixtures thereof. Biopol® is manufactured by ICI in the United Kingdom. Waxes and wax blends, particularly petroleum and synthetic waxes, provide a barrier to moisture, oxygen, and some organic liquids, such as grease or oils. Waxes also allow an article such as a container to be heat sealed. Petroleum waxes are a particularly useful group of waxes in food and beverage packaging, including paraffin waxes and microcrystalline waxes.

In some cases, it may be preferable for the coating to be elastomeric or deformable. Some coatings may also be used to strengthen places where the articles are severely bent. In such cases, a pliable, elastomeric coating may be preferred. A waterproof coating is desirable for articles intended to be in contact with water. If the articles are intended to come into contact with foodstuffs, the coating material will preferably comprise an FDA-approved coating. Polymeric coatings such as polyethylene are useful in forming generally thin layers having low density. Low density polyethylene is especially useful in creating containers which are liquid-tight and even pressure-tight to a certain extent. Polymeric coatings can also be utilized as an adhesive when heat sealed.

Appropriate inorganic coatings include sodium silicate, calcium carbonate, aluminum oxide, silicon oxide, kaolin, clay, ceramic, and mixtures thereof. The inorganic coatings may also be mixed with one or more of the organic coatings set forth above. Aluminum oxide and silicon oxide are useful coatings, particularly as a barrier to oxygen and moisture. These coatings can be applied to the article by any means known in the art, including the use of a high energy electron beam evaporation process, chemical plasma deposition and sputtering. Another method of forming an aluminum oxide or silicon oxide coating involves treating the article with an aqueous solution having an appropriate pH level to cause the formation of aluminum oxide or silicon oxide on the article due to the composition of the article.

If there is moisture contact with an uncoated product, such as contact from food or beverages, the material of the product will be softened. While solvent based coatings can be used, it is preferable to use water based coatings. Preferred coatings that can be used include acrylic based coatings such as various acrylic emulsions, vinyl based coatings including waxes such as paraffin wax, polyvinyl alcohol, polylactic acid, and shellac. When water based coatings are used, the water is removed to coalesce the coating particles on the surface of a formed product.

When water is added with the coating or a water-based coating is used, an additional conditioning component is added to the formed product. The structural matrix of the product will absorb the water from the coating into the matrix to provide additional moisture thereto. The coating can also be flash dried on the surface and at the same time leave the moisture on the inside of the product for conditioning of the matrix.

When using an integral coating method, a material is added to the mixture before it is molded that has approximately the same melting temperature as the peak temperature of the moldable mixture. The individual particles of the integral coating material will tend to migrate to the surface of the article during the heated molding process by the outward flow of the vaporizing water. Upon reaching the surface of the molded article, the coating particles are exposed to elevated temperatures which cause the particles to melt and coalesce together to form a coating over the surface of the product. The coating particles then congeal or solidify at or near the surface of the article upon demolding and cooling of the article. Such integral coating materials may include any material having a melting point that is generally above the boiling point of super heated water within the molded article and at or below the maximum temperature of the surface of the article while it is being molded. Integral coating agents may include, for example, selected waxes, stearates, shellac, polylactic acid, latex or any other plastic or polymeric material having the stated melting criteria.

In another sealing method, nonmigrating materials such as latexes, polyvinyl alcohol, or other plastics are used as internal sealants to create a general water resistance throughout the foamed cellular matrix. These sealing materials are dissolved in water and built into the moldable mixture so that when a product is formed, the sealing material is dispersed throughout the formed structural matrix. When using polyvinyl alcohol (PVA), which is made from polyvinyl acetate, a PVA with a higher hydrolysis is easier to dissolve in water. For example, a 2% solution of PVA has a dissolution time of 15 minutes, a high molecular weight, and a high hydrolysis rate. The dissolving of PVA into solution is also a function of temperature.

D. Printing.

It may be desirable to apply print or other indicia, such as trademarks, product information, container specifications, or logos, on the surface of the article. This can be accomplished using any conventional printing means or processes known in the art of printing paper or cardboard products, including planographic, relief, intaglio, porous, and impactless printing. Conventional printers include offset, Van Dam, laser, direct transfer contact, and thermographic printers. However, essentially any manual or mechanical means can be used.

The type of printing and printer used depends in part on the shape of the article. For example, flat plates will require a different printing apparatus than a cup. In addition, the molds can be specially designed to provide embossing on the surface of the article. The article can also be provided with a watermark. Because the articles have a relatively high porosity, the applied ink will tend to dry rapidly. One skilled in the art will appreciate that the article porosity and ink quantities must be compatible. In addition, decals, labels or other indicia can be attached or adhered to the article using methods known in the art.

E. Physical Properties of the Articles.

In view of the foregoing, it is possible, by using a microstructural engineering approach, to obtain a wide variety of articles of varying shapes, strengths, flexibilities, stiffness, insulation, and other physical properties. In general, the flexural strength of the final molded articles will preferably be in a range of about 0.5 MPa to about 30 MPa, more preferably from about 1 MPa to about 15 MPa, and most preferably from about 2 MPa to about 10 MPa. The tensile strength of the final molded articles will preferably be in a range of about 0.5 MPa to about 20 MPa, more preferably from about 0.75 MPa to about 10 MPa, and most preferably from about 1 MPa to about 5 MPa. The tensile and flexural fracture energy, defined as the area under a stress/strain curve, of the final molded articles will preferably be in a range from about 100 J/m$^2$ to about 10,000 J/m$^2$, more preferably from about 300 J/m$^2$ to about 5000 J/m$^2$, and most preferably from about 600 J/m$^2$ to about 1000 J/m$^2$ Because of the combination of high strength and low density made possible by the compositions and methods of the present invention, the specific strength or fracture energy of the articles, or strength or fracture energy values that have been normalize with respect to the density of the articles, will be significantly higher than what was possible according to the prior art. For example, the specific flexural strength will preferably be in a range of about 0.5 MPa/(g/cm$^3$) to about 60 MPa/(g/cm$^3$), more preferably from about 1 MPa/(g/cm$^3$) to about 40 MPa/(g/cm$^3$), and most preferably from about 2 MPa/(g/cm$^3$) to about 20 MPa/(g/cm$^3$). The specific tensile strength will preferably be in a range of about 0.5 MPa/(g/cm$^3$) to about 30 MPa/(g/cm$^3$), more preferably from about 0.75 MPa/(g/cm$^3$) to about 20 MPa/(g/cm$^3$), and most preferably from about 1 MPa/(g/cm$^3$) to about 12 MPa/(g/cm$^3$). The specific fracture energy will preferably be in a range of about 1000 (J/m$^2$)/(g/cm$^3$) to about 10,000 (J/m$^2$)/(g/cm$^3$), more preferably from about 2000 (J/m$^2$)/(g/cm$^3$) to about 7500 (J/m$^2$)/(g/cm$^3$), and most preferably from about 3000 (J/m$^2$)/(g/cm$^3$) to about 5000 (J/m$^2$)/(g/cm$^3$).

Because of the reduced amount of starch that is required in order to impart the required strength and toughness properties to the molded article, it is useful to normalize the mechanical properties of the inventive articles with respect to the weight fraction of the starch-based binder within a particular article. As a result, the articles of the present invention will preferably have a normalized flexural strength with respect to the weight fraction of starch-based binder of about 5 MPa/(wt. fraction of starch-based binder) to about 100 MPa/(wt. fraction of starch-based binder), more preferably from about 10 MPa/(wt. fraction of starch-based binder) to about 75 MPa/(wt. fraction of starch-based binder), and most preferably from about 20 MPa/(wt. fraction of starch-based binder) to about 60 MPa/(wt. fraction of starch-based binder). The articles will preferably have a normalized tensile strength with respect to the weight fraction of starch-based binder of about 3 MPa/(wt. fraction of starch-based binder) to about 50 MPa/(wt. fraction of starch-based binder), more preferably from about 4 MPa/(wt. fraction of starch-based binder) to about 30 MP/(wt. fraction of starch-based binder), and most preferably from about 5 MPa/(wt. fraction of starch-based binder) to about 20 MPa/(wt. fraction of starch-based binder). The articles will preferably have a normalized fracture energy with respect to weight fraction of starch-based binder of about 2000 (J/m$^2$)/(wt. fraction of starch-based binder) to about 30,000 (J/m$^2$)/(wt. fraction of starch-based binder), more preferably from about 3000 (J/m$^2$)/(wt. fraction of starch-based binder) to about 15,000 (J/m$^2$)/(wt. fraction of starch-based binder), and most preferably from about 5000 (J/m$^2$)/(wt. fraction of starch-based binder) to about 10,000 (J/m$^2$)/(wt. fraction of starch-based binder).

The range of strain of the articles (i.e., the amount of strain before rupture) will preferably be in a range from about 1% to about 15%, more preferably from about 1% to about 10%, and most preferably from about 1% to about 5%.

Finally, the articles of the present invention have a generally low density, which reduces the overall weight per article as well as the mass of material that must be used initially to produce the articles and then discarded or recycled when the article has completed the duration of its intended use. In general, the articles of the present invention will preferably have a density in a range from about 0.05 g/cm$^3$ to about 1 g/cm$^3$, more preferably from about 0.1 g/cm$^3$ to about 0.5 g/cm$^3$, and most preferably from about 0.15 g/cm$^3$ to about 0.25 g/cm$^3$.

The articles can be characterized as having a laminate-type structure; there is an outer skin layer having a relatively high density and an interior foam portion having a lower density. The outer skin layer is created instantaneously when the moldable mixture is contacted with the mold. The pores formed in the interior foam portion can have a diameter of about 0.25 mm or greater. The interior foam portion hardens when the moisture is removed during the molding process. By increasing the water content, the density of the final product will be lowered, but a longer heated molding time is required since more water must be driven off.

VI. EXAMPLES OF THE PREFERRED EMBODIMENTS

Outlined below are a number of examples showing the manufacture of articles from the inorganically filled, starch-bound, moldable mixtures of the present invention. The examples compare the properties of the articles for varying compositions and processing conditions. In the first group of examples, articles were formed with inorganic fillers but without fibers, which articles required conditioning to obtain adequate flexibility. After the first group of examples follow later examples in which fibers were included by first dispersing them by means of a high viscosity, high yield stress mixture. The elimination of the conditioning step as well as the dramatic improvement in toughness and flexibility of the articles by including the well-dispersed fibers clearly demonstrate the advantage of including fibers.

EXAMPLES 1-13

Drinking cups were formed from moldable mixtures containing different types of inorganic aggregates to determine the effects of the different aggregates. Each of the moldable mixtures had the following basic mix design measured by weight:

| | |
|---|---|
| 39.8% | Stalok 400 (modified potato starch) |
| 9.95% | inorganic aggregate |
| 49.75% | water |
| 0.5% | magnesium stearate |

Each moldable mixture was prepared in a small Hobart mixer. First, the dry ingredients (including the inorganic aggregate, starch, and magnesium stearate) were completely mixed. Then the water was added slowly while the dry materials were being mixed until a homogeneous mixture was obtained. The mixtures were extracted from the Hobart mixing bowl using a syringe. The weight of the moldable material used to manufacture a cup for each mixture was determined by first weighing the syringe containing the moldable mixture, expelling the contents of the syringe into the molding apparatus, and then weighing the syringe.

The molding system included a male mold made out of tooled brass and a female mold made out of tooled steel, the molds being configured substantially according to FIG. 8. The molds were designed to produce 12 oz. drinking cups having a smooth surface and a thickness of about 4 min. The male mold contained four vent grooves that formed four vent holes.

The cups of Examples 1-13 were obtained by heating each selected moldable mixture between the molds at a temperature of about 200° C. Once the articles became significantly form-stable, they were removed from the molds and placed in an oven for about 1.5 hours at a temperature of 105° C. to remove the remaining moisture. The moisture was removed so that subsequent testing of the cups would better reflect the effects of the components as opposed to the effects of the starch-based binder moisture content. It was assumed that the weight loss of the cup during drying in the oven was a loss of water. The measured weight loss was thus used to determine the moisture of cups upon being removed from the mold. The cups were then sealed in plastic bags to maintain a constant humidity until the cups could be tested.

Summarized below is a list of the selected inorganic aggregates and the resulting properties of the cups formed from each of the mix designs:

| Example | Inorganic Aggregate | Cup Density (g/cc) | Moisture Out of Mold (% W/W) | Thermal Conduct. (W/m · K) | Thermal Resist. (ft$^2$ · h · °F/ BTU · in) |
|---|---|---|---|---|---|
| 1 | Gamma Sperse | 0.190 | 3.0 | 0.046 | 3.15 |
| 2 | Carbital 50 | 0.185 | 2.5 | 0.044 | 3.25 |
| 3 | R040 | 0.215 | 2.7 | 0.045 | 3.20 |
| 4 | Mica 4k | 0.205 | 2.6 | 0.048 | 3.10 |
| 5 | Glass Bubbles B38/4000 | 0.190 | 4.9 | 0.047 | 3.15 |
| 6 | Polymica 400 | 0.195 | 2.0 | 0.049 | 2.90 |
| 7 | Aerosil R972 | 0.125 | 4.2 | 0.040 | 3.68 |
| 8 | Aerosil 130 | 0.135 | 4.0 | 0.054 | 2.70 |
| 9 | Aerosil 200 | 0.145 | 4.1 | 0.046 | 3.15 |
| 10 | Aerosil 380 | 0.155 | 4.3 | 0.048 | 3.10 |
| 11 | Cabosil EH5 | 0.140 | 2.8 | 0.041 | 3.60 |
| 12 | Wollastonite | 0.195 | 2.1 | N/A | N/A |
| 13 | Sil-co-sil Silica Sand | 0.200 | 2.1 | N/A | N/A |

| Example | Inorganic Aggregate | Energy to Failure (mJ) | Displacement to Failure (%) | Peak Load (N) | Stiffness (N/m) |
|---|---|---|---|---|---|
| 1 | Gamma Sperse | 6.0 | 3.1 | 5.00 | 2.5 |
| 2 | Carbital 50 | 9.0 | 3.5 | 5.10 | 2.7 |
| 3 | R040 | 7.0 | 3.1 | 5.05 | 2.6 |
| 4 | Mica 4k | N/A | N/A | N/A | N/A |
| 5 | Glass Bubbles B38/4000 | 9.5 | 3.2 | 5.20 | 3.4 |
| 6 | Polymica 400 | 10.0 | 2.7 | 5.15 | 2.4 |
| 7 | Aerosil R972 | 7.0 | 4.0 | 4.95 | 1.9 |
| 8 | Aerosil 130 | 7.0 | 3.5 | 4.90 | 1.8 |
| 9 | Aerosil 200 | 9.0 | 3.5 | 5.00 | 2.1 |
| 10 | Aerosil 380 | 6.0 | 3.1 | 4.95 | 2.2 |
| 11 | Cabosil EH5 | 7.0 | 3.4 | 4.95 | 2.0 |
| 12 | Wollastonite | 8.5 | 3.1 | 5.10 | 2.9 |
| 13 | Sil-co-Sil Silica Sand | 8.0 | 2.8 | 5.05 | 3.0 |

The properties analyzed include thermal properties and mechanical properties. The thermal properties include thermal conductance and thermal resistivity which were determined by a transient hot-wire method. Three measurements were recorded for the thermal conductivity of the side walls of the cups and the average value was reported. Mechanical properties were defined by developing a test that would simulate the pinching between the thumb and the other four fingers that a cup might experience during use. The results served as a means to compare cups produced from different compositions and under different conditions. The strength and ductility were not easily quantifiable due to the complex geometry. Instead the data is reported without normalization to the cross-sectional area.

The cups were positioned on an inclined platform. The inclination was adjusted so that the side edge of the cup was normal to the loading direction. The area below the top rim of the cup was chosen as the point of load application. This resulted in the most reproducible results. Loads were applied to the cups at the rate of 15 mm/min. until a clear failure was observed. The displacements and the corresponding loads were recorded, thereby providing a comparative evaluation of the mechanical properties for articles made from the different mix designs. Using the defined testing method, a comparison was made on the basis of peak load, maximum displacement before failure, energy absorbed during fracture, and stiffness. The energy of failure is the area under the load displacement curve measured from the origin to the point of complete fracture. Each of the above properties are based on a statistical average of seven identical tests.

The tests showed that the fumed silica aggregates (Aerosil R972, 130, 200, 380 and Cabosil EH5) resulted in a density of about 30% lower compared to those where a different inorganic aggregate was added. The other inorganic aggregates had a limited effect on the density of the cups, with the exception of Polymica, which also decreased the density by about 30% relative to cups using the other inorganic aggregates. The dry peak load and stiffness of the cups containing fumed silica were affected to the same extent as the density; approximately 30% of each was lost compared to cups produced without fumed silica. The dry displacement-to-failure and energy-to-failure measurements exhibited little or no change due to the addition of inorganic materials.

The addition of glass bubbles, Wollastonite, Polymica 400, and silica sand did not affect the energy-to-failure, displacement-to-failure, peak load, and stiffness to any significant degree. Mica 4k demonstrated a 30% increase in peak load. The value for thermal properties were found to be within a band width of about ±10% of the value for cups produced with no inorganic aggregate. The values were independent of the type of inorganic aggregate used.

Based on the above tests, fumed silica aggregates appear to be less preferred since they adversely affect the mechanical properties of the articles. In contrast, the other inorganic aggregates can be used to replace at least 20% by weight of the starch-based binder without significantly affecting the mechanical properties of the articles. It is believed that fumed silicas produce a detrimental effect as a result of their low strength and high specific surface area in comparison to the other inorganic aggregates.

EXAMPLES 14–18

Cups were made using collamyl starch with different concentrations of calcium carbonate to determine the effect of using collamyl starch. The same procedures and apparatus set forth in Examples 1–13 were used to make and test the cups of Examples 14–18. A base mixture was first prepared by combining the following components by weight:

| | |
|---|---|
| collamyl starch | 49.75% |
| water | 49.75% |
| magnesium stearate | 0.5% |

RO40 calcium carbonate was added to the mixture in amounts of 20%, 40%, 50%, and 60% by total weight of the calcium carbonate and starch-based binder, while maintaining a total starch and calcium carbonate concentration of 49.75% by weight of the mixture. Summarized below are the properties of the articles made using different percentages of calcium carbonate.

| Example | Calcium Carbonate Aggregate (weight %) | Density (g/cc) | Thermal Conduct. W/m · K | Energy to Fail. (mJ) | Displacement to Failure (%) | Peak load (N) | Stiffness (N/m) |
|---|---|---|---|---|---|---|---|
| 14 | 0 | 0.17 | 0.043 | 6 | 3.5 | 4.5 | 1.9 |
| 15 | 20 | 0.17 | 0.043 | 7 | 4.3 | 4.5 | 1.7 |
| 16 | 40 | 0.24 | 0.046 | 7 | 3.5 | 5.2 | 2.2 |
| 17 | 50 | 0.27 | 0.045 | 7 | 3.2 | 5.8 | 2.5 |
| 18 | 60 | 0.32 | 0.053 | 7 | 2.6 | 6.5 | 3.5 |

The increase in density was negligible for the first 20% of RO40 calcium carbonate that was added. For higher concentrations, the increase was significant, being about 2% for each weight percent of added RO40. Increases in the thermal conductivity followed a similar pattern as for the density. The increase in thermal conductivity for concentrations of RO40 exceeding 20% was about 0.5% per percent of added RO40. The fracture energy and displacement-to-failure for the cups was largely unaffected by the addition of RO40. The peak load increased linearly at the rate of about 1% per percent of added RO40. The stiffness curve was similar to the density curve; a relatively flat region up to 20% RO40 and a linear increase for higher concentrations. The rate of increase in stiffness was approximately 1% for each percent of added RO40 in mixtures exceeding 20% RO40.

Based on the above observations, collamyl starch can be used to make the articles of the present invention. Furthermore, relatively high concentrations of calcium carbonate can be added to mixtures containing collamyl starch without significantly reducing the desired mechanical properties.

EXAMPLES 19–26

Cups were made using different types of admixtures to determine their effects, if any, on the properties of the mixtures. The same procedures and apparatus set forth in Examples 1–13 were used to make and test the cups of the present examples. A base mixture was first prepared by combining the following components by weight:

| | |
|---|---|
| 39.8% | Stalok 400 (modified potato starch) |
| 9.95% | RO40 calcium carbonate |
| 49.5% | water |
| 0.5% | magnesium stearate. |

Admixtures, including Methocel® 240, Tylose® 15002 and polyvinyl alcohol (PVA), were then combined to the mixture by weight percentage of the total solids in the mixture. Summarized below is a list of the moldable mixtures and the properties resulting from their use.

| Example | Admixtures (weight %) | Density (g/cc) | Thermal Conduct. (W/m · K) | Energy to Fail. (mJ) | Displacement to Failure (%) | Peak load (N) | Stiffness (N/m) |
|---|---|---|---|---|---|---|---|
| 19 | None | 0.26 | 0.045 | 4 | 2.2 | 4.5 | 2.8 |
| | PVA | | | | | | |
| 20 | 1.9 | 0.26 | 0.046 | 6 | 3.1 | 5.5 | 2.7 |
| 21 | 2.9 | 0.27 | 0.048 | 5 | 2.6 | 5.5 | 3.3 |
| 22 | 3.4 | 0.26 | 0.044 | 4 | 2.8 | 5.0 | 2.8 |
| | Mediocel ® 240 | | | | | | |
| 23 | 0.5 | 0.19 | 0.045 | 6 | 3.4 | 5.5 | 2.3 |
| 24 | 1.0 | 0.18 | 0.052 | 8 | 6.0 | 4.5 | 0.9 |
| | Tylose ® 15002 | | | | | | |
| 25 | 0.5 | 0.23 | 0.044 | 7 | 4.1 | 5.0 | 1.8 |
| 26 | 1.0 | 0.19 | 0.049 | 3 | 3.1 | 3.5 | 1.7 |

The addition of PVA was shown to have little effect on the densities, thermal conductivities, or mechanical properties of the cups made therefrom. Methocel® 240 and Tylose® 15002 affected the density slightly. The density decreased just over 20% per each addition of 1% of either admixture. The thermal conductivity increased about 10% for the same additions. Methocel® 240 had a positive effect on the energy and displacement-to-failure measurements for dry cups. The energy-to-failure values doubled for each 1% addition, whereas the displacement-to-failure values showed an improvement of 2.5 times. The peak load dropped about 20% for each 1% addition of Methocel® 240, while the stiffness fell more than 70%. A 0.5% addition of Tylose® 15002 increased the energy-to-failure by 60%, the displacement-to-failure by 80% and the peak load by 10%. These increases disappeared with a further (0.5%) addition of Tylose® 15002. The stiffness of dry cups was halved by additions of 1% of either Methocel® or Tylose®.

Generally, PVA was found to have a minimal impact on the properties of the formed cups. Methocel® 240 and Tylose® 15002 were found to either maintain or improve the properties of the cups at lower concentrations. The benefits, however, were lost as the concentration of each was increased.

EXAMPLES 27–31

Cups were made using different amounts of the cross-linking admixture Sunrez 747 to determine its effect on the moldable mixture. The same procedures and apparatus set forth in Examples 1–13 were used to make and test the cups of the following examples. A base mixture was first prepared by combining the following components by weight:

| | |
|---|---|
| 28.15% | Stalok 400 (modified potato starch) |
| 19.9% | RO40 calcium carbonate |
| 1.7% | PVA |
| 49.75% | water |
| 0.5% | magnesium stearate. |

The base mixture was then varied by incrementally increasing the concentration of Sumez 747 by weight of total solids in the mixture over a range from 2% to 20%. Summarized below are the percentages of Sunrez 747 and the corresponding properties of the resulting cups.

| Example | Sunrez 747 (weight %) | Density (g/cc) | Thermal Conduct. W/m · K | Energy to Fail. (mJ) | Displacement to Failure (%) | Peak load (N) | Stiffness (N/m) |
|---|---|---|---|---|---|---|---|
| 27 | 0 | 0.26 | 0.044 | 4 | 2.8 | 4.8 | 2.5 |
| 28 | 2 | 0.25 | 0.048 | 5 | 2.8 | 5.0 | 2.6 |
| 29 | 5 | 0.24 | 0.048 | 4 | 2.8 | 4.8 | 2.5 |
| 30 | 10 | 0.23 | 0.048 | 7 | 4.4 | 4.2 | 1.5 |
| 31 | 20 | 0.24 | 0.046 | 4 | 3.4 | 4.0 | 1.8 |

The tests showed that Sunrez 747 had limited effect on the cup density. Initially, the density decreased about 2% for each percent of added Sunrez 747. This relationship persisted up to about 10% of the admixture, after which the cup density increased slightly. The thermal conductivity showed an initial increase of approximately 4% for the first 2% of added Sunrez 747, but then leveled out. The mechanical properties of the cups also peaked early with the addition of Sunrez 747. The energy and displacement-to-failure of cups showed only minor increases up to 10% and then fall off slightly again. The peak load was fairly level with an apex at 2%. The stiffness curve approximates a step function. There was a plateau where there was no effect of Sunrez 747 addition up to 5%. There was a dramatic decrease in stiffness, roughly 50%, between 5 and 10%; thereafter the stiffness was not affected. In general, moderate improvements in the various properties were found where lower concentrations of Sunrez 747 were added.

EXAMPLES 32–39

Five mix designs were evaluated using varying concentrations of calcium carbonate (RO40) and different types of starch in order to determine the minimum processing time and filling weight at four processing temperatures (160° C., 180° C., 200° C., and 220° C). As used in the examples, specification, and appended claims, the term "processing time" refers to the time necessary to heat the mixture into a form-stable article. The composition of the five mixtures were as follows:

|  | Stalok 400 (g) | Hylon VII (g) | RO40 (g) | Mg Stearate (g) | Water (g) |
|---|---|---|---|---|---|
| Mixture 1 | 500 | 0 | 0 | 5 | 500 |
| Mixture 2 | 350 | 50 | 100 | 5 | 450 |
| Mixture 3 | 300 | 50 | 150 | 5 | 440 |
| Mixture 4 | 250 | 50 | 200 | 5 | 425 |
| Mixture 5 | 200 | 50 | 250 | 5 | 410 |

Hylon VII is a type of modified corn starch that was substituted for part of the Stalok 400. The moldable mixtures were prepared using the procedures set forth in Examples 1–13. Once the mixtures were prepared, a Haas LB-STA machine was used to make 16 oz. cups having thicknesses of about 4 mm and waffled exteriors. The resulting filling weights and processing times at the selected temperatures are summarized as follows:

| Example | Temp. (°C.) | Mixture 1 | Mixture 2 | Mixture 3 | Mixture 4 | Mixture 5 |
|---|---|---|---|---|---|---|
| | | | Processing Time (sec) | | | |
| 32 | 220 | 40 | 40 | 40 | 40 | 40 |
| 33 | 200 | 50 | 50 | 50 | 45 | 45 |
| 34 | 180 | 75 | 75 | 75 | 75 | 75 |
| 35 | 160 | 170 | 170 | 170 | 165 | 160 |
| | | | Filling Weight (g) | | | |
| 36 | 220 | 30.5 | 32.2 | 34.4 | 37.9 | 41.6 |
| 37 | 200 | 33 | 31.5 | 35.6 | 39.3 | 43.9 |
| 38 | 180 | 31.4 | 33.5 | 35.5 | 37.6 | 44.1 |
| 39 | 160 | 31.7 | 33.7 | 34.1 | 39.7 | 43.9 |

As expected, the tests revealed that the processing times decreased as the processing temperatures increased. The decrease in processing time was greatest for increases in processing temperatures where less calcium carbonate was included. However, the processing time at the lower molding temperature decreased as the amount of calcium carbonate was increased. The tests also revealed that the minimum filling weight increased with higher concentrations of calcium carbonate, although the filling weight was independent of the mold temperature.

EXAMPLES 40–44

Using the same process as in Examples 1–13, 12 oz. cups were made using dies at a temperature of 200° C. The mixture for manufacturing the cup consisted of the following components by weight:

| | |
|---|---|
| 24.95% | Stalok 400 (modified potato starch) |
| 19.9% | RO40 calcium carbonate |
| 4.9% | Hylon VII (modified corn starch) |
| 49.75% | water |
| 0.5% | magnesium stearate. |

The dried cups were placed in a high humidity chamber having a relative humidity of about 95% and a temperature of about 45° C. The cups were removed after varying levels of moisture had been absorbed by the starch-bound structural matrix of the cups and tested to determine their mechanical properties. The respective moisture contents and corresponding mechanical properties are outlined below:

| Example | Moisture Content | Peak Load (N) | Displacement to Failure (%) | Energy (mJ) |
|---|---|---|---|---|
| 40 | 0 | 5.5 | 2.9 | 5 |
| 41 | 2 | 8.5 | 3.7 | 12 |
| 42 | 5.5 | 10.5 | 11.8 | 45 |
| 43 | 7.5 | 9.0 | 23.5 | 65 |
| 44 | 9.5 | — | 24.3 | 40 |

The test results reveal a roughly linear correlation between the moisture content and the mechanical properties for low moisture contents. As the moisture content increased, the mechanical properties improved until the moisture content reached 7.5%, after which they deteriorated slightly.

EXAMPLES 45–47

Using the same processing parameters set forth in Examples 1–13, 12 oz. cups were made from moldable mixtures having varying percentages of calcium carbonate and relatively constant viscosities to determine the effect of calcium carbonate on the required water content and time for removing the water. Summarized below are the compositions tested and the required times to produce a form-stable article having a finished surface.

| Example | Calcium Carbonate (g) | Starch-based binder (g) | Magnesium Stearate (g) | water (g) | Process Time (sec) |
|---|---|---|---|---|---|
| 45 | 250 | 250 | 10 | 425 | 50–55 |
| 46 | 350 | 150 | 10 | 350 | 35–40 |
| 47 | 400 | 100 | 10 | 285 | 30 |

The results show that with increased concentrations of calcium carbonate, less water is needed to obtain a mixture having a constant viscosity. Furthermore, as a result of having less water, the required processing time to produce a form-stable article was decreased.

EXAMPLES 48–54

Articles were made using different types of calcium carbonate to determine the effect of the particle size and packing density of the inorganic aggregate. Mixtures were made from three different types of calcium carbonate: Carbital 75, RO40, and Marblend. The basic chemical composition for each type of calcium carbonate was the same; however, the particle size distribution, average particle size, and natural packing density (or uncompressed packing density), as shown below, varied greatly.

| Type of Calcium Carbonate | Average Particle Size (μm) | Natural Packing Density |
|---|---|---|
| Carbital 75 | 2.395 | 0.3593 |
| RO40 | 40.545 | 0.6869 |
| Marblend | 68.468 | 0.7368 |

The gradation for each type of calcium carbonate was as follows:

| Sieve Opening (μm) | Retained % | Passing % |
|---|---|---|
| Gradation of Carbital 75 | | |
| 18.00 | 0.00 | 100.00 |
| 5.470 | 10.00 | 90.00 |
| 3.043 | 25.00 | 75.00 |
| 1.583 | 50.00 | 50.00 |
| 0.862 | 75.00 | 25.00 |
| 0.490 | 90.00 | 10.00 |
| Gradation of RO40 | | |
| 275.000 | 0.00 | 100.00 |
| 134.700 | 10.00 | 90.00 |
| 82.150 | 25.00 | 75.00 |
| 41.308 | 50.00 | 50.00 |
| 14.190 | 75.00 | 25.00 |
| 2.782 | 90.00 | 10.00 |
| Gradation of Marblend | | |
| 1000.00 | 0.00 | 100.00 |
| 338.100 | 10.00 | 90.00 |
| 212.200 | 25.00 | 75.00 |
| 36.190 | 50.00 | 50.00 |
| 12.160 | 75.00 | 25.00 |
| 3.761 | 90.00 | 10.00 |

These tables show that, of the three types of calcium carbonate tested, Carbital 75 had by far the smallest average particle size and the smallest particle size distribution, Marblend had the largest, and RO40 was intermediate. Each mixture contained one type of calcium carbonate, Stalok 400 potato starch, and water, while no mold releasing agent was used. The mixtures were prepared according to the procedures set forth in Examples 1–13 and then placed between molds having a temperature of about 200° C. The articles were removed from the molds once they had obtained form-stability. The molds were nickel-Teflon coated and had complementary shapes defined to produce a platter. The formed platters were approximately 25 cm long, 18 cm wide, and 3 mm thick. Outlined below are the components for each mixture, the weight of the final platter, and the processing time.

| Example | Calcium Carbonate (g) | Stalok 400 (g) | Water (g) | Platter weight (g) | Processing Time (sec) |
|---|---|---|---|---|---|
| Calcium Carbonate Carbital 75 | | | | | |
| 48 | 100 | 900 | 800 | 31.6 | 40 |
| 49 | 200 | 800 | 800 | 32.5 | 40 |
| 50 | 300 | 700 | 800 | NA | NA |
| Calcium Carbonate RO40 | | | | | |
| 51 | 700 | 300 | 800 | 30.2 | 40 |
| 52 | 800 | 200 | 800 | NA | NA |
| Calcium Carbonate Marblend | | | | | |
| 53 | 700 | 300 | 800 | 30.2 | 40 |
| 54 | 800 | 200 | 800 | NA | NA |

Examples 48 and 49 produced form-stable articles having negligible cracks or defects, although the plates of Example 48 were of somewhat higher quality than those of Example 49. In example 50, where the Carbital 75 was increased to 30% by weight of the total solids, crack-free, form-stable articles could not be made, regardless of the processing time. Examples 51 and 53 produced form-stable articles having negligible cracks or defects using 70% by weight of total solids RO40 and Marblend. The best articles were formed in Example 53. Crack-free, form-stable articles could not be made in Examples 52 and 54 where the concentration of RO40 and Marblend was increased to 80% by weight of the solids.

The above examples teach that functional articles can be made with higher concentrations of inorganic aggregate by using an aggregate material which (1) has a larger average diameter (which yields an aggregate material having a lower specific surface area), and (2) which has a greater particle size distribution (which yields an aggregate material having a higher particle packing density). The maximum amount of Carbital 75 that could be used to produce functional articles was 20% by weight of the solids. In comparison, functional articles could be made using 70% by weight of either RO40 or Marblend. The difference in the concentration of aggregate that could be used is attributed to the fact that RO40 and Marblend had a natural packing density approximately twice that of Carbital 75. The difference is further attributed to the fact that RO40 and Marblend had an average particle size that was approximately twenty to thirty times larger than Carbital 75. However, it would be expected that by using an aggregate having a packing density higher then that of Marblend, an article could be made having an even higher concentration of inorganic aggregates.

It is also noteworthy that the viscosity of the mixtures increased as the concentration of Carbital 75 increased and that the viscosity of the mixtures decreased with increased concentrations of RO40 and Marblend. As previously discussed, the starch-based binder absorbs the solvent. By replacing a portion of the starch-based binder with an inorganic aggregate, the amount of solvent that would have been absorbed by the starch-based binder is free to lubricate the aggregate particles. However, the inorganic aggregate replacing the starch-based binder also produces interstitial space which must be filled by the solvent. Accordingly, if the amount of solvent freed by the removal of the starch-based binder is smaller than the volume of interstitial space created by the addition of the aggregate, then the viscosity of the mixture increases. This process is illustrated by the use of Carbital 75. In contrast, if the amount of solvent freed by the removal of the starch-based binder is larger than the volume of interstitial space created by the addition of more aggregate, then the viscosity of the mixture decreases. This process is illustrated by the RO40 and Marblend.

EXAMPLES 55–59

In the following examples, each of the components was held constant except for the starch-based binder, which was gradually substituted with rice flour. Because rice flour includes a high percentage of starch, along with some protein, it would be expected to have a binding effect within the structural matrix. In addition, the inert fraction would be expected to act as an inert organic filler. All concentrations are expressed as a percentage by weight of the overall mixture. The base mixture included the following:

| | |
|---|---|
| RO40 Calcium Carbonate | 24.8% |
| Water | 49.5% |
| Mg Stearate | 0.5% |
| Stalok 400 | variable |
| Rice Flour | variable |

The following table shows the relationship between the varying starch and rice flour contents on the properties of cell diameter, wall thickness, and skin thickness.

| Example | Stalok 400 | Rice Flour | Average Cell Diameter | Wall Thickness | Skin Thickness |
| --- | --- | --- | --- | --- | --- |
| 55 | 24.8% | 0% | 670 μm | 2.2 mm | 300 μm |
| 56 | 19.8% | 5.0% | 450 μm | 2.4 mm | 370 μm |
| 57 | 14.9% | 9.9% | 370 μm | 2.5 mm | 330 μm |
| 58 | 9.9% | 14.9% | 300 μm | 2.3 mm | 250 μm |
| 59 | 5.0% | 19.8% | 300 μm | 2.1 mm | 200 μm |

The compositions of these examples resulted in molded articles in which the average cell diameter of the cells decreased as the percentage of the rice flour was increased and the amount of Stalok 400 (potato starch) was decreased. Hence, these examples show that the cell size can be regulated through the use of controlled mixtures of starch-based binder of different origin. This, in ram, results in articles having significantly different physical and mechanical properties. In this manner, rice flour (or similar grain flours or alternative starch sources) can be used in varying mounts in order to carefully control the physical and mechanical properties of the resulting articles manufactured therefrom.

EXAMPLES 60–62

Mixtures were prepared that contained the following components and concentrations in order to show the effect of water concentration on the density and insulation ability of the articles manufactured therefrom.

| Example | Potato Starch (g) | Calcium Carbonate RO40 (g) | Magnesium Stearate (g) | Water (g) |
| --- | --- | --- | --- | --- |
| 60 | 500 | 501 | 10 | 700 |
| 61 | 500 | 500 | 10 | 800 |
| 62 | 500 | 500 | 10 | 900 |

As the amount of water in the mixtures used to manufacture articles was increased the average cell diameter increased, the density decreased, and the insulation ability increased (i.e., the thermal conductivity decreased).

EXAMPLE 63

A study was performed to determine the effect of varying the number of vent holes within the molding apparatus used to manufacture cups on the structure of the resulting molded cups. The moldable mixture of Example 1 was formed into cups using different molding apparatus in which the number of vent holes was varied so that there were 2, 4, 6, 8, or 10 vent holes of standard size, respectively. The density of the walls of the resulting cups increased as the number of vent holes increased, presumably because of the decrease in pressure that was able to build up, which led to a lower expansion of the cells within the structural matrix of the cup walls. Hence, using fewer vent holes results in a molded article having walls that are less dense and which have larger cells within the structural matrix.

EXAMPLES 64–138

Various starch-based moldable mixtures were made and formed into clam shell containers in order to determine the effect of (1) inorganic concentration in the mixtures, (2) water content, (3) processing temperature, and (4) filling weight on the strain to failure, flexural strength, and fracture energy of the formed products. The inorganic content of the mixtures was varied in three steps, and included 0, 30, and 50 wt-% of RO40 calcium carbonate supplied by Georgia Marble. The water content was also varied to achieve three different rheologies such that a "standard funnel" was emptied in 20, 40, and 60 seconds. The starch component was Stalok 400 modified potato starch. Each mixture also contained 1 wt-% of magnesium stearate as a mold release agent. The mixtures were prepared in a small Hobart mixer. The dry ingredients were completely mixed first, and then portions of water were added and the resulting rheology was frequently monitored to achieve the flow times of 20, 40, and 60 seconds.

The clam shells were produced in a mold with a flat bottom. The processing temperatures used in forming the products were 160° C., 180° C., and 200° C. The mold was filled using three different steps: (1) the minimum filling weight required to make a complete product, (2) the minimum filling weight plus 25%, and (3) the minimum filling weight plus 50%. The processing time was adjusted to correspond to the minimum required for each example.

Test bars from each of the formed clam shells of Examples 64–138, having a size of approximately 15×100 mm, were cut from the same region of each of the clam shells. Four test bars were evaluated for each example to determine the mechanical properties thereof. The moisture level in the tested clam shells was the equilibrium moisture content at ambient temperature and relative humidity. The equilibrium moisture content was achieved by storing the test bars in a controlled environment at 20° C. and 50% relative humidity, and monitoring the weight gain of the test bars. The moisture level in the starch component was approximately 11 wt-%. The test bars were evaluated using three point bending at a constant displacement rate. Both load and displacement were recorded, and subsequent analysis yielded strain to failure, flexural strength, and fracture energy.

The varying parameters and mechanical properties for each of Examples 64–138, including inorganic concentration, flow time, processing temperature, and filling weight are summarized below, along with the strain to failure, flexural strength, and fracture energy of the formed products. The letters A, B, and C under the filling weight column indicate the minimum required filling weight, the minimum required filling weight plus 25%, and the minimum required filling weight plus 50%, respectively.

| Example | CaCO$_3$ (Wt-%) | Flow Time(s) | Temp. (°C.) | Filling Wt. | Strain (%) | Flexural Strength (MPa) | Fracture Energy (J/m$^2$) |
| --- | --- | --- | --- | --- | --- | --- | --- |
| 64 | 0 | 20 | 160 | A | 2 | 1.8 | 162 |
| 65 | 0 | 20 | 160 | B | 2 | 1.97 | 278 |
| 66 | 0 | 20 | 160 | C | 2.76 | 2.6 | 363 |
| 67 | 0 | 20 | 180 | A | 2.81 | 2.4 | 403 |
| 68 | 0 | 20 | 180 | B | 1.98 | 2.3 | 215 |
| 69 | 0 | 20 | 180 | C | 2.1 | 2.1 | 154 |
| 70 | 0 | 20 | 200 | A | 2.3 | 2.6 | 316 |
| 71 | 0 | 20 | 200 | B | 2 | 2.4 | 200 |
| 72 | 0 | 20 | 200 | C | 1.9 | 2.6 | 148 |
| 73 | 0 | 40 | 160 | A | 3.9 | 2.4 | 426 |
| 74 | 0 | 40 | 160 | B | 2.35 | 2.6 | 285 |
| 75 | 0 | 40 | 160 | C | 2.27 | 2.5 | 246 |
| 76 | 0 | 40 | 180 | A | 2 | 3.1 | 206 |
| 77 | 0 | 40 | 180 | B | 1.8 | 2.34 | 179 |
| 78 | 0 | 40 | 180 | C | 2.1 | 2.25 | 247 |
| 79 | 0 | 40 | 200 | A | 1.95 | 2.9 | 217 |
| 80 | 0 | 40 | 200 | B | 2.2 | 2.2 | 224 |
| 81 | 0 | 40 | 200 | C | 2.1 | 2.6 | 184 |
| 82 | 0 | 60 | 160 | A | 2.38 | 2.3 | — |
| 83 | 0 | 60 | 180 | A | 2.18 | 2.5 | 303 |

-continued

| Example | CaCO₃ (Wt-%) | Flow Time(s) | Temp. (°C.) | Filling Wt. | Strain (%) | Flexural Strength (MPa) | Fracture Energy (J/m²) |
| --- | --- | --- | --- | --- | --- | --- | --- |
| 84 | 0 | 60 | 180 | B | 2.2 | 2.4 | 243 |
| 85 | 0 | 60 | 180 | C | 2.5 | 2.45 | 265 |
| 86 | 0 | 60 | 200 | A | 2.54 | 2.9 | 260 |
| 87 | 0 | 60 | 200 | B | 1.7 | 2.46 | 175 |
| 88 | 0 | 60 | 200 | C | 1.9 | 2.15 | 190 |
| 89 | 30 | 20 | 160 | A | 1.2 | 2.6 | 196 |
| 90 | 30 | 20 | 160 | B | 1.6 | 2.4 | 134 |
| 91 | 30 | 20 | 160 | C | 1.96 | 2.9 | 226 |
| 92 | 30 | 20 | 180 | A | 2.2 | 2.36 | 168 |
| 93 | 30 | 20 | 180 | B | 1.5 | 2.3 | 122 |
| 94 | 30 | 20 | 180 | C | 1.75 | 2.3 | 120 |
| 95 | 30 | 20 | 200 | A | 1.5 | 2.37 | — |
| 96 | 30 | 20 | 200 | B | 2.5 | 2.4 | — |
| 97 | 30 | 20 | 200 | C | 1.7 | 2 | — |
| 98 | 30 | 40 | 160 | A | 1.62 | 2.15 | — |
| 99 | 30 | 40 | 160 | C | 1.4 | 1.85 | — |
| 100 | 30 | 40 | 180 | A | 2 | 2.63 | 182 |
| 101 | 30 | 40 | 180 | B | 2.1 | 2.68 | 208 |
| 102 | 30 | 40 | 180 | C | 1.9 | 2.1 | 146 |
| 103 | 30 | 40 | 200 | A | 1.5 | 2.7 | 121 |
| 104 | 30 | 40 | 200 | B | 1.5 | 2.2 | 98 |
| 105 | 30 | 40 | 200 | C | 2 | 2.2 | 178 |
| 106 | 30 | 60 | 160 | A | 1.3 | 2.5 | 130 |
| 107 | 30 | 60 | 160 | B | 1.8 | 2.3 | 146 |
| 108 | 30 | 60 | 160 | C | 1.4 | 2.83 | 134 |
| 109 | 30 | 60 | 180 | A | 2.2 | 3.7 | 258 |
| 110 | 30 | 60 | 180 | B | 1.6 | 3 | 167 |
| 111 | 30 | 60 | 180 | C | 2.2 | 3.7 | 258 |
| 112 | 30 | 60 | 200 | A | 1.5 | 2.8 | 136 |
| 113 | 30 | 60 | 200 | B | 1.4 | 2.48 | 102 |
| 114 | 30 | 60 | 200 | C | 1.72 | 2 | 115 |
| 115 | 50 | 20 | 160 | A | 1.21 | 2.45 | — |
| 116 | 50 | 20 | 160 | B | 1.1 | 2 | 70 |
| 117 | 50 | 20 | 160 | C | 1 | 1.76 | 58 |
| 118 | 50 | 20 | 180 | A | 1.1 | 2.1 | 79 |
| 119 | 50 | 20 | 180 | B | 1.2 | 1.57 | 68 |
| 120 | 50 | 20 | 180 | C | 1.18 | 1.43 | 68 |
| 121 | 50 | 20 | 200 | A | 1 | 2.12 | 61 |
| 122 | 50 | 20 | 200 | B | 1.2 | 2 | 71 |
| 123 | 50 | 20 | 200 | C | 1.03 | 1.46 | 56 |
| 124 | 50 | 40 | 160 | A | 1.3 | 2.5 | 115 |
| 125 | 50 | 40 | 160 | B | 1.14 | 2.1 | 78 |
| 126 | 50 | 40 | 160 | C | 1.1 | 1.4 | 59 |
| 127 | 50 | 40 | 180 | A | 1.3 | 2.2 | 94 |
| 128 | 50 | 40 | 180 | B | 1.5 | 2.04 | 95 |
| 129 | 50 | 40 | 180 | C | 1.37 | 1.7 | 75 |
| 130 | 50 | 40 | 200 | A | 1.4 | 2.25 | 107 |
| 131 | 50 | 40 | 200 | B | 1.2 | 2.13 | 76 |
| 132 | 50 | 40 | 200 | C | 1.1 | 1.4 | 54 |
| 133 | 50 | 60 | 180 | A | 1.3 | 1.85 | 85 |
| 134 | 50 | 60 | 180 | B | 1.14 | 1.8 | 69 |
| 135 | 50 | 60 | 180 | C | 0.97 | 1.54 | 57 |
| 136 | 50 | 60 | 200 | A | 1.4 | 2.7 | - |
| 137 | 50 | 60 | 200 | B | 1.3 | 2.4 | |
| 138 | 50 | 60 | 200 | C | 1.2 | 2 | |

As shown above, the strain to failure of the formed products was not a function of rheology, processing temperature, or the filling weight. The only factor that significantly influenced the strain to failure was the calcium carbonate content. The most likely interpretation of this result is that the interfacial bond strength between the starch and the inorganic component is comparatively weak. Substituting 50% of the starch with calcium carbonate reduced the strain by about 50%.

The flexural strength of the formed products was mainly affected by two parameters, calcium carbonate concentration and rheology (i.e., water content) of the mixture. The strength was adversely affected by the addition of the calcium carbonate. Substituting 50% of the starch with calcium carbonate reduced the strength by approximately 17%. In contrast, the strength increased with an increase in viscosity of the mixture. A reduction in water content, which increased the flow time through a standard funnel from 20 s to 60 s, increased the strength by about 11%. The increase in strength with increased viscosity was due to an increase in density of the material.

The fracture energy of the formed products was very sensitive to the addition of calcium carbonate. This was not unexpected since the level of inorganics influenced both the strain to failure, and to a smaller extent, the flexural strength. Substituting 50% of the starch with calcium carbonate reduced the fracture energy by about 70%. An increase in processing temperature also impacted the fracture energy negatively. The effect of processing temperature on fracture energy was relatively small for the pure starch material. However, an increase in processing temperature from 160° C. to 200° C. reduced the fracture energy by about 27% for material containing 50% calcium carbonate. Excess filling weight generally impacted both the strength and the fracture energy negatively, due to the resulting lower density of the products.

EXAMPLES 139–146

Moldable mixtures are made which have a lightweight aggregate in order to yield a more lightweight article having greater insulation ability and lower density. The mixtures used to form such articles are set forth as follows:

| Example | Potato Starch (g) | Perlite (% by volume of mixture) | Magnesium Stearate (g) | Water (g) |
| --- | --- | --- | --- | --- |
| 139 | 500 | 5 | 10 | 500 |
| 140 | 500 | 10 | 10 | 500 |
| 141 | 500 | 15 | 10 | 500 |
| 142 | 500 | 25 | 10 | 500 |
| 143 | 500 | 40 | 10 | 500 |
| 144 | 500 | 55 | 10 | 500 |
| 145 | 500 | 65 | 10 | 500 |
| 146 | 500 | 85 | 10 | 500 |

The mixtures are formed into cups using the systems and methods set forth above. As the amount of perlite is increased, the resulting cup has a lower density, thermal conductivity, increased stiffness, and increased brittleness. The cups having the optimal balance of the foregoing properties are obtained by using a moldable mixture in the which the concentration of perlite ranges from between about 25% to about 55% perlite by volume of the moldable mixture. However, using more or less than these amounts may be desired for certain articles.

In the following group of examples, longer-length fibers were dispersed within the moldable mixtures by first preparing a preblended mixture of high viscosity. The result of adding fibers dramatically increased the fracture energy, toughness, and flexibility of the newly demolded articles compared to the articles that were prepared without the use of fibers. In addition, the articles did not require further conditioning but retained adequate flexibility due to the remainder of adequate moisture within the starch-bound cellular matrix, as well as because of the strengthening effect of the fibers dispersed throughout the cellular matrix.

EXAMPLE 147

A moldable mixture for use in forming foamed articles was prepared having the following ingredients in the respective amounts:

| | |
|---|---|
| Potato Starch | 500 g |
| Calcium Carbonate (RO40) | 500 g |
| Softwood Fibers | 100 g |
| Magnesium Stearate | 10 g |
| Water | 1300 g |

The moldable mixture was prepared by mixing 100 g of the potato starch with all of the fibers and 800 g of water to form a preblended mixture. This preblended mixture was then put into a microwave oven and heated up above the gelation point of 65° C. so that the starch would gelate and create a liquid with fibers suspended therein with a much higher viscosity. The preblended mixture was then mixed at high shear for 10 minutes resulting is a complete dispersion of the fibers. The calcium carbonate, and the remaining amount of starch and water were then added to the preblended mixture and mixed to form the moldable mixture.

EXAMPLES 148–162

Clam shell containers were formed from different moldable mixtures having five different types of starches and varying water content. Each of the moldable mixtures of these examples had the following basic mix design:

| | |
|---|---|
| Starch | 500 g |
| Calcium Carbonate (RO40) | 500 g |
| Softwood fiber (C33) | 100 g |
| Water | variable |
| Magnesium Stearate | 20 g |

The starches that were utilized in the various moldable mixtures of these examples included Western Polymer potato starch, Collamyl 910050 potato starch, Waxy Corn 7351, Staley Pearl corn starch, and Sta Lok 400 modified potato starch. The water content of the moldable mixtures varied at levels of 900 g, 1100 g, and 1300 g per 500 g of starch used. The softwood fibers were included at a level of 10% by weight of the combined starch and calcium carbonate. A stock fibrous sheet comprising individual softwood fibers was broken into small fragments before being added to the mixture. Colored water was made by adding 2.55 g Egg Yellow, 0.52 g Blue, and 0.34 g Double Strength Red, all colors of Iris brand, to 100 g of the water used in each mixture.

Each of the moldable mixtures of Examples 148–162 were prepared by the following procedure. The total 100 g amount of chopped fiber pieces was soaked in 800 g of the water for about 30 minutes. The soaked fibers and water were then placed in a mixing bowl of either a Hobart or Kitchen Aid mixer and mixed at slow to medium speed for about 4 minutes to form an initial mixture. The mixing action broke the fibrous sheet fragments into small fibrous clumps or nodules. A weighed quantity of 100 g of starch was then added to the initial mixture and the mixing was continued at medium speed for 1 minute to form an initial mixture. The mixer was stopped and the preblended mixture was placed in a plastic beaker and subjected to microwave energy in a standard kitchen microwave oven for 10 minutes at high power in order to gelate the starch. The hot, thickened mixture was removed from the microwave oven and was shear mixed at slow, medium and high speeds for a total of 15 minutes to disperse the fiber therein, thus forming the preblended mixture. Thereafter, 500 g of calcium carbonate, 400 g of unmodified starch, and 20 g of magnesium stearate were added to the preblended mixture, which was mixed at slow to medium speed with additional water for about 5 minutes so that a final homogeneous starch-based composition was obtained. The additional water included 100 g of colored water and the remaining water as required in the batch.

The starch-based compositions were then placed between male and female molds designed to produce clam shell containers. The molding time was 75 seconds, with the temperature of the female molds being 180° C. and the temperature of the male molds being 190° C. The molded clam shell containers were then removed from the molds and placed in a humidity chamber for a short period of time to equilibrate with moisture. While a humidity chamber was used in Examples 73–87, it should be understood that use of a humidity chamber is optional and not required in forming the products of the present invention.

Summarized below is a list of the selected starches used with the varying amounts of water in Examples 148–162, as well as the resulting properties of the clam shell containers formed from each of the moldable mixtures.

| Example | Starch | Water Content (g) | K (W/m.K) | Thickness (mm) | Moisture (Wt- %) | Spec. Grav. (g/cm³) | Shell Wt. (g) |
|---|---|---|---|---|---|---|---|
| 148 | Western Polymer | 900 | 0.065 | 1.643 | 4.808 | 0.358 | 31.44 |
| 149 | Western Polymer | 1100 | 0.057 | 1.660 | 4.603 | 0.306 | 24.66 |
| 150 | Western Polymer | 1300 | 0.062 | 1.635 | 5.094 | 0.234 | 20.47 |
| 151 | Collamyl | 900 | 0.064 | 1.643 | 4.549 | 0.310 | 27.37 |
| 152 | Collamyl | 1100 | 0.055 | 1.593 | 4.536 | 0.251 | 21.47 |
| 153 | Collamyl | 1300 | 0.052 | 1.403 | 4.683 | 0.237 | 16.03 |
| 154 | Waxy Corn | 900 | 0.059 | 1.618 | 4.340 | 0.296 | |
| 155 | Waxy Corn | 1100 | 0.054 | 1.220 | 4.302 | 0.246 | 15.61 |
| 156 | Waxy Corn | 1300 | 0.056 | 1.543 | 4.188 | 0.229 | 17.77 |
| 157 | Staley Pearl Starch | 900 | 0.066 | 1.663 | 4.077 | 0.458 | 34.82 |
| 158 | Staley Pearl Starch | 1100 | 0.063 | 1.660 | 4.054 | 0.291 | 27.32 |
| 159 | Staley Pearl Starch | 1300 | 0.061 | 1.671 | 3.936 | 0.273 | 22.56 |
| 160 | Sta Lok 400 | 900 | 0.065 | 1.317 | 5.196 | 0.409 | 28.55 |
| 161 | Sta Lok 400 | 1100 | 0.063 | 1.500 | 4.670 | 0.306 | 22.83 |
| 162 | Sta Lok 400 | 1300 | 0.061 | 1.510 | 4.988 | 0.238 | 18.90 |

As shown above, increasing the amount of water from 900 g to 1300 g in the moldable mixtures of the above examples generally resulted in a decrease in clam shell weight and specific gravity. Weights were lowest for the waxy corn starch and highest for the unmodified corn starch (Staley Pearl), with the potato starches in between. Three measurements were recorded for the thermal conductivity of the walls of the clam shells and the average K value was reported. The thermal conductivity (K) of the formed products generally decreased as the density decreased with increasing water content in the starch-based compositions. Changing the starch-based binder yielded different thermal conductivity values and changed the relationship between density and thermal conductivity somewhat.

Mechanical properties of the formed clam shells of Examples 148–162 were also tested, including flexural strength, fracture energy, and strain, which are summarized below.

| Example | Flexural Strength (MPa) | Fracture Energy (J/m²) | Strain Before Failure (%) |
|---|---|---|---|
| 148 | 6.2 | 740 | 2 |
| 149 | 5.5 | 780 | 1.8 |
| 150 | 4.5 | 650 | 1.7 |
| 151 | 5.5 | 600 | 1.7 |
| 152 | 4.3 | 620 | 1.6 |
| 153 | 2.5 | 430 | 1.5 |
| 154 | 3.8 | 500 | 1.7 |
| 155 | 3 | 350 | 1.65 |
| 156 | 2.5 | 200 | 1.65 |
| 157 | 11 | 680 | 1.85 |
| 158 | 7 | 550 | 1.6 |
| 159 | 6 | 480 | 1.55 |
| 160 | 5.2 | 570 | 2.1 |
| 161 | 4.8 | 350 | 1.45 |
| 162 | 4.5 | 270 | 1.3 |

As shown above, as the water content of the starch-based composition was increased from 900 g to 1300 g, which caused a decrease in the density of the formed products, the strength decreased, the fracture energy generally decreased, and the strain before failure decreased.

EXAMPLES 163–201

Clam shell containers were formed from various moldable mixtures having 500 g of Sta Lok 400 potato starch, 500 g of calcium carbonate, 20 g of magnesium stearate, and a varying fiber and water content. The fibers used were softwood fibers. Each of the moldable mixtures of these examples were then molded to form clam shell containers.

Summarized below is a list of the fiber mounts, including 5%, 10%, 15%, and 20% by weight fiber, and varying amounts of water ranging from 800 g to 1500 g, used in Examples 163–201, along with the final weight of the clam shell formed. The mechanical properties of Examples 163–178 and 187–201 were tested, including flexural strength, strain, and fracture energy, which are also summarized below.

| Example | Fiber (wt. %) | Water (g) | Final wt. (g) | Flexural Strength (MPa) | Strain Before Failure (%) | Fracture Energy (J/m) |
|---|---|---|---|---|---|---|
| 163 | 5 | 800 | 28.9 | 3.5 | 1.7 | 450 |
| 164 | 5 | 900 | 26.6 | 3.6 | 1.6 | 410 |
| 165 | 5 | 1000 | 23.2 | 3.1 | 1.65 | 350 |
| 166 | 5 | 1100 | 22.4 | 2 | 1.3 | 200 |
| 167 | 5 | 1200 | 20 | 2.5 | 1.6 | 300 |
| 168 | 5 | 1300 | 18.9 | 3 | 1.6 | 375 |
| 169 | 5 | 1400 | 18.3 | 1.6 | 1.3 | 110 |
| 170 | 5 | 1500 | 16 | 1.4 | 1.2 | 100 |
| 171 | 10 | 800 | 33.8 | 4.4 | 2.05 | 720 |
| 172 | 10 | 900 | 27.7 | 4.4 | 1.9 | 930 |
| 173 | 10 | 1000 | 27.8 | 2.8 | 2.8 | 460 |
| 174 | 10 | 1100 | 26.1 | 3.3 | 1.8 | 550 |
| 175 | 10 | 1200 | 24.4 | 3 | 1.7 | 740 |
| 176 | 10 | 1300 | 21.7 | 2 | 2.4 | 470 |
| 177 | 10 | 1400 | 21.2 | 3.2 | 1.9 | 640 |
| 178 | 10 | 1500 | 20.7 | 2.5 | 1.65 | 620 |
| 179 | 10 | 800 | 35.6 | — | — | — |
| 180 | 10 | 900 | 32.8 | — | — | — |
| 181 | 10 | 1000 | 29.1 | — | — | — |
| 182 | 10 | 1100 | 27 | — | — | — |
| 183 | 10 | 1200 | 26.2 | — | — | — |
| 184 | 10 | 1300 | 23.6 | — | — | — |
| 185 | 10 | 1400 | 23.9 | — | — | — |
| 186 | 10 | 1500 | 21.5 | — | — | — |
| 187 | 15 | 800 | 43 | 8.5 | 2.2 | 1430 |
| 188 | 15 | 900 | 39.4 | 8.3 | 1.85 | 1210 |
| 189 | 15 | 1000 | 36.6 | 7.2 | 2.25 | 800 |
| 190 | 15 | 1100 | 32.7 | 4.8 | 2 | 730 |
| 191 | 15 | 1200 | 32.3 | 5.7 | 1.75 | 880 |
| 192 | 15 | 1300 | 30.3 | 5 | 1.75 | 890 |
| 193 | 15 | 1400 | 23.8 | 3.6 | 1.55 | 720 |
| 194 | 15 | 1500 | 23.6 | 4.3 | 1.25 | 780 |
| 195 | 20 | 900 | 46.6 | 6 | 3.1 | 1050 |
| 196 | 20 | 1000 | 44.9 | 9.2 | 2.4 | 1175 |
| 197 | 20 | 1100 | 37.6 | 5.4 | 2.2 | 950 |
| 198 | 20 | 1200 | 36.3 | 7 | 2.5 | 1000 |
| 199 | 20 | 1300 | 32.1 | 5.5 | 2.25 | 1100 |
| 200 | 20 | 1400 | 31 | 5 | 2.3 | 1100 |
| 201 | 20 | 1500 | 24.7 | 2.2 | 2.4 | 475 |

As shown above, there was a steady decrease in the weight of the molded clam shells of Examples 163–201 as the water content was increased. Also, the weight of the clam shells increased as the fiber content was raised.

As shown above with respect to Examples 163–178 and 187–201, the strength of the formed products increased with fiber content, with a more dramatic increase at 15% by weight than at 20% by weight, considering the differential improvement for each additional amount of fiber. The strain improved at 20% by weight fiber, while the fracture energy was higher for increasing amounts of fiber. An increase in water content of the mixtures led to a fall in strength, especially at higher fiber contents. The strain remained similar for all water contents and showed a slight increase at intermediate water contents.

The density and thermal conductivity (K) of the formed products of Examples 179–186 containing 10 wt-% fiber were also determined and are summarized below.

| Example | Water Content (g) | Density (g/cm³) | k-factor (W/m · K) |
|---|---|---|---|
| 179 | 800 | 0.28 | 0.061 |
| 180 | 900 | 0.25 | 0.057 |
| 181 | 1000 | 0.222 | 0.054 |
| 182 | 1100 | 0.217 | 0.052 |
| 183 | 1200 | 0.224 | 0.053 |
| 184 | 1300 | 0.178 | 0.049 |
| 185 | 1400 | 0.215 | 0.053 |
| 186 | 1500 | 0.185 | 0.051 |

EXAMPLES 202–209

Clam shell containers were formed from moldable mixtures having waxy corn starch, with a varying fiber and water content, with the other components being the same as in Examples 163–201. The fibers used were softwood fibers in an amount of 10% by weight. Varying amounts of water were used in the moldable mixtures of Examples 202–209, from 900 g to 1200 g. Each of the moldable mixtures were then molded to form clam shell containers. The amount of water for each of Examples 202–209, along with the final weight of the clam shells formed are summarized below.

| Example | Water Content (g) | Final Weight (g) | Density (g/cc) | k-factor (W/m · K) |
|---------|-------------------|------------------|----------------|---------------------|
| 202 | 900 | 26.2 | — | — |
| 203 | 1000 | 23.4 | — | — |
| 204 | 1100 | 19.9 | — | — |
| 205 | 1200 | 19.3 | — | — |
| 206 | 900 | 24.5 | 0.21 | 0.052 |
| 207 | 1000 | 21.4 | 0.19 | 0.049 |
| 208 | 1100 | 19.4 | 0.18 | 0.053 |
| 209 | 1200 | 18.5 | 0.165 | 0.051 |

As shown above, there was a steady decrease in the weight of the molded clam shells of Examples 202–209 as the water content was increased. The density of the formed products of Examples 206–209 was also determined and decreased as the water content of the moldable mixtures increased, while the thermal conductivity remained fairly constant.

EXAMPLES 210–214

Clam shell containers were formed from moldable mixtures using various amounts of pregelated starch, ranging from 25 g to 150 g (5–30 wt-% of the total starch added), which was used to form preblended mixtures having 100 g of softwood fibers and 800 g of water. In each of Examples 135–139, the pregelated starch was mixed with the other components for six minutes to form a thickened preblended mixture. Once the thickened preblended mixture had been formed with the fibers dispersed therein, the remaining amount of ungelated starch was added thereto so that the total starch content was 500 g, along with 500 g of calcium carbonate, 20 g of magnesium stearate, and 200 g of additional water. The moldable mixtures were then molded into clam shell containers.

The amount of pregelatinized starch used in Examples 210–214, along with the final weight of the formed clam shells is summarized below.

| Example | Pregelatinized Starch (wt-%) | Final Weight (g) |
|---------|------------------------------|------------------|
| 210 | 5 | 29.9 |
| 211 | 10 | 26.2 |
| 212 | 15 | 26 |
| 213 | 20 | 27.6 |
| 214 | 30 | 25.4 |

The low pregelatinized starch content of Example 210 (5 wt-%) resulted in a poor fiber dispersion in the moldable mixture. At the high pregelatinized starch content of Example 214 (30 wt-%) the mixture was difficult to process. The pregelatinized starch content of Examples 211–213 (10, 15, and 20 wt-%) were found to be satisfactory in forming the products, with better results at the latter two values. As shown above, the amount of pregelatinized starch used did not have a significant effect on the final weight of the molded clam shells of the above examples.

EXAMPLE 215

Starch/water mixtures were prepared having two sample concentrations of starch in order to determine the effect of starch concentration on the viscosity and yield stress of the resulting mixture:

Sample 1 50 g of Western Polymer potato starch in 800 g of water;

Sample 2 100 g of the above starch in 800 g of water.

These samples were then microwaved for 10 minutes with frequent stirring. The stirring was needed to avoid settling of the starch. A very homogeneous pregelatinized starch liquid system was obtained in this manner for each of Samples 1 and 2.

On each sample, a single point measurement was made at a shear rate of 5 s$^1$. Sample 1 had a viscosity of 12.5 Pa·s and Sample 2 had a viscosity of 75 Pa·s. The measurements were made on a Paar Physica MC-20 Rheometer with a cone/plate configuration. The angle of the cone was 1° with a 0.05 mm truncation. The diameter of the plate was 50 mm. The single point measurements were double checked with a 12.5 mm parallel plate.

Figure 20:
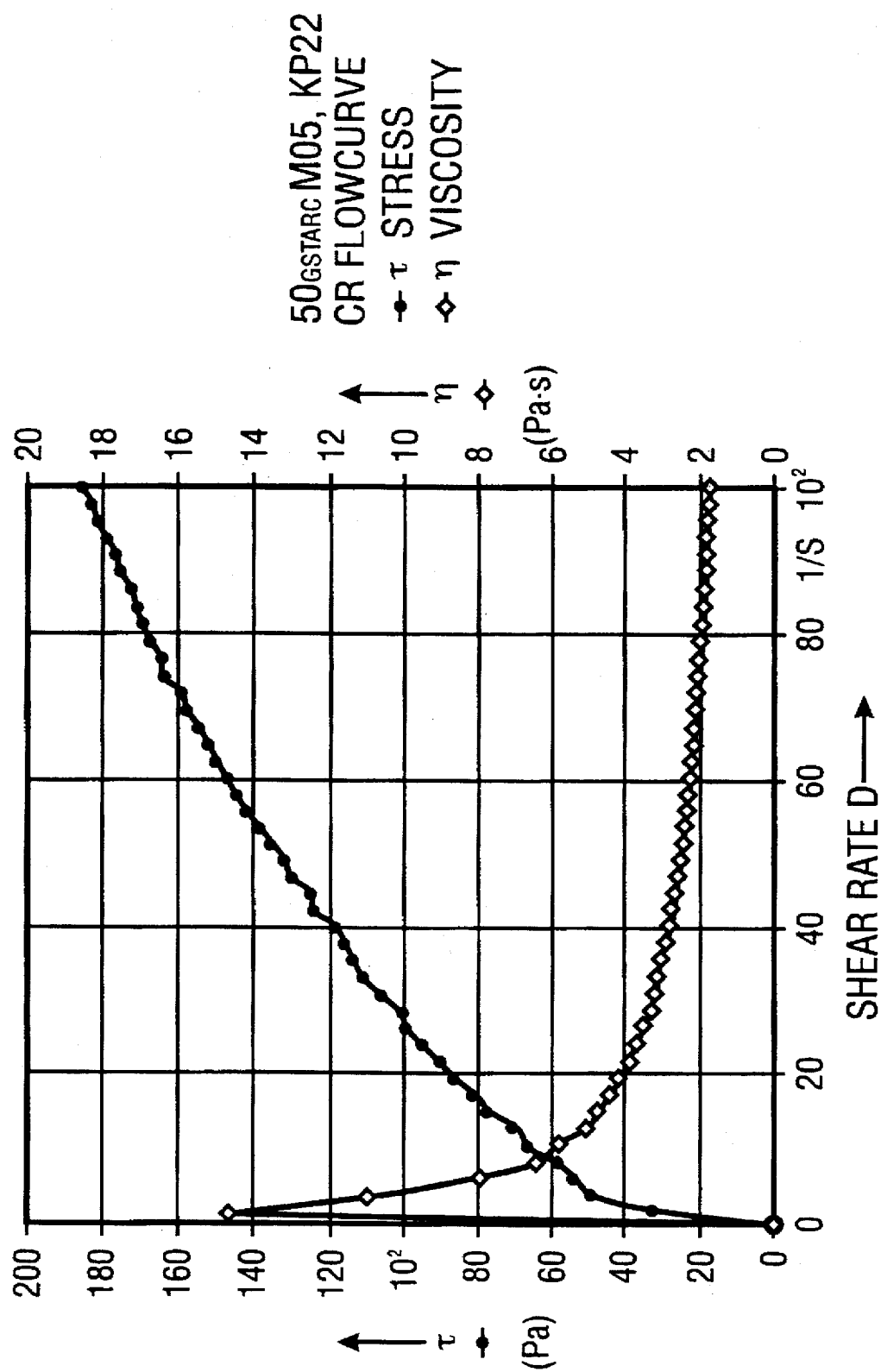
FIG. 20 shows a graph illustrating the yield stress and viscosity of a mixture containing 50 g gelated starch and 800 g water.
Figure 21:
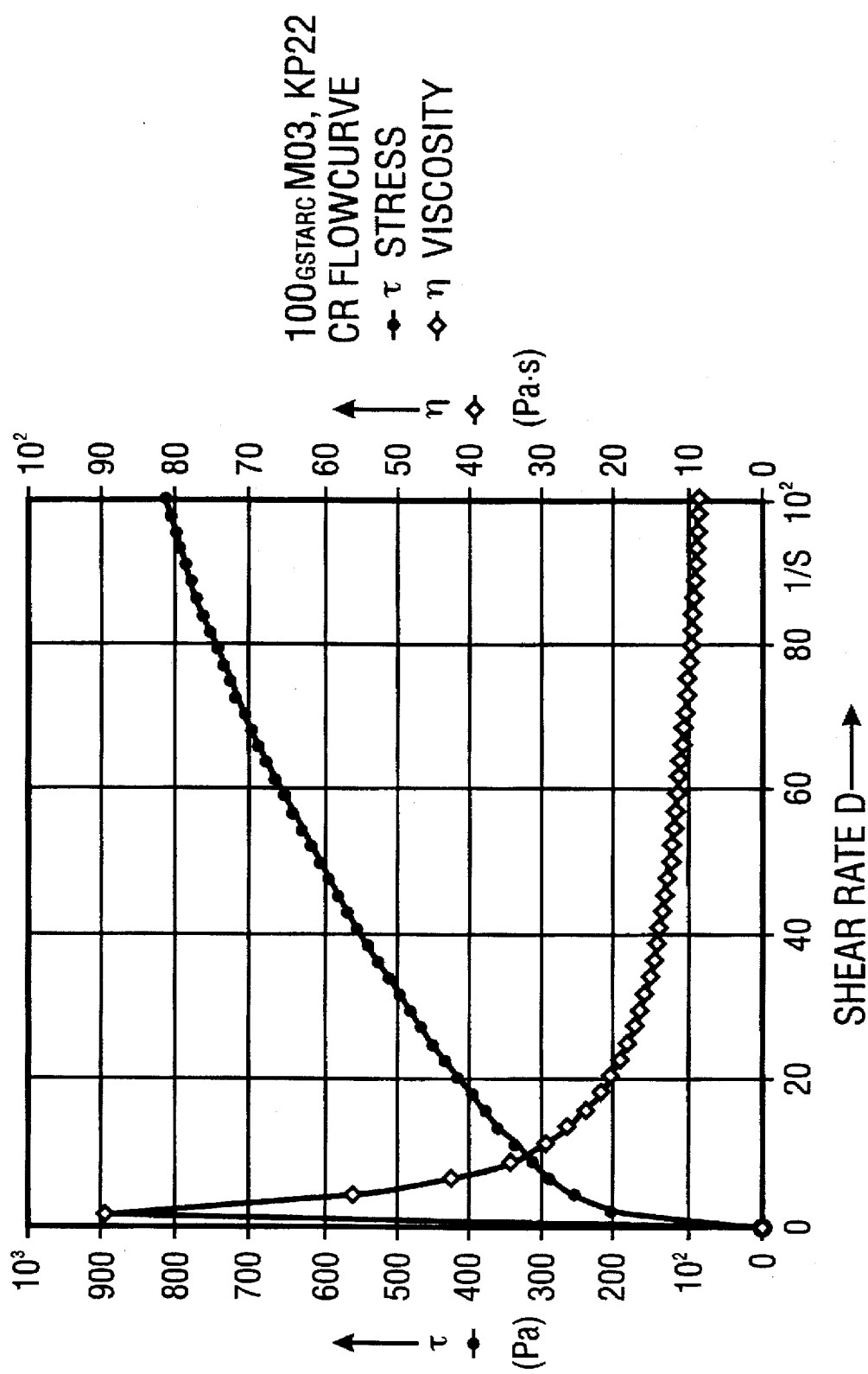
FIG. 21 shows a graph illustrating the yield stress and viscosity of a mixture containing 100 g gelated starch and 800 g water.

A flow curve was then generated with a shear rate range of 0–100 s$^{-1}$. The measurement included an up-curve generated over a period of time of greater than 180 s during which the shear rate was increased, followed by a down-curve generated over a period of time of greater than 60 s during which the shear rate was decreased. The down-curve was run to indicate whether there was any permanent effect of shear on the viscosity of the sample. FIGS. 20 and 21 show graphs of the flow curves (up-curves) for each of Samples 1 and 2 (the down-curves are not shown). At both concentrations of Samples 1 and 2, it was found that the down-curve deviated from the up-curve on the first measurement by a small amount. When a second measurement was made on the same sample of material, this difference disappeared, indicating a more steady state in viscosity. As shown in FIG. 20 for Sample 1, when the shear rate increased, the viscosity went down to a steady state of about 1.9 Pa·s. As shown in FIG. 21 for Sample 2, when the shear rate increased, the viscosity went down to a steady state of about 9 Pa·s.

Figure 22:
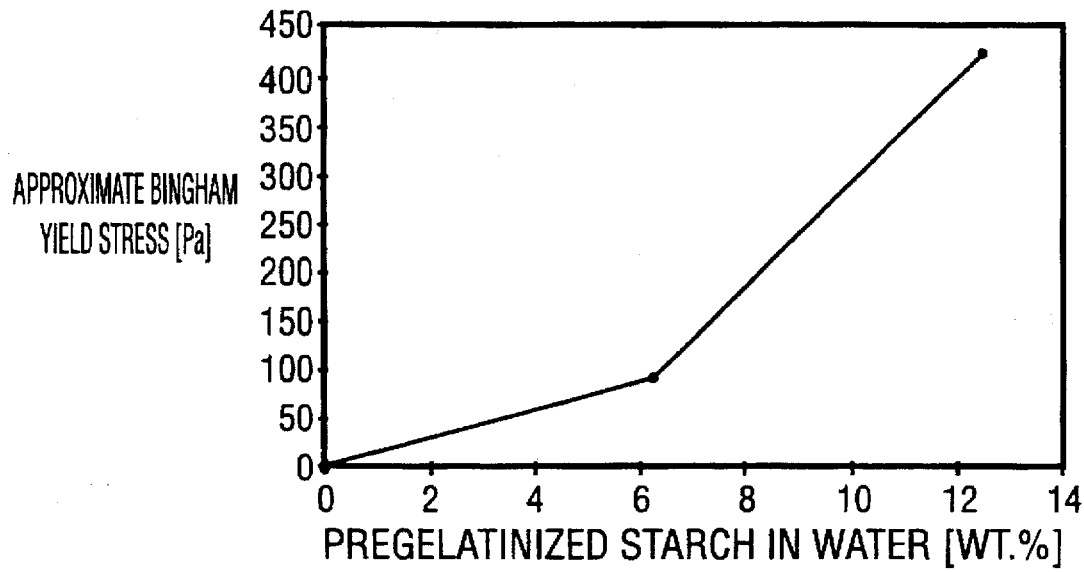
FIG. 22 shows a graph illustrating the effect of including varying amounts of pregelatinized starch on yield stress.
Figure 23:
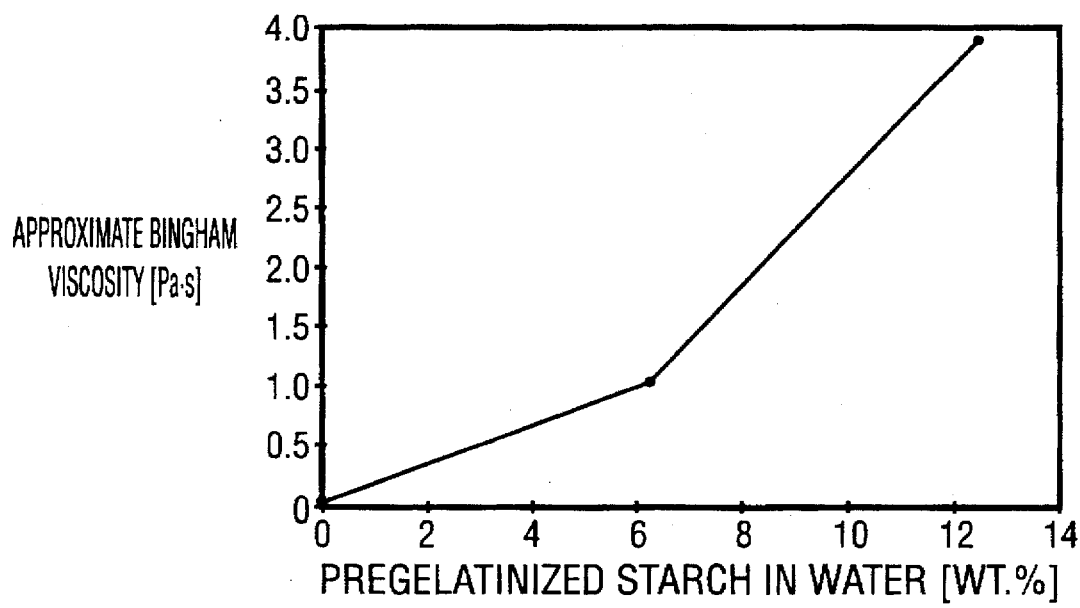
FIG. 23 shows a graph illustrating the effect of including varying amounts of pregelatinized starch on viscosity.
Figure 24:
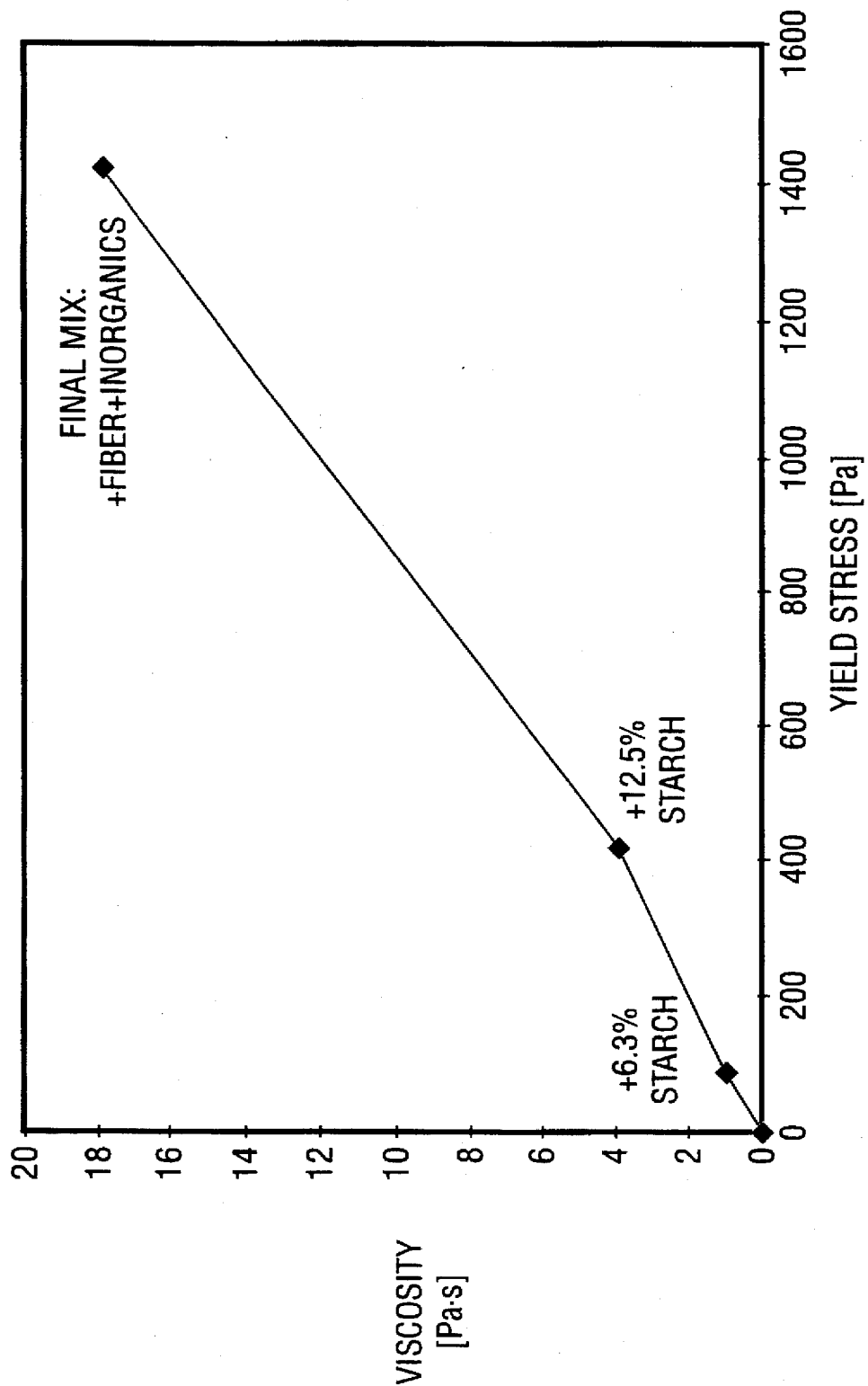
FIG. 24 shows a graph illustrating the effect of including varying amounts of pregelatinized starch on the yield stress and viscosity of a final mixture.

FIGS. 22 and 23 show the effect of the pregelatinized starch on the yield stress and viscosity of the starch/water mixtures of Samples 1 and 2. The pregelatinized starch increased both the yield stress and the viscosity dramatically from about 6.3 wt-% (50 g of starch) up to about 12.5 wt-% (100 g of starch), which is shown by the Binghamian curves of FIGS. 22 and 23. This range for the amount of pregelatinized starch used in the starch/water mixture to increase the viscosity and yield stress of the mixture will aid in dispersing fibers added thereto. FIG. 22 shows that the yield stress of the mixture increased from about 80 Pa to about 425 Pa for the above range of pregelatinized starch. FIG. 23 shows that the viscosity of the mixture increased from about 1 Pa·s to about 3.8 Pa·s for the above range of pregelatinized starch. FIG. 24 shows the yield stress vs. viscosity Binghamian curve for a final mixture containing the pregelatinized starch, fibers and inorganics. The yield stress increased up to about 1400 Pa and the viscosity increased up to about 18 Pa·s for the final mixture.

EXAMPLES 216–225

Clam shell containers were formed from different moldable mixtures having two different types of unmodified starches, including Western Polymer potato starch and Staley Pearl corn starch. A varying water content of 900 to 1700 g was used as well as 10 wt-% of softwood fibers. Each of the moldable mixtures of Examples 216–225 was then molded to form the clam shell containers.

Summarized below is a list of the selected starches used with the varying amounts of water in the moldable mixtures, as well as the resulting properties of the clam shells formed from each of the moldable mixtures.

| Example | Starch | Water Content (g) | Density (g/cm³) | Weight (g) |
|---|---|---|---|---|
| 216 | Western Polymer | 900 | 0.339 | 31.48 |
| 217 | Western Polymer | 1100 | 0.274 | 23.55 |
| 218 | Western Polymer | 1300 | 0.213 | 17.82 |
| 219 | Western Polymer | 1500 | 0.206 | 14.75 |
| 220 | Western Polymer | 1700 | 0.156 | 11.91 |
| 221 | Staley Pearl | 900 | 0.384 | 30.96 |
| 222 | Staley Pearl | 1100 | 0.343 | 26.93 |
| 223 | Staley Pearl | 1300 | 0.219 | 17.86 |
| 224 | Staley Pearl | 1500 | 0.190 | 15.20 |
| 225 | Staley Pearl | 1700 | 0.231 | 15.40 |

As shown above, when the water content in the moldable mixtures of Examples 216–225 was increased, the average weights of the final products decreased, except for Example 225, in which a poor sample was obtained using 1700 g of water. Except for Example 225, the densities of the products also reduced with an increasing water content in the moldable mixtures, indicating that the decrease in weight was due to greater foaming by steam during formation of the products. The increase in density of the product of Example 225 indicated that the product formed with 1700 g of water was poor in terms of the density desired. Thus, in Examples 216–224, the weight of the products reduced as the water content increased, resulting in lighter, less dense products.

The mechanical properties of the formed clam shells of Examples 216–224 were tested, including flexural strength, fracture energy, and strain, which are summarized below.

| Example | Strength (MPa) | Fracture Energy (J/m²) | Strain (%) |
|---|---|---|---|
| 216 | 4.7 | 780 | 2.1 |
| 217 | 4 | 550 | 1.7 |
| 218 | 2.7 | 370 | 2.2 |
| 219 | 2.6 | 350 | 1.5 |
| 220 | 2 | 250 | 1.6 |
| 221 | 7.2 | 660 | 1.6 |
| 222 | 5.5 | 710 | 1.8 |
| 223 | 3.6 | 520 | 1.9 |
| 224 | 3.7 | 450 | 1.3 |

As shown above, as the water content went up from 900 g to 1700 g in each of Examples 216–224, the strength generally decreased, the fracture energy generally decreased, and the strain fluctuated from a high of 2.2% down to 1.3%.

Figure 25:
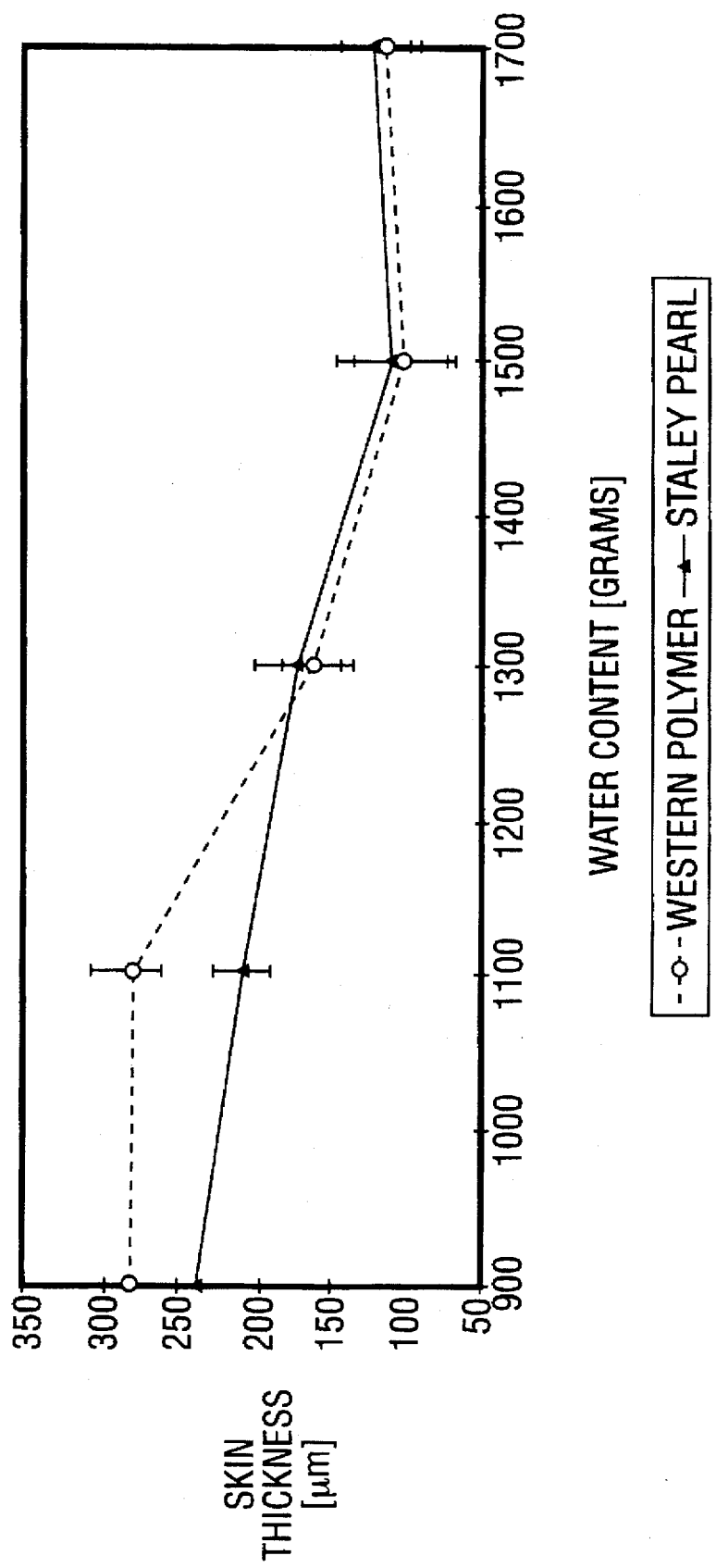
FIG. 25 shows a graph illustrating the effect of water content in a moldable mixture on the skin thickness of a final product.

FIGS. 25 is a graph showing the skin thickness as a function of water content for the articles of Examples 216–225. The graph of FIG. 25 shows that as the water content increased in the various moldable mixtures, the skin thickness generally decreased in the final products. This result corresponded well with the observed decrease in density of these products with increasing water, since the density is primarily governed by the skin thickness on the outside of the product.

Figure 26:
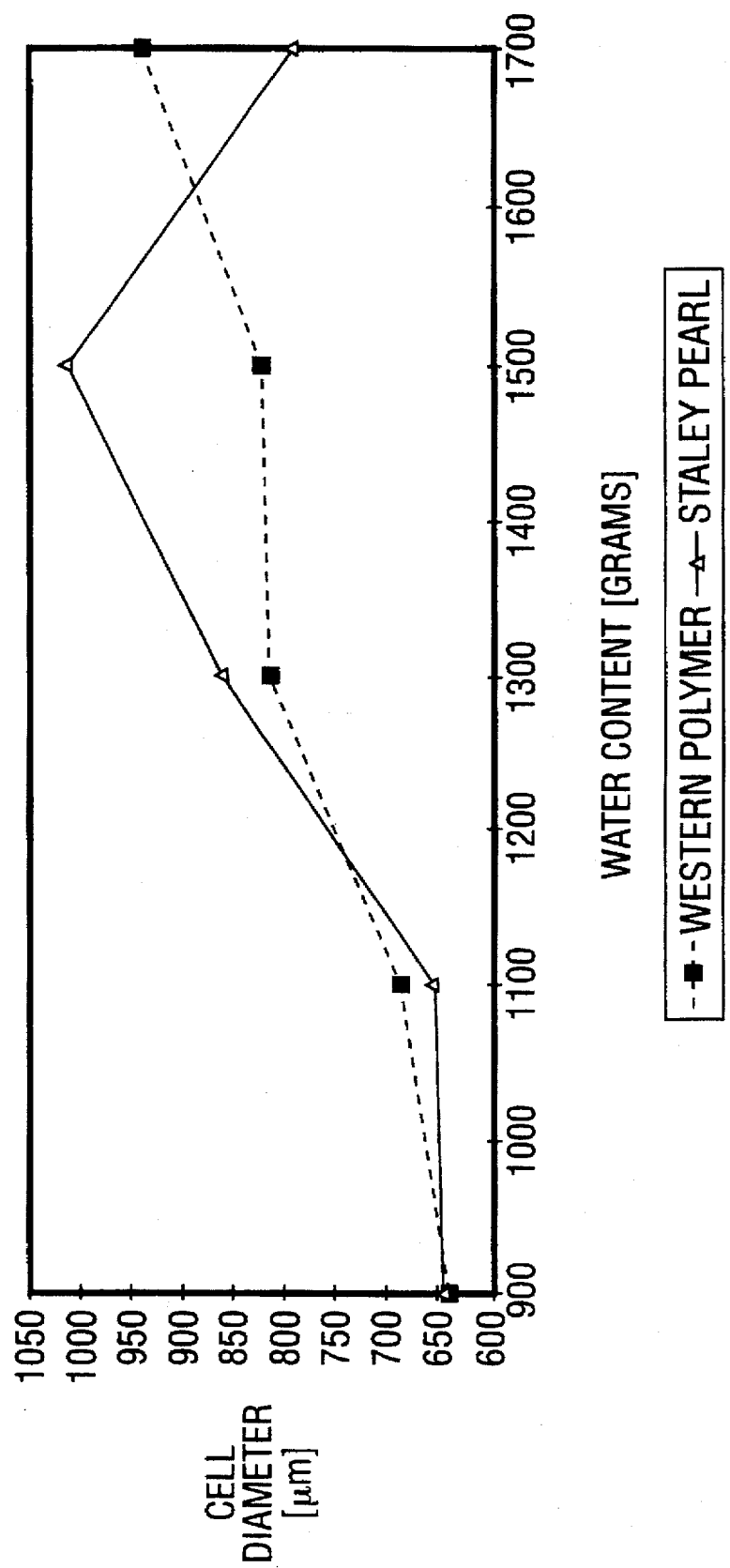
FIG. 26 shows a graph illustrating the effect of water content in a moldable mixture on the internal cell diameter of a foamed product.

FIG. 26 is a graph showing the average internal cell diameter as a function of water content for the articles of Examples 216–225. The graph of FIG. 26 shows that as the water content increased the cell diameters of the foamed structural matrix of the products also increased, except for Example 225, which had a decrease in average cell diameter. The larger interior cells contributed to a lower density and more flexibility in the formed products.

The skin thicknesses and average internal cell diameters of the articles of Examples 216–225 are summarized below.

| Example | Skin Thickness (μm) | Av. Cell Diam. (μm) |
|---|---|---|
| 216 | 280 | 640 |
| 217 | 280 | 680 |
| 218 | 170 | 820 |
| 219 | 110 | 825 |
| 220 | 120 | 950 |
| 221 | 240 | 640 |
| 222 | 220 | 650 |
| 223 | 175 | 870 |
| 224 | 115 | 1025 |
| 225 | 125 | 800 |

It was also observed that the articles of Examples 216–225 that were molded from mixtures with higher water content appeared to have the fewest and smallest pinholes in the surfaces thereof.. Thus, these lightweight products would be relatively easy to coat with an appropriate coating material to increase water and grease resistance.

EXAMPLE 226

Viscosity measurements were conducted on three samples of starch-based fiber containing mixtures having various amounts of water as follows:

Sample 1 900 g water

Sample 2 1300 g water

Sample 3 1500 g water

A Paar-Physica instrument was used to measure the viscosity of the sample mixtures. A parallel plate configuration was used with a gap setting of 1 mm. It was determined that the measurements had to be made quickly and at relatively low shear rates to avoid segregation and fiber alignment.

Figure 27:
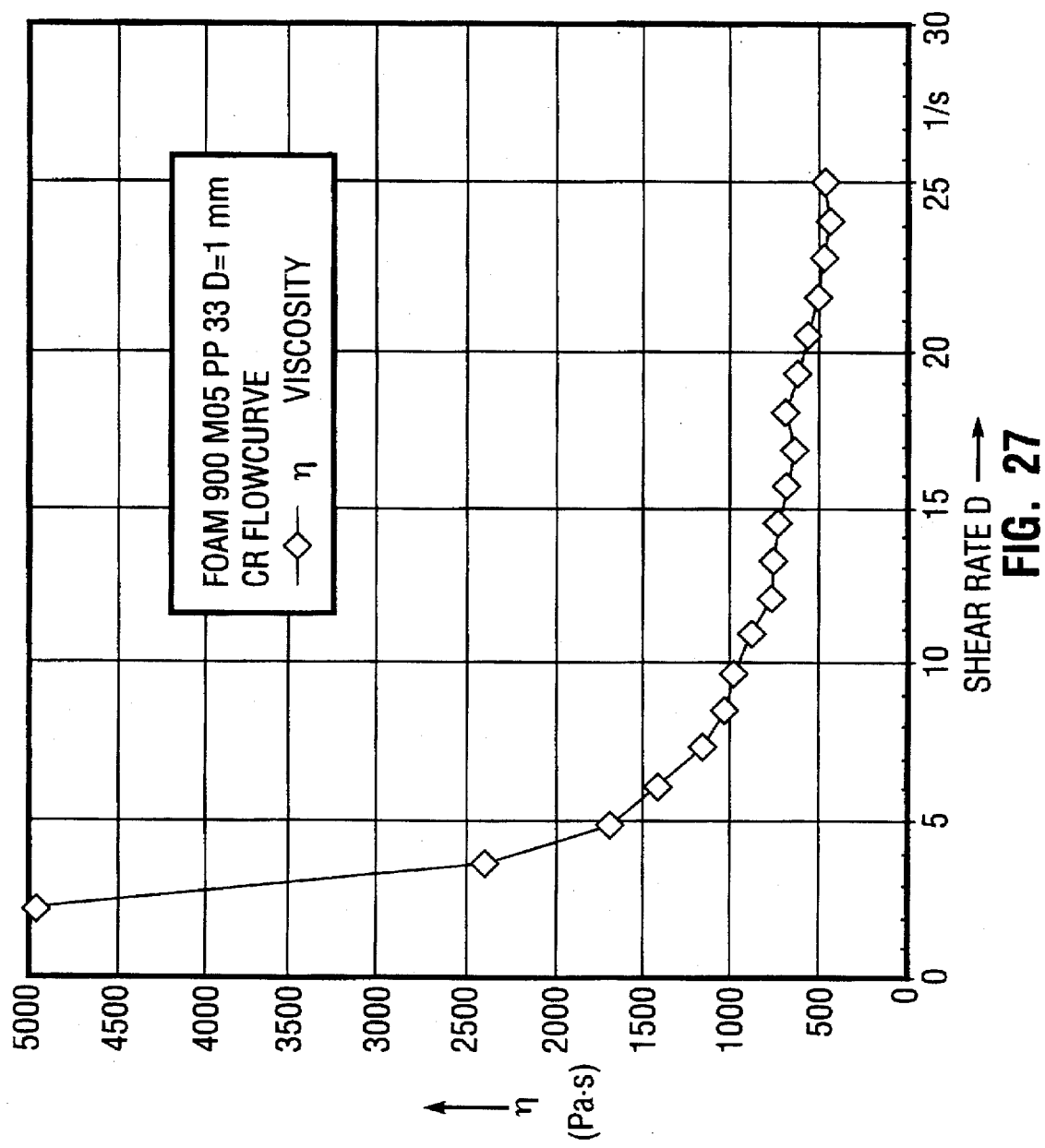
FIG. 27 shows a graph illustrating the effect of shear rate on viscosity for a moldable mixture containing 900 g water.

FIG. 27 shows a flow curve of shear rate vs. viscosity (η) for the mixture of Sample 1. FIG. 27 shows a drop in apparent viscosity with an increasing shear rate, with the viscosity stabilizing at about 500 Pa·s at a shear rate of 25 s$^{-1}$. The mixture of sample 1 had an apparent viscosity of about 1700 Pa·s at a shear rate of 5 s$^{-1}$.

Figure 28:
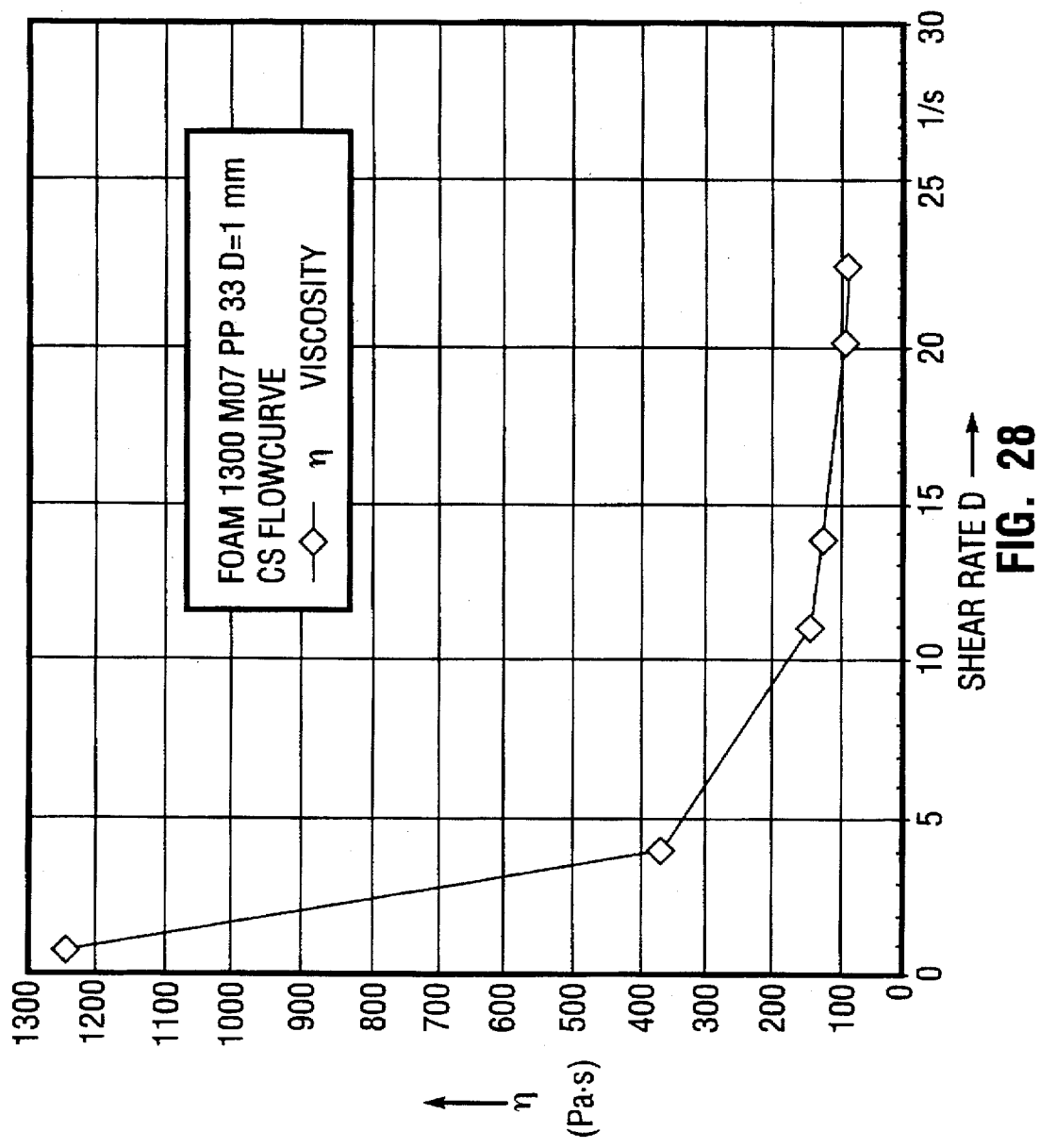
FIG. 28 shows a graph illustrating the effect of shear rate on viscosity for a moldable mixture containing 1300 g water.
Figure 29:
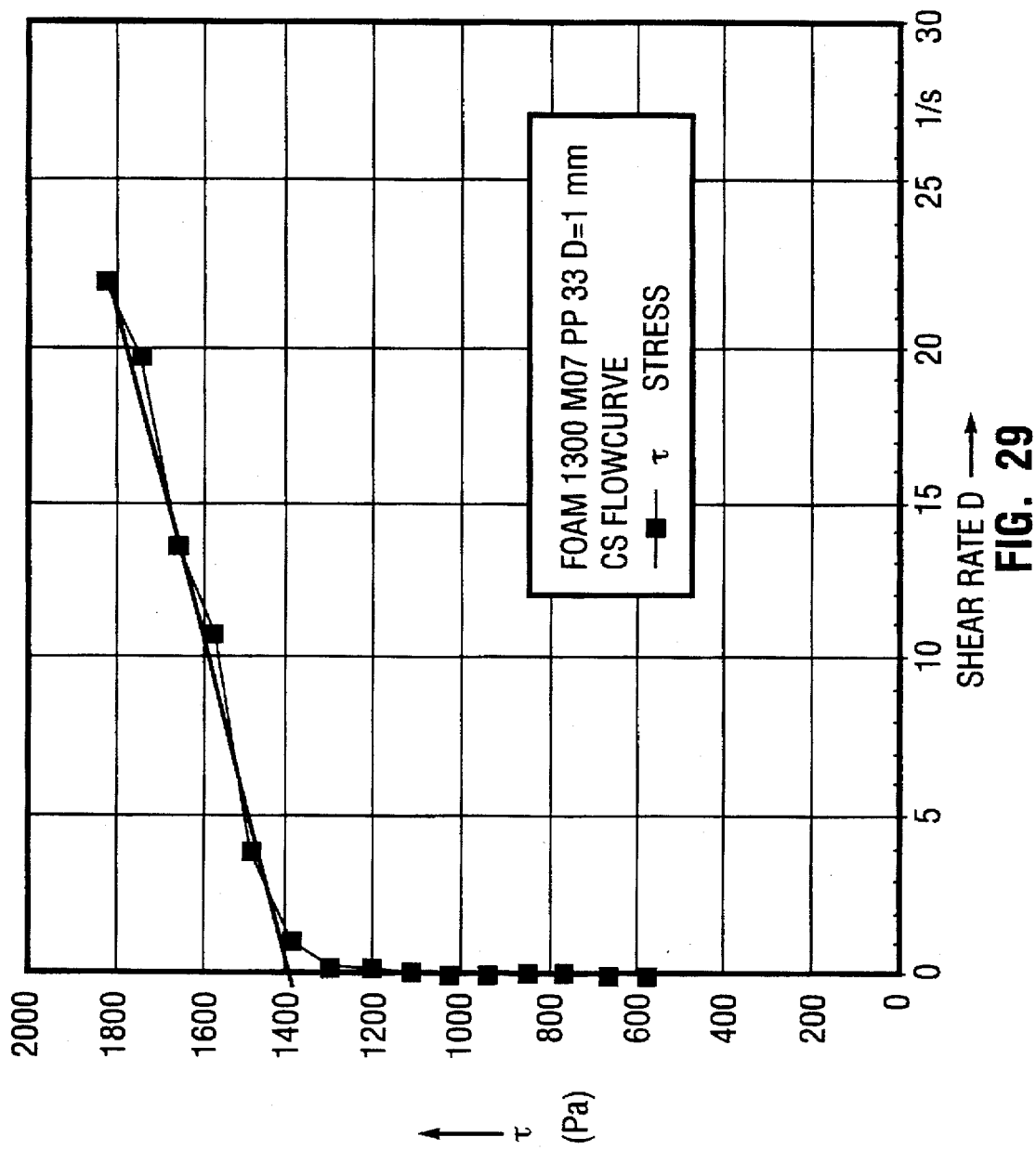
FIG. 29 shows a graph illustrating the effect of shear rate on yield stress for a moldable mixture containing 1300 g water.

FIGS. 28–29 show various flow curves for Sample 2. FIG. 28 shows a drop in apparent viscosity with an increasing shear rate, with the viscosity stabilizing at about 80 Pa·s at a shear rate of 22 s$^{-1}$. The mixture of Sample 2 had an apparent viscosity of about 340 Pa·s at a shear rate of 5 s$^{-1}$. FIG. 29 shows a flow curve of the shear rate vs. yield stress for Sample 2. The yield stress (τ) increased up to 1820 Pa at a shear rate of 22 s$^{-1}$ from an initial yield stress of 1400 Pa. By calculating the difference between the increased yield stress (1820 Pa) and the initial yield stress (1400 Pa) and dividing by the shear rate (22 s$^{-1}$), the plastic viscosity was determined to be 19.1 Pa·s.

Figure 30:
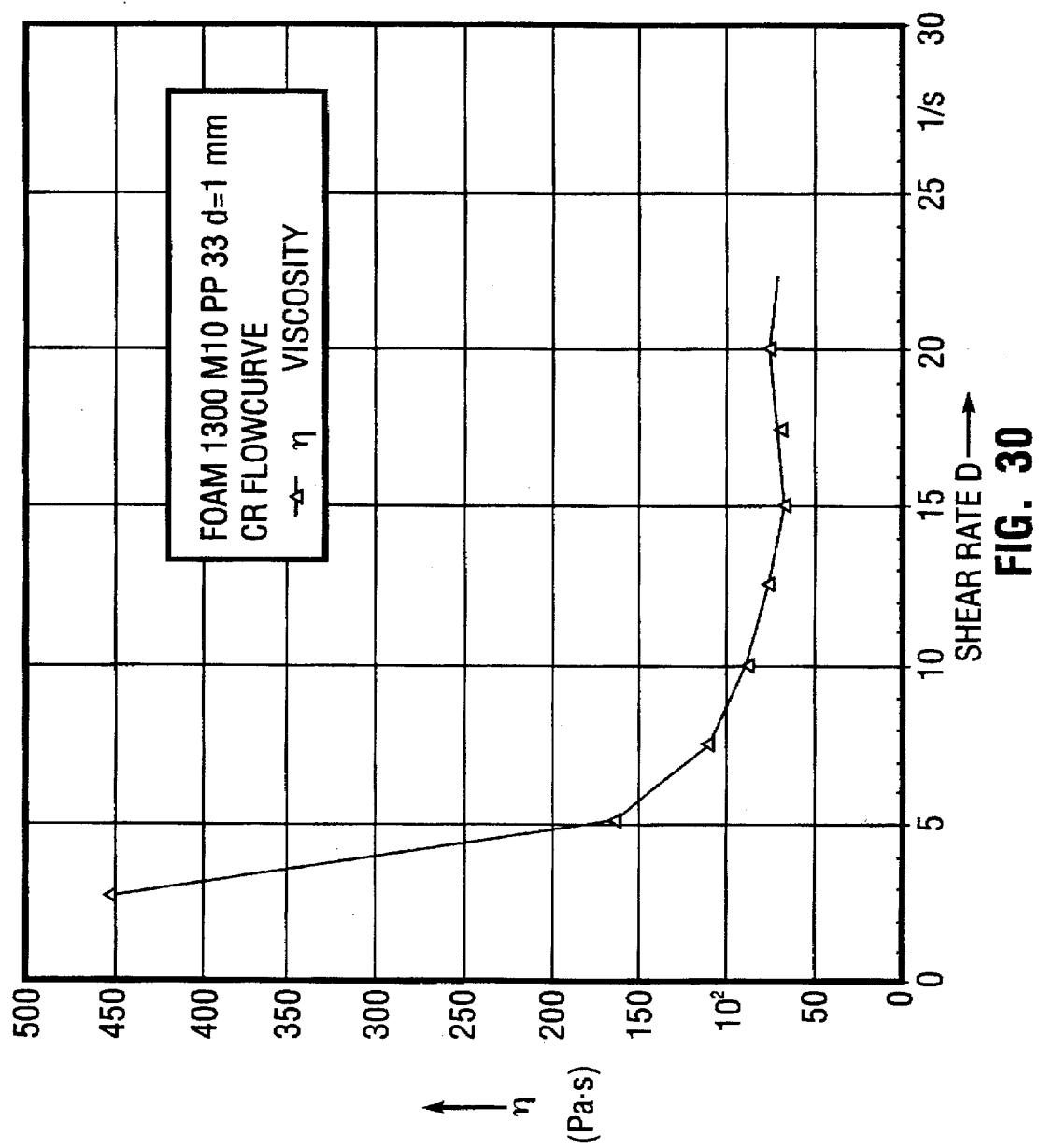
FIG. 30 shows a graph illustrating the effect of shear rate on viscosity for a moldable mixture containing 1300 g water.

FIG. 30 shows a flow curve for another mixture of Sample 2. FIG. 30 shows a drop in apparent viscosity with an increasing shear rate, with the viscosity stabilizing at about 75 Pa·s at a shear rate of 20 s$^{-1}$. This mixture of Sample 2 had an apparent viscosity of about 165 Pa·s at a shear rate of 5 s$^{-1}$.

Figure 31:
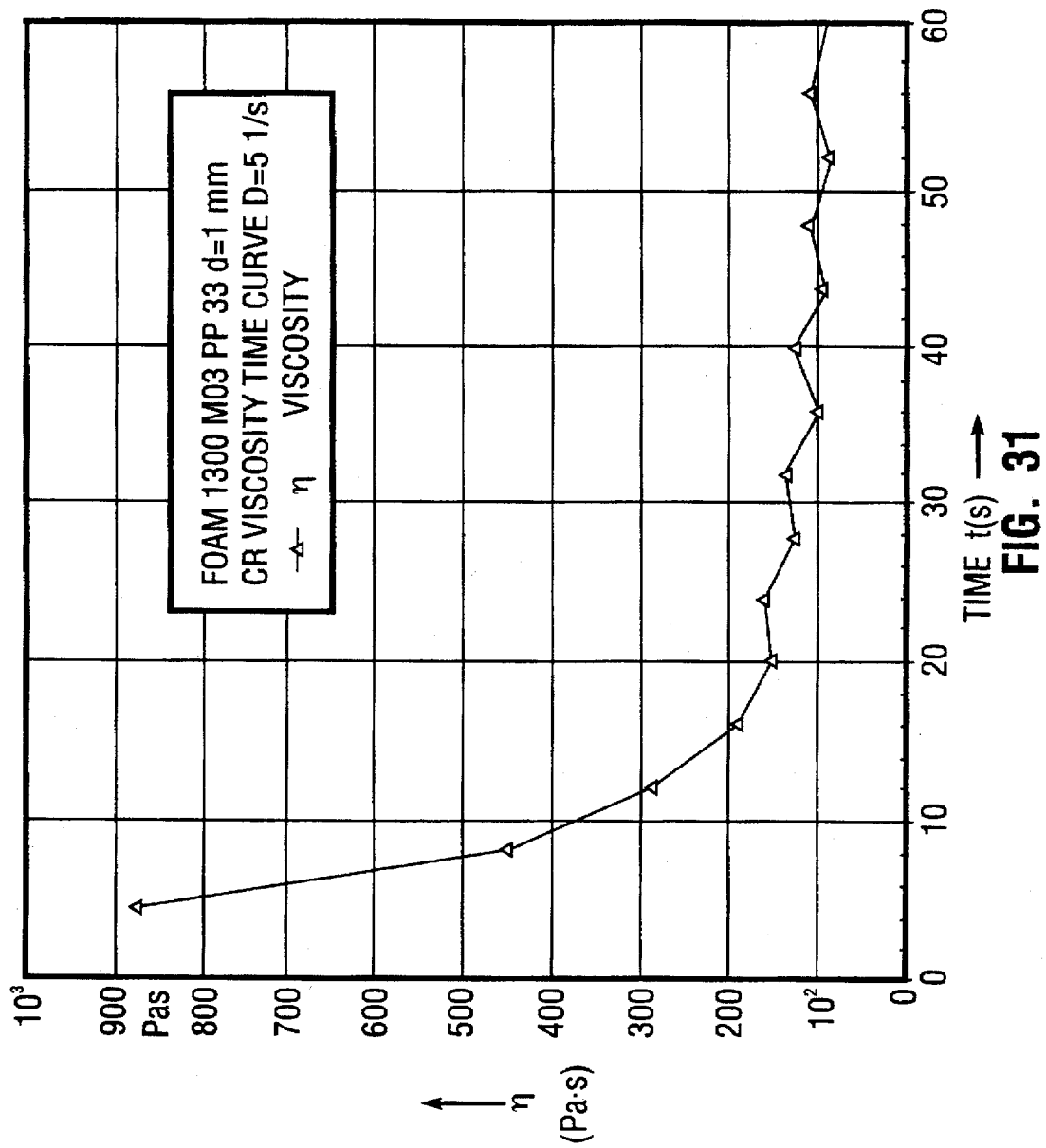
FIG. 31 shows a graph illustrating the effect of shearing time on viscosity for a moldable mixture containing 1300 g water.

FIG. 31 shows a viscosity-time-curve for the mixture of Sample 2 at a shear rate of 5 s$^{-1}$. FIG. 31 shows a drop in apparent viscosity with shearing time, with the viscosity stabilizing at about 100 Pa·s. This is most likely due to the alignment of fibers in the direction of shear over time. An initial viscosity was determined after 8 seconds to be 446 Pa·s at the shear rate of 5 s$^{-1}$. This number was an average of three single point measurements that varied between 419 and 472 Pa's.

Figure 32:
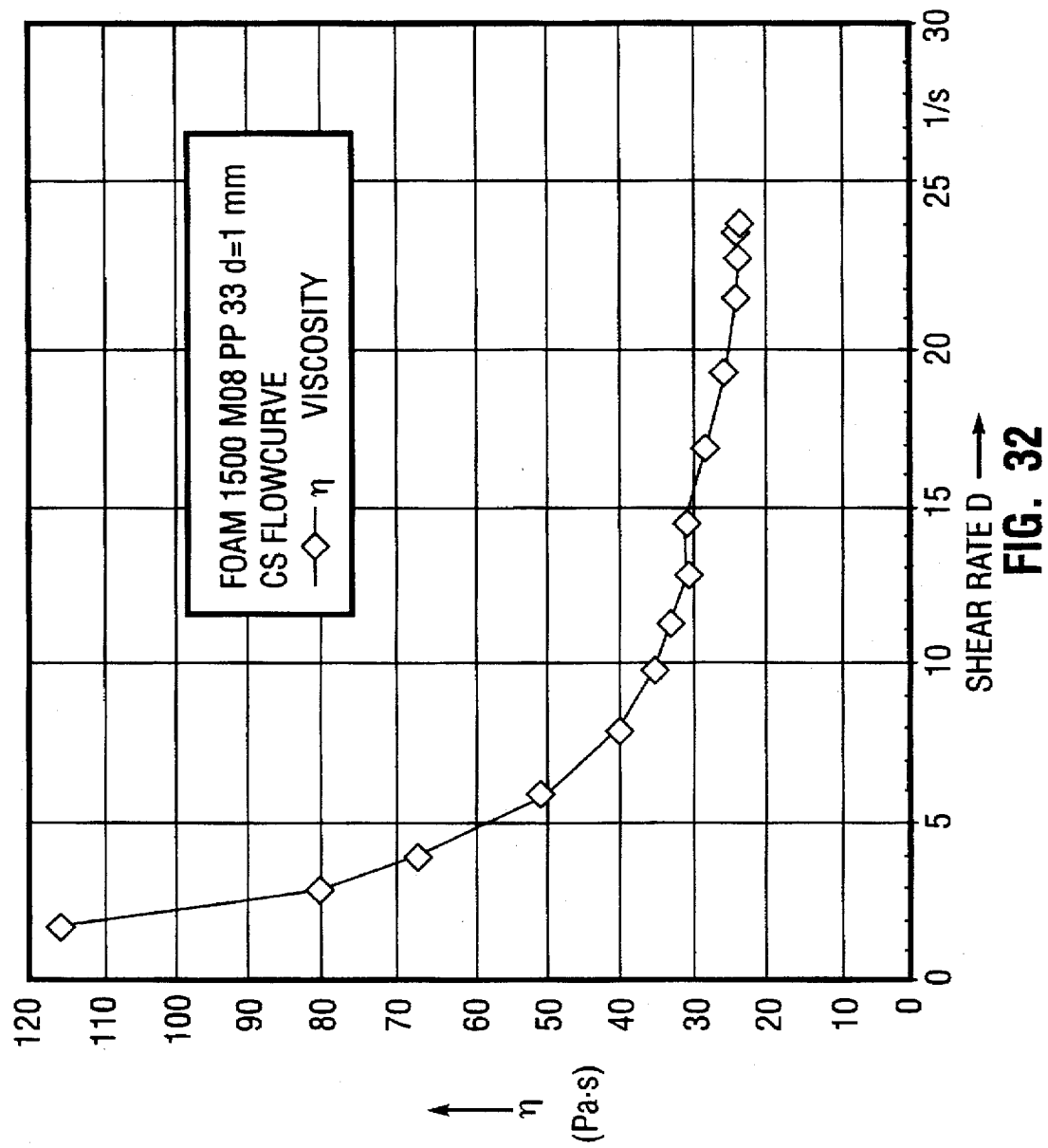
FIG. 32 shows a graph illustrating the effect of shear rate on viscosity for a moldable mixture containing 1500 g water.
Figure 33:
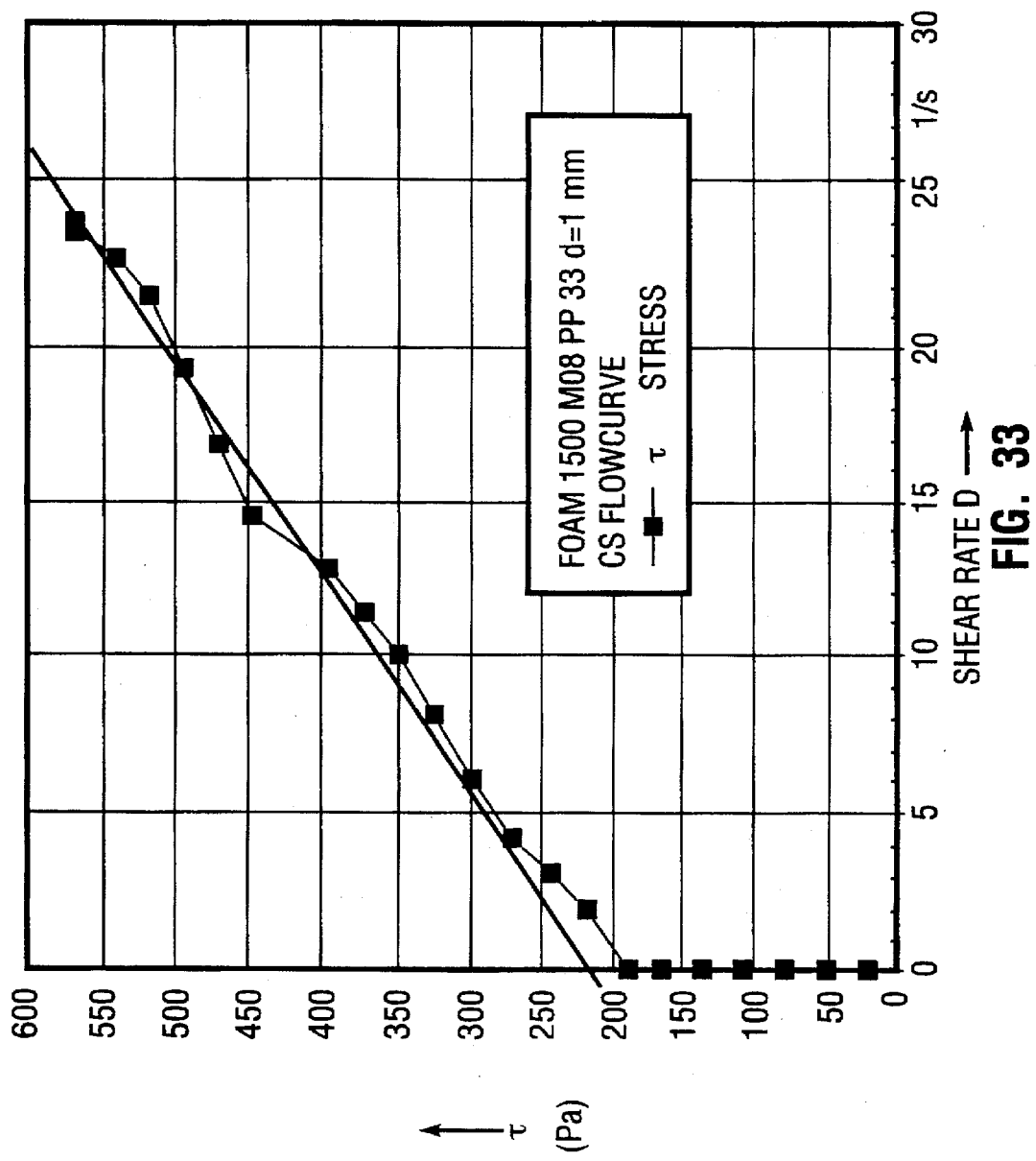
FIG. 33 shows a graph illustrating the effect of shear rate on yield stress for a moldable mixture containing 1500 g water.

FIGS. 32–33 show various flow curves for Sample 3. FIG. 32 shows a drop in apparent viscosity with an increasing shear rate, with the viscosity stabilizing at about 24 Pa·s at a shear rate of 24 s$^{-1}$. The mixture of Sample 3 had an apparent viscosity of about 60 Pa·s at a shear rate of 5 s$^{-1}$. FIG. 33 shows a flow curve of the shear rate vs. yield stress for Sample 3. The yield stress increased up to 600 Pa at a shear rate of 26.5 s$^{-1}$ from an initial yield stress of 215 Pa. By calculating the difference between the increased yield stress (600 Pa) and the initial yield stress (215 Pa) and dividing by the shear rate (26.5 s$^{-1}$), the plastic viscosity was determined to be 14.5 Pa·s.

EXAMPLES 227–246

Clam shell containers were formed using various moldable mixtures. The clam shells were formed with various molding times to determine the minimum molding time necessary to produce a quality product with maximum residual moisture. The clam shells were formed from two moldable mixtures with a different water content. All of the components in the moldable mixtures were the same except that the top portion of the clam shell was formed with 1400 g of water and the bottom portion of the clam shell was formed with 1300 g of water. The moldable mixtures had the following basic mix design:

| | |
|---|---|
| Western Polymer Potato Starch | 500 g |
| Calcium Carbonate (Georgia Marble RO40) | 500 g |
| Federal Softwood Fiber | 100 g |
| Water | 1400, 1300 g |
| Magnesium Stearate | 20 g |

The mold was heated to the following constant temperatures and was not adjusted during the molding process:

| | |
|---|---|
| Mold Core | 195° C. |
| Front Plate | 190° C. |
| Rear Plate | 190° C. |

A molding time of 30 seconds was chosen as a starting point. If the product was not of suitable quality at that molding time, the time was increased in 5 second increments until a satisfactory product was produced. When a satisfactory product was produced at a certain baking time, two more samples were produced, making three samples to average. This procedure continued to a final molding time of 130 seconds. A satisfactory product was determined as one that was form stable, with no bubbles (due to underheating), and had a smooth surface.

The weight of a sample was taken directly out of the mold. The sample was then dried in an oven at 150° C. and weighed again. The amount of moisture was determined by subtracting the dry weight from the mold weight of the sample and dividing by the mold weight. The average moisture of the three samples for each example was determined, including the top shell portions and the bottom shell portions, which were determined separately. The molding time and final moisture content of the top shell and bottom shell portions are summarized below for each of Examples 227–246.

| Example | Molding Time (sec) | Moisture (Wt-%) in top shell | Moisture (Wt-%) in bottom shell |
|---|---|---|---|
| 227 | 35 | 4.9 | 9.3 |
| 228 | 40 | 3.3 | 5.4 |
| 229 | 45 | 3.1 | 4.4 |
| 230 | 50 | 1.5 | 3.2 |
| 231 | 55 | 1.4 | 3.3 |
| 232 | 60 | 1.1 | 2.4 |
| 233 | 65 | 0.9 | 1.4 |
| 234 | 70 | 0.7 | 1.3 |
| 235 | 75 | 1.2 | 1.1 |
| 236 | 80 | 1.3 | 1.2 |
| 237 | 85 | 0.9 | 1.0 |
| 238 | 90 | 1.7 | 0.8 |
| 239 | 95 | 1.2 | 0.7 |
| 240 | 100 | 1.1 | 1.1 |
| 241 | 105 | 1.0 | 0.9 |
| 242 | 110 | 0.8 | 1.0 |
| 243 | 115 | 0.9 | 1.0 |
| 244 | 120 | 1.3 | 1.2 |
| 245 | 125 | 1.1 | 1.0 |
| 246 | 130 | 1.2 | 1.2 |

As shown above, there was a consistent relationship between sample moisture and baking time. The moisture in both the top shell and bottom shell portions dropped rapidly with small increases in baking time. In both portions, the residual moisture levels out between 0–1 wt-% moisture at 70–75 seconds. The variations after this time in residual moisture are due to the fact that when the products come out of the mold at the higher molding times, they are essentially completely dry. These dry products absorb additional moisture from the air in the time it takes to weigh them, resulting in the variations of the moisture content.

The data for the top shell portions indicates that a molding time between 40–45 seconds is sufficient to produce a quality product. All of the samples molded at less than 35 seconds resulted in poor products, while only one sample was poor at 40 seconds and all three samples were molded sufficiently at 45 seconds. The sample averages show a product moisture of about 3.3 wt-% at 40 seconds (Example 228) and about 3.1 wt-% (Example 229) at 45 seconds. Thus, the top shell portion had about 3 wt-% moisture in producing a satisfactory product.

Due to the higher density of the bottom shell portion, a longer molding time is required for the bottom shell. It was found that below 45 seconds, all of the samples were poor. A molding time of 50 seconds produced three satisfactory samples, but at a molding time of 55 seconds, one sample was again poor. Without considering the need for better heat transfer in the mold design, it was concluded that a sufficient molding time for the bottom shell portion was between 55–60 seconds (Examples 231–232). Thus, the bottom shell portion had about 2–3 wt-% moisture in producing a satisfactory product.

Thus, through the present invention, it is possible to produce a starch-based clam shell container with about 3 wt-% residual moisture directly out of the mold without the need for subsequent conditioning thereof. The molding times to produce such a clam shell are about 40–45 seconds for the top shell portion and about 55–60 seconds for the bottom shell portion.

EXAMPLES 247–267

Clam shell containers were formed using various moldable mixtures. In forming these products, the fill weight of the mixtures in the mold was determined and the effect of the fill weight on the final weight of the products was studied. The water content of the mixtures was 1100, 1300, and 1500 g, and Western Polymer potato starch was used along with RO40 calcium carbonate and 10 wt-% of softwood fibers. The water content, fill weight, and final weight of the products produced are summarized below for each of Examples 247–267.

| Example | Water Content (g) | Fill Weight (g) | Final Weight (g) |
| --- | --- | --- | --- |
| 247 | 1100 | 25 | — |
| 248 | 1100 | 27.5 | 24.87 |
| 249 | 1100 | 30 | 24.18 |
| 250 | 1100 | 32.5 | 23.63 |
| 251 | 1100 | 35 | 22.95 |
| 252 | 1100 | 37.5 | 22.44 |
| 253 | 1100 | 40 | — |
| 254 | 1300 | 25 | — |
| 255 | 1300 | 27.5 | 18.26 |
| 256 | 1300 | 30 | 17.67 |
| 257 | 1300 | 32.5 | 17.34 |
| 258 | 1300 | 35 | 16.82 |
| 259 | 1300 | 37.5 | 16.80 |
| 260 | 1300 | 40 | — |
| 261 | 1500 | 25 | — |
| 262 | 1500 | 27.5 | 16.42 |
| 263 | 1500 | 30 | 15.55 |
| 264 | 1500 | 32.5 | 14.75 |
| 265 | 1500 | 35 | 14.73 |
| 266 | 1500 | 37.5 | 15.18 |
| 267 | 1500 | 40 | — |

As shown above, as the fill weight increased for any given water content, the weight of the final product decreased. Also, for the same given fill weight, a higher water content resulted in a lower weight of the product. At a fill weight of 25 g and 40 g, poor products were formed so that the final weight was not reported for the above corresponding examples.

EXAMPLES 268–273

Clam shell containers were formed using various moldable mixtures. Western Polymer potato starch was used along with various fiber types, including cotton linters and wood fibers, in the moldable mixtures of Examples 268–273. The fiber type and amount, moisture and bulk density of the formed products are summarized below for each of Examples 268–273.

| Example | Fiber type (Wt-%) | Moisture (Wt-%) | Density (g/cm³) |
| --- | --- | --- | --- |
| 268 | Cotton Flock D200 fine (20%) | 4.98 | 0.217 |
| 269 | Cotton Flock D260 medium (20%) | 4.90 | 0.217 |
| 270 | Cotton Flock D275 coarse (20%) | 5.04 | 0.223 |
| 271 | Alfacell C10 (20%) | 5.05 | 0.215 |
| 272 | Softwood (10%) | 5.05 | 0.225 |
| 273 | Hardwood (10%) | 5.48 | 0.198 |

The mechanical properties of the formed clam shells of Examples 268–273 were also tested, including strength (peak load), in which the formed material was bent with a 10 mm displacement over a 40 mm span, as well as the strain (at rupture), and the fracture energy. These mechanical properties are summarized below.

| Example | Strength (MPa) | Strain (%) | Fracture Energy (J/m²) |
| --- | --- | --- | --- |
| 268 | 3.501 | 1.34 | 223 |
| 269 | 3.179 | 1.68 | 406 |
| 270 | 2.33 | 1.6 | 204 |
| 271 | 2.69 | 1.27 | 173 |
| 272 | 3.865 | 1.74 | 771 |
| 273 | 3.145 | 1.35 | 452 |

As shown above, the cotton fibers were able to provide strength to the starch matrix, but had a different post-fracture behavior. The softwood fiber-containing material (Example 272) retained integrity long after the first cracks propagated in the material and the load started to decrease, indicating that it was a tougher material. The products made out of cotton fibers and Alfacell (Examples 269–271) had a more abrupt failure and were thus more brittle. The product containing medium cotton fibers (Example 269) had a strain measurement closest to that for the softwood fiber-containing product, while the product containing fine cotton fibers (Example 268) had a strength measurement closest to that for the softwood fiber-containing product.

COMPARATIVE TESTING

Two fiber reinforced starch-based compositions of the present invention were formulated and molded into clam shell containers in order to compare their mechanical properties, including strain, flexural strength, and fracture energy, to the mechanical properties of a conventional starch-based material made without fibers formed into a tray. The compositions of the invention molded into clam shells are identified below as Samples 1 and 2, while the conventional starch material is identified as Sample 3.

The ingredients and respective amounts used in the compositions of the present invention that were used to mold the inventive clam shells are summarized below for each of Samples 1 and 2. The components were mixed together by first gelating 100 g of the starch-based binder in water and then uniformly dispersing the fibers throughout the fluid fraction by means of the high yield stress fluid fraction transferring the shear from the mixer down to the fiber level.

| Ingredient | Sample 1 | Sample 2 |
| --- | --- | --- |
| Potato Starch | 500 g | 1000 g |
| Calcium Carbonate (RO40) | 500 g | 0 |
| Softwood Fiber | 100 g | 100 g |
| Magnesium Stearate | 20 g | 20 g |
| Water | 1300 g | 1300 g |

The tray of Sample 3 was made from a conventional starch-based mixture containing no fibers or inorganic aggregates (namely a starch binder, water, and mold release agent) and measured 25×25 cm. Test sections were removed from the tray of Sample 3 and from the bottom of the clam shells of Samples 1 and 2 to determine various characteristics and mechanical properties of the materials used. The thickness, moisture content, and density of the articles made from Samples 1–3 are summarized below.

| Sample | Thickness (mm) | Moisture (wt-%) | Density (g/cm³) |
|---|---|---|---|
| 1 | 2.11 | 5.05 | 0.225 |
| 2 | 2.1 | 10.74 | 0.149 |
| 3 | 3.46 | 10.78 | 0.208 |

The mechanical properties of each of Samples 1–3 were measured, including flexural strength, strain, and fracture energy, by using a three point bending test at a constant displacement rate. Both load and displacement were measured, and subsequent analysis yielded the flexural strength, the strain to failure, and the fracture energy. These mechanical properties are summarized below along with the normalized fracture energy, which was determined to take into account the varying densities of Samples 1–3.

| Sample | Flexural Strength (MPa) | Strain (%) | Fracture Energy (J/m²) | Normalized Fracture Energy (J/m²)/(g/cm³) |
|---|---|---|---|---|
| 1 | 3.865 | 1.74 | 771 | 3430 |
| 2 | 3.464 | 1.88 | 526 | 3530 |
| 3 | 2.968 | 2.1 | 156 | 750 |

Figure 34:
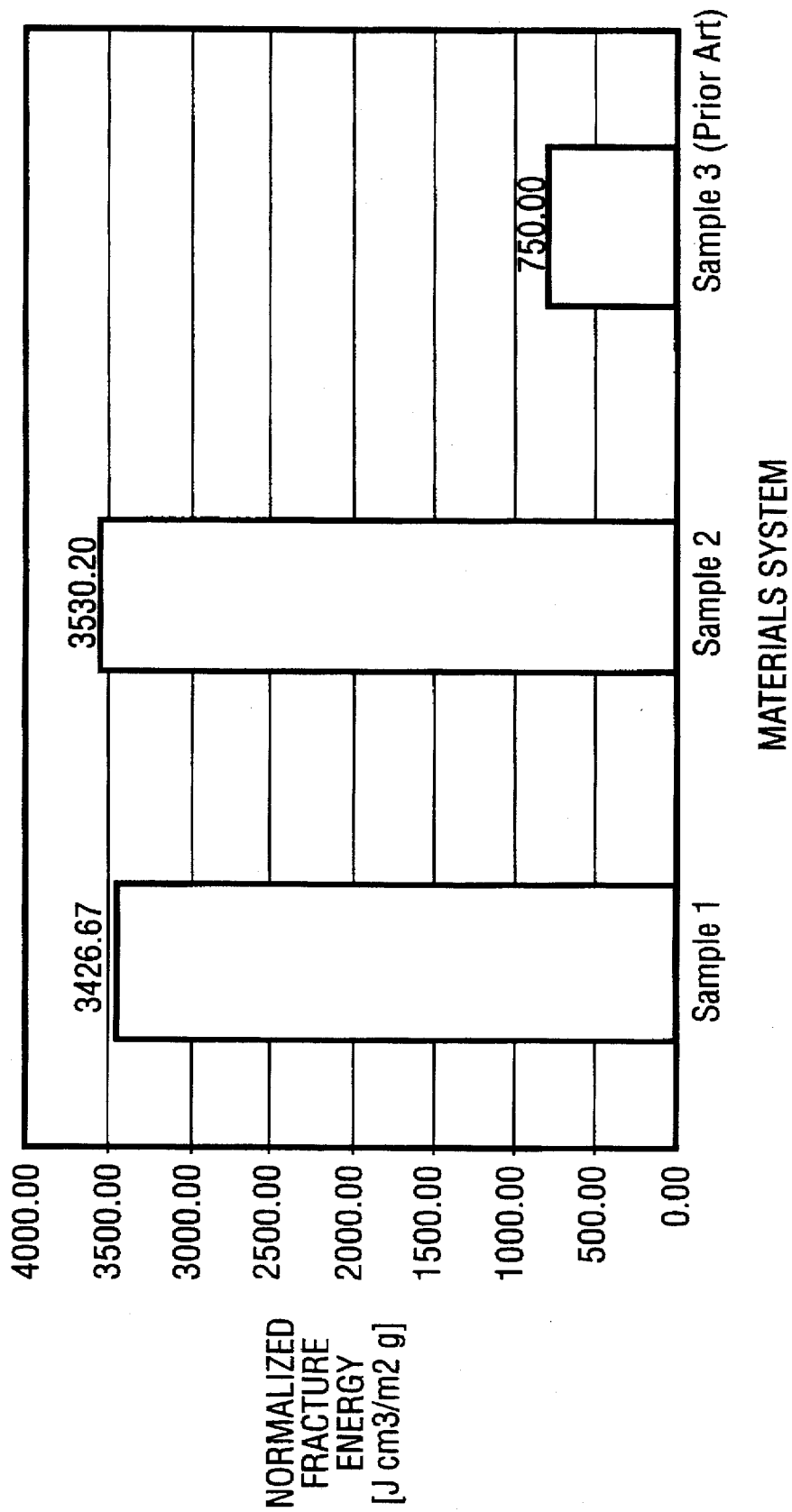
FIG. 34 shows a graph illustrating the normalized fracture energy of starch-based materials of the invention and a conventional starch material.

As shown above, the flexural strength of the articles made using Samples 1 and 2 of the present invention was higher than the flexural strength of the articles using the conventional starch-based composition of Sample 3. It should be noted that because the article made from Sample 3 had a greater thickness (3.46 mm) compared to the thicknesses of the articles made from Samples 1 and 2 (2.11 mm and 2.1 mm) it would be expected to give an artificially high flexural strength reading compared to if it had a thickness of about 2 mm due to limitations of the testing method. Hence, if Sample 3 would have had the same thickness as Samples 1 and 2 (2.1 mm), the flexural strength of Sample 3 would be expected to have been even lower. While the strain or elongation before failure was fairly comparable for each of Samples 1–3, the fracture energy was substantially higher for the article made from Samples 1 and 2 compared to the article made from Sample 3. As shown above, the difference in fracture energies was even more dramatic between the articles made from Samples 2 and 3 because of the significantly lower density of the article made from Sample 2. FIG. 34 shows a graph illustrating the much higher normalized fracture energies of Samples 1 and 2 compared with the lower normalized fracture energy of the conventional starch material of Sample 3. Thus, this comparative test demonstrates that the inclusion of substantially uniformly dispersed fibers in the compositions of the present invention yields articles with higher flexural strength and dramatically higher fracture energy compared to the articles made according to the prior art.

In a second comparative test, the articles made from the compositions of Samples 1–3 were tested for tensile strength and other properties. An additional composition made according to the present invention, identified as Sample 4, was prepared as above and formed into a clam shell article. A standard starch-based composition without fibers, identified as Sample 5, was also formed into a clam shell article. Finally, an article in the shape of a plate was obtained that was manufactured from a second conventional starch-based material identified as Sample 6. The components and their respective amounts within each of the compositions of Samples 4–6 are set forth below.

| Component | Sample 4 | Sample 5 | Sample 6 |
|---|---|---|---|
| Potato Starch | 1000 g | 1000 g | 495 g |
| Vegetable oil mixed with Cetodan (emulsified monoglyceride) | 0 | 0 | 50 g (47 g oil and 3 g Cetodan) |
| Softwood Fiber | 50 g | 0 | 0 |
| Mold release agent | 20 g | 20 g | 5 g |
| Water | 1300 | 1300 | 500 |

Sample pieces of the various articles that were tested were prepared as follows for testing. The samples to be tested were cut out of the bottom portions of the clam shells of Samples 1–2 and 4–5, and from the tray and plate of Samples 3 and 6, respectively. The samples for tensile testing were cut to a 25 mm×60 mm dimension. Since the mechanical properties of starch-based materials are generally sensitive to moisture content, and can change over time depending on the ambient moisture conditions to which they are exposed, the moisture contents within all six test samples were equilibrated in order to yield more reliable comparative test results. In particular, the test samples were placed in a humidity chamber at 25° C. and at 52% relative humidity for a period of about 12 hours, thereby equalizing the moisture within each of the test samples to about 10% by weight of the starch content. The moisture within each of the samples was maintained at this level until the moment they were tested.

Brass shim stock (0.005 inches in thickness) was attached to each end of a sample to provide means for securing the sample to the testing machine for applying a tension, or tensile stress. The shims were attached to the samples with an overlap of 15 mm on each end and an overhang of about 15 mm. Super Glue was used to attach the shims due to its quick curing time and high shear strength.

The tensile strengths of each of the test samples were tested using an Instron 8501 machine using the Series 9 program. The grips were about 70 mm apart and the tested sample was held by the overhanging portion of the brass shims thereon. It was assumed that the indirect application of a load to the shims would not measurably affect the test results as the stiffness of the brass shims was about 1000 times that of the starch-based materials of the test samples. The test was conducted under displacement control wherein the loading rate was held constant at 10 mm per minute. Displacement, or elongation, was allowed to proceed until a complete rupture of the sample was achieved, i.e., where the sample no longer could resist a load.

The tensile strength was calculated by dividing the maximum load by the cross-sectional area at the plane of fracture. The amount of strain before failure was calculated by dividing the displacement at maximum load by the gauge length (length of sample between the shims). It was assumed that the strain in the shims was negligible due to the much higher stiffness thereof. The fracture energy was calculated by computing the area under the load displacement curve (to the point of complete rupture of the test sample) and dividing it by the sample area at the plane of fracture.

The above mechanical properties as well as the density and starch content (weight fraction) of the materials of Samples 1–6 are summarized as follows.

| Sample | Density (g/cm$^3$) | Starch weight fraction | Tensile Strength (MPa) | Strain (%) | Fracture Energy (J/m$^2$) |
|---|---|---|---|---|---|
| 1 | 0.243 | 0.45 | 1.407 | 1.44 | 831 |
| 2 | 0.196 | 0.89 | 1.88 | 1.57 | 723 |
| 3 | 0.209 | 0.98 | 1.08 | 1.83 | 573 |
| 4 | 0.192 | 0.93 | 1.8 | 1.64 | 678 |
| 5 | 0.145 | 0.98 | 0.93 | 1.6 | 397 |
| 6 | 0.13 | 0.89 | 1.04 | 1.4 | 388 |

As the table shows, the tensile strengths and fracture energies are significantly greater with respect to articles made from the compositions of Samples 1, 2, and 4, which include substantially uniformly dispersed fibers. The mechanical properties of tensile strength and fracture energy were then normalized with respect to the density and the starch weight fraction for each of Samples 1–6. The results are summarized below.

| Sample | Normalized Tensile Strength MPa/[(g/cm$^3$) · weight fraction of starch] | Normalized Fracture Energy (J/m$^2$)/[(g/cm$^3$) · weight fraction of starch] |
|---|---|---|
| 1 | 13 | 7599 |
| 2 | 11 | 4142 |
| 3 | 5 | 2798 |
| 4 | 10 | 3796 |
| 5 | 7 | 2795 |
| 6 | 9 | 3356 |

As shown above, the normalized tensile strengths and fracture energies of the articles of Samples 1, 2 and 4, which were made according to the present invention, were significantly higher than the conventional materials of Samples 3, 5, and 6 that contained no fibers, particularly with respect to the tensile strength and fracture energy of Sample 1, which contained considerably less starch per unit weight of the article by virtue of the inclusion of a high inorganics content. This comparative test demonstrates that the inclusion of uniformly dispersed fibers substantially increased both the tensile strength and the fracture energy of the starch-based materials of the invention per unit starch, particularly where a large amount of calcium carbonate was included.

VII. SUMMARY.

From the foregoing, it will be appreciated that the present invention provides compositions and methods for manufacturing novel organically-bound materials that can replace paper, paperboard, metal, plastic, polystyrene, or other organic materials as the material of choice for producing containers and other articles.

The present invention further provides compositions and methods that improve the dispersion of fibers within such organically-bound materials without the use of large quantities of water. Such compositions and methods specifically allow for a more thorough dispersion of fibers, particularly relatively long-length fibers (i.e., those having an average length greater than about 1.5 mm), within the organically-bound materials used to make said containers or other articles.

The present invention additionally provides compositions and methods for manufacturing organically-bound materials that can be filled with relatively large percentages of inorganic aggregates, particularly an aggregate filler which is compatible with and commonly found in the earth, and yet maintain their structural integrity and desired mechanical properties.

Moreover, the present invention provides compositions and methods that yield highly inorganically filled, organically-bound articles having properties similar, or even superior, to paper, paperboard, metal, polystyrene, plastic, or other organic materials.

The present invention further provides compositions and methods which allow for the manufacture of containers and other articles without the need for prolonged, high-humidity conditioning in order to obtain the required flexibility or toughness.

The present invention also provides compositions and methods which yield starch-based articles that do not require the application of a coating to maintain adequate moisture within the cellular matrix or to make the cellular matrix water resistant.

The present invention additionally provides compositions and methods which yield starch-bound containers and other articles having a smoother, more uniform surface compared to existing starch-based articles.

The present invention further provides compositions and methods that yield starch-bound articles having varying cross-sectional thicknesses throughout the same article.

Further, the present invention provides compositions and methods for manufacturing articles using existing manufacturing equipment and techniques presently used to form such articles from paper, paperboard, metals, polystyrene, plastic, or other organic materials. Another object is that such compositions and methods do not result in the concomitant generation of wastes involved with the manufacture of articles from conventional materials.

The present invention also provides compositions and methods that require the use of less water that has to be removed during the manufacturing process (as compared to the manufacture of paper or other organically-based materials), in order to shorten the processing time and reduce the initial equipment capital investment.

The present invention additionally provides compositions and methods that make possible the manufacture of containers and other articles at a cost that is comparable to or even less than existing methods of manufacturing containers or other articles from paper, paperboard, metal, plastic, polystyrene, or other organic materials. Specifically, an important object and feature is that such compositions and methods result in a reduction in the consumption of energy, valuable natural resources, and initial start-up capital presently expended in making articles from conventional materials, such as paper, metals, polystyrene, plastic, or other organic materials.

The present invention further provides compositions and methods that yield articles having a similar cross-section and comparable mechanical properties of, e.g., insulation, strength, toughness, etc., compared to paper, paperboard, polystyrene, plastic, or other organic materials.

The present invention also provides compositions and methods that allow for the mass-production of highly inorganically filled, organically-bound articles that can be rapidly formed and ready to use within a matter of minutes from the beginning of the manufacturing process.

Finally, the present invention provides compositions and methods that allow for the production of highly inorganically filled, starch-based materials having greater flexibility, flexural strength, toughness, moldability, mass-producibility, product stability, and lower environmental impact compared to conventionally manufactured starch-based materials.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture having a fiber-reinforced, starch-bound cellular matrix of starch-based binder and inorganic aggregate, the matrix comprising a starch-based binder, an inorganic aggregate filler, and fibers substantially uniformly dispersed throughout the starch-bound cellular matrix, the fibers having an average aspect ratio greater than about 25:1, the inorganic filler having a concentration greater than about 20% by weight of the starch-bound cellular matrix, wherein the starch-bound cellular matrix has a thickness less than about 1 cm, wherein the starch-bound cellular matrix degrades after prolonged exposure to water.

2. An article of manufacture having a fiber-reinforced, starch-bound cellular matrix as defined in claim 1, wherein the cellular matrix is formed without a separate conditioning step.

3. An article of manufacture having a fiber-reinforced, starch-bound cellular matrix as defined in claim 1, wherein the cellular matrix includes less than about 5% by weight of a synthetic polymer.

4. An article of manufacture having a fiber-reinforced, starch-bound cellular matrix as defined in claim 1, wherein the cellular matrix includes less than about 2% by weight of a synthetic polymer.

5. An article of manufacture having a fiber-reinforced, starch-bound cellular matrix as defined in claim 1, wherein the cellular matrix includes no synthetic polymer.

6. An article of manufacture having a fiber-reinforced, starch-bound cellular matrix as defined in claim 1, wherein the cellular matrix has a flexural strength greater than about 1 MPa.

7. An article of manufacture having a fiber-reinforced, starch-bound cellular matrix as defined in claim 1, wherein the cellular matrix has a flexural strength greater than about 2 MPa.

8. An article of manufacture having a fiber-reinforced, starch-bound cellular matrix as defined in claim 1, wherein the cellular matrix has a tensile strength greater than about 0.75 MPa.

9. An article of manufacture having a fiber-reinforced, starch-bound cellular matrix as defined in claim 1, wherein the cellular matrix has a tensile strength greater than about 1 MPa.

10. An article of manufacture having a fiber-reinforced, starch-bound cellular matrix as defined in claim 1, wherein the cellular matrix has a fracture energy greater than about 300 J/m$^2$.

11. An article of manufacture having a fiber-reinforced, starch-bound cellular matrix as defined in claim 1, wherein the cellular matrix has a fracture energy greater than about 600 J/m$^2$.

12. An article of manufacture having a fiber-reinforced, starch-bound cellular matrix as defined in claim 1, wherein the cellular matrix has a flexural strength normalized with respect to density in a range of about 0.5 MPa/(g/cm$^3$) to about 60 MPa/(g/cm$^3$).

13. An article of manufacture having a fiber-reinforced, starch-bound cellular matrix as defined in claim 1, wherein the cellular matrix has a flexural strength normalized with respect to density in a range from about 1 MPa/(g/cm$^3$) to about 40 MPa/(g/cm$^3$).

14. An article of manufacture having a fiber-reinforced, starch-bound cellular matrix as defined in claim 1, wherein the cellular matrix has a flexural strength normalized with respect to density in a range from about 2 MPa/(g/cm$^3$) to about 20 MPa/(g/cm$^3$).

15. An article of manufacture having a fiber-reinforced, starch-bound cellular matrix as defined in claim 1, wherein the cellular matrix has a tensile strength normalized with respect to density in a range from about 0.5 MPa/(g/cm$^3$) to about 30 MPa/(g/cm$^3$).

16. An article of manufacture having a fiber-reinforced, starch-bound cellular matrix as defined in claim 1, wherein the cellular matrix has a tensile strength normalized with respect to density in a range from about 0.75 MPa/(g/cm$^3$) to about 20 MPa/(g/cm$^3$).

17. An article of manufacture having a fiber-reinforced, starch-bound cellular matrix as defined in claim 1, wherein the cellular matrix has a tensile strength normalized with respect to density in a range from about 1 MPa/(g/cm$^3$) to about 12 MPa/(g/cm$^3$).

18. An article of manufacture having a fiber-reinforced, starch-bound cellular matrix as defined in claim 1, wherein the cellular matrix has a fracture energy normalized with respect to density in a range from about 1000 (J/m$^2$)/(g/cm$^3$) to about 10,000 (J/m$^2$)/(g/cm$^3$).

19. An article of manufacture having a fiber-reinforced, starch-bound cellular matrix as defined in claim 1, wherein the cellular matrix has a fracture energy normalized with respect to density in a range from about 2000 (J/m$^2$)/(g/cm$^3$) to about 7500 (J/m$^2$)/(g/cm$^3$).

20. An article of manufacture having a fiber-reinforced, starch-bound cellular matrix as defined in claim 1, wherein the cellular matrix has a fracture energy normalized with respect to density in a range from about 3000 (J/m$^2$)/(g/cm$^3$) to about 5000 (J/m$^2$)/(g/cm$^3$).

21. An article of manufacture having a fiber-reinforced, starch-bound cellular matrix as defined in claim 1, wherein the cellular matrix has a flexural strength normalized with respect to weight fraction of the starch-based binder in a range from about 5 MPa/(wt. fraction of starch-based binder) to about 100 MPa/(wt. fraction of starch-based binder).

22. An article of manufacture having a fiber-reinforced, starch-bound cellular matrix as defined in claim 1, wherein the cellular matrix has a flexural strength normalized with respect to weight fraction of the starch-based binder in a range from about 10 MPa/(wt. fraction of starch-based binder) to about 75 MPa/(wt. fraction of starch-based binder).

23. An article of manufacture having a fiber-reinforced, starch-bound cellular matrix as defined in claim 1, wherein the cellular matrix has a flexural strength normalized with respect to weight fraction of the starch-based binder in a range from about 20 MPa/(wt. fraction of starch-based binder) to about 60 MPa/(wt. fraction of starch-based binder).

24. An article of manufacture having a fiber-reinforced, starch-bound cellular matrix as defined in claim 1, wherein the cellular matrix has a tensile strength normalized with respect to weight fraction of the starch-based binder in a range from about 3 MPa/(wt. fraction of starch-based binder) to about 50 MPa/(wt. fraction of starch-based binder).

25. An article of manufacture having a fiber-reinforced, starch-bound cellular matrix as defined in claim 1, wherein the cellular matrix has a tensile strength normalized with respect to weight fraction of the starch-based binder in a range from about 4 MPa/(wt. fraction of starch-based binder) to about 30 MPa/(wt. fraction of starch-based binder).

26. An article of manufacture having a fiber-reinforced, starch-bound cellular matrix as defined in claim 1, wherein the cellular matrix has a tensile strength normalized with respect to weight fraction of the starch-based binder in a range from about 5 MPa/(wt. fraction of starch-based binder) to about 20 MPa/(wt. fraction of starch-based binder).

27. An article of manufacture having a fiber-reinforced, starch-bound cellular matrix as defined in claim 1, wherein the cellular matrix has a fracture energy normalized with respect to weight fraction of the starch-based binder in a range from about 2000 $(J/m^2)$/(wt. fraction of starch-based binder) to about 30,000 $(J/m^2)$/(wt. fraction of starch-based binder).

28. An article of manufacture having a fiber-reinforced, starch-bound cellular matrix as defined in claim 1, wherein the cellular matrix has a fracture energy normalized with respect to weight fraction of the starch-based binder in a range from about 3000 $(J/m^2)$/(wt. fraction of starch-based binder) to about 15,000 $(J/m^2)$/(wt. fraction of starch-based binder).

29. An article of manufacture having a fiber-reinforced, starch-bound cellular matrix as defined in claim 1, wherein the cellular matrix has a fracture energy normalized with respect to weight fraction of the starch-based binder in a range from about 5000 $(J/m^2)$/(wt. fraction of starch-based binder) to about 10,000 $(J/m^2)$/(wt. fraction of starch-based binder).

30. An article of manufacture having a fiber-reinforced, starch-bound cellular matrix as defined in claim 1, wherein the article has a strain before failure in a range from about 1% to about 15%.

31. An article of manufacture having a fiber-reinforced, starch-bound cellular matrix as defined in claim 1, wherein the article has a strain before failure in a range from about 1% to about 10%.

32. An article of manufacture having a fiber-reinforced, starch-bound cellular matrix as defined in claim 1, wherein the article has a strain before failure in a range from about 1% to about 5%.

33. An article of manufacture having a fiber-reinforced, starch-bound cellular matrix as defined in claim 1, wherein the cellular matrix has a density in a range from about 0.05 $g/cm^3$ to about 1 $g/cm^3$.

34. An article of manufacture having a fiber-reinforced, starch-bound cellular matrix as defined in claim 1, wherein the cellular matrix has a density in a range from about 0.1 $g/cm^3$ to about 0.5 $g/cm^3$.

35. An article of manufacture having a fiber-reinforced, starch-bound cellular matrix as defined in claim 1, wherein the cellular matrix has a density in a range from about 0.15 $g/cm^3$ to about 0.25 $g/cm^3$.

36. An article of manufacture having a fiber-reinforced, starch-bound cellular matrix as defined in claim 1, wherein the cellular matrix includes an outer skin portion having a density and an interior foam portion having a density that is significantly lower than the density of the outer skin portion.

37. An article of manufacture having a fiber-reinforced, starch-bound cellular matrix as defined in claim 36, wherein the outer skin portion includes virtually no pinholes.

38. An article of manufacture having a fiber-reinforced, starch-bound cellular matrix as defined in claim 36, wherein the cross-sectional area of pinholes within the outer skin portion that are large enough to allow passage of moisture is less than about 15% the cross-sectional area of the outer skin portion.

39. An article of manufacture having a fiber-reinforced, starch-bound cellular matrix as defined in claim 36, wherein the cross-sectional area of pinholes within the outer skin portion that are large enough to allow passage of moisture is less than about 10% the cross-sectional area of the outer skin portion.

40. An article of manufacture having a fiber-reinforced, starch-bound cellular matrix as defined in claim 36, wherein the cross-sectional area of pinholes within the outer skin portion that are large enough to allow passage of moisture is less than about 5% the cross-sectional area of the outer skin portion.

41. An article of manufacture having a fiber-reinforced, starch-bound cellular matrix as defined in claim 1, wherein the starch-based binder includes an unmodified starch that has been gelatinized during molding.

42. An article of manufacture having a fiber-reinforced, starch-bound cellular matrix as defined in claim 1, wherein the starch-based binder includes a potato starch or potato starch derivative that has been gelatinized during molding.

43. An article of manufacture having a fiber-reinforced, starch-bound cellular matrix as defined in claim 1, wherein the starch-based binder includes a waxy corn starch or waxy corn starch derivative that has been gelatinized during molding.

44. An article of manufacture having a fiber-reinforced, starch-bound cellular matrix as defined in claim 1, wherein the starch-based binder has an amylose content less than about 45%.

45. An article of manufacture having a fiber-reinforced, starch-bound cellular matrix as defined in claim 1, wherein the starch-based binder has an amylose content less than about 35%.

46. An article of manufacture having a fiber-reinforced, starch-bound cellular matrix as defined in claim 1, wherein the starch-based binder has an amylose content less than about 25%.

47. An article of manufacture having a fiber-reinforced, starch-bound cellular matrix as defined in claim 1, wherein the starch-based binder includes a modified starch.

48. An article of manufacture having a fiber-reinforced, starch-bound cellular matrix as defined in claim 1, wherein the starch-based binder includes a starch that has been modified by a process selected from the group consisting of esterification, ethefification, oxidation, acid hydrolysis, cross-linking, and enzyme conversion.

49. An article of manufacture having a fiber-reinforced, starch-bound cellular matrix as defined in claim 1, wherein the starch-based binder has a concentration in a range from about 10% to about 80% by weight of the cellular matrix.

50. An article of manufacture having a fiber-reinforced, starch-bound cellular matrix as defined in claim 1, wherein the starch-based binder has a concentration in a range from about 30% to about 70% by weight of the cellular matrix.

51. An article of manufacture having a fiber-reinforced, starch-bound cellular matrix as defined in claim 1, wherein the starch-based binder has a concentration in a range from about 40% to about 60% by weight of the cellular matrix.

52. An article of manufacture having a fiber-reinforced, starch-bound cellular matrix as defined in claim 1, wherein the fibers include naturally occurring organic fibers.

53. An article of manufacture having a fiber-reinforced, starch-bound cellular matrix as defined in claim 1, wherein the fibers include cellulosic fibers.

54. An article of manufacture having a fiber-reinforced, starch-bound cellular matrix as defined in claim 1, wherein the fibers are derived from at least one fiber source selected from the group consisting of plant leaves, stems, husks, shells, and fruits.

55. An article of manufacture having a fiber-reinforced, starch-bound cellular matrix as defined in claim 1, wherein the fibers are derived from a fiber source selected from the group consisting of hemp, cotton, sisal, abaca, and bagasse.

56. An article of manufacture having a fiber-reinforced, starch-bound cellular matrix as defined in claim 1, wherein the fibers are derived from hardwood.

57. An article of manufacture having a fiber-reinforced, starch-bound cellular matrix as defined in claim 1, wherein the fibers are derived from softwood.

58. An article of manufacture having a fiber-reinforced, starch-bound cellular matrix as defined in claim 1, wherein the fibers include inorganic fibers.

59. An article of manufacture having a fiber-reinforced, starch-bound cellular matrix as defined in claim 1, wherein the fibers are derived from a material selected from the group consisting of glass, graphite, silica, ceramic, and metal.

60. An article of manufacture having a fiber-reinforced, starch-bound cellular matrix as defined in claim 1, wherein the fibers include recycled paper fibers.

61. An article of manufacture having a fiber-reinforced, starch-bound cellular matrix as defined in claim 1, wherein the fibers have a concentration in a range from about 2% to about 80% by weight of the cellular matrix.

62. An article of manufacture having a fiber-reinforced, starch-bound cellular matrix as defined in claim 1, wherein the fibers have a concentration in a range from about 4% to about 40% by weight of the cellular matrix.

63. An article of manufacture having a fiber-reinforced, starch-bound cellular matrix as defined in claim 1, wherein the fibers have a concentration in a range from about 5% to about 20% by weight of the cellular matrix.

64. An article of manufacture having a fiber-reinforced, starch-bound cellular matrix as defined in claim 1, wherein the fibers have an aspect ratio of at least about 100:1.

65. An article of manufacture having a fiber-reinforced, starch-bound cellular matrix as defined in claim 1, wherein the fibers have an aspect ratio of at least about 250:1.

66. An article of manufacture having a fiber-reinforced, starch-bound cellular matrix as defined in claim 1, wherein the fibers have an average length in a range from about 0.3 mm to about 2 mm.

67. An article of manufacture having a fiber-reinforced, starch-bound cellular matrix as defined in claim 1, wherein the fibers have an average length of at least about 2 mm.

68. An article of manufacture having a fiber-reinforced, starch-bound cellular matrix as defined in claim 1, wherein the fibers have an average length of at least about 3.5 mm.

69. An article of manufacture having a fiber-reinforced, starch-bound cellular matrix as defined in claim 1, wherein the fibers have an average length of at least about 6.5 mm.

70. An article of manufacture having a fiber-reinforced, starch-bound cellular matrix as defined in claim 1, wherein the inorganic aggregate filler includes calcium carbonate.

71. An article of manufacture having a fiber-reinforced, starch-bound cellular matrix as defined in claim 1, wherein the inorganic aggregate filler is selected from the group consisting of sand, gravel, rock, limestone, sandstone, glass beads, mica, clay, kaolin, synthetic clay, alumina, silica, fly ash, fused silica, tabular alumina, microspheres, calcium sulfate dihydrate, calcium aluminate, hydrated hydraulic cement particles, and unhydrated hydraulic cement particles.

72. An article of manufacture having a fiber-reinforced, starch-bound cellular matrix as defined in claim 1, wherein the inorganic aggregate filler is selected from the group consisting of perlite, vermiculite, hollow glass spheres, aerogels, xerogels, porous ceramic spheres, xonotlite, lightweight expanded clays, pumice, and exfoliated rock.

73. An article of manufacture having a fiber-reinforced, starch-bound cellular matrix as defined in claim 1, wherein the inorganic aggregate filler has a concentration in a range from about 30% to about 70% by weight of the cellular matrix.

74. An article of manufacture having a fiber-reinforced, starch-bound cellular matrix as defined in claim 1, wherein the inorganic aggregate filler has a concentration in a range from about 40% to about 60% by weight of the cellular matrix.

75. An article of manufacture having a fiber-reinforced, starch-bound cellular matrix as defined in claim 1, wherein the inorganic aggregate filler has a specific surface area in a range from about 0.1 $m^2/g$ to about 400 $m^2/g$.

76. An article of manufacture having a fiber-reinforced, starch-bound cellular matrix as defined in claim 1, wherein the inorganic aggregate filler has a specific surface area in a range from about 0.15 $m^2/g$ to about 50 $m^2/g$.

77. An article of manufacture having a fiber-reinforced, starch-bound cellular matrix as defined in claim 1, wherein the inorganic aggregate filler has a specific surface area in a range from about 0.2 $m^2/g$ to about 2 $m^2/g$.

78. An article of manufacture having a fiber-reinforced, starch-bound cellular matrix as defined in claim 1, wherein the inorganic aggregate filler has a natural packing density in a range from about 0.5 to about 0.9.

79. An article of manufacture having a fiber-reinforced, starch-bound cellular matrix as defined in claim 1, wherein the inorganic aggregate filler has a natural packing density in a range from about 0.6 to about 0.8.

80. An article of manufacture having a fiber-reinforced, starch-bound cellular matrix as defined in claim 1, wherein the cellular matrix further comprises a humectant.

81. An article of manufacture having a fiber-reinforced, starch-bound cellular matrix as defined in claim 1, further comprising a coating on a surface of the article.

82. An article of manufacture having a fiber-reinforced, starch-bound cellular matrix as defined in claim 81, wherein the coating renders the article more resistant to water.

83. An article of manufacture having a fiber-reinforced, starch-bound cellular matrix as defined in claim 81, wherein the coating renders the article more resistant to oils.

84. An article of manufacture having a fiber-reinforced, starch-bound cellular matrix as defined in claim 81, wherein the coating comprises a wax.

85. An article of manufacture having a fiber-reinforced, starch-bound cellular matrix as defined in claim 81, wherein the coating comprises polyethylene.

86. An article of manufacture having a fiber-reinforced, starch-bound cellular matrix as defined in claim 81, wherein the coating comprises polylactic acid.

87. An article of manufacture having a fiber-reinforced, starch-bound cellular matrix as defined in claim 81, wherein the coating comprises shellac.

88. An article of manufacture having a fiber-reinforced, starch-bound cellular matrix as defined in claim 81, wherein the coating comprises ethyl cellulose.

89. An article of manufacture having a fiber-reinforced, starch-bound cellular matrix as defined in claim 81, wherein the coating comprises polyvinyl alcohol.

90. An article of manufacture having a fiber-reinforced, starch-bound cellular matrix as defined in claim 81, wherein the coating comprises magnesium stearate.

91. An article of manufacture having a fiber-reinforced, starch-bound cellular matrix as defined in claim 1, the cellular matrix further comprising an integral sealing material.

92. An article of manufacture having a fiber-reinforced, starch-bound cellular matrix as defined in claim 91, wherein the internal sealing material comprises polyvinyl alcohol.

93. An article of manufacture having a fiber-reinforced, starch-bound cellular matrix as defined in claim 1, wherein the article comprises a food or beverage container.

94. An article of manufacture having a fiber-reinforced, starch-bound cellular matrix as defined in claim 1, wherein the article comprises a liquid tight container.

95. An article of manufacture having a fiber-reinforced, starch-bound cellular matrix as defined in claim 1, wherein the article is in the shape of a clam shell container.

96. An article of manufacture having a fiber-reinforced, starch-bound cellular matrix as defined in claim 1, wherein the article is in the shape of a carton.

97. An article of manufacture having a fiber-reinforced, starch-bound cellular matrix as defined in claim 1, wherein the article is in the shape of a box.

98. An article of manufacture having a fiber-reinforced, starch-bound cellular matrix as defined in claim 1, wherein the article is in the shape of a cup.

99. An article of manufacture having a fiber-reinforced, starch-bound cellular matrix as defined in claim 1, wherein the article is in the shape of a plate.

100. An article of manufacture having a fiber-reinforced, starch-bound cellular matrix as defined in claim 1, wherein the article is in the shape of a bowl.

101. An article of manufacture having a fiber-reinforced, starch-bound cellular matrix as defined in claim 1, wherein the article is in the shape of a tray.

102. An article of manufacture having a fiber-reinforced, inorganically filled, starch-bound cellular matrix of starch and inorganic aggregate, the cellular matrix comprising a starch-based binder, an inorganic aggregate filler having a concentration in a range from about 20% to about 80% by weight of the cellular matrix, and fibers substantially uniformly dispersed throughout the matrix, the fibers having an average fiber length in a range from about 2 mm to about 25 mm, an average aspect ratio greater than about 25:1, and a concentration in a range from about 2% to about 80% by volume of the starch-bound cellular matrix, wherein the starch-bound cellular matrix has a thickness less than about 5 mm and degrades after prolonged exposure to water.

103. An article of manufacture having a fiber-reinforced, starch-bound cellular matrix as defined in claim 102, wherein the cellular matrix is formed without a separate conditioning step.

104. An article of manufacture having a fiber-reinforced, starch-bound cellular matrix as defined in claim 102, wherein the cellular matrix includes less than about 5% by weight of a synthetic polymer.

105. An article of manufacture having a fiber-reinforced, starch-bound cellular matrix as defined in claim 102, wherein the cellular matrix includes no synthetic polymer.

106. An article of manufacture having a fiber-reinforced, starch-bound cellular matrix as defined in claim 102, wherein the article comprises a food or beverage container.

107. An article of manufacture having a fiber-reinforced, starch-bound cellular matrix comprising a starch-based binder and fibers substantially uniformly dispersed throughout the starch-bound cellular matrix, the fibers having an average length greater than about 2 mm, an average aspect ratio greater than about 25:1, and a concentration in a range from about 2% to about 80% by weight of the cellular matrix, the cellular matrix having a thickness less than about 1 cm and degrades after prolonged exposure to water.

108. An article of manufacture having a fiber-reinforced, starch-bound cellular matrix as defined in claim 107, wherein the cellular matrix has a density in a range from about 0.05 g/cm$^3$ to about 1 g/cm$^3$.

109. An article of manufacture having a fiber-reinforced, starch-bound cellular matrix as defined in claim 107, wherein the cellular matrix has a density in a range from about 0.1 g/cm$^3$ to about 0.5 g/cm$^3$.

110. An article of manufacture having a fiber-reinforced, starch-bound cellular matrix as defined in claim 107, wherein the cellular matrix includes an outer skin portion having a density and an interior foam portion having a density that is significantly lower than the density of the outer skin portion.

111. An article of manufacture having a fiber-reinforced, starch-bound cellular matrix as defined in claim 107, wherein the starch-based binder includes an unmodified starch that has been gelatinized during molding.

112. An article of manufacture having a fiber-reinforced, starch-bound cellular matrix as defined in claim 107, wherein the starch-based binder includes a potato starch or potato starch derivative that has been gelatinized during molding.

113. An article of manufacture having a fiber-reinforced, starch-bound cellular matrix as defined in claim 107, wherein the starch-based binder includes a waxy corn starch or waxy corn starch derivative that has been gelatinized during molding.

114. An article of manufacture having a fiber-reinforced, starch-bound cellular matrix as defined in claim 107, wherein the starch-based binder includes a modified starch.

115. An article of manufacture having a fiber-reinforced, starch-bound cellular matrix as defined in claim 107, wherein the starch-based binder has a concentration in a range from about 10% to about 80% by weight of the cellular matrix.

116. An article of manufacture having a fiber-reinforced, starch-bound cellular matrix as defined in claim 107, wherein the starch-based binder has a concentration in a range from about 30% to about 70% by weight of the cellular matrix.

117. An article of manufacture having a fiber-reinforced, starch-bound cellular matrix as defined in claim 107, wherein the fibers include naturally occurring organic fibers.

118. An article of manufacture having a fiber-reinforced, starch-bound cellular matrix as defined in claim 107, wherein the fibers have an aspect ratio of at least about 100:1.

119. An article of manufacture having a fiber-reinforced, starch-bound cellular matrix as defined in claim 107, wherein the fibers have an aspect ratio of at least about 250:1.

120. An article of manufacture having a fiber-reinforced, starch-bound cellular matrix as defined in claim 107, wherein the fibers have an average length of at least about 3.5 mm.

121. An article of manufacture having a fiber-reinforced, starch-bound cellular matrix as defined in claim 107, further comprising an inorganic aggregate filler.

122. An article of manufacture having a fiber-reinforced, starch-bound cellular matrix as defined in claim 121, wherein the inorganic aggregate filler includes calcium carbonate.

123. An article of manufacture having a fiber-reinforced, starch-bound cellular matrix as defined in claim 121, wherein the inorganic aggregate filler is selected from the group consisting of sand, gravel, rock, limestone, sandstone, glass beads, mica, clay, kaolin, synthetic clay, alumina, silica, fly ash, fused silica, tabular alumina, microspheres, calcium sulfate dihydrate, calcium aluminate, hydrated hydraulic cement particles, and unhydrated hydraulic cement particles.

124. An article of manufacture having a fiber-reinforced, starch-bound cellular matrix as defined in claim 121, wherein the inorganic aggregate filler is selected from the group consisting of perlite, vermiculite, hollow glass spheres, aerogels, xerogels, porous ceramic spheres, xonotlite, lightweight expanded clays, pumice, and exfoliated rock.

125. An article of manufacture having a fiber-reinforced, starch-bound cellular matrix as defined in claim 121, wherein the inorganic aggregate filler has a concentration in a range from about 20% to about 80% by weight of the cellular matrix.

126. An article of manufacture having a fiber-reinforced, starch-bound cellular matrix as defined in claim 121, wherein the inorganic aggregate filler has a concentration in a range from about 30% to about 70% by weight of the cellular matrix.

127. An article of manufacture having a fiber-reinforced, starch-bound cellular matrix as defined in claim 121, wherein the inorganic aggregate filler has a concentration in a range from about 40% to about 60% by weight of the cellular matrix.

128. An article of manufacture having a fiber-reinforced, starch-bound cellular matrix as defined in claim 107, wherein the cellular matrix further comprises a humectant.

129. An article of manufacture having a fiber-reinforced, starch-bound cellular matrix as defined in claim 107, further comprising a coating on a surface of the article.

130. An article of manufacture having a fiber-reinforced, starch-bound cellular matrix as defined in claim 107, wherein the article comprises a food or beverage container.

131. An article of manufacture having a fiber-reinforced, starch-bound cellular matrix as defined in claim 107, wherein the article comprises a liquid tight container.

132. An article of manufacture having a fiber-reinforced, starch-bound cellular matrix as defined in claim 107, wherein the article is in the shape of a clam shell container.

133. An article of manufacture having a fiber-reinforced, starch-bound cellular matrix as defined in claim 107, wherein the cellular matrix has a thickness less than about 5 mm.

134. An article of manufacture having a fiber-reinforced, starch-bound cellular matrix comprising a starch-based binder and fibers substantially uniformly dispersed throughout the starch-bound cellular matrix, the fibers having an average length greater than about 2 mm, an average aspect ratio greater than about 25:1, and a concentration in a range from about 2% to about 80% by weight of the cellular matrix, the cellular matrix including an outer skin portion having a density and an interior foam portion having a density that is significantly lower than the density of the outer skin portion.

135. An article of manufacture having a fiber-reinforced, starch-bound cellular matrix as defined in claim 134, wherein the cellular matrix has a density in a range from about 0.05 g/cm$^3$ to about 1 g/cm$^3$.

136. An article of manufacture having a fiber-reinforced, starch-bound cellular matrix as defined in claim 134, wherein the cellular matrix has a density in a range from about 0.1 g/cm$^3$ to about 0.5 g/cm$^3$.

137. An article of manufacture having a fiber-reinforced, starch-bound cellular matrix as defined in claim 134, wherein the cellular matrix has a thickness less than about 1 cm.

138. An article of manufacture having a fiber-reinforced, starch-bound cellular matrix as defined in claim 134, further comprising an inorganic aggregate filler.

139. An article of manufacture having a fiber-reinforced, starch-bound cellular matrix as defined in claim 138, wherein the inorganic aggregate filler includes calcium carbonate.

140. An article of manufacture having a fiber-reinforced, starch-bound cellular matrix as defined in claim 138, wherein the inorganic aggregate filler has a concentration in a range from about 20% to about 80% by weight of the cellular matrix.

141. An article of manufacture having a fiber-reinforced, starch-bound cellular matrix as defined in claim 138, wherein the inorganic aggregate filler has a concentration in a range from about 30% to about 70% by weight of the cellular matrix.

142. An article of manufacture having a fiber-reinforced, starch-bound cellular matrix as defined in claim 134, further comprising a coating on a surface of the article.

143. An article of manufacture having a fiber-reinforced, starch-bound cellular matrix as defined in claim 134, wherein the starch-based binder includes an unmodified starch that has been gelatinized during molding.

144. An article of manufacture having a fiber-reinforced, starch-bound cellular matrix as defined in claim 134, wherein the starch-based binder includes a potato starch or potato starch derivative that has been gelatinized during molding.

145. An article of manufacture having a fiber-reinforced, starch-bound cellular matrix as defined in claim 134, wherein the starch-based binder includes a waxy corn starch or waxy corn starch derivative that has been gelatinized during molding.

146. An article of manufacture having a fiber-reinforced, starch-bound cellular matrix as defined in claim 134, wherein the starch-based binder includes a modified starch.

147. An article of manufacture having a fiber-reinforced, starch-bound cellular matrix as defined in claim 134, wherein the starch-based binder has a concentration in a range from about 10% to about 80% by weight of the cellular matrix.

148. An article of manufacture having a fiber-reinforced, starch-bound cellular matrix as defined in claim 134, wherein the starch-based binder has a concentration in a range from about 30% to about 70% by weight of the cellular matrix.

149. An article of manufacture having a fiber-reinforced, starch-bound cellular matrix as defined in claim 134, wherein the fibers include naturally occurring organic fibers.

150. An article of manufacture having a fiber-reinforced, starch-bound cellular matrix as defined in claim 134, wherein the fibers include inorganic fibers.

151. An article of manufacture having a fiber-reinforced, starch-bound cellular matrix as defined in claim 134, wherein the fibers have an aspect ratio of at least about 100:1.

152. An article of manufacture having a fiber-reinforced, starch-bound cellular matrix as defined in claim 134, wherein the fibers have an aspect ratio of at least about 250:1.

153. An article of manufacture having a fiber-reinforced, starch-bound cellular matrix as defined in claim 134, wherein the fibers have an average length greater than about 3.5 mm.

154. An article of manufacture having a fiber-reinforced, starch-bound cellular matrix as defined in claim 134, wherein the cellular matrix further comprises a humectant.

155. An article of manufacture having a fiber-reinforced, starch-bound cellular matrix as defined in claim 134, wherein the article comprises a food or beverage container.

156. An article of manufacture having a fiber-reinforced, starch-bound cellular matrix as defined in claim 134, wherein the article comprises a liquid-tight container.

157. An article of manufacture having a fiber-reinforced, starch-bound cellular matrix as defined in claim 134, wherein the article is in the shape of a clam-shell container.

158. An article of manufacture having a fiber-reinforced, starch-bound cellular matrix of starch and inorganic aggregate, the cellular matrix comprising a starch-based binder, and inorganic aggregate filler, and fibers substantially uniformly dispersed throughout the starch-bound cellular matrix, the fibers having an average aspect ratio greater than about 25:1, the inorganic aggregate filler having a concentration greater than about 20% by weight of the cellular matrix, the cellular matrix including an outer skin portion having a density and an interior foam portion having a density that is significantly lower than the density of the outer skin portion.

159. An article of manufacture having a fiber-reinforced, starch-bound cellular matrix as defined in claim 158, wherein the article comprises a food or beverage container.

160. An article of manufacture having a fiber-reinforced, starch-bound cellular matrix as defined in claim 158, further comprising a coating on a surface of the article.

161. An article of manufacture having a fiber-reinforced, starch-bound cellular matrix as defined in claim 158, wherein the starch-based binder includes an unmodified starch that has been gelatinized during molding.

162. An article of manufacture having a fiber-reinforced, starch-bound cellular matrix as defined in claim 158, wherein the starch-based binder includes a potato starch or potato starch derivative that has been gelatinized during molding.

163. An article of manufacture having a fiber-reinforced, starch-bound cellular matrix as defined in claim 158, wherein the starch-based binder includes a waxy cornstarch or waxy cornstarch derivative that has been gelatinized during molding.

164. An article of manufacture having a fiber-reinforced, starch-bound cellular matrix as defined in claim 158, wherein the starch-based binder includes a modified starch.

165. An article of manufacture having a fiber-reinforced, starch-bound cellular matrix as defined in claim 158, wherein the starch-based binder has a concentration in a range from about 10% to about 80% by weight of the cellular matrix.

166. An article of manufacture having a fiber-reinforced, starch-bound cellular matrix as defined in claim 158, wherein the starch-based binder has a concentration in a range from about 30% to about 70% by weight of the cellular matrix.

167. An article of manufacture having a fiber-reinforced, starch-bound cellular matrix as defined in claim 158, wherein the fibers include naturally occurring organic fibers.

168. An article of manufacture having a fiber-reinforced, starch-bound cellular matrix as defined in claim 158, wherein the fibers include inorganic fibers.

169. An article of manufacture having a fiber-reinforced, starch-bound cellular matrix as defined in claim 158, wherein the fibers have an aspect ratio of at least about 100:1.

170. An article of manufacture having a fiber-reinforced, starch-bound cellular matrix as defined in claim 158, wherein the fibers have an aspect ratio of at least about 250:1.

171. An article of manufacture having a fiber-reinforced, starch-bound cellular matrix as defined in claim 158, wherein the fibers have an average length greater than about 3.5 min.

172. An article of manufacture having a fiber-reinforced, starch-bound cellular matrix as defined in claim 158, wherein said inorganic aggregate filler is homogeneously dispersed throughout the cellular matrix.

173. An article of manufacture having a fiber-reinforced, starch-bound cellular matrix as defined in claim 158, wherein the inorganic aggregate filler includes calcium carbonate.

174. An article of manufacture having a fiber-reinforced, starch-bound cellular matrix as defined in claim 158, wherein the inorganic aggregate filler is selected from the group consisting of sand, gravel, rock, limestone, sandstone, glass beads, mica, clay, kaolin, synthetic clay, alumina silica, fly ash, fused silica, tabular alumina, microspheres, calcium sulfate dihydrate, calcium aluminate, hydrated hydraulic cement particles, and unhydrated hydraulic cement particles.

175. An article of manufacture having a fiber-reinforced, starch-bound cellular matrix as defined in claim 158, wherein the inorganic aggregate filler is selected from the group consisting of perlite, vermiculite, hollow glass spheres, areogels, xerogels, porous ceramic spheres, xonotlite, lightweight expanded clays, pumice, and exfoliated rock.

176. An article of manufacture having a fiber-reinforced, starch-bound cellular matrix as defined in claim 158, wherein the inorganic aggregate filler has a concentration in a range from about 20% to about 80% by weight of the cellular matrix.

177. An article of manufacture having a fiber-reinforced, starch-bound cellular matrix as defined in claim 158, wherein the inorganic filler has a concentration in a range from about 30% to about 70% by weight of the cellular matrix.

178. An article of manufacture having a fiber-reinforced, starch-bound cellular matrix as defined in claim 158, wherein the inorganic aggregate filler has a concentration in a range from about 40% to about 60% by weight of the cellular matrix.

179. An article of manufacture having a fiber-reinforced, starch-bound cellular matrix as defined in claim 158, wherein the cellular matrix further comprises a humectant.

180. An article of manufacture having a fiber-reinforced, starch-bound cellular matrix as defined in claim 158, wherein the article comprises a liquid-tight container.

181. An article of manufacture having a fiber-reinforced, starch-bound cellular matrix as defined in claim 158, wherein the article is in the shape of a clam-shell container.

182. An article of manufacture having a fiber-reinforced, starch-bound cellular matrix comprising a starch-based binder and fibers substantially uniformly dispersed throughout the starch-bound cellular matrix, the fibers having an average length greater than about 2 mm, an average aspect ratio greater than about 25:1, and a concentration in a range from about 2% to about 80% by weight of the cellular matrix, the cellular matrix having an average density less than about 0.25 g/cm$^3$.

183. An article of manufacture having a fiber-reinforced, starch-bound cellular matrix as defined in claim 182, wherein the article comprises a food or beverage container.

184. An article of manufacture having a fiber-reinforced, starch-bound cellular matrix as defined in claim 182, further comprising a coating on a surface of the article.

185. An article of manufacture having a fiber-reinforced, starch-bound cellular matrix as defined in claim 182, further comprising an aggregate filler.

186. An article of manufacture having a fiber-reinforced, starch-bound cellular matrix as defined in claim 185, wherein the inorganic aggregate filler includes calcium carbonate.

187. An article of manufacture having a fiber-reinforced, starch-bound cellular matrix as defined in claim 185, wherein the inorganic aggregate filler is selected from the group consisting of sand, gravel, rock, limestone, sandstone, glass beads, mica, clay, kaolin, synthetic clay, alumina silica, fly ash, fused silica, tabular alumina, microspheres, calcium sulfate dihydrate, calcium aluminate, hydrated hydraulic cement particles, and unhydrated hydraulic cement particles.

188. An article of manufacture having a fiber-reinforced, starch-bound cellular matrix as defined in claim 185, wherein the inorganic aggregate filler is selected from the group consisting of perlite, vermiculite, hollow glass spheres, areogels, xerogels, porous ceramic spheres, xonotlite, lightweight expanded clays, pumice, and exfoliated rock.

189. An article of manufacture having a fiber-reinforced, starch-bound cellular matrix as defined in claim 185, wherein the inorganic aggregate filler has a concentration in a range from about 20% to about 80% by weight of the cellular matrix.

190. An article of manufacture having a fiber-reinforced, starch-bound cellular matrix as defined in claim 185, wherein the inorganic filler has a concentration in a range from about 30% to about 70% by weight of the cellular matrix.

191. An article of manufacture having a fiber-reinforced, starch-bound cellular matrix as defined in claim 185, wherein the inorganic aggregate filler has a concentration in a range from about 40% to about 60% by weight of the cellular matrix.

192. An article of manufacture having a fiber-reinforced, starch-bound cellular matrix comprising a starch-based binder, an aggregate filler, and fibers substantially uniformly dispersed throughout the starch-bound cellular matrix, the fibers having an average length greater than about 2 mm, an average aspect ratio greater than about 25:1, and a concentration in a range from about 2% to about 80% by weight of the cellular matrix, the cellular matrix including an outer skin portion having a density and an interior foam portion having a density that is significantly lower than the density of the outer skin portion.

193. An article of manufacture having a fiber-reinforced, starch-bound cellular matrix as defined in claim 192, further comprising a coating on a surface of the article.

194. An article of manufacture having a fiber-reinforced, starch-bound cellular matrix as defined in claim 193, wherein the coating comprises a wax.

195. An article of manufacture having a fiber-reinforced, starch-bound cellular matrix as defined in claim 193, wherein the coating comprises a polymeric material.

196. An article of manufacture having a fiber-reinforced, starch-bound cellular matrix comprising a starch-based binder, an inorganic aggregate filler, and fibers substantially uniformly dispersed throughout the starch-bound cellular matrix, the fibers having an average length greater than about 2 mm, an average aspect ratio greater than about 25:1, and a concentration in a range from about 2% to about 80% by weight of the cellular matrix, the inorganic aggregate filler having a concentration greater than about 20% by weight of the cellular matrix, the cellular matrix including an outer skin portion having a density and an interior foam portion having a density that is significantly lower than the density of the outer skin portion.

197. An article of manufacture having a fiber-reinforced, starch-bound cellular matrix as defined in claim 196, further comprising a coating on a surface of the article.

198. An article of manufacture having a fiber-reinforced, starch-bound cellular matrix as defined in claim 197, wherein the coating comprises a wax.

199. An article of manufacture having a fiber-reinforced, starch-bound cellular matrix as defined in claim 197, wherein the coating comprises a polymeric material.

200. An article of manufacture having a fiber-reinforced, starch-bound cellular matrix as defined in claim 196, wherein the article comprises a food or beverage container.

* * * * *

UNITED STATES PATENT AND TRADEMARK OFFICE
CERTIFICATE OF CORRECTION

PATENT NO. : 5,683,772

DATED : November 4, 1997

INVENTOR(S) : Per Just Andersen; Simon K. Hodson

Page 1 of 4

It is certified that error appears in the above-identified patent and that said Letters Patent is hereby corrected as shown below: On the title page:

Page 2, Left Column, U.S. Patent Documents, Pat. No. 2,968,561, "Bimkrant" should be --Birnkrant--

Page 3, Left Column, Foreign Patent Documents, Pat. No. 0556774 A2, "WIPO" should be --European Pat. Off.--

Col. 1, line 30, after "INVENTION" delete "1. The"

Col. 1, line 31, before "Field" insert --1. The--

Col. 1, line 60, after "materials." begin a new line starting with "2."

Col. 4, line 55, "mounts" should be --amounts--

Col. 28, line 43, after "be" change "dram" to --drawn--

Col. 32, line 5, after "mixture" change "ofpregelated" to --of pregelated--

Col. 32, line 7, after "binder" change "gelales" to --gelates--

Col. 34, line 5, change "tom" to --torn--

Col. 37, line 27, after "also" change "bum" to --burn--

Col. 38, line 16, after "top end" insert --6--

Col. 39, line 9, after "wasted." begin a new paragraph starting with "The"

Col. 46, line 64, after "appropriate" change "mounts" to --amount--

UNITED STATES PATENT AND TRADEMARK OFFICE
CERTIFICATE OF CORRECTION

PATENT NO. : 5,683,772

DATED : November 4, 1997

INVENTOR(S) : Per Just Andersen; Simon K. Hodson

It is certified that error appears in the above-identified patent and that said Letters Patent is hereby corrected as shown below:

Col. 46, line 66, after "in" change "ram" to --turn--

Col. 47, line 25, before "of water" change "mount" to --amount--

Col. 49, line 16, after "removed" change "form" to --from--

Col. 50, line 19, before "P.J." change "Anderson" to --Andersen--

Col. 50, line 48, after "preferable" change "foe" to --for--

Col. 61, line 10, after "and" change "filing" to --filling--

Col. 64, line 3, after "Bars)" delete the second period

Col. 64, line 25, after "rotating" change "dram" to --drum--

Col. 64, line 28, after "As" change "dram" to --drum--

Col. 64, line 31, after "from" change "dram" to --drum--

Col. 65, line 65, after "fossil and" change "modem" to --modern--

Col. 66, line 4, after "resins," delete the period

Col. 68, line 16, after "been" change "normalize" to --normalized--

Col. 69, line 65, after "4" change "min" to --mm--

Col. 73, after Example 22, change "Mediocel" to --Methocel--

UNITED STATES PATENT AND TRADEMARK OFFICE
CERTIFICATE OF CORRECTION

PATENT NO. : 5,683,772

DATED : November 4, 1997

INVENTOR(S) : Per Just Andersen; Simon K. Hodson

It is certified that error appears in the above-identified patent and that said Letters Patent is hereby corrected as shown below:

Col. 77, line 8, under the heading "Sieve Opening" change "18.00" to --18.000--

Col. 79, line 34, under the heading "Calcium Carbonate R040 (g)" change "501" to --500--

Col. 84, line 24, change "K (W/m.K)" to --K (W/m·K)--

Col. 84, line 34, Example 154, under the heading "Shell Wt.(g)" and in the space under "16.03" insert --24.59--

Col. 85, line 35, after "fiber" change "mounts" to --amounts--

Col. 86, line 41, after "were" change "aiso" to --also--

UNITED STATES PATENT AND TRADEMARK OFFICE
CERTIFICATE OF CORRECTION

PATENT NO. : 5,683,772

DATED : November 4, 1997

INVENTOR(S) : Per Just Andersen; Simon K. Hodson

It is certified that error appears in the above-identified patent and that said Letters Patent is hereby corrected as shown below:

Col. 90, line 24, after "thereof" delete the second period

Col. 91, line 7, after "472" change "Pa's" to --Pa·s--

Col. 102, line 45, after "esterification," change "ethefification" to --etherification--

Col. 109, line 42, after "waxy" change "cornstarch" to --corn starch--

Col. 109, line 43, after "waxy" change "cornstarch" to --corn starch--

Col. 110, line 8, after "3.5" change "min" to --mm--

Signed and Sealed this

Twenty-third Day of June, 1998

BRUCE LEHMAN

Attest:

Attesting Officer

Commissioner of Patents and Trademarks